(12) United States Patent
Yoshida et al.

(10) Patent No.: US 7,319,500 B2
(45) Date of Patent: Jan. 15, 2008

(54) VIEWING ANGLE COMPENSATION FILM AND LIQUID CRYSTAL DISPLAY

(75) Inventors: Hidefumi Yoshida, Kawasaki (JP); Takashi Sasabayashi, Kawasaki (JP); Yasutoshi Tasaka, Kawasaki (JP); Yohei Nakanishi, Kawasaki (JP); Kenji Okamoto, Kawasaki (JP); Seiji Tanuma, Kawasaki (JP); Kazutaka Hanaoka, Kawasaki (JP); Takatoshi Mayama, Kawasaki (JP); Yuichi Inoue, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 1244 days.

(21) Appl. No.: 09/825,116

(22) Filed: Apr. 3, 2001

(65) Prior Publication Data

US 2001/0030726 A1    Oct. 18, 2001

(30) Foreign Application Priority Data

| Apr. 6, 2000 | (JP) | ............................. 2000-105352 |
| Oct. 4, 2000 | (JP) | ............................. 2000-305471 |
| Feb. 19, 2001 | (JP) | ............................. 2001-042212 |

(51) Int. Cl.
   *G02F 1/1335*    (2006.01)

(52) U.S. Cl. ........................ 349/96; 349/99; 349/102; 349/103; 349/117; 349/119

(58) Field of Classification Search ................ 349/117, 349/118, 116, 113, 115, 120, 119, 121, 136, 349/73, 96, 99, 102, 103; 359/73
See application file for complete search history.

(56) References Cited

U.S. PATENT DOCUMENTS

| 4,813,770 | A | * | 3/1989 | Clerc et al. .................... 349/74 |
| 5,213,852 | A | | 5/1993 | Arakawa et al. |
| 5,448,386 | A | * | 9/1995 | Watanabe et al. ........... 349/119 |
| 5,548,426 | A | * | 8/1996 | Miyashita et al. ............ 359/73 |
| 5,659,411 | A | * | 8/1997 | Nito et al. ................... 349/117 |
| 5,796,457 | A | * | 8/1998 | Ukai et al. ................... 349/119 |
| 5,883,685 | A | * | 3/1999 | Mazaki et al. ............. 349/117 |
| 5,940,155 | A | * | 8/1999 | Yang et al. .................. 349/120 |
| 6,061,108 | A | * | 5/2000 | Anderson et al. ............. 349/98 |
| 6,137,556 | A | * | 10/2000 | Yamahara .................... 349/136 |
| 6,141,070 | A | * | 10/2000 | Kaneko ........................ 349/117 |
| 6,379,758 | B1 | * | 4/2002 | Hanmer et al. .............. 428/1.1 |
| 6,544,605 | B1 | * | 4/2003 | Verrall et al. ................ 428/1.3 |
| 6,628,359 | B1 | * | 9/2003 | Terashita et al. ............ 349/120 |

FOREIGN PATENT DOCUMENTS

JP          04-101119          4/1992

(Continued)

*Primary Examiner*—Evan Pert
(74) *Attorney, Agent, or Firm*—Greer, Burns & Crain, Ltd

(57) ABSTRACT

There is provided a liquid crystal display which exhibits preferable viewing angle characteristics even in a diagonal viewing angle. Optical retardation films of a first type that satisfy $n_x > n_y$, $n_z$ and optical retardation films of a second type that satisfy $n_x \cong n_y > n_z$ are used, and a setting is made to satisfy Rp−t=2×(−0.08×$R_{LC}$+58 nm+α) (α=±30 nm) and Rt−t=(1.05±0.05)×$R_{LC}$−47 nm+β(−100 nm≦β≦47 nm) where Δnd represents a retardation $R_{LC}$ in the liquid crystal display; Rp−t represents the sum of retardations Rp in in-plane directions of a plurality of optical retardation films; and Rt−t represents the sum of retardations Rt in the direction of the thickness of the plurality of optical retardation films.

61 Claims, 89 Drawing Sheets

FOREIGN PATENT DOCUMENTS

| | | |
|---|---|---|
| JP | 04-162018 | 6/1992 |
| JP | 05-045520 | 2/1993 |
| JP | 05-257014 | 10/1993 |
| JP | 05-289052 | 11/1993 |
| JP | 06-214116 | 8/1994 |
| JP | 07-244280 | 9/1995 |
| JP | 07-333433 | 12/1995 |
| JP | 08-050206 | 2/1996 |
| JP | 08-129171 | 5/1996 |
| JP | 08-62434 | 10/1996 |
| JP | 09-054315 | 2/1997 |
| JP | 09-146086 | 6/1997 |
| JP | 09-197397 | 7/1997 |
| JP | 09-203895 | 8/1997 |
| JP | 10-003081 | 1/1998 |
| JP | 10-246885 | 9/1998 |
| JP | 10-312166 | 11/1998 |
| JP | 10-319389 | 12/1998 |
| JP | 11-142-836 | 5/1999 |
| JP | 11-242225 | 9/1999 |
| JP | 11-264976 | 9/1999 |
| JP | 2000-019518 | 1/2000 |
| JP | 2000-081618 | 3/2000 |
| JP | 2000-235185 | 8/2000 |
| WO | 97/12275 | 4/1997 |

\* cited by examiner

FIG.16
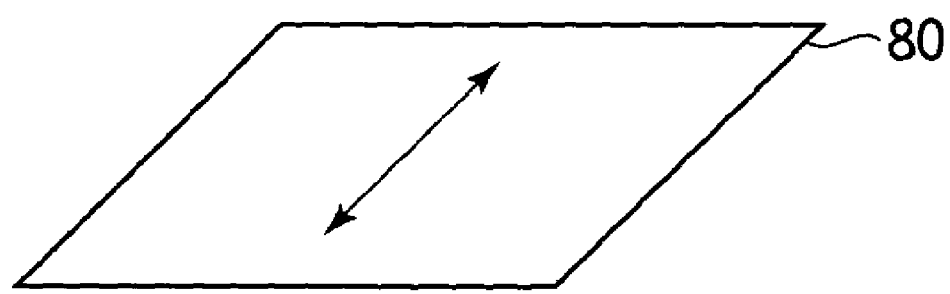
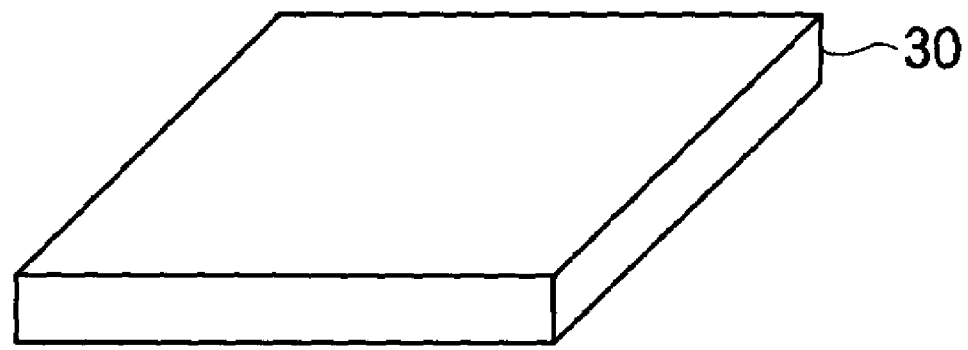
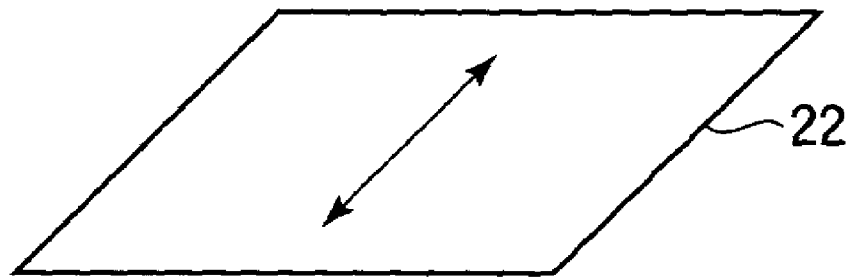

CR
——— : 20
--------- : 50
············ : 100
—·—·—·— : 200
—··—··— : 500

FIG.21
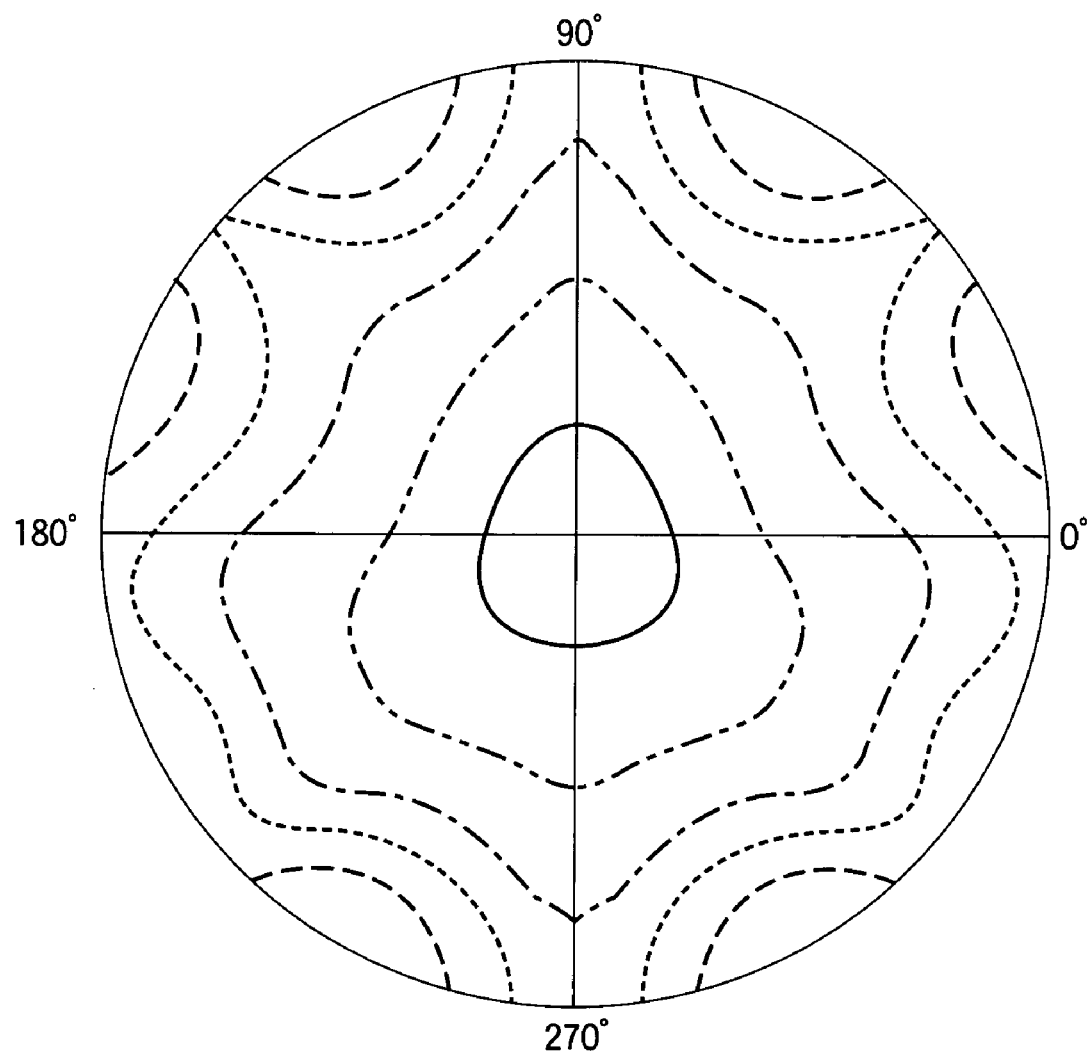
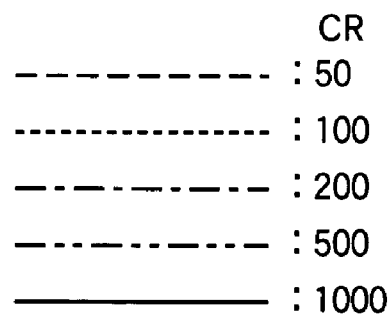

FIG.28
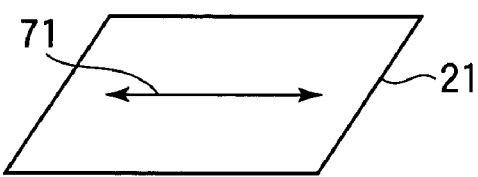
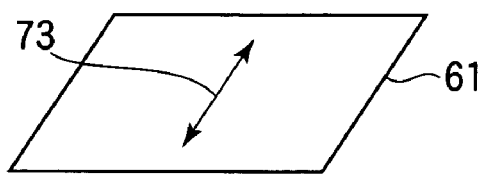
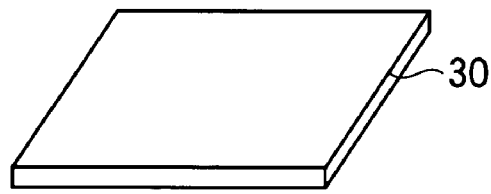
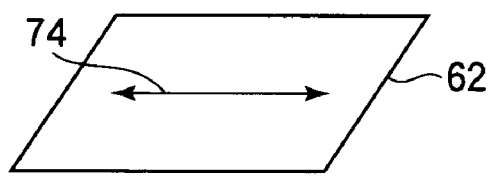

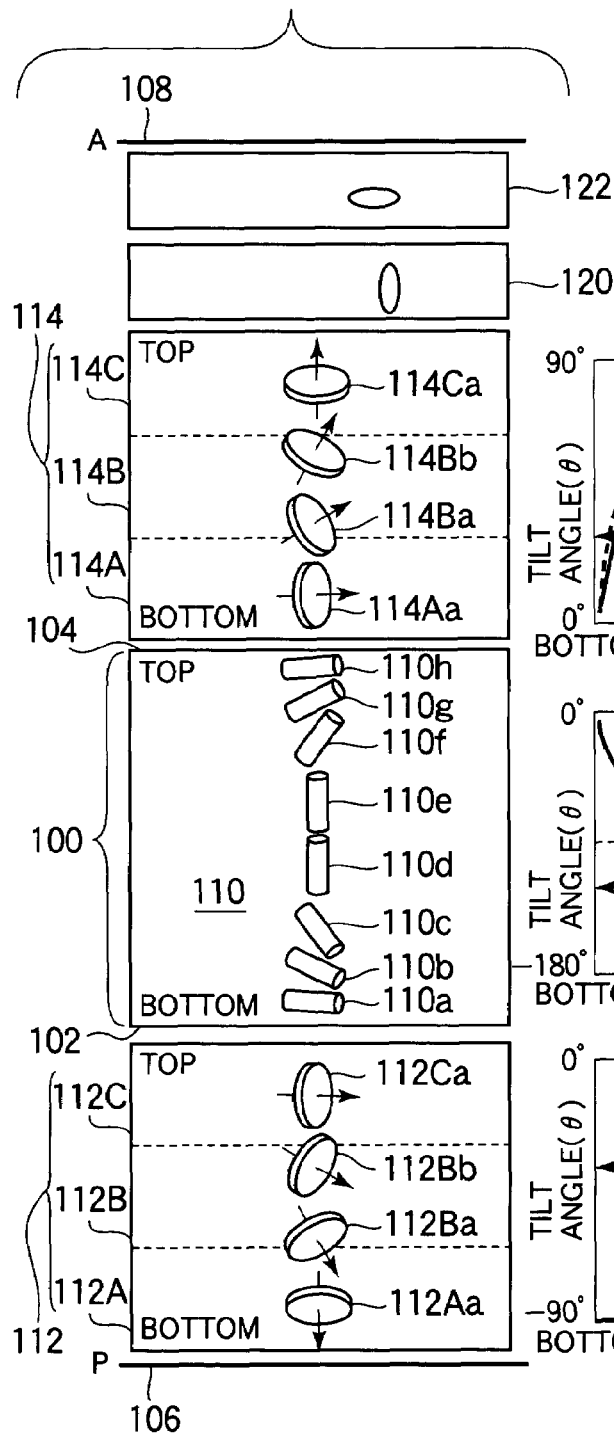
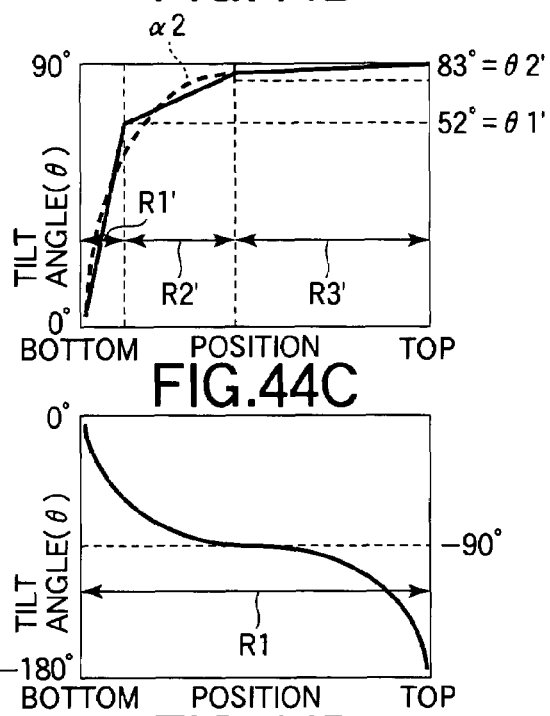
FIG.44A
FIG.44B
FIG.44C
FIG.44D

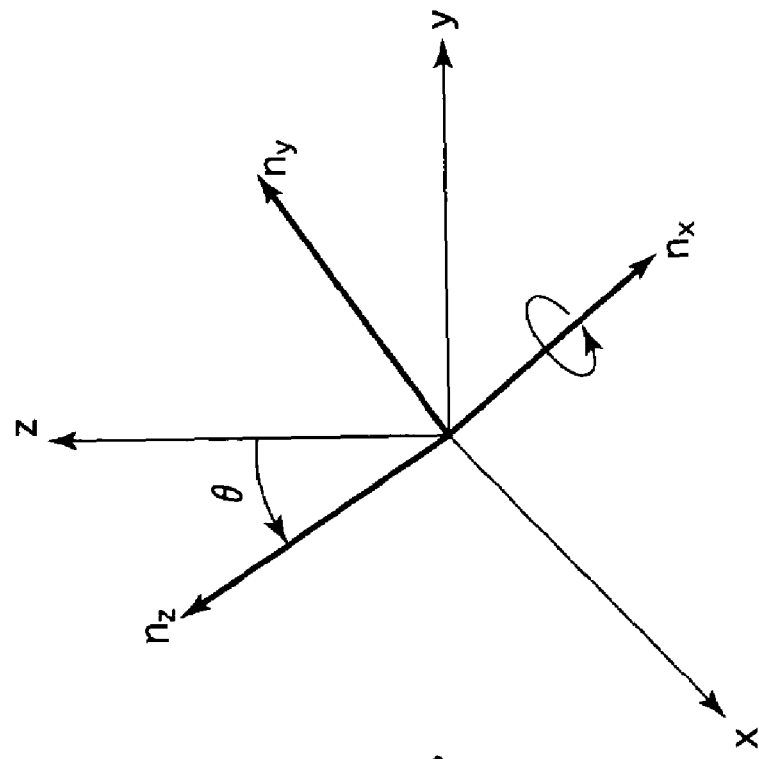
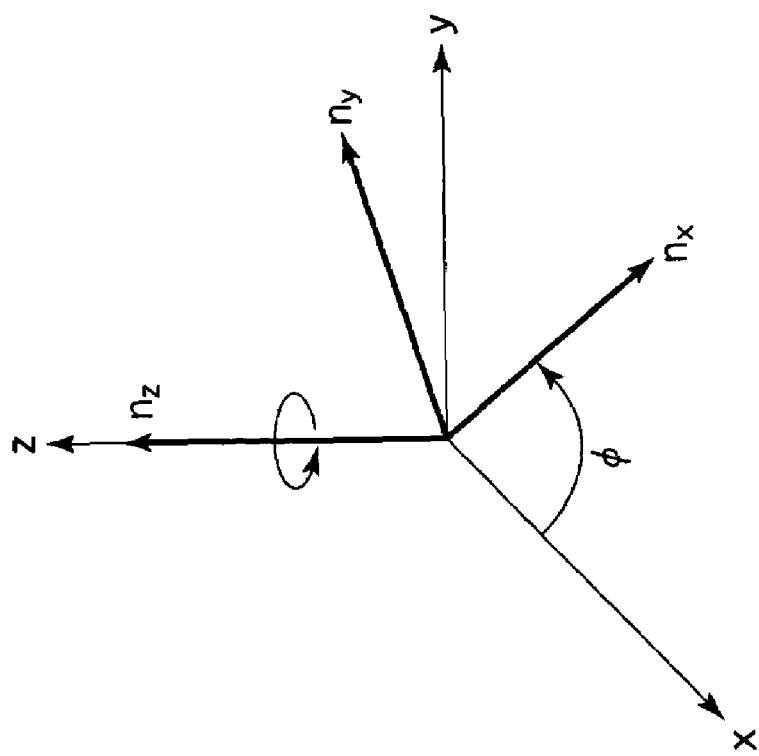
FIG.49

FIG. 63
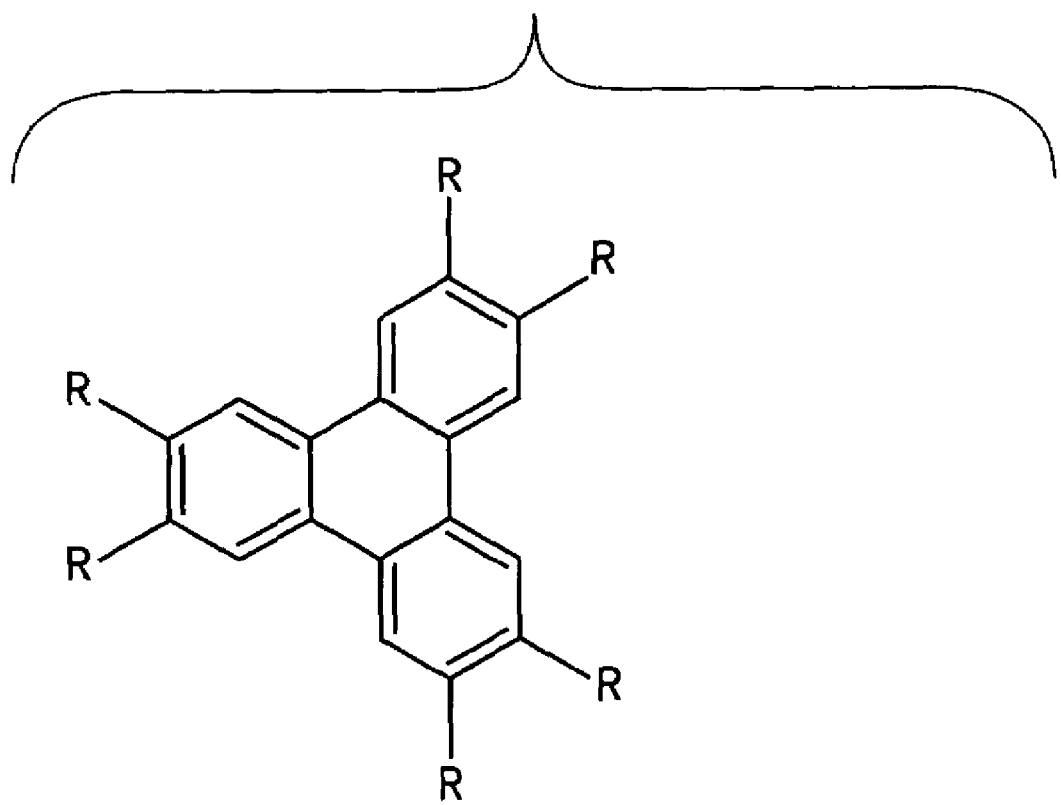
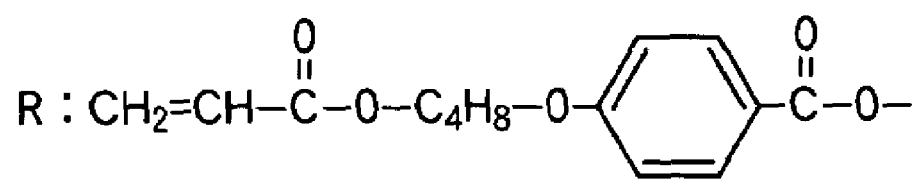

POLAR ANGLE IN UPWARD AND
DOWNWARD DIRECTION

POLAR ANGLE IN LEFTWARD AND
RIGHTWARD DIRECTION

VIEWING ANGLE COMPENSATION FILM AND LIQUID CRYSTAL DISPLAY

BACKGROUND OF THE INVENTION

1. Field of the Invention

The present invention relates to a liquid crystal display (LCD) and, more particularly, to a vertically aligned (VA) liquid crystal display in which liquid crystal molecules are aligned substantially vertically to the substrate when no voltage is applied to the liquid crystals and in which a phase difference film is used as a viewing angle compensation film to reduce viewing angle dependency that is characteristic of liquid crystal displays.

2. Description of the Related Art

Liquid crystal displays, more particularly, TN (twisted nematic) display mode TFT (thin film transistor) LCDs utilizing the rotary mode have recently spread as displays for personal computers and the like. However, such TN LCDs have problems such as a reduction of display contrast in a diagonal viewing direction, inversion of brightness and darkness of display and an insufficient response speed. Under such circumstances, VA LCDs have been proposed which utilize the birefringent mode instead of the rotary mode unlike TN LCDs.

VA LCDs are characterized in that they are higher than TN LCDs in display contrast and in the speed of response in switching between white and black levels (from white display to black display or from black display to white display). However, VA LCDs have the problem of viewing angle dependency during display of halftones similarly to TN LCDs.

So-called alignment separating techniques have been proposed and put in use to achieve preferable viewing angle characteristics by aligning liquid crystal molecules in a pixel in two or more different directions. In Japanese patent application No. H10-185836, the present applicant has proposed a so-called MVA (multi-domain vertical alignment) liquid crystal display having domain defining structure in which liquid crystal molecules in a pixel are aligned in two or more different directions by providing domain defining structure that is constituted by protrusions or recesses provided on opposite surfaces of a pair of substrates of the liquid crystal panel or slits provided on the electrode or a combination of such features.

FIGS. 1 through 3B are schematic illustrations of a conventional MVA LCD. FIG. 1 shows a general configuration of the same; FIG. 2 shows the region of one pixel; and FIGS. 3A and 3B are sectional views of a major part showing an operation of the same.

Referring to FIG. 1, a pair of polarizers 22 and 21 are provided outside a liquid crystal panel 30, and the absorption axes of the pair of polarizers 22 and 21 are orthogonal to each other as indicated by the arrow in the figure. Liquid crystal molecules are aligned in four directions in each pixel, and the directions of alignment of the liquid crystal molecules indicated by the arrows A through D are at an angle of about 45 deg. to the absorption axes of the polarizers 22 and 21.

Referring to FIG. 2, a plurality of gate bus lines 11 and drain bus lines 12 are disposed on a TFT substrate such that they cross each other, and a region surrounded by gate bus lines 11 and drain bus lines 12 serves as one pixel region. In a pixel regions, a TFT 306 is disposed which is connected to a gate bus line 11 and drain bus line 12, and a pixel electrodes 13 is provided in connection to the TFT 306. At the pixel electrode 13, a slit 15 to serve as domain defining structure is formed in a substantially V-shaped configuration, and it extends in directions substantially at an angle of 45 deg. to the polarizer axes of the pair of polarizers indicated by cross arrows. A storage capacity bus line 16 is disposed in the middle of the pixel in parallel with the gate bus line 11 to form a storage capacity (auxiliary capacity) between the pixel electrode 13 and itself. Protrusions 14 to serve as domain defining structure are disposed on a counter substrate. The protrusions 14 are formed in parallel with the slit 15 such that they do not overlap the same and are formed in a substantially V-shaped configuration similarly to the slit 15.

FIG. 3A shows a state at a time when no voltage is applied, and FIG. 3B shows a state at a time when a voltage is applied. Those figures show only elements that must be shown for description and omit other elements. A slit 15 is provided on a pixel electrode 13 disposed on a transparent substrate 24 that is a TFT substrate made of glass or the like, and protrusions 14 made of a dielectric material are provided on a counter electrode (common electrode) 25 provided on a transparent substrate 23 that is a counter substrate. Nematic liquid crystals having negative dielectrically isotropic properties are sealed between the TFT substrate and counter substrate. A pair of polarizers 22 and 21 is provided outside the transparent substrates 24 and 23.

When no voltage is applied, liquid crystal molecules 27 are aligned such that their longitudinal directions are substantially perpendicular to the substrates 24 and 23 as shown in FIG. 3A. When a voltage is applied, electric lines of force 28 are tilted by the slit 15 (or the cut-out in the pixel electrode 13) and the protrusions 14 as shown in FIG. 3B. Since the liquid crystal molecules 27 are tilted perpendicularly to the electric lines of force 28, they are tilted in two directions (i.e., directions 180 deg. different from each other) that extend from the slit 15 and the protrusions 14. Since the slit 15 and protrusions 14 in the pixel extend in directions about 90 deg. different from each other as shown in FIG. 2, four regions having different directions of alignment A through D are formed as shown in FIG. 2. The directions of alignment A through D correspond to the reference symbols A through D in FIG. 1.

FIG. 4 is a diagram showing viewing angle characteristics of the conventional MVA LCD shown in FIGS. 1 through 3B.

FIG. 4 shows that the MVA LCD has contrast of 100 or more even it is viewed in positions at a tilt angle of 80 deg. in upward, downward, leftward and rightward directions (at azimuth angles of 0, 90, 180 and 270 deg.) and that it therefore has preferable viewing angle characteristics in the upward, downward, leftward and rightward directions.

However, a significant reduction occurs in the contrast when viewed in diagonal directions at an angle of 45 deg. (at azimuth angles of 45, 135, 225 and 315 deg.). Contrast of 5 or more can be achieved in a range of tilt angles up to about 40 deg., and contrast of only 1 can be achieved at a tilt angle of 80 deg.

In order to improve characteristics in such diagonal viewing directions, the above-cited prior patent application has disclosed a configuration in which an optical retardation film is disposed in an MVA LCD. However, the improvement achieved by the configuration disclosed in the prior patent application is insufficient, and there are demands for further improvements.

SUMMARY OF THE INVENTION

The present invention confronts the above-described problems, and it is an object of the invention to provide a liquid crystal display whose viewing angle characteristics are improved in all directions including diagonal viewing directions.

According to the principle of the invention, the above-described problems are solved by a liquid crystal display having the following characteristics.

There is provided a liquid crystal display characterized in that it has:

a liquid crystal panel in which a liquid crystal layer made of liquid crystals is sandwiched between a pair of substrates, the liquid crystals including liquid crystal molecules whose longitudinal directions are aligned substantially perpendicularly to surfaces of the substrates when no voltage is applied;

first and second polarizing elements provided outside the liquid crystal panel on both sides thereof and disposed such that the respective absorption axes are orthogonal to each other and such that the absorption axes are substantially at an angle of 45 deg. to the direction of alignment of the liquid crystal molecules when a voltage is applied to the liquid crystals;

a first optical retardation film of a first type provided between the first polarizing element and the liquid crystal panel such that a phase-delay axis thereof is orthogonal to the absorption axis of the first polarizing element, the first type of optical retardation film being an optical retardation film whose in-plane refractive index $n_x$ is greater than both of an in-plane refractive index $n_y$ thereof and a refractive index $n_z$ thereof in the direction of the thickness thereof;

a second optical retardation film of the first type provided between the second polarizing element and the liquid crystal panel such that a phase-delay axis thereof is orthogonal to the absorption axis of the second polarizing element, the second optical retardation film of the first type being an optical retardation film in which $n_x$ and $n_y$ are substantially equal to each other and in which $n_x$ and $n_y$ are greater than $n_z$; and at least one optical retardation film of a second type provided in at least one location between the first polarizing element and the first optical retardation film of the first type, between the second polarizing element and the second optical retardation film of the first type, between the first optical retardation film of the first type and the liquid crystal panel or between the second optical retardation film of the first type and the liquid crystal panel and in that it satisfies:

$$Rp-t=2\times(-0.08\times R_{LC}+58 \text{ nm}+\alpha) \qquad \text{Equation 1}$$

where $\alpha=\pm30$ nm; and $$Rt-t=(1.05\pm0.05)\times R_{LC}-47 \text{ nm}+\beta \qquad \text{Equation 2}$$

where $-100 \text{ nm} \leq \beta \leq 47$ nm, a retardation $R_{LC}$ in the liquid crystal layer being represented by $\Delta nd$ that is the product of birefringence $\Delta n$ of the liquid crystals and the thickness d of the liquid crystal layer, a retardation Rp in an optical retardation film in a direction in the plane thereof being represented by $(n_x-n_y)d$, a retardation Rt in the direction of the thickness being represented by $((n_x+n_y)/2-n_z)d$, the sum of retardations Rp in-plane directions of the plurality of optical retardation films excluding optical retardation films whose phase-delay axes are located in parallel with the absorption axes of polarizing elements adjacent thereto being represented by Rp–t, the sum of retardations Rt in the direction of thickness of the plurality of optical retardation films being represented by Rt–t.

According to the above-described principle of the invention, the quantities and locations of retardations provided by the first type optical retardation films and second type optical retardation films for compensating viewing angle characteristics are optimized. It is therefore possible to improve viewing angle characteristics of a liquid crystal display in diagonal directions, thereby providing preferable display.

BRIEF DESCRIPTION OF THE DRAWINGS

FIG. 16 shows a configuration of an MVA LCD that is added with a uniaxial optical retardation film;

FIG. 21 shows viewing angle characteristics of the MVA LCD according to the fourth embodiment of the invention;

FIG. 28 shows a configuration of an MVA LCD according to a sixth embodiment of the invention;

FIGS. 44A through 44D are illustrations of a schematic configuration of Example 2 as an example of a specific configuration of a liquid crystal display according to the seventh embodiment of the invention;

FIG. 49 is an illustration for defining Eulerian angles $\phi$ and $\theta$;

FIG. 63 shows a discotic liquid crystal used in optical retardation films 130 and 132 according to the example of the eighth embodiment of the invention;

DETAILED DESCRIPTION OF THE PREFERRED EMBODIMENTS

Preferred embodiments of the invention will now be described with reference to the drawings.

While the description will refer to MVA liquid crystal displays as liquid crystal panels, the invention is not limited to them and may be applied to other vertically aligned liquid crystal displays and TN liquid crystal displays.

First Embodiment

Prior to a description of an embodiment of the invention, a description will be made on an optical retardation film of a first type and an optical retardation film of a second type according to the invention.

Figure 8:
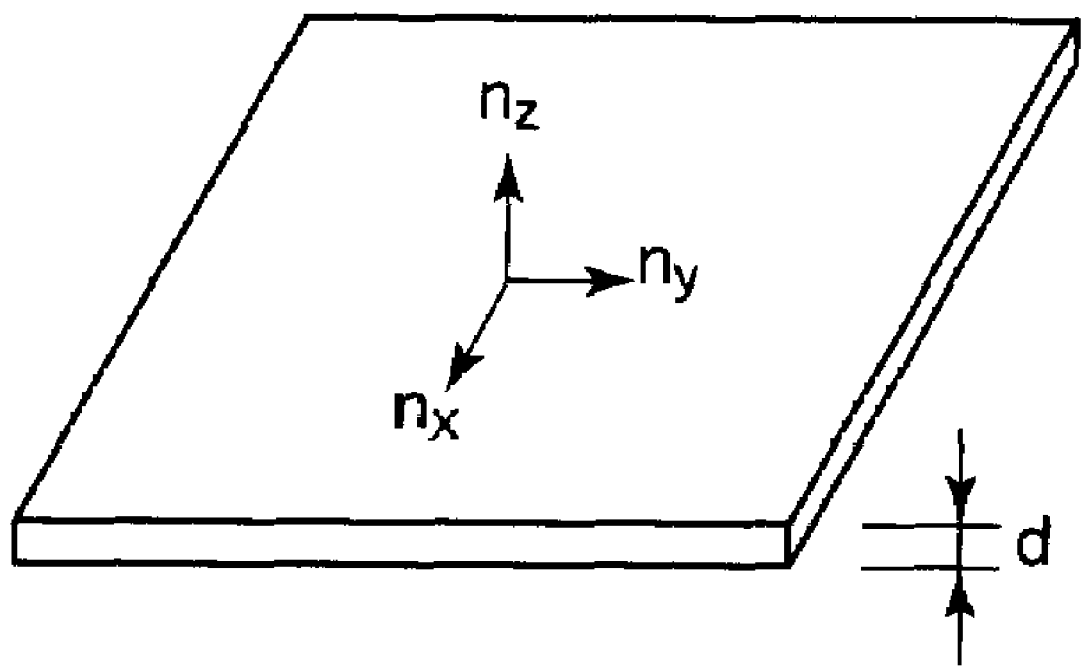
FIG. 8 illustrates an optical retardation film.

FIG. 8 illustrates an optical retardation film. What is important for an optical retardation film is a retardation in an in-plane direction of the same and a retardation in the direction of the thickness, and the retardation in the in-plane direction and the retardation in the direction of the thickness are respectively expressed by:

$$Rp=(n_x-n_y)d;$$

and $$Rt=((n_x+n_y)/2-n_z)d$$

where $n_x$ and $n_y$ represent refractive indices of the film in directions in the plane thereof, and $n_z$ represents a refractive index in the direction of the thickness of the same.

In the context of the invention, an optical retardation film in which $n_x$ is greater than both of $n_y$ and $n_z$ or which satisfies $n_x>n_y$, $n_z$ is referred to as "an optical retardation film of a first type", and the direction of $n_x$ or $n_y$ which is greater is referred to as "a phase-delay axis". Let us assume that the thickness of the optical retardation film is represented by "d". Then, when light passes through the optical retardation film of the first type, a retardation (a phase difference) expressed by $Rp=(n_x-n_y)d$ occurs in a direction in the plane of the same. An optical retardation film in which $n_x$ and $n_y$ are greater than $n_z$ or which satisfies $n_x \cong n_y > n_z$ is referred to as "an optical retardation film that has optically negative uniaxial properties in the normal direction of the surface thereof" and is referred to as "an optical retardation film of a second type" in the context of the invention. Let us assume that the thickness of the optical retardation film is represented by "d". Then, when light passes through the optical retardation film of the second type, a retardation of $Rt=((n_x+n_y)/2-n_z)d$ occurs in the direction of the thickness. While a retardation Rp in a direction in the plane of an optical retardation film of a first type and a retardation Rt in the direction of the thickness of an optical retardation film of a second type have been described, there are retardations Rp and Rt having different values in in-plane directions and in the direction of thickness.

While the optical retardation film of the second type has been described as having refractive indices that satisfy $n_x \cong n_y > n_z$, in the present specification, the relationship between $n_x$ and $n_y$ ($n_x \cong n_y$) is satisfies:

$$(n_x+n_y)/2-n_z > (n_x-n_y) \times 2; \text{ or}$$

$$(n_x-n_y) \times d \leq 20 \text{ nm}.$$

Figure 5:
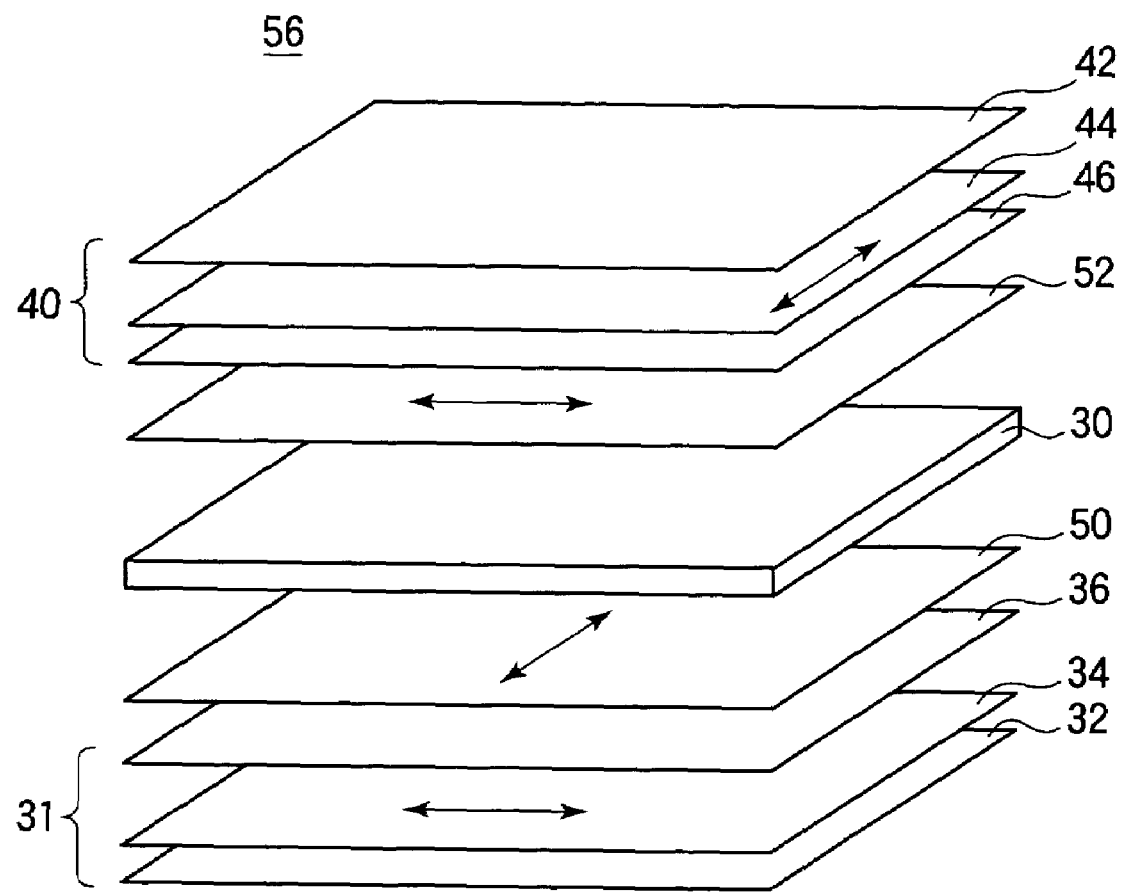
FIG. 5 shows a first embodiment of the invention.

FIG. 5 shows a liquid crystal display 56 according to a first embodiment of the invention. The liquid crystal display 56 is a transmission type liquid crystal display in which a protective layer 32, a first polarizing element 34, a first optical retardation film 36 of a second type, a first optical retardation film 50 of a first type, a liquid crystal panel 30, a second optical retardation film 52 of the first type, a second optical retardation film 46 of the second type, a second polarizing element 44 and another protective film 42 are provided which are listed in the order of their closeness to the side of the display where light enters. The protective layer 32, the first polarizing element 34 and the first optical retardation film 36 of the second type are combined and integrated to form a polarizer 31. Similarly, the protective layer 42, the second polarizing element 44 and the second optical retardation film 46 of the second type are combined and integrated to form another polarizer 40. That is, the optical retardation films 36 and 46 of the second type serve also as protective layers that are protective members forming a part of the polarizers 31 and 40. As thus described, the polarizing elements in the context of the present specification are layers having a polarizing function and are regarded as elements excluding protective members or the like which are different from so-called polarizers that are generally integral with protective members. The liquid crystal panel 30 is an MVA LCD having four separate alignments as shown in FIGS. 1 through 3B.

Figure 1:
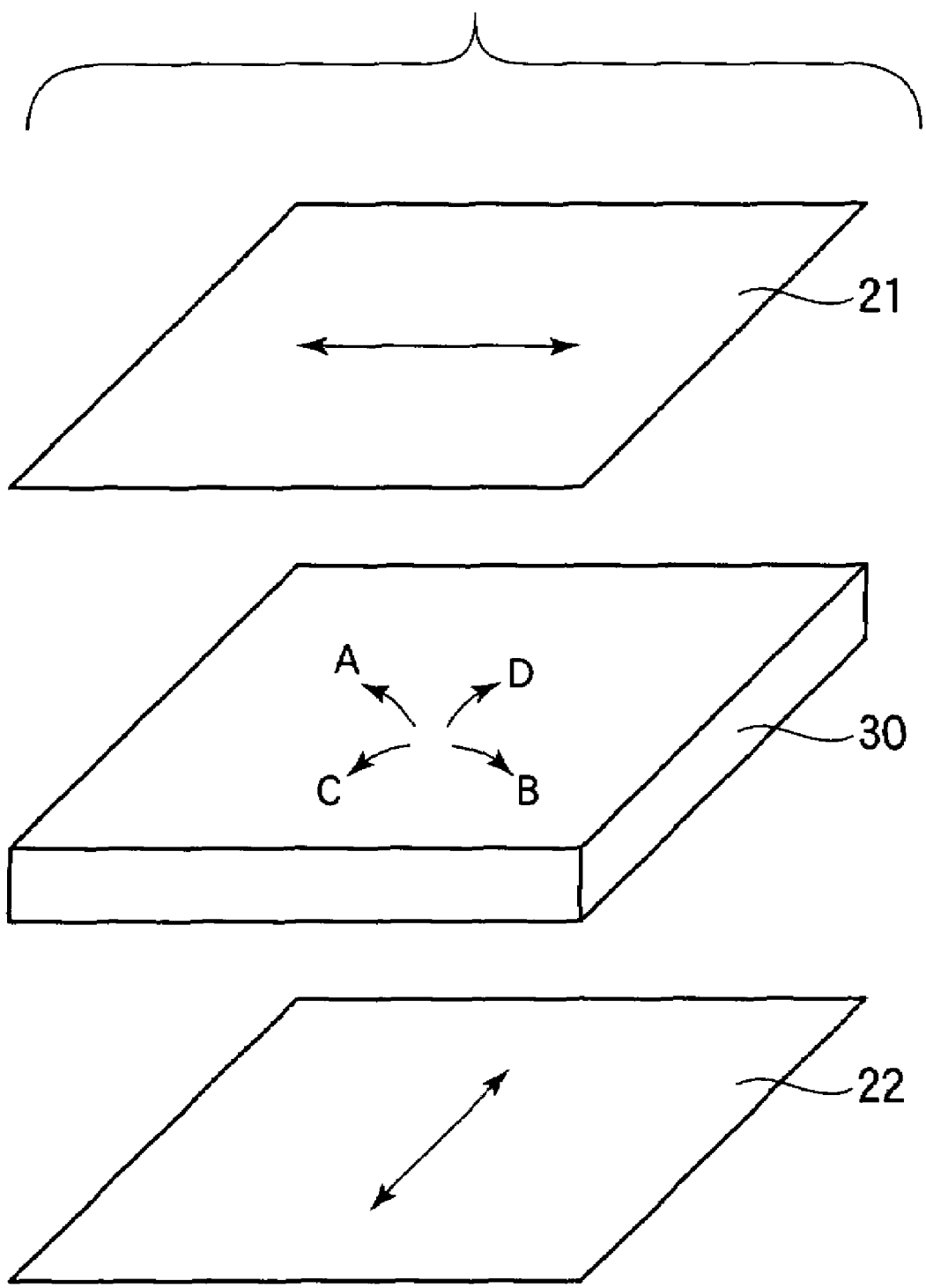
FIG. 1 shows a conventional MVA liquid crystal display.
Figure 2:
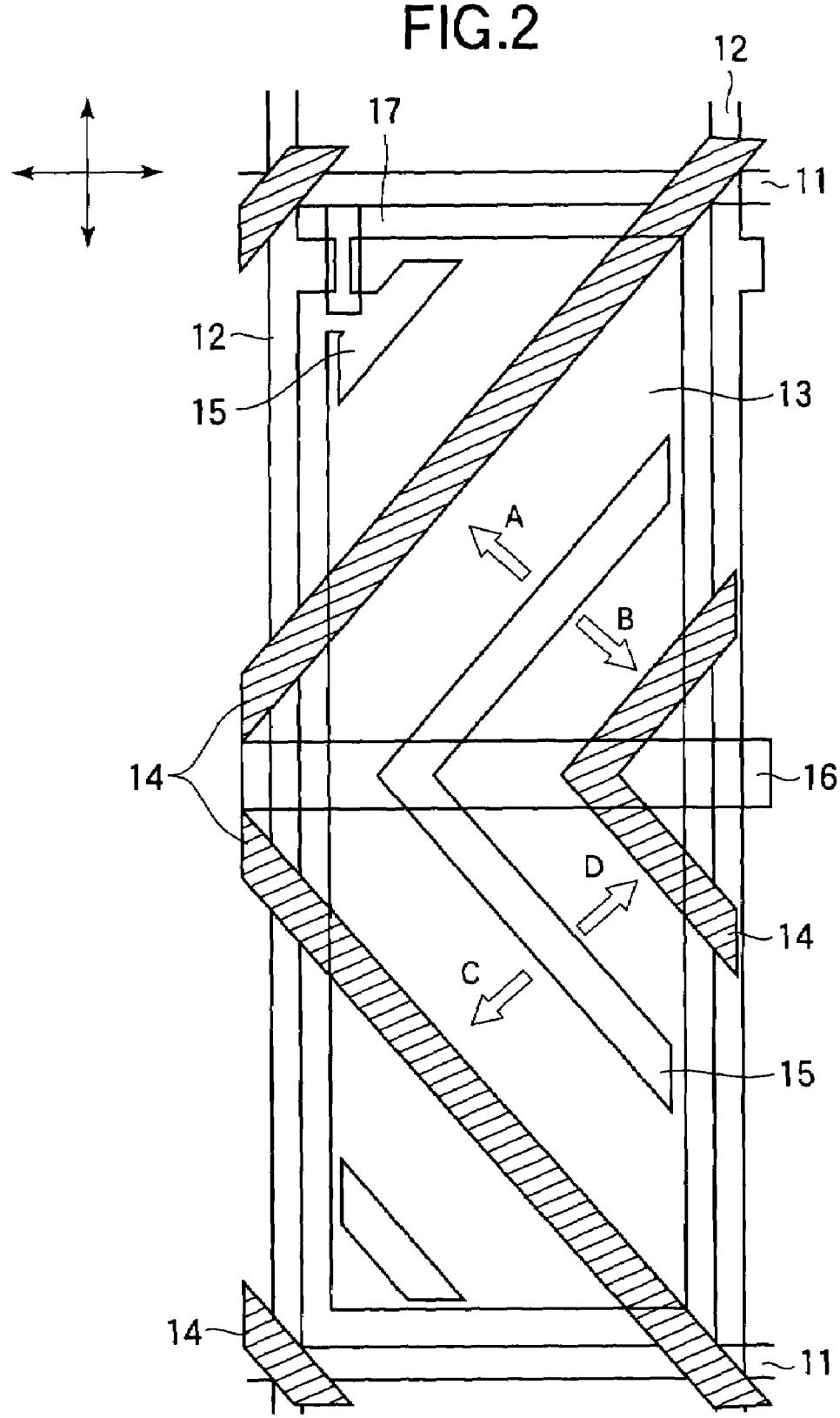
FIG. 2 shows a configuration of a pixel of the MVA liquid crystal display.
Figure 3A:
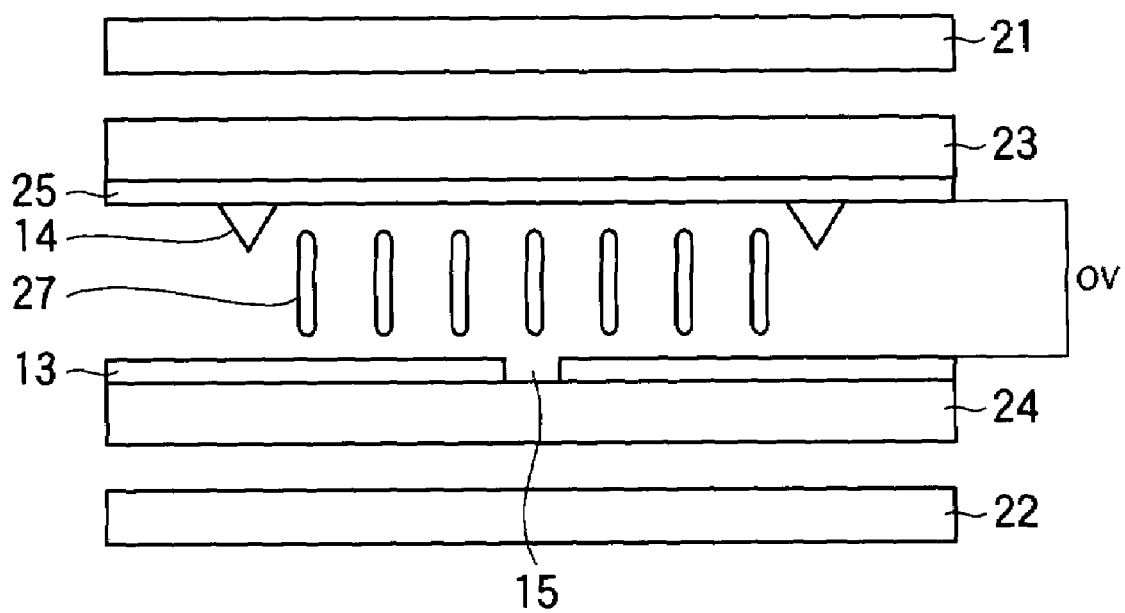
FIGS. 3A and 3B show an operation of the MVA liquid crystal display.
Figure 3B:
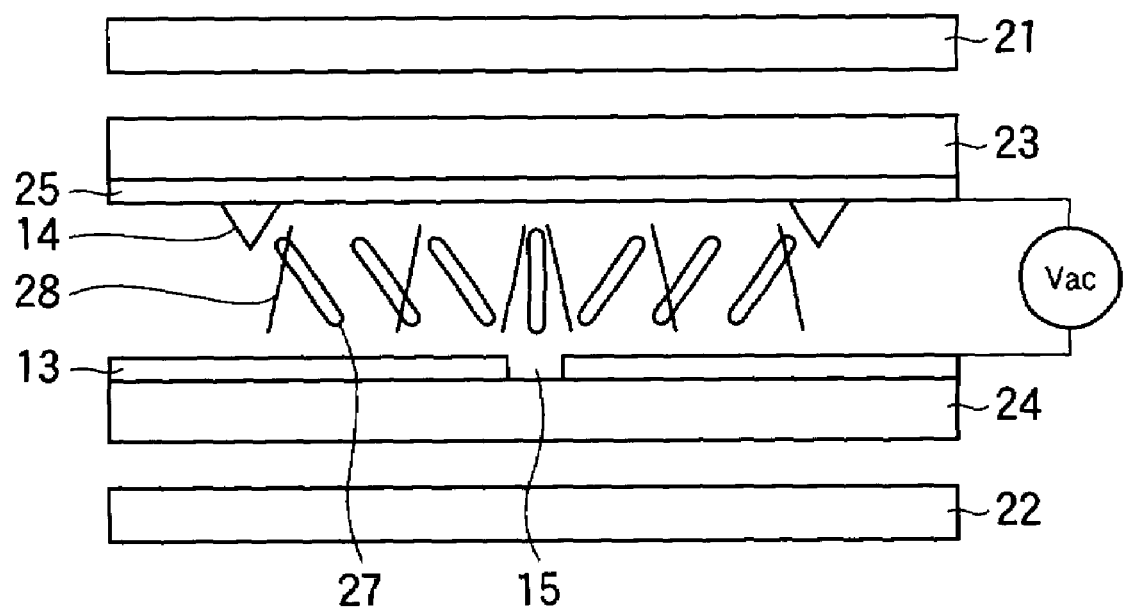

The absorption axes of the pair of polarizing elements 34 and 44 are orthogonal to each other as indicated by the arrows in the figure, and the directions of the absorption axes are at 45 deg. to a direction of alignment of liquid crystals (e.g., the direction A) as described with reference to FIG. 1. The phase-delay axes of the pair of optical retardation films 50 and 52 of the first type are also orthogonal to each other. The absorption axis and the phase-delay axis of the polarizing element 34 (or 44) and the optical retardation film 50 (or 52) of the first type located on the same side of the liquid crystal panel 30 are orthogonal to each other. The phase-delay axes of retardations in the planes (or extending directions in the planes) of the optical retardation films 36 and 46 of the second type may be in parallel with or orthogonal to the absorption axes of the polarizing elements 34 and 44 adjacent thereto. When the retardations are in parallel with the absorption axes, the retardations are not involved in the calculation of retardations in the plane (the calculation using Equation 1).

Next, a calculation will be carried out using specific numerical values. A retardation $R_{LC}$ ($\Delta$nd) in the liquid crystal layer of the liquid crystal panel 30 is 280 nm. TAC (triacetyl cellulose) films that are used as protective layers of plarizers are used as the optical retardation films 36 and 46 of the second type. A retardation Rt in the TAC films in the direction of the thickness thereof is 55 nm. A retardation Rp in a direction in the plane of the same is 5 nm which is not involved in the calculation because the phase-delay axes of the films are located in parallel with the absorption axes of the polarizing elements 34 and 44 adjacent thereto. In general polarizers, those axes are automatically matched because the extending directions of the polarizing elements and the axis of combination of the TAC films are matched at a manufacturing step. Both of the optical retardation films 50 and 52 of the first type have a retardation Rp of 35 nm in a direction in the plane thereof and a retardation Rt of 60 nm in the direction of the thickness.

Figure 9:
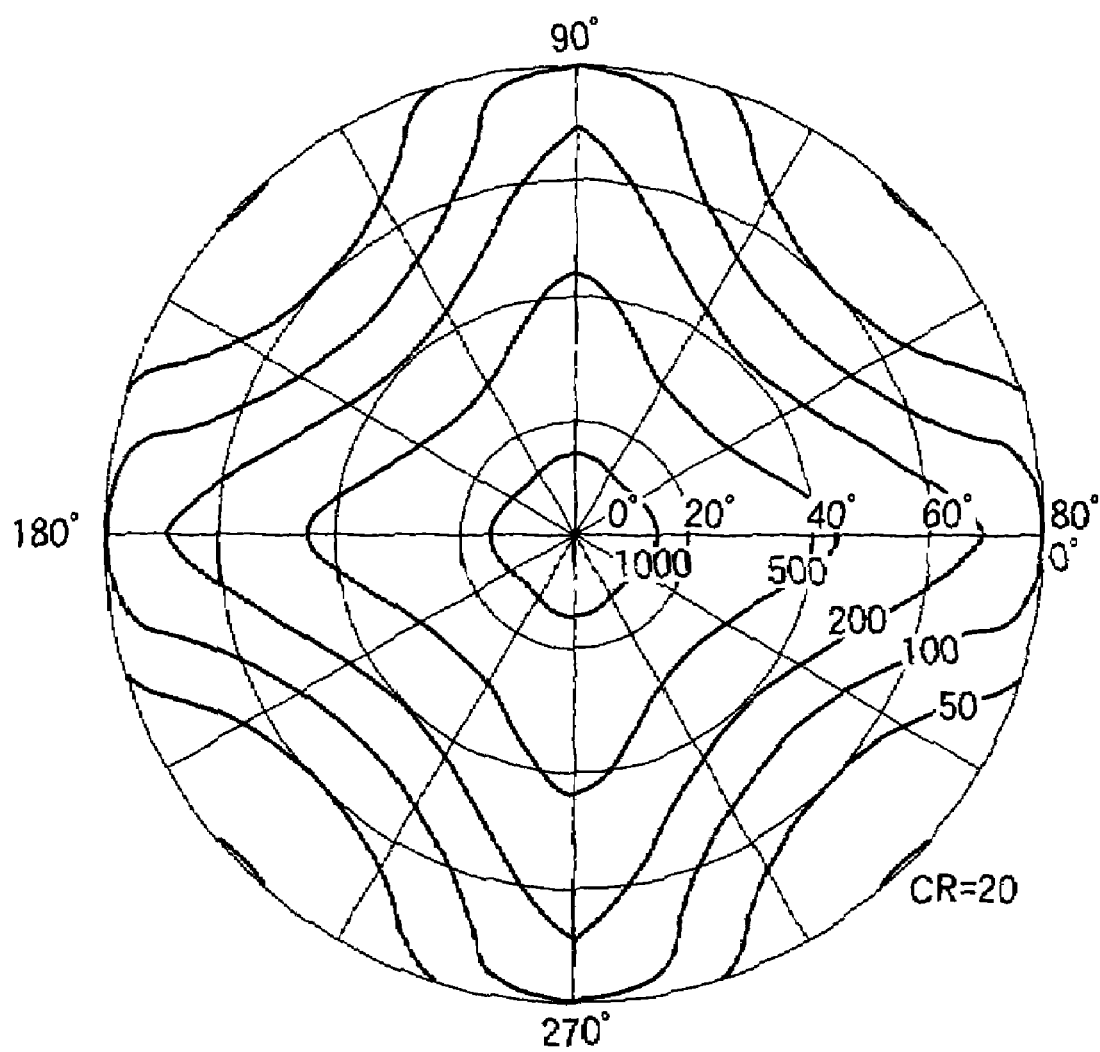
FIG. 9 shows viewing angle characteristics of the first embodiment.

Therefore, the sum Rp–t of retardations of the liquid crystal display 56 in a direction of the plane thereof is 35×2=70 nm. The sum Rt–t of retardations in the direction of the thickness thereof is 55×2+60×2=230. The range of the sum of retardations in the in-plane direction is Rp–t=71.2 (±60) nm according to Equation 1, and Rp–t of the liquid crystal display 56 resides near the center of the range. The sum of retardations in the direction of the thickness of the same is Rt–t=233 nm according to Equation 2, and this is an idealistic value within a range. FIG. 9 shows viewing angle characteristics in such a state.

FIG. 9 shows iso-contrast curves obtained by connecting viewing angles at which equal contrast is achieved in all directions. FIG. 9 indicates that preferable display can be performed in that contrast is 20 or more at all viewing angles including an azimuth angle of 45 deg. at which contrast is lowest.

A description will now be made on two equations, i.e., Equations 1 and 2 for achieving optimum contrast disclosed in the present invention.

According to the invention, optimum ranges of in-plane directions and the direction of the thickness in certain positions of optical retardation films of the first and second types are defined by the following equations as described above.

$$Rp-t=2\times(-0.08\times R_{LC}+58\text{ nm}+\alpha) \quad \text{Equation 1}$$

where $\alpha=\pm 30$ nm; and $$Rt-t=(1.05\pm 0.05)\times R_{LC}-47\text{ nm}+\beta \quad \text{Equation 2}$$

where $-100\text{ nm}\leqq\beta\leqq 47$ nm.

In particular, when the phase-delay axis of an optical retardation film that is in contact with a polarizing element (or integral with the polarizing element as in the case of a protective film of a polarizer) or that is adjacent to the polarizing element (as in the case of a separate member) is in parallel with the absorption axis of the polarizing element, retardations in directions in the plane of the optical retardation film will not be involved in Equation 1. The reason is that no retardation occurs in any direction in the plane of an optical retardation film when the phase-delay axis of the optical retardation film and the absorption axis of a polarizing element are in parallel with each other.

Figure 14A:
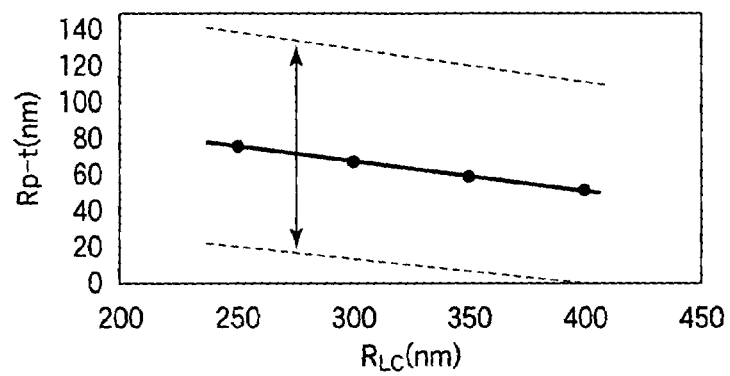
FIGS. 14A and 14B show optimum resolutions and marginal ranges for the same.
Figure 14B:
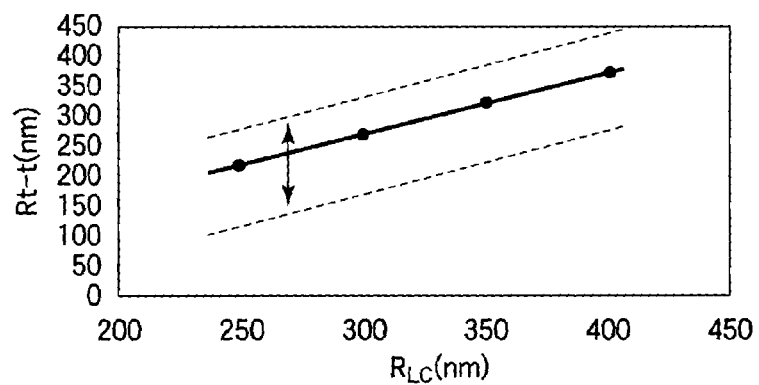

A description will now be made on how Equations 1 and 2 according to the invention give optimum solutions. FIGS. 14A and 14B show conditions under which maximum contrast is achieved during observation at a diagonal viewing angle (an azimuth angle of 45 deg. and a tilt angle of 80 deg.). FIG. 14A relates to retardations in directions in the plane, and FIG. 14B relates to retardations in the direction of the thickness.

In FIG. 14A, the solid is plotted by connecting points at which the maximum contrast is achieved with in-plane retardations shown as conditions, and the broken lines indicate a range in which contrast is 2 or more. The solid line may be regarded substantially straight, and a y-section in the same is 24 (nm). The range in which contrast is 2 or more stays substantially constantly at ±60 nm regardless of retardations $R_{LC}$ in various liquid crystals. This value is associated with the terms +58 nm and $\alpha=\pm 30$ nm in Equation 1.

Conditions for retardations in the direction of the thickness in FIG. 14B may be understood similarly, and the values of the terms −47 nm and $-100\text{ nm}\leqq\beta\leqq 47$ nm in Equation 2 relate to such conditions.

Figure 11:
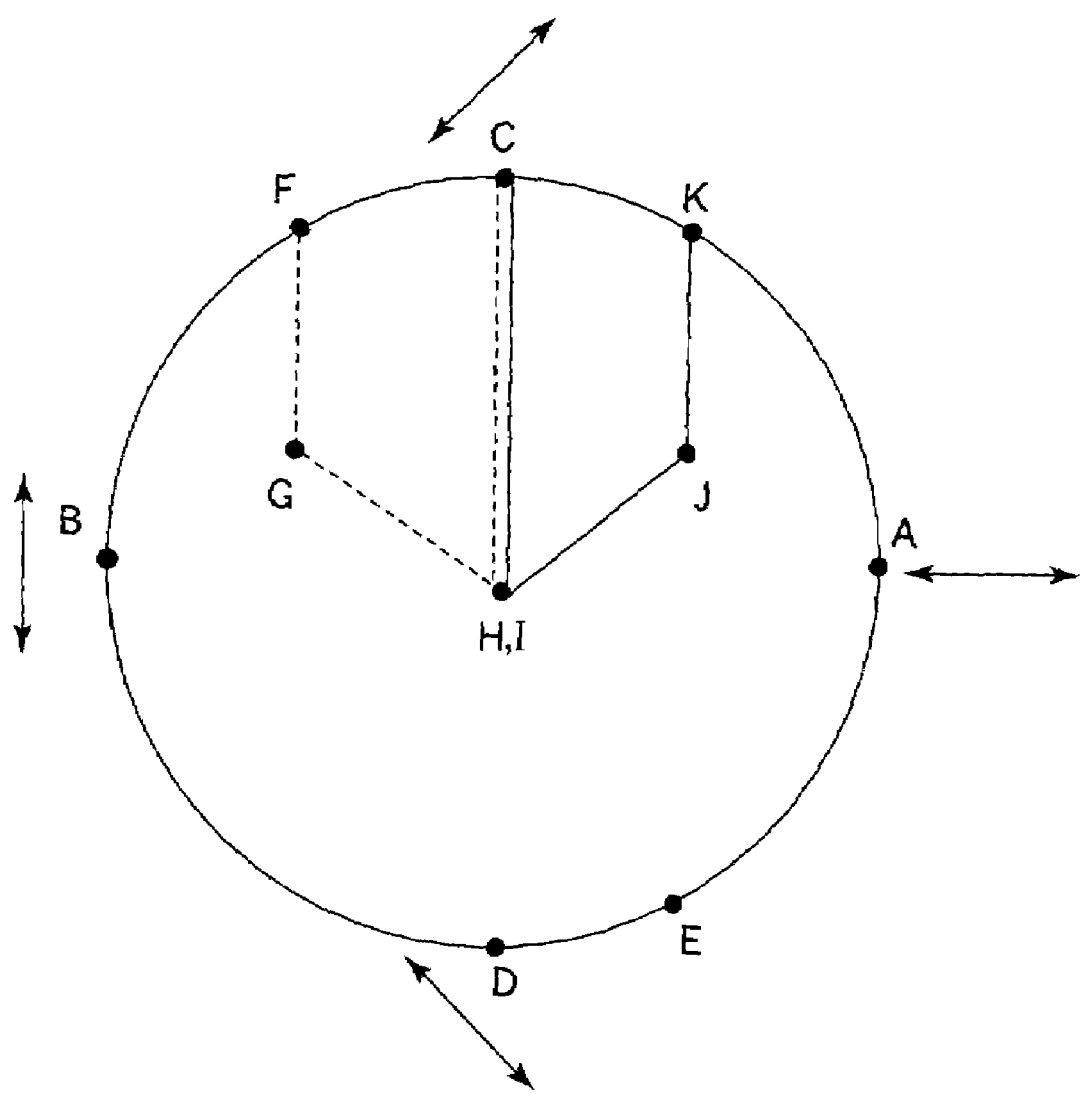
FIG. 11 is an illustration of states of polarization in various layers.
Figure 12:
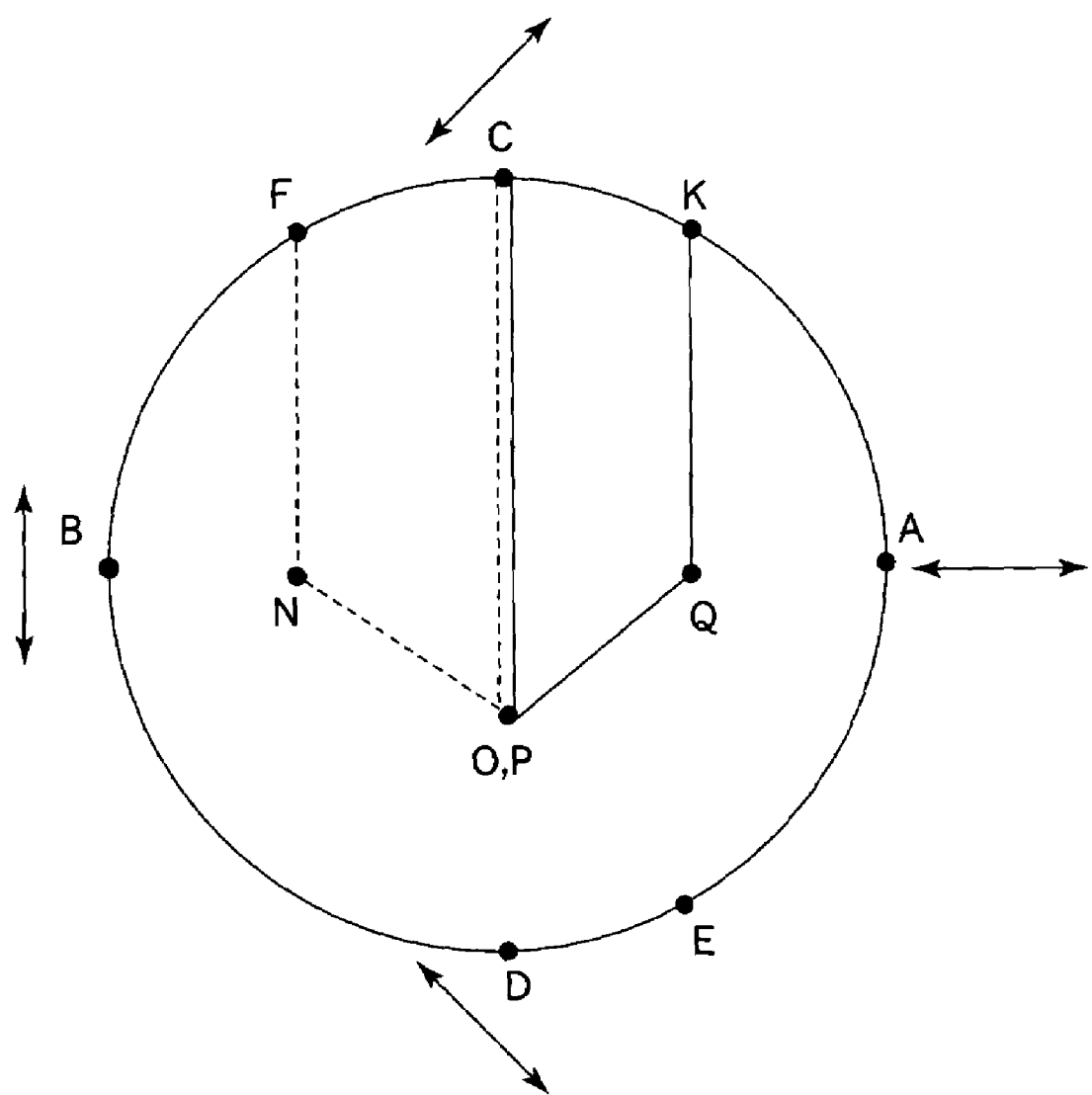
FIG. 12 is another illustration of states of polarization in various layers.
Figure 13:
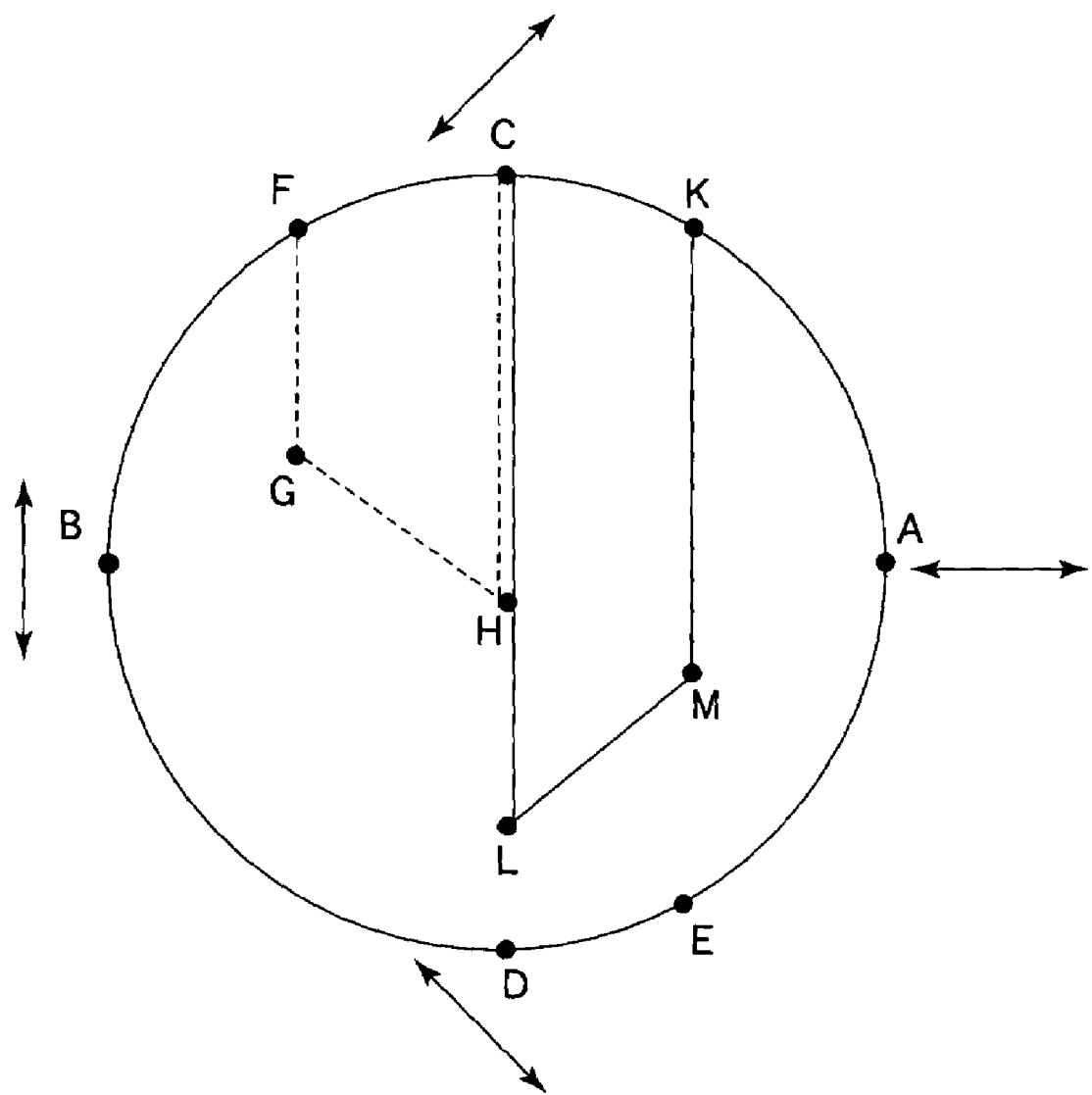
FIG. 13 is still another illustration of states of polarization in various layers.

A description will now be made with reference to FIGS. 11 through 13 to prove that the simple Equations 1 and 2 determine such conditions. FIGS. 11 through 13 show states of polarization of light that passes through an optical retardation film and a liquid crystal layer as a locus on a Poincare sphere as viewed from the north pole of the Poincaré sphere.

First, FIG. 11 will be described with reference to the first embodiment shown in FIG. 5. The absorption axis of the polarizing element is at a point E that is slightly shifted from a point D toward a point A because the observation is in a diagonal viewing angle at which the absorption axis of the polarizing element viewed at an angle slightly smaller than 45 deg. Therefore, incident light is polarized to a point F.

While the light passes through the optical retardation film of the second type at the entrance side, the optical retardation film of the second type can be regarded as having its axis at a side thereof because it is viewed in a diagonal direction. Therefore, the light is rotated about the point A (rotation is always clockwise rotation) to move to a point G on the sphere. The broken line represents a locus on the southern sphere. Next, the light passes through the optical retardation film of the first type at the entrance side, and the axis of the optical retardation film of the first type may be regarded as located at a point K that is slightly shifted from a point C toward the point A because of the diagonal viewing direction. Therefore, the light is rotated about the point K to move to a point H on the sphere. Then, the light passes through the liquid crystal layer and, meanwhile, it is rotated about a point B because liquid crystal molecules have an axis in the longitudinal direction thereof. Therefore, the light moves from the point H to a point I via the point C. Next, the light passes through the optical retardation film of the first type at the exit side, and the axis of the optical retardation film of the first type may be regarded as located in a point E that is slightly shifted from the point D toward the point A because of the diagonal viewing direction. Therefore, the light is rotated about the point E to move to a point J. Finally, the light passes through the optical retardation film of the second type at the exit side, and the light is rotated about the point A to move to the point K because the axis of the optical retardation film can be regarded as located at the point A similarly to the entrance side. The point K corresponds to the direction of the absorption axis of the polarizing element at the exit side.

As apparent from FIGS. 11 through 13, the liquid crystal layers in FIGS. 11 through 13 have different $R_{LC}$ values. The line segment HCI in FIG. 11 and the line segment OCP in FIG. 12 are different in length. However, they have substantially the same configuration. The line segments GH and IJ in FIG. 11 and the line segments NO and PQ in FIG. 12 extend in the same directions and have the same lengths respectively when those loci are projected on a plane. However, in practice, those line segments are loci on a sphere and have different angles of rotation and lengths that depend on their positions. Such differences are associated with the magnitudes of retardations in in-plane directions. The difference in length (angle of rotation) originates in the positions of the line segments on the sphere or retardations $R_{LC}$ in the liquid crystal layers. Thus, an optimum retardation in an in-plane direction depends on a retardation $R_{LC}$ in a liquid crystal layer, and the coefficient for $R_{LC}$ in Equation 1 is therefore 0.08.

Referring now to retardations in the direction of the thickness, the movements on the spheres attributable to the liquid crystal layers (the line segments HCI and OCP) and the movements on attributable to the optical retardation film of the second type (the line segments FG+JK and FN+QK) cancel each other. Specifically, the difference between the line segment FG+JK and the line segment HCI in FIG. 11 and the difference between the line segment FN+QK and the line segment OCP in FIG. 12 are the same when those loci are projected upon a plane. However, they are different when viewed as angles of rotation on a sphere. Thus, an optimum retardation in the direction of the thickness also depends on a retardation $R_{LC}$ in liquid crystals, and the coefficient for $R_{LC}$ in Equation 2 is therefore 1.05.

Equations 1 and 2 according to the invention are thus derived.

Second Embodiment

Figure 6:
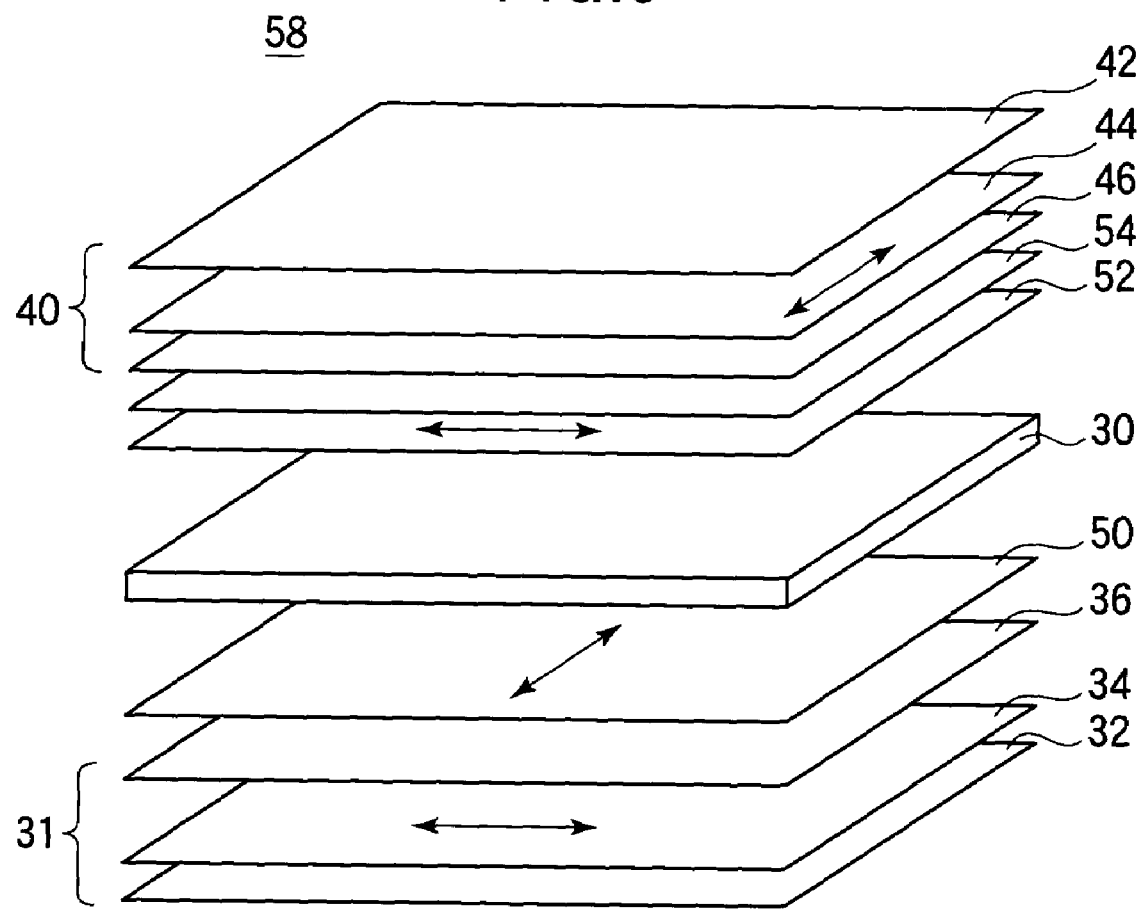
FIG. 6 shows a second embodiment of the invention.

FIG. 6 shows a liquid crystal display 58 according to a second embodiment of the invention. The liquid crystal display 58 has a configuration similar to that of the liquid crystal display 56 in FIG. 5 except that the retardation $R_{LC}$ in the liquid crystal layer of the liquid crystal panel 30 is 350 nm and in that a second optical retardation film 54 of the second type is inserted between the second optical retardation film 52 of the first type and the second optical retardation film 46 of the second type. The optical retardation film 54 has a retardation of 55 nm in the direction of the thickness thereof, and the phase-delay axis of the same in the plane thereof is in parallel with the absorption axis of the polarizing element 44 located on the same side as the liquid crystal layer.

The sum Rp–t of retardations in direction in the plane of the liquid crystal display 58 is 70 nm, and the sum of retardations in the direction of the thickness is 285 nm. Equation 1 gives Rp–t=60±30 nm that is sufficiently within an allowable range, although slightly off the center. Equation 2 gives Rt–t=303 nm that is similarly within an allowable range, although slightly off the center. The reason for the deviations from the centers of the equations is that the optical retardation films of the second type are provided asymmetrically. As shown in FIG. 12, in the present embodiment, the effect of the optical retardation films of the second type is asymmetric as represented by the line segments FG and MK, and the line segments GH and LM are in different locations. Therefore, the optimum value should be different. However, the optical retardation films of the first type used in the present embodiment are the same as those in the first embodiment shown in FIG. 5, and this seems to be the reason for the deviation of the condition from the center of Equation 2.

Figure 10:
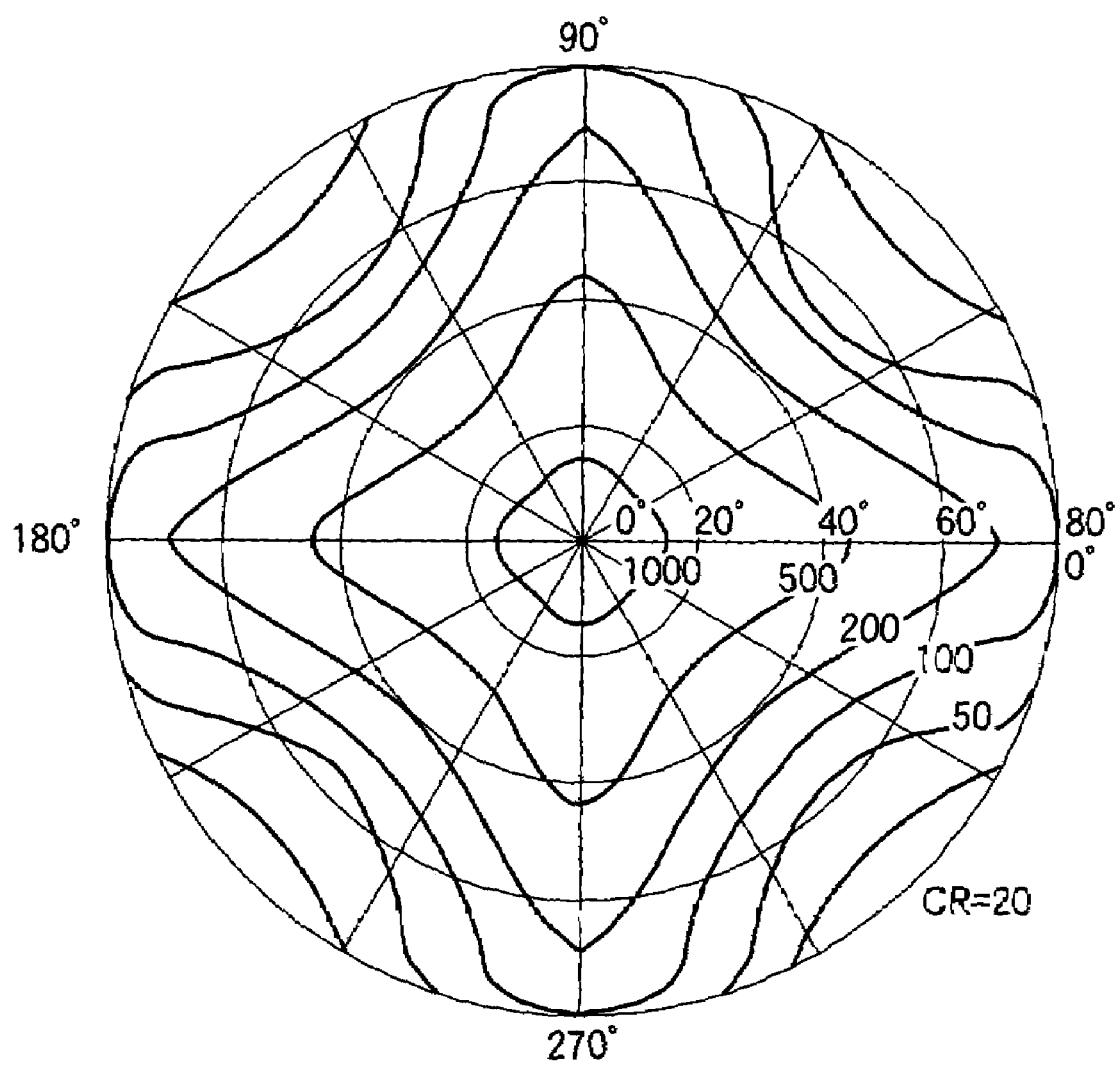
FIG. 10 shows viewing angle characteristics of the second embodiment.

FIG. 10 shows viewing angle characteristics according to the second embodiment. Although the lines of contrast 20 are located further inward in diagonal directions at 45 deg. compared to those in the first embodiment (FIG. 9) possibly because of the slight deviation of the condition from an optimum value, contrast is still close to 20 even in such regions, which provides sufficiently preferable viewing angle characteristics.

Experiments were conducted to examine the boundaries of the ranges defined by Equations 1 and 2. In this case, norbornene type films available on the market were stretched in two directions to fabricate a film having various retardations in the direction of the thickness as optical retardation films of the second type. Although the film had poorer viewing angle characteristics than that shown in FIG. 9, it provided contrast of 5 or more in all directions which resulted sufficiently preferable viewing angle characteristics.

Third Embodiment

Figure 7:
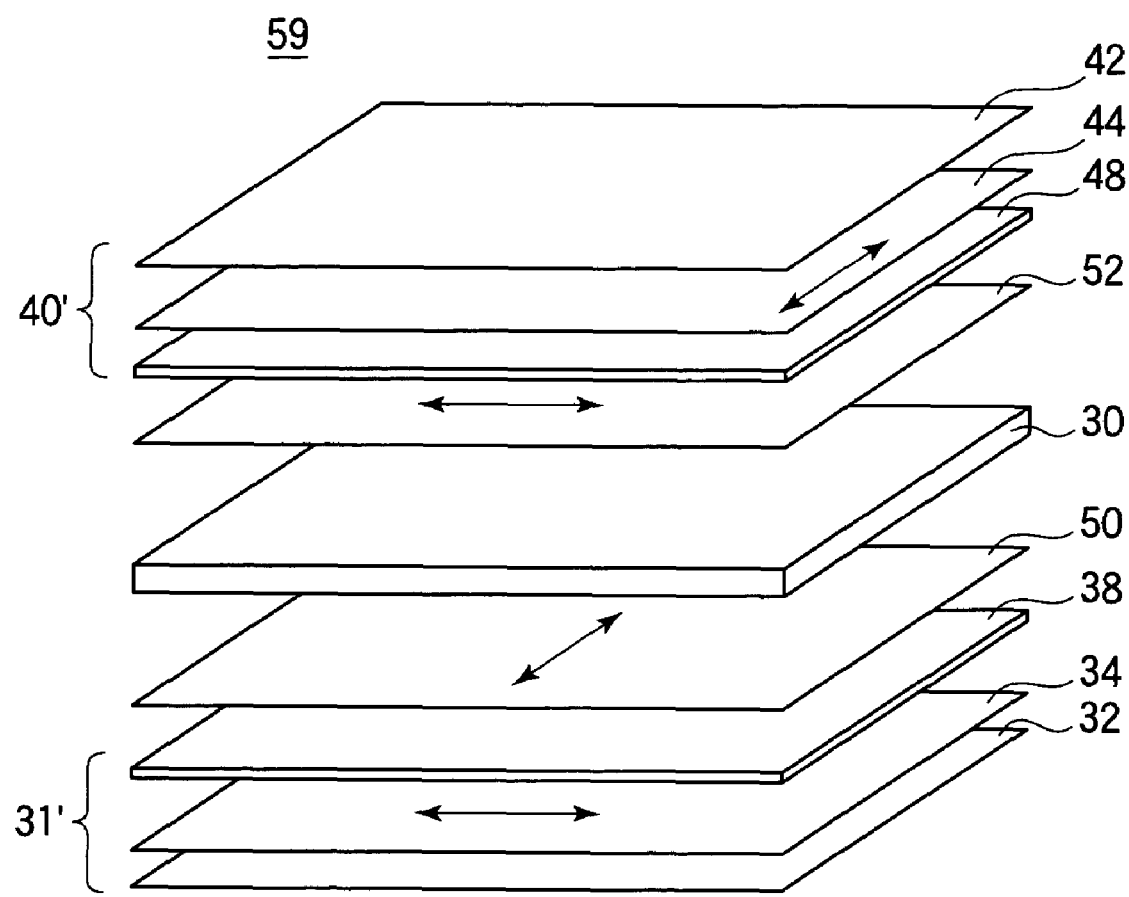
FIG. 7 shows a third embodiment of the invention.

FIG. 7 shows a liquid crystal display 59 according to a third embodiment of the invention. The liquid crystal display 59 has a configuration similar to that of the liquid crystal display 56 in FIG. 5 except that the retardation $R_{LC}$ in the liquid crystal layer of the liquid crystal panel 30 is 350 nm and that it has polarizers 31' and 40'. The polarizers 31' and 40' employ films 38 and 48 with a thickness in the range from 90 nm to 125 nm that have a retardation in the direction of the thickness greater than that in a normal TAC film (hereinafter referred to as "thick TAC films") as TAC films of protective layers to serve as optical retardation films of the second type. The use of such thick TAC films 38 and 48 is effective when a liquid crystal panel having a liquid crystal layer with a retardation $R_{LC}$ of about 350 nm is used as in the second embodiment. That is, there is no need for inserting any additional TAC film as an optical retardation film of the second type unlike the second embodiment.

In the liquid crystal display 59, the thick TAC films 38 and 48 have a retardation of 90 nm in the direction of the thickness thereof and a retardation of 10 nm in a direction in the plane thereof (provided that their phase-delay axes are in parallel with the absorption axes of the polarizing elements), and the optical retardation films of the first type have a retardation of 40 nm in a direction in the plane thereof and a retardation of 55 nm in the direction of the thickness thereof. Therefore, the sum Rt–t of retardations in the direction of the thickness is 290 nm which is a value close to a value of 303 nm that is obtained using Equation 2.

More preferable combinations of ranges according to the invention will now be described.

Let us assume that a liquid crystal layer has a retardation $R_{LC}$ of 280 nm±30 nm; the sum Rt–t of retardation in the direction of the thickness of the same is 220 nm±40 nm; and the sum Rp–t of retardations in directions in the plane of the same is 80 nm±40 nm.

Let us assume that another liquid crystal layer has a retardation $R_{LC}$ of 350 nm±40 nm; the sum Rt–t of retardation in the direction of the thickness of the same is 290 nm±60 nm; and the sum Rp–t of retardations in directions in the plane of the same is 80 nm±40 nm.

Figure 15:
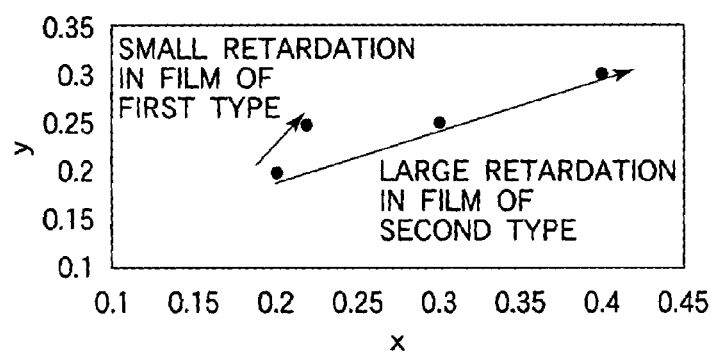
FIG. 15 is a graph that explains coloring as a result of retardations.

While retardations in the direction of the thickness and in the in-plane directions include some margin. As shown in FIG. 15, black will be displayed with a bluish tint in a diagonal viewing angle when the sum of retardations in the in-plane directions is large, and a reduction in contrast occurs to display black with a reddish tint when the sum is small. The display will have a bluish tint when the sum of retardations in the direction of the thickness is small, and it will have a reddish tint when the sum is large. This is a problem associated with preference of individuals, and it may be inadequate to limit a retardation to a certain value. Taking those situations into consideration, some margin is included in the ranges of retardations.

Fourth Embodiment

Figure 17:
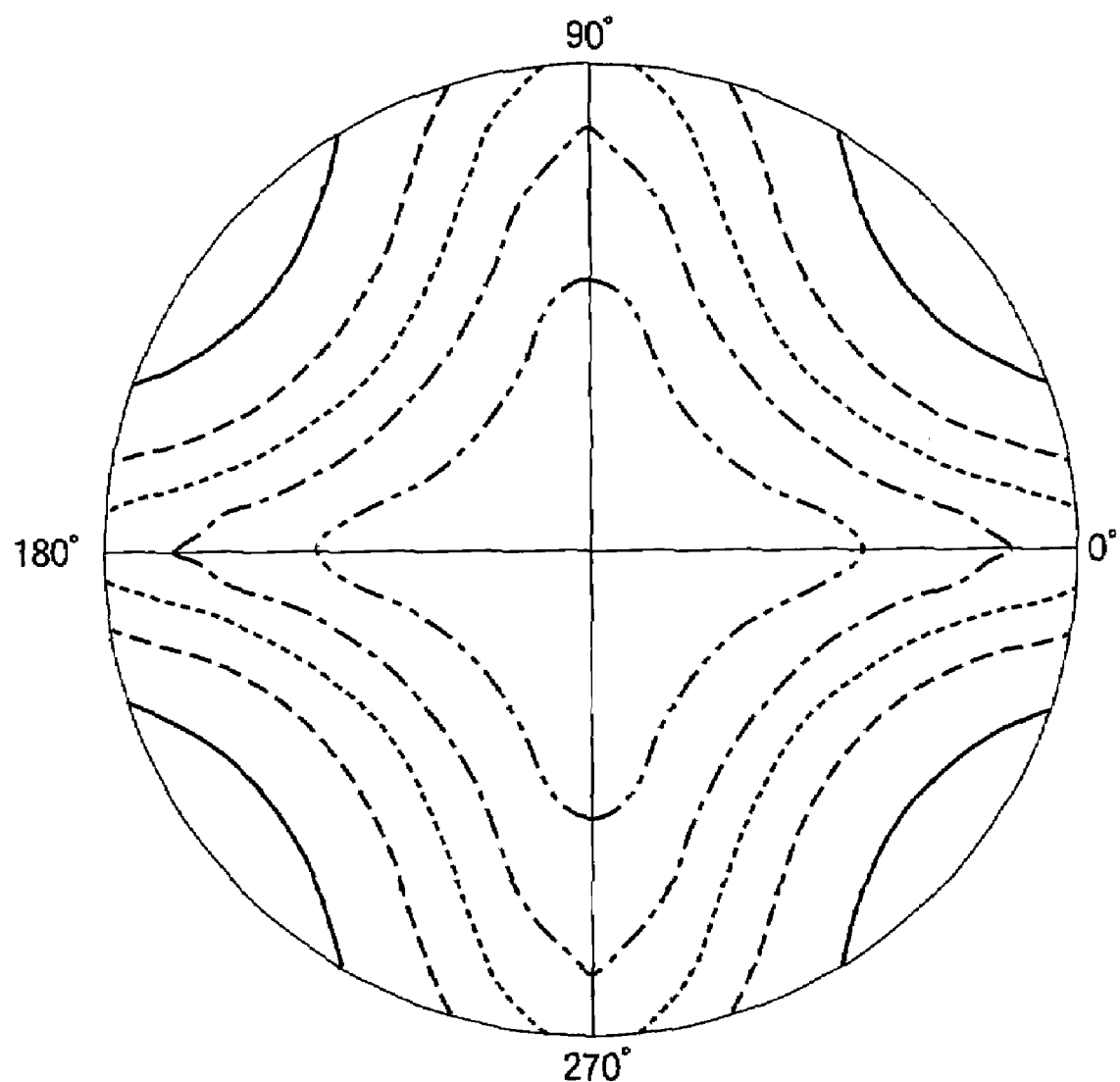
FIG. 17 shows viewing angle characteristics of the MVA LCD added with a uniaxial optical retardation film.

A description will now be made on MVA liquid crystal displays according to fourth, fifth and sixth embodiments of the invention. Prior to the description of the embodiments, a specific description will be made on problems to be solved by those embodiments. FIG. 16 shows a configuration in which a uniaxial optical retardation film 80 of the first type as described above is added between the first polarizing element 21 and liquid crystal panel 30 of the MVA liquid crystal display in FIG. 1, and FIG. 17 shows viewing angle characteristics of the same. As apparent from a comparison between FIG. 4 and FIG. 17, the viewing angle can be expanded to achieve higher contrast, and, in particular, contrast is improved especially when viewed in directions, e.g., directions at 45 deg., other than upward, downward, leftward and rightward directions.

For example, the above-described uniaxial optical retardation film of the first type is fabricated by stretching a norbornene type film or the like. A uniaxial optical retardation film of the first type used in an MVA liquid crystal display is sometimes required to have birefringence at a value of 50 nm or less, and it has been difficult to achieve such a small value in a stretched film. For this reason, there has been only a small margin for the manufacture of uniaxial optical retardation films of the first type having such specifications, which has been a significant problem in mass production of the same.

Japanese patent application No. H10-185836 has disclosed various configurations for provision of optical retardation films in MVA liquid crystal displays, but it has still left demands for further improvement of viewing angle characteristics.

The present embodiment has been conceived to solve such a problem, and it is a first object of the embodiment to provide a uniaxial optical retardation film of the first type having small birefringence that can be fabricated with stability and a high margin for manufacture and to provide a VA liquid crystal display having viewing angle characteristics utilizing the same. It is a second object to provide a VA liquid crystal display having still higher viewing angle characteristics utilizing a configuration including optical retardation films.

In order to achieve the above-described objects, in a first mode of the present embodiment, a viewing angle compensation film having characteristics equivalent to those of an optical retardation film of the first type is provided by lamination layer groups having negative birefringence layers which are laminated at a tilt and being laminated in a face-to-face relationship so that each of the tilts becomes in opposite directions each other.

Figure 18A:
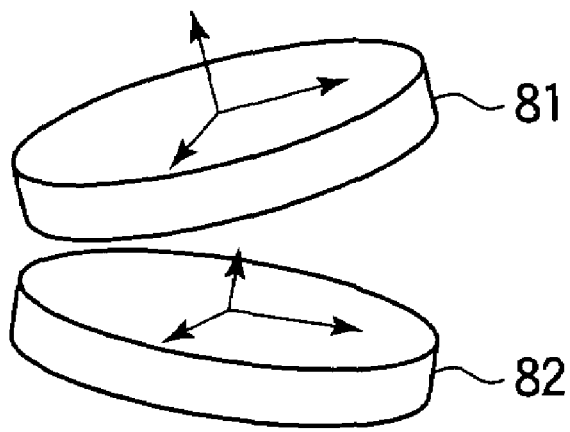
FIGS. 18A through 18D show a principle and a configuration of a viewing angle compensation film according to the invention.
Figure 18B:
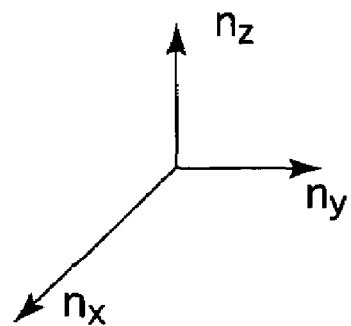

FIGS. 18A through 18D illustrate a principle and a configuration of a viewing angle compensation film according to the present embodiment. Layered optical materials having negative birefringent characteristics are known including the discotic liquid crystal disclosed in Japanese unexamined patent publication No. H8-50206. Further, Japanese unexamined patent publication No. H8-50206 has disclosed an optical compensation film or uniaxial optical retardation film of the second type in which a discotic liquid crystal layer is formed on a substrate having a rubbing film to provide negative birefringence and to achieve a minimum value of retardation in a direction at an angle to the normal of the film. The inventors discovered that $n_x > n_y \cong n_z$ can be satisfied, i.e., optical characteristics equivalent to those of a uniaxial optical retardation film of the first type can be achieved as shown in FIG. 18B by combining layered optical materials 81 and 82 having negative birefringent characteristics such as discotic liquid crystals at tilts opposite to each other as shown in FIG. 18A.

Figure 18C:
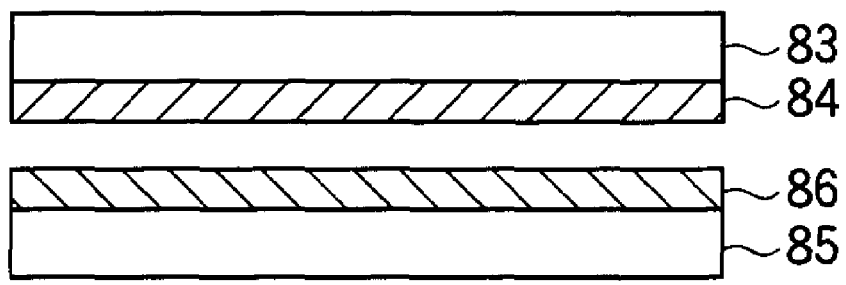
Figure 18D:
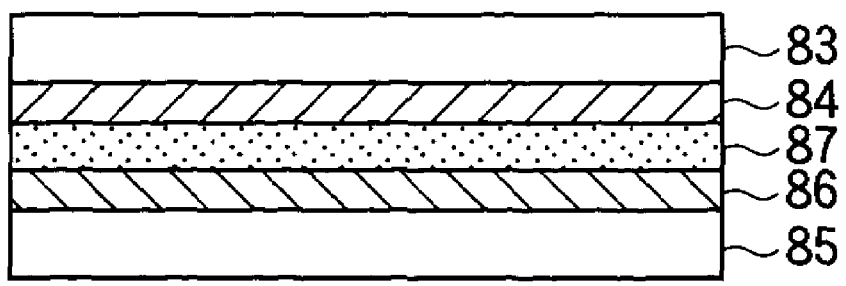

An optical compensation film having optical characteristics equivalent to those of a uniaxial optical retardation film of the first type can be provided by lamination layer groups 84 and 86 having negative birefringence layers which are laminated at a tilt in opposite directions on two respective substrates 83 and 85 and by arranging the lamination layer groups 84 and 86 in a face-to-face relationship as shown in FIG. 18C. The lamination layer groups 84 and 86 in a face-to-face relationship may be integrated by providing a bonding material 87 between them as shown in FIG. 18D. In either case, the layers in the two lamination layer groups are provided in a plane-symmetric relationship.

The discotic liquid crystal disclosed in Japanese unexamined patent publication No. H8-50206 may be used as the layered optical material. As disclosed in Japanese unexamined patent publication No. H8-50206, in the case of an optical compensation film obtained by applying discotic liquid crystals on to a substrate having a rubbing film, the tilt angle of the discotic liquid crystal layer is small in the part thereof in contact with the substrate. It gradually increases with the distance from the substrate and ranges from 10 deg. or less to 70±10 deg. In this case, two such liquid crystal layers may be provided in a face-to-face relationship to obtain optical characteristics equivalent to those of an optical retardation film of the first type. The optical compensation film of the present embodiment can be fabricated using a method similar to the method disclosed in Japanese unexamined patent publication No. H8-50206, and even a film having birefringence of 50 nm or less can be easily fabricated.

The use of an optical compensation film according to the present embodiment makes it possible to improve the viewing angle characteristics of a VA liquid crystal display significantly.

A liquid crystal display in a second mode of the present embodiment is characterized in that it has a VA liquid crystal panel, first and second polarizing elements provided on both sides of the same such that their absorption axes are orthogonal to each other, a first optical retardation film (a uniaxial optical retardation film of the first type) provided between the liquid crystal panel and the first polarizing element such that its phase-delay axis is orthogonal to the absorption axis of the first polarizing element, a second optical retardation film (a uniaxial optical retardation film of the first type) provided between the liquid crystal panel and the second polarizing element such that its phase-delay axis is orthogonal to the absorption axis of the second polarizing element and an additional optical retardation film (a uniaxial optical retardation film of the second type) provided in at least one location between the first polarizing element and the first optical retardation film, between the first optical retardation film and the liquid crystal panel, between the second polarizing element and the second optical retardation film or between the second optical retardation film and the liquid crystal panel.

It was found that the configuration of the liquid crystal display in the second mode of the present embodiment provides a further improvement of viewing angle characteristics.

The additional optical retardation film is a uniaxial optical retardation film of the second type and, in the present embodiment, the uniaxial optical retardation film of the second type is characterized in that it satisfies $0 \text{ nm} \leq (n_x - n_y)d \leq 10$ nm (d: the thickness of the additional optical retardation film).

The liquid crystal display in the second mode of the present embodiment is preferably an MVA liquid crystal display.

While the first and second optical retardation films can be provided by stretching films as described above, films having a polymer liquid crystal layer such as the optical compensation film in the first mode may be used.

Figure 19:
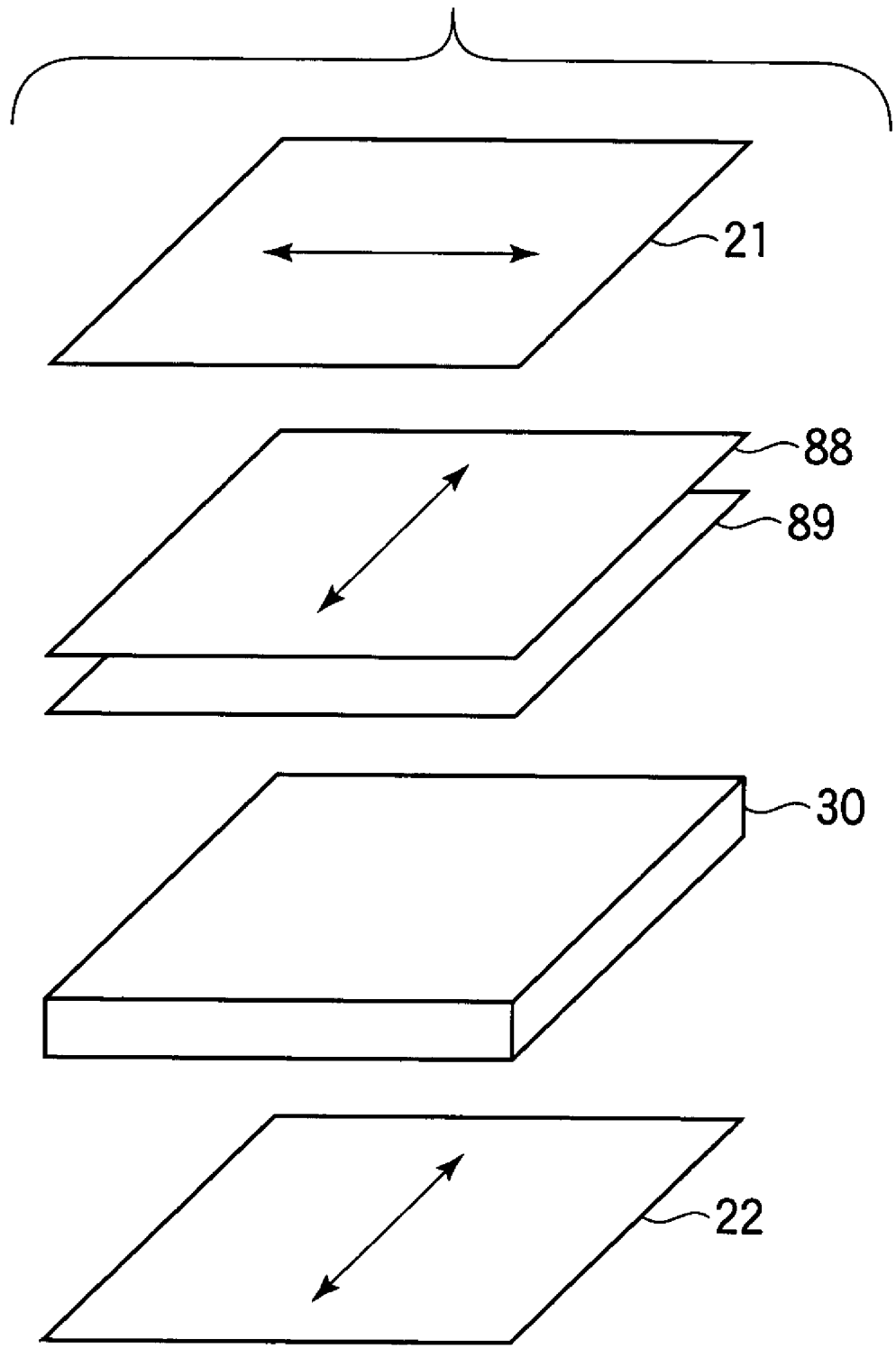
FIG. 19 shows a configuration of an MVA LCD according to a fourth embodiment of the invention.

FIG. 19 shows a configuration of an MVA liquid crystal display (LCD) according to a fourth embodiment of the invention. As illustrated, the MVA LCD according to the fourth embodiment has a liquid crystal panel 30, first and second polarizing elements 21 and 22 provided on both sides of the liquid crystal panel 30 and first and second optical compensation films 88 and 89 provided between the liquid crystal panel 30 and the first polarizing element 21. The liquid crystal panel 30 has the same configuration as that described with reference to FIGS. 2 and 3B. Therefore, the MVA LCD of the fourth embodiment has a configuration that is provided by adding the first and second optical compensation films 88 and 89 to the configuration shown in FIG. 1. While the first and second optical compensation films 88 and 89 are obtained by forming discotic liquid crystal layers 84 and 86 on substrates 83 and 85 respectively as shown in FIG. 18C, they may be integrated by providing a bonding layer 87 between the liquid crystal layers 84 and 86 as shown in FIG. 18D. A method for forming the discotic liquid crystal layers 84 and 86 is disclosed in detail in Japanese unexamined patent publication No. H8-50206 and will not be described here, and a description will be made only on characteristics provided by those parts when used in an MVA liquid crystal display panel according to the present embodiment.

As shown in FIG. 18A, discotic liquid crystal molecules have a disc-like configuration, and the discotic liquid crystal molecules are stacked in the discotic liquid crystal layers 84 and 86. First, a simulation was made on an assumption that the discotic liquid crystal molecules are uniformly stacked at a tilt angle of 45 deg. The discotic liquid crystal molecules have negative anisotropy of refractivity in that refractive indices na in two direction in the disc are equal and in that na>nb where nb represents a refractive index in the axial direction thereof perpendicular to the disc. When two liquid crystal layers formed by staking discotic liquid crystal molecules tilted in opposite directions were combined as shown in FIG. 18A, anisotropy was observed in a direction that is 90 deg. different from the directions of tilt of the discotic liquid crystal molecules or the direction $n_x$ in FIG. 18B. That is, it was found that $n_x > n_y \approx n_z$, which is characteristic of a uniaxial optical retardation film of the first type. In this case, "tilt" means a tilt of the layer, i.e., a tilt of an optic axis thereof (an axis in a direction perpendicular to the disc). It was found that a retardation (a value of birefringence) varies by a factor of (na−nb)×d when the thickness d of the discotic liquid crystal layers is varied. Since a uniaxial optical retardation film of the first type also has a retardation of $(n_x-n_y)d$ in a direction in the plane thereof as described above, characteristics similar to those of the uniaxial optical retardation film can be achieved in terms of the relationship between the value of birefringence and the thickness. It was found that a relationship represented by B=A±30% is satisfactory where A represents a desired retardation in a uniaxial optical retardation film of the first type and B represents a retardation in each of discotic liquid crystal layers which are tilted at 45 deg. For example, in order to obtain an optical compensation film having characteristics equivalent to those of a uniaxial optical retardation film of the first type that generates birefringence of 45 nm, films with discotic liquid crystal layers each having a negative retardation of 40 nm may be combined such that the liquid crystal layers face each other.

Figure 20:
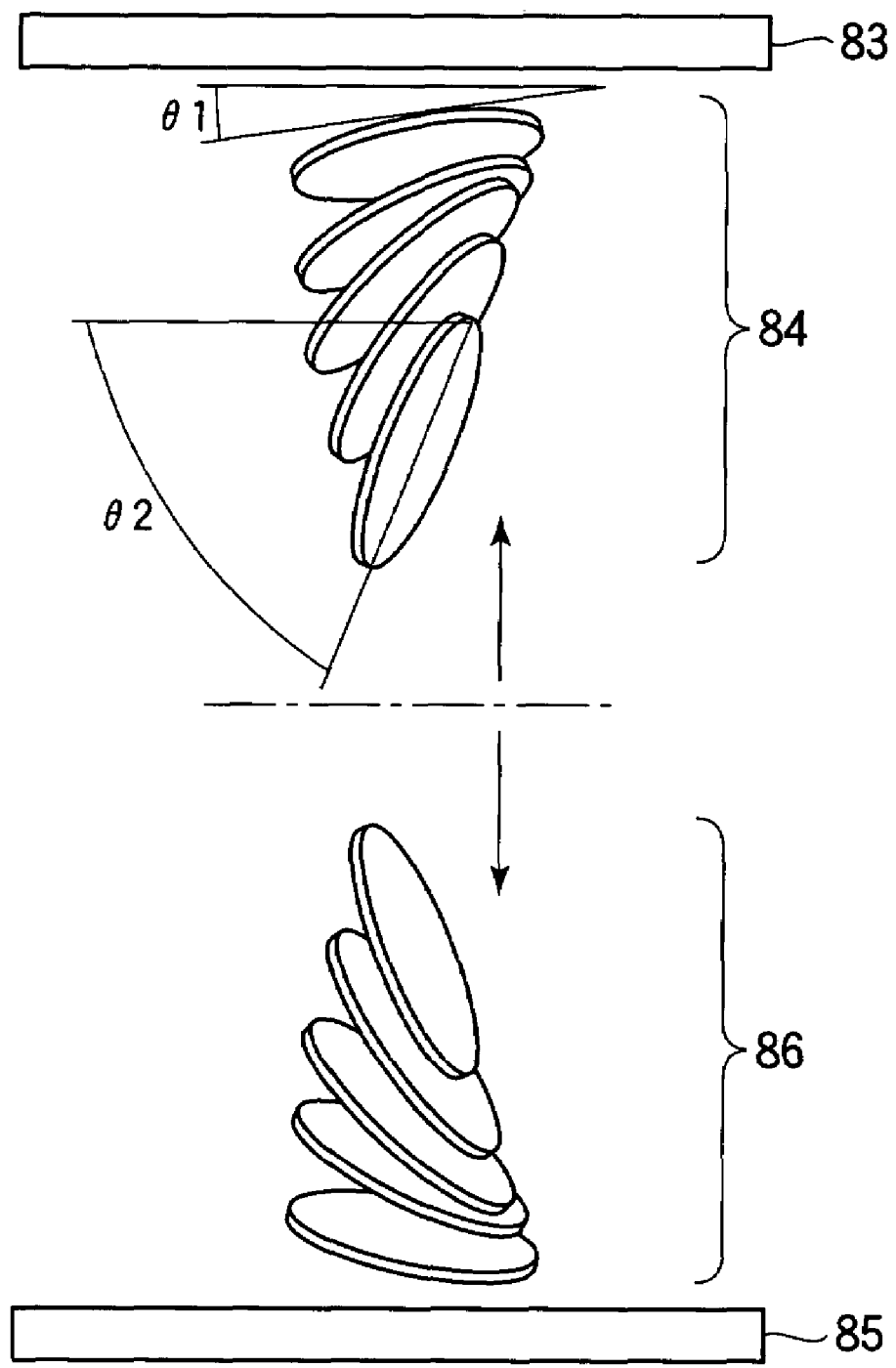
FIG. 20 shows a configuration of a viewing angle compensation film according to the fourth embodiment of the invention.

When a film having discotic liquid crystal layers is fabricated using the method disclosed in Japanese unexamined patent publication No. H8-50206, the tilt angle of disc-shaped discotic liquid crystal molecules gradually changes as shown in FIG. 20. In FIG. 20, reference numbers 83 and 85 represent substrates, and reference numbers 84 and 86 represent discotic liquid crystal layers. Referring to the tilt angle of the discotic liquid crystals, the tilt angle is θ1=4 deg. in positions near the substrates, and it is θ2=68 deg. in positions apart from the substrates. The liquid crystal molecules in the discotic liquid crystal layers 84 and 86 are provided in a plane-symmetric relationship. When such a film having a retardation of 18 nm in a direction in the plane of the substrate as viewed front ways was used as each of the first and second optical compensation films 88 and 89 in FIG. 19, it exhibited characteristics equivalent to those of a uniaxial optical retardation film of the first type having a retardation of 45 nm in a direction in the plane thereof. FIG. 21 shows viewing angle characteristics of the MVA LCD at that time. As apparent from a comparison with FIG. 17, viewing angle characteristics equivalent to (or higher than) those achievable with a uniaxial optical retardation film of the first type are provided.

As a result of a study into an optimum value made by carrying out simulation while varying conditions, it has been revealed that preferable characteristics can be achieved by a combination of two films having discotic liquid crystal layers when B=A/2×0.8±30% is satisfied where A represents an optimum retardation (in-plane retardation) that is achieved by the use of a uniaxial optical retardation film of the first type and B represents a frontal retardation (retardation in the plane of the substrate as viewed in the normal direction) in one film having discotic liquid crystal layers whose tilt angle gradually changes.

As described above, according to the fourth embodiment of the invention, characteristics equivalent to those of a uniaxial optical retardation film of the first type can be achieved by stacking and combining layers having negative birefringence in opposite directions. This makes it possible to easily fabricate a film having characteristics equivalent to those of a uniaxial optical retardation film of the first type with birefringence of 50 nm or less, which has been difficult to fabricate in the past. It is therefore possible to improve viewing angle characteristics of a VA LCD.

Fifth Embodiment

Figure 22:
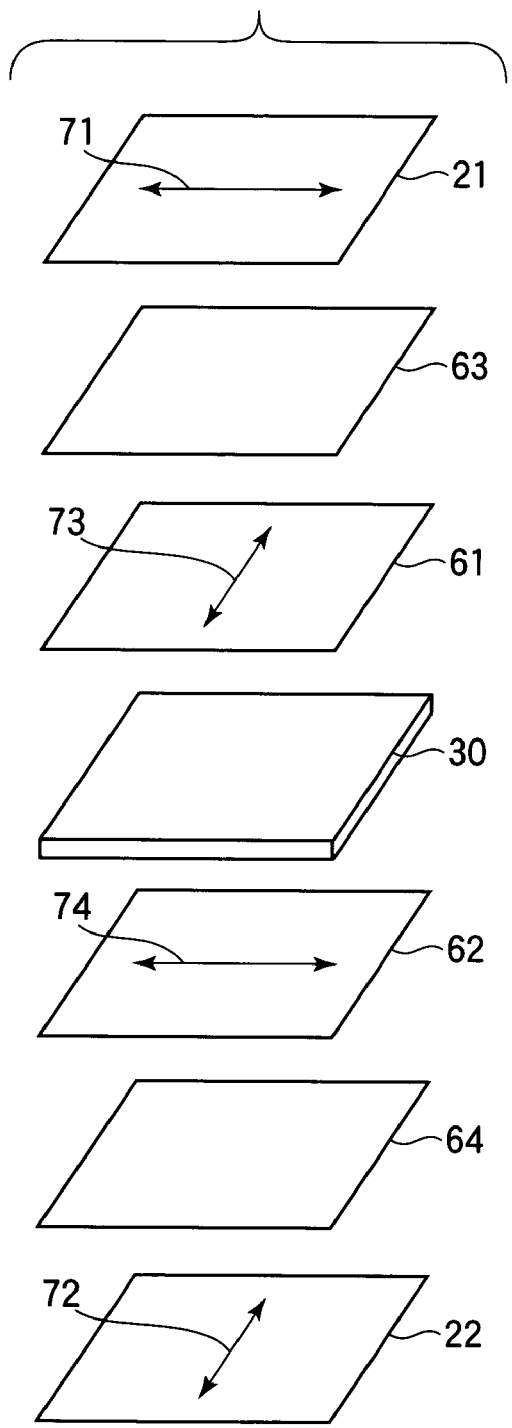
FIG. 22 shows a configuration of an MVA LCD according to a fifth embodiment of the invention.

FIG. 22 shows a configuration of an MVA LCD according to a fifth embodiment of the invention. A liquid crystal panel 30 is a four-division MVA type panel. Pixel electrodes, gate bus lines, data bus lines, TFT elements and protrusions, slits or the like in a zigzag configuration for defining domains are formed on one of substrates of the liquid crystal panel 30 (TFT substrate), and a full transparent electrode, a color filter, protrusions or the like in a zigzag configuration for defining domains are formed on the other substrate (CF substrate). Vertical alignment films made of polyimide are formed on both substrates, and the substrates are combined with spacers having a diameter of 3.5 μm interposed therebetween to seal nematic liquid crystals (Δn=0.082) having negative dielectric anisotropy between them.

First and second polarizing elements 21 and 22 are provided on both sides of the liquid crystal panel 30 such that their absorption axes 71 and 72 are at 45 deg. to the direction in which liquid crystal molecules are tilted when a voltage is applied and such that the absorption axes are orthogonal to each other. The directions in which liquid crystal molecules are tilted in the four separate regions (directions of alignment) are 90 deg. different from each other when projected and viewed on the plane of the substrate of the liquid crystal panel. The present embodiment is significantly advantageous especially in such a configuration (in which the separate directions of alignment, the absorption axes of the polarizers and the phase-delay axes of the optical retardation films are in the above-described relationship).

An uniaxial optical retardation film 61 of the first type is provided between the liquid crystal panel 30 and the first polarizing element 21 such that $n_x > n_y \approx n_z$ is satisfied, and its phase-delay axis 73 (in the $n_x$-direction) is orthogonal to the absorption axis of the first polarizing element 21. While the optical retardation film of the first type is obtained by stretching, for example, a norbornene type film available on the market, it may be a film obtained by stacking and combining layers having negative birefringence in opposite directions according to the fourth embodiment. Although $n_y$ and $n_z$ of the uniaxial optical retardation film of the first type are preferable equal, $n_y$ and $n_z$ will not completely agree with each other because of errors (variations) during manufacture. The present embodiment is based on an assumption that a uniaxial optical retardation film of the first type satisfies $0 \leq (n_y-n_z) \times d < 20$ nm. Further, a uniaxial optical retardation film 62 of the first type is provided between the liquid crystal panel 30 and the second polarizing element 22 such that $n_x > n_y \cong n_z$ is satisfied and such that its phase-delay axis 74 (in the $n_x$-direction) is orthogonal to the absorption axis of the second polarizing element 22. The uniaxial optical retardation films 61 and 62 of the first type have equal retardations R in a direction of the plane thereof.

A uniaxial optical retardation film 63 of the second type is provided between the first polarizing element 21 and the uniaxial optical retardation film 61 of the first type such that $n_x \cong n_y > n_z$ is satisfied. In the present specification, it is assumed that a uniaxial optical retardation film of the second type satisfies $0 \leq (n_x-n_y) \times d \leq 10$ nm. Further, a uniaxial optical retardation film 64 of the second type is provided between the second polarizing element 22 and the uniaxial optical retardation film 62 of the first type such that $n_x \cong n_y > n_z$ is satisfied. The uniaxial optical retardation films 63 and 64 of the second type have equal retardations Rt in the direction of the thickness thereof.

Figure 23:
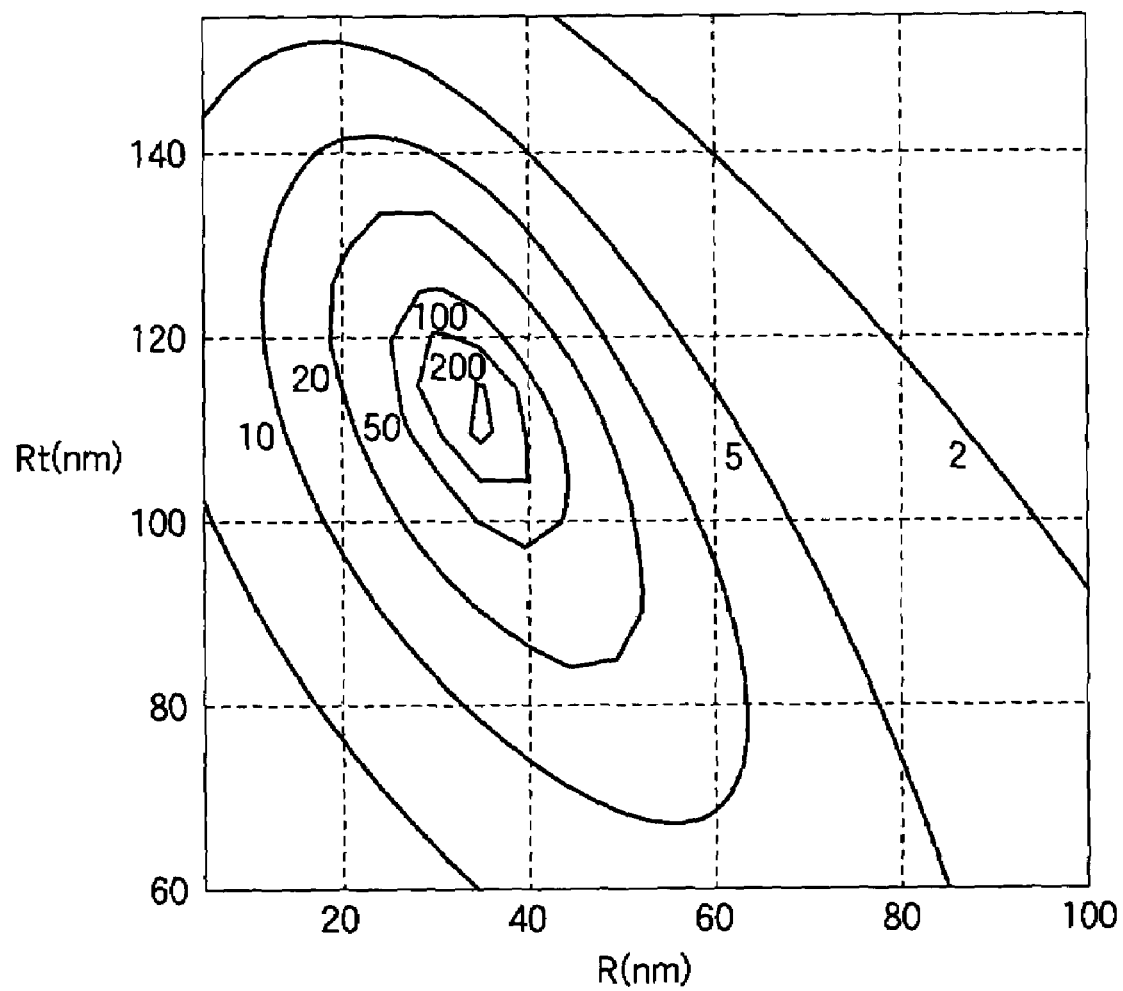
FIG. 23 shows viewing angle characteristics of the MVA LCD according to the fifth embodiment of the invention.
Figure 24:
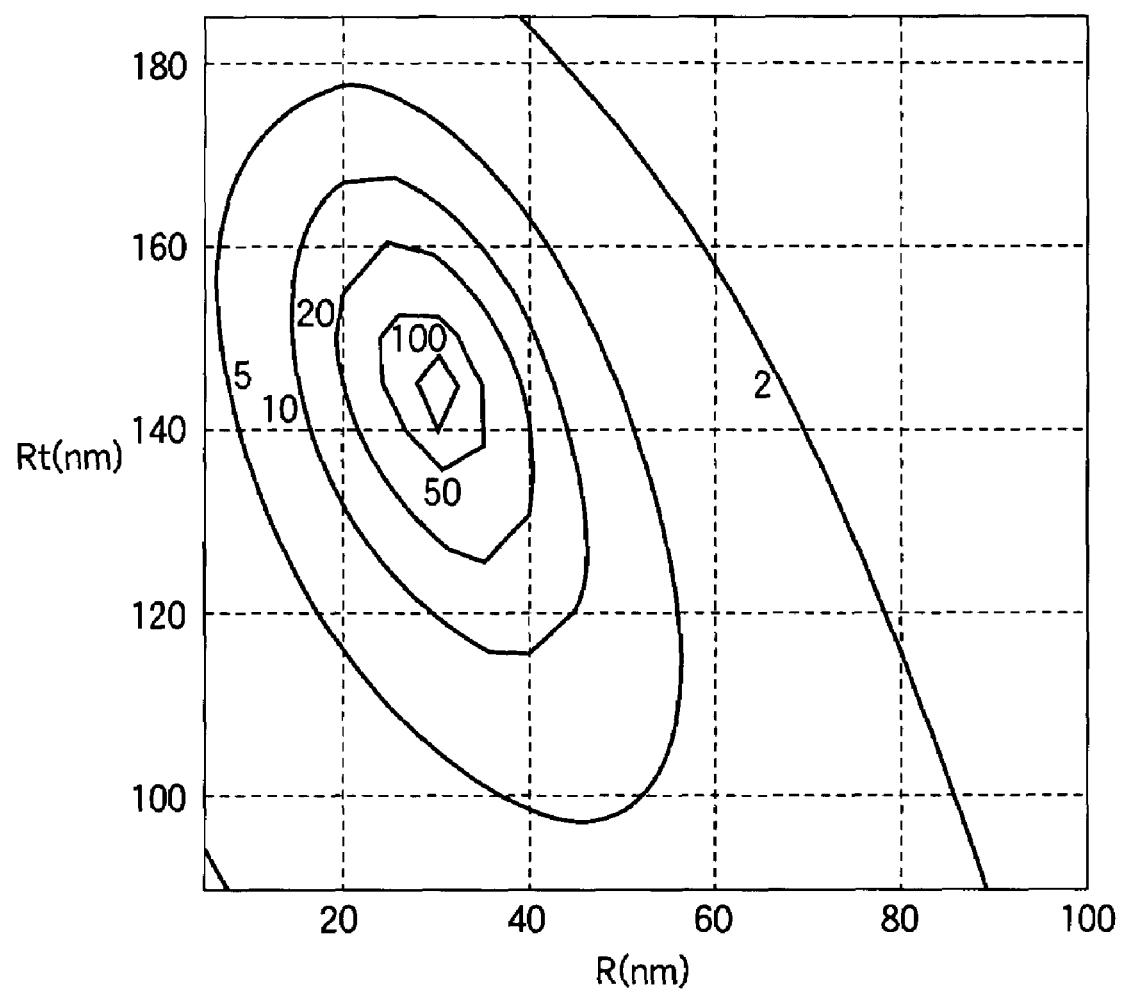
FIG. 24 shows viewing angle characteristics of the MVA LCD according to the fifth embodiment of the invention.
Figure 25:
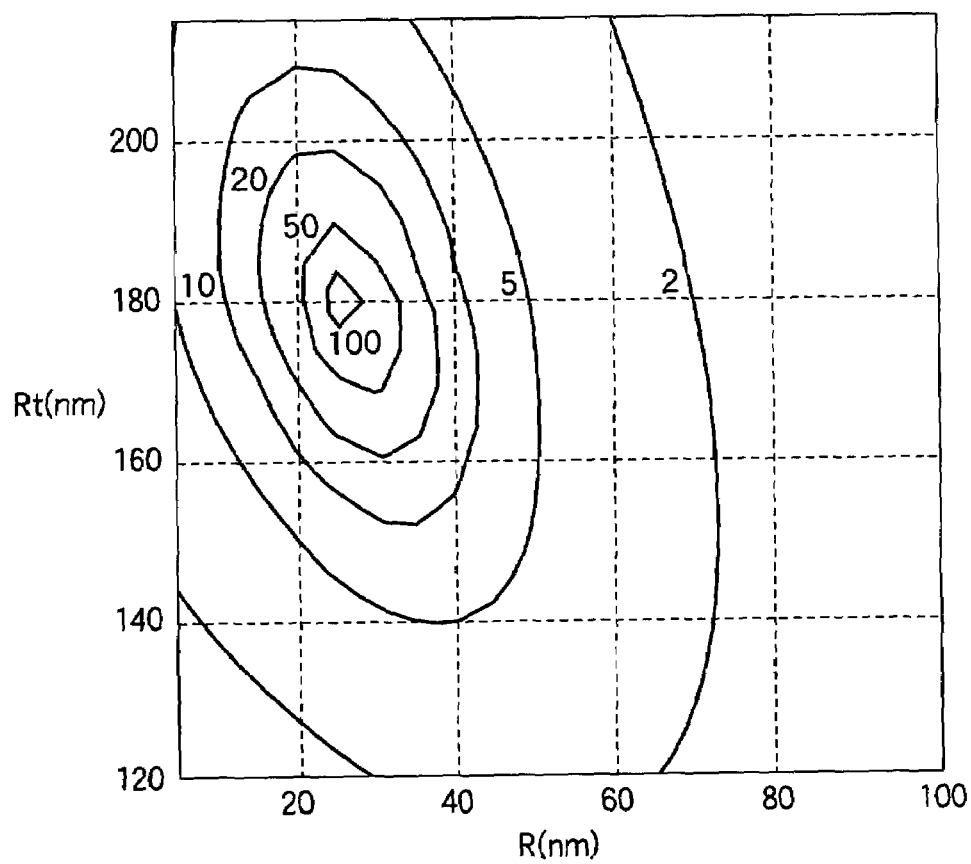
FIG. 25 shows viewing angle characteristics of the MVA LCD according to the fifth embodiment of the invention.

FIGS. 23 through 25 show results of a simulation of viewing angle characteristics of the above-described configuration carried out while varying the retardation R in the uniaxial optical retardation films 61 and 62 of the first type and the retardation Rt in the uniaxial optical retardation films 63 and 64 of the second type, a retardation $R_{LC}$ in liquid crystal panel 30 being 288 nm, 345 nm or 411 nm. A retardation $R_{LC}$ in the liquid crystal panel is represented by $R_{LC} = \Delta n \times d$ (d: the thickness of the liquid crystal layer). Those figures are contour graphs on which the retardation R is plotted along the abscissa axes; the retardation Rt is plotted along the ordinate axes; and points (R, Rt) where the panel has equal contrast as viewed at a diagonal angle of 80 deg. in directions at 45 deg. are connected by a line. FIG. 23 was plotted for a retardation $R_{LC}$ of 288 nm; FIG. 24 was plotted for a retardation $R_{LC}$ of 345 nm; and FIG. 25 was plotted for a retardation $R_{LC}$ of 411 nm.

Figure 4:
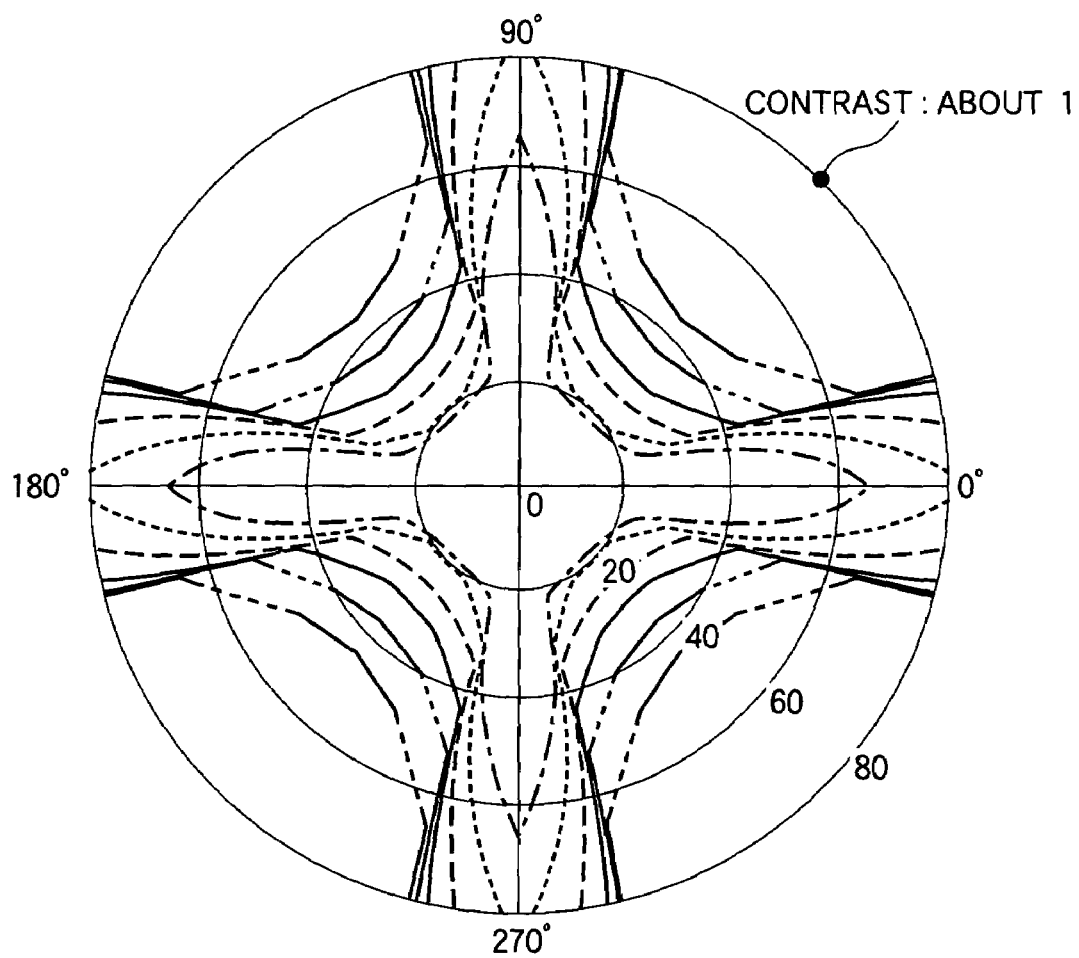
FIG. 4 is a diagram showing viewing angle characteristics of the conventional MVA liquid crystal display.

The panel has contrast of 1 when viewed at a diagonal angle of 80 deg. in directions at 45 deg. without any optical retardation film as shown in FIG. 4, and the provision of optical retardation films can be regarded effective under conditions (R, Rt) that result in higher contrast.

Figure 26:
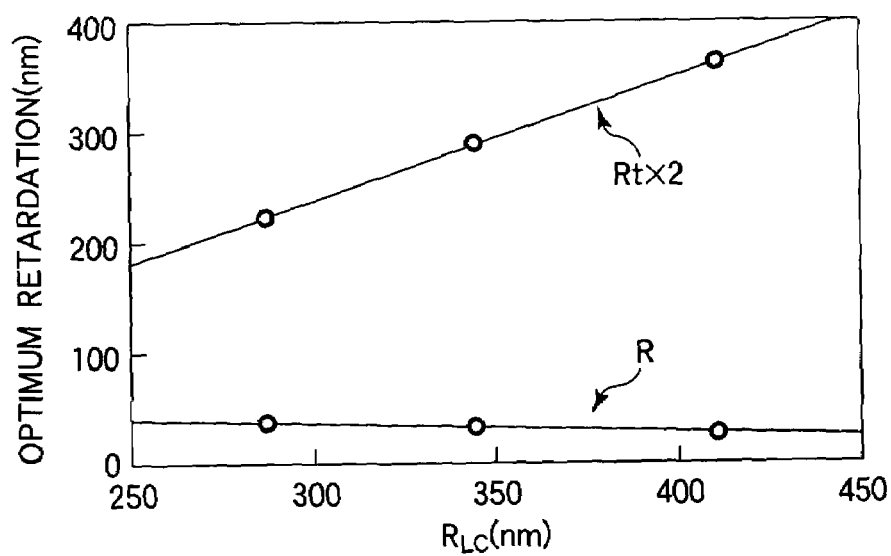
FIG. 26 is a graph showing retardations $R_{LC}$ in the liquid crystals of the MVA LCD according to the fifth embodiment and optimum retardations in optical retardation films thereof.

FIG. 26 shows the conditions (R, Rt) under which the highest contrast appears on the panel as viewed at a diagonal angle of 80 deg. in directions at 45 deg. plotted relative to the retardation $R_{LC}$. Referring to the retardation Rt, optimum values of the sum of the retardations Rt or Rt×2 in the uniaxial optical retardation films 63 and 64 of the second type are plotted. Further, when three or more uniaxial optical retardation films of the second type are used, the sum of the retardations Rt of those films may be considered. The result shown in FIG. 26 indicates that an optimum value of the retardation R is in a relationship as shown below with the retardation $R_{LC}$.

Optimum Value of Retardation R: $-0.08 \times R_{LC} + 58$
Optimum Value of Rt×2: $1.13 \times R_{LC} - 105$ (unit: nm).

Figure 27:
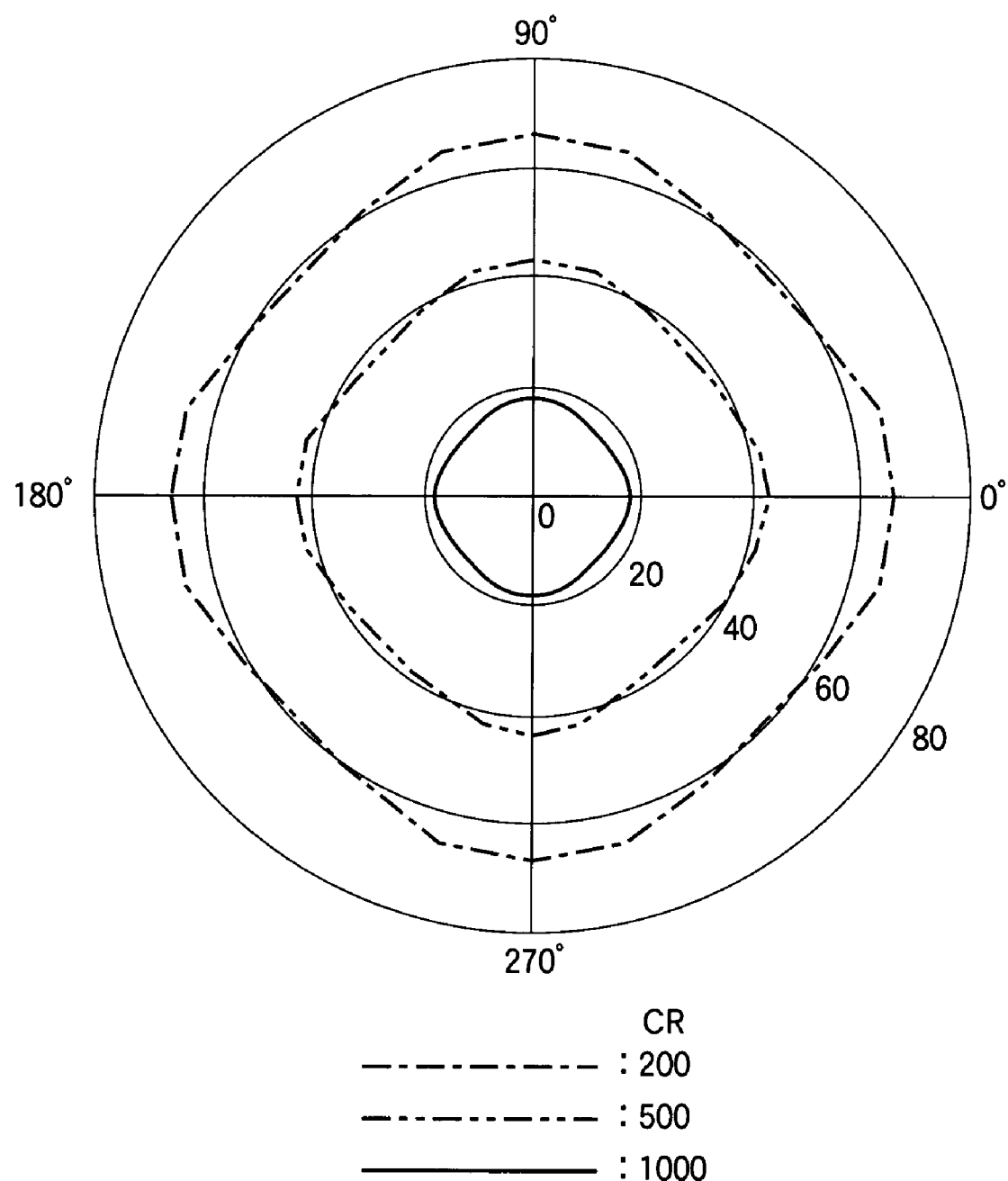
FIG. 27 shows viewing angle characteristics (iso-contrast curves) of the MVA LCD according to the fifth embodiment.

FIG. 27 shows iso-contrast curves taken on the fifth embodiment when the retardation $R_{LC}$, retardation R and retardation Rt are 345 nm, 30 nm and 145 nm respectively. In this case, the panel had contrast of about 100 when viewed at a diagonal angle of 80 deg. in directions at 45 deg., which indicates significant improvement of viewing angle characteristics.

The fifth embodiment achieved preferable viewing angle characteristics in an actual configuration in which stretched norbornene type films having a retardation R=40 nm as described above were used as the uniaxial optical retardation films 61 and 62 of the first type and in which polycarbonate (PC) films having a retardation Rt=100 nm were used as the uniaxial optical retardation films 63 and 64 of the second type.

In the fifth embodiment, one uniaxial optical retardation film 63 of the second type was provided between the first polarizing element 21 and the uniaxial optical retardation film 61 of the first type; one uniaxial optical retardation film 64 of the second type was provided between the second polarizing element 22 and the uniaxial optical retardation film 62 of the first type; and the two uniaxial optical retardation films 63 and 64 of the second type had equal retardations Rt. However, the uniaxial optical retardation films 63 and 64 of the second type are not limited to a single-layer configuration, and they may form a plurality of layers. By way of example, a study was made into a case wherein N ($N \geq 1$) uniaxial optical retardation films of the second type were provided at least between the first polarizing element 21 and the uniaxial optical retardation film 61 of the first type or between the second polarizing element 22 and the uniaxial optical retardation film 62 of the first type where $n_x \cong n_y > n_z$ was satisfied. As a result, it was revealed that optimum values of a retardation R and a retardation $Rt_1 + Rt_2 + \ldots + Rt_N$ are in a relationship as shown below with a retardation $R_{LC}$ (unit: nm) where retardations $((n_x+n_y)/2 - n_z)d$ of the N optical retardation films are represented by $Rt_1$, $Rt_2$, ..., $Rt_N$, respectively.

Optimum Value of Retardation R: $-0.08 \times R_{LC} + 58$
Optimum Value of $Rt_1 + Rt_2 + \ldots + Rt_N$: $1.13 \times R_{LC} - 105$ That is, when a plurality of uniaxial optical retardation films of the second type are provided, they are equivalent to one uniaxial optical retardation film of the second type having a value that is equal to the sum of retardations Rt of those films.

Sixth Embodiment

FIG. 28 shows a configuration of an MVA LCD according to a sixth embodiment of the invention. The sixth embodiment is different from the fifth embodiment in that a uniaxial optical retardation film 65 of the second type that satisfies $n_x \cong n_y > n_z$ is provided between the uniaxial optical retardation film 61 of the first type and the liquid crystal panel 30 instead of the uniaxial optical retardation films 63 and 64 of the second type and in that a uniaxial optical retardation film 66 of the second type that satisfies $n_x \cong n_y > n_z$ is provided between the uniaxial optical retardation film 62 of the first type and the liquid crystal panel 30. In this case, the uniaxial optical retardation films 61 and 62 of the first type have equal retardations R, and the uniaxial optical retardation films 65 and 66 of the second type have equal retardations Rt.

Figure 29:
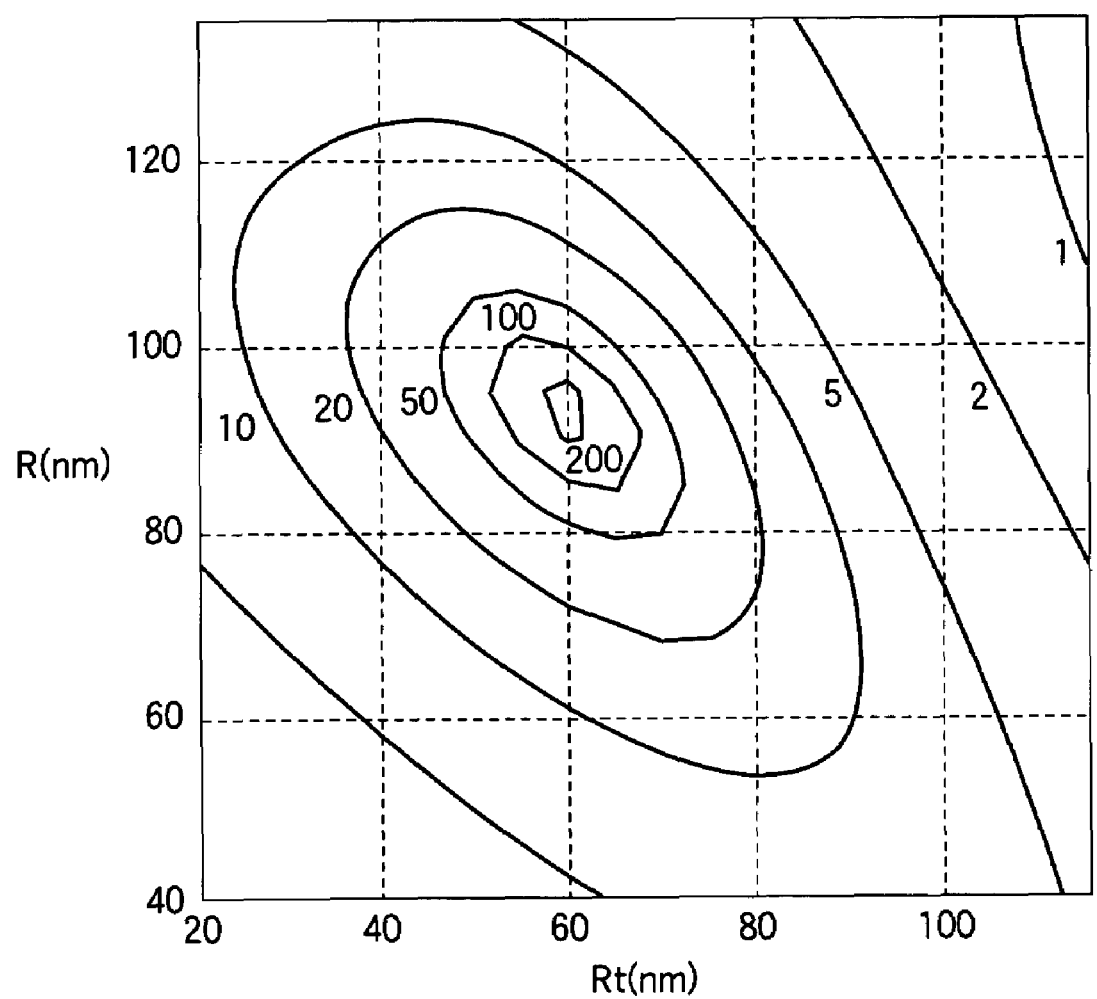
FIG. 29 shows viewing angle characteristics of the MVA LCD according to the sixth embodiment.
Figure 30:
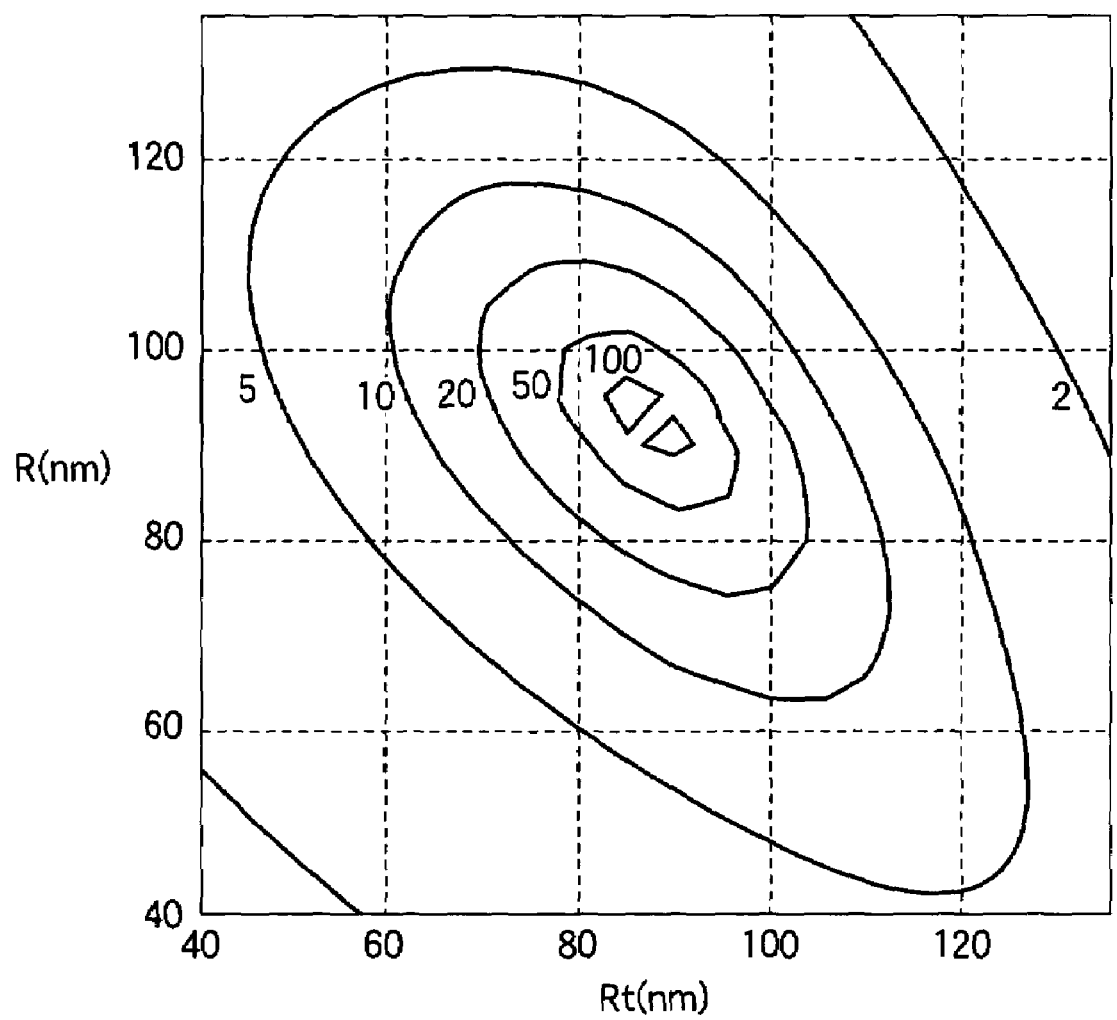
FIG. 30 shows viewing angle characteristics of the MVA LCD according to the sixth embodiment.
Figure 31:
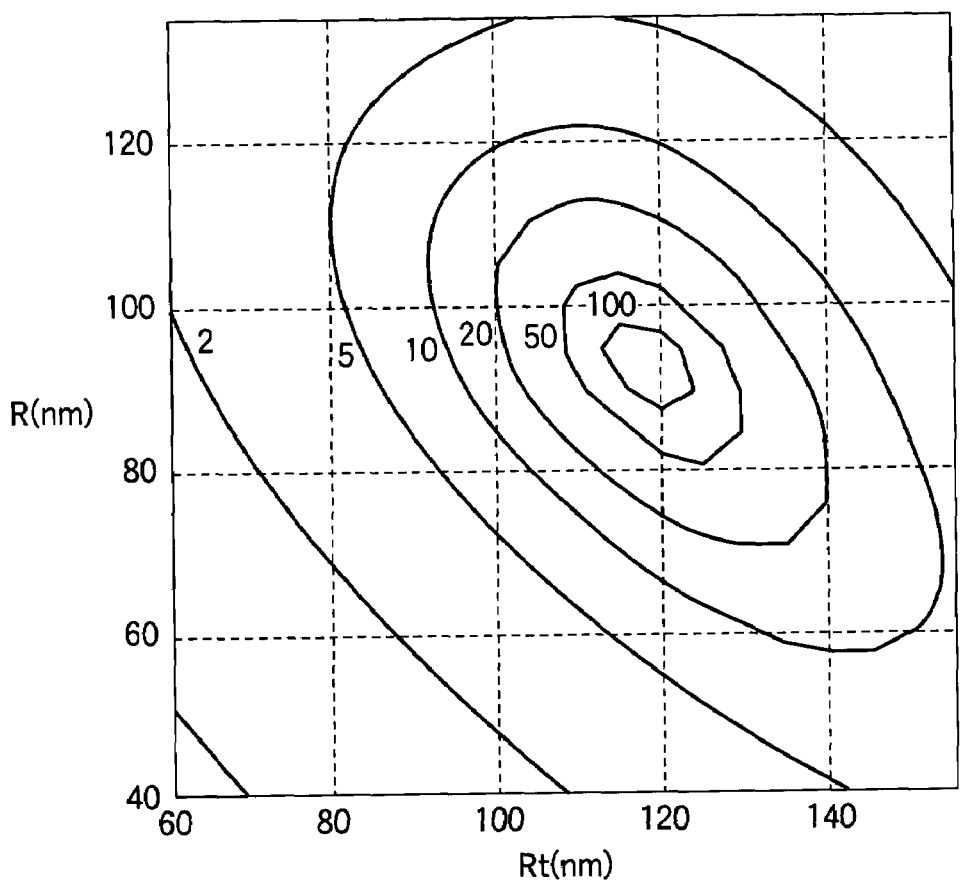
FIG. 31 shows viewing angle characteristics of the MVA LCD according to the sixth embodiment.
Figure 32:
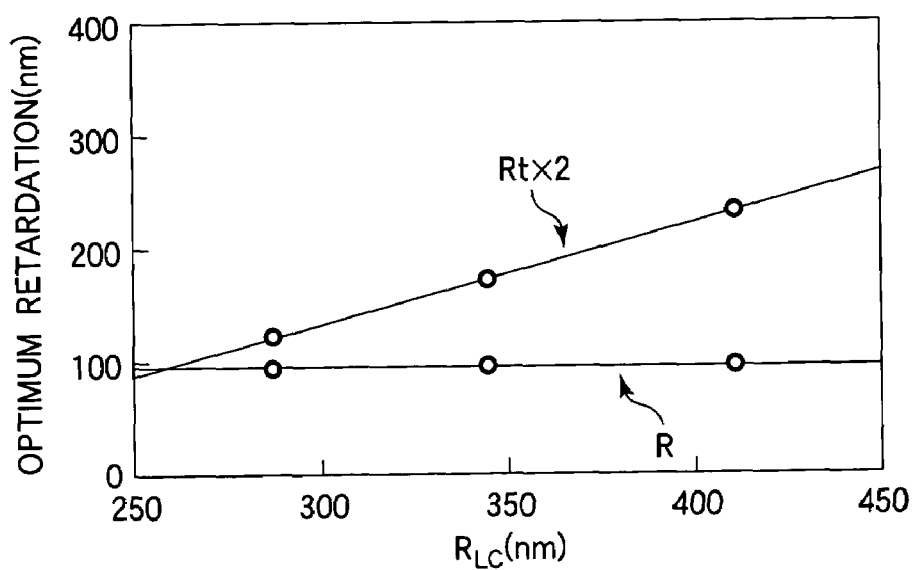
FIG. 32 is a graph showing retardations $R_{LC}$ in the liquid crystals of the MVA LCD according to the sixth embodiment and optimum retardations in optical retardation films thereof.

FIGS. 29 through 31 show results of a simulation of viewing angle characteristics of the sixth embodiment carried out while varying the retardation R in the uniaxial optical retardation films 61 and 62 of the first type and the retardation Rt in the uniaxial optical retardation films 65 and 66 of the second type, a retardation $R_{LC}$ in liquid crystal panel 30 being 288 nm, 345 nm or 411 nm just as in the fifth embodiment. Those figures are contour graphs on which the retardation Rt is plotted along the abscissa axes; the retardation R is plotted along the ordinate axes; and points (Rt, R) where the panel has equal contrast as viewed at a diagonal angle of 80 deg. in directions at 45 deg. are connected by a line. FIG. 29 was plotted for a retardation $R_{LC}$ of 288 nm; FIG. 30 was plotted for a retardation $R_{LC}$ of 345 nm; and FIG. 31 was plotted for a retardation $R_{LC}$ of 411 nm.

The results shown in FIGS. 29 through 31, FIG. 32 shows the conditions (Rt, R) under which the highest contrast appears on the panel as viewed at a diagonal angle of 80 deg. in directions at 45 deg. plotted relative to the retardation $R_{LC}$. Referring to the retardation Rt, optimum values of the sum of the retardations Rt or Rt×2 of the uniaxial optical retardation films 65 and 66 of the second type are plotted. The result shown in FIG. 32 indicates that an optimum value of the retardation R is in a relationship as shown below with the retardation $R_{LC}$.

Optimum Value of Retardation R: Constant at 95 Regardless of Retardation $R_{LC}$ Optimum Value of Rt×2: $0.89 \times R_{LC} - 137$ (unit: nm)

The uniaxial optical retardation films 65 and 66 of the second type according to the sixth embodiment are not also limited to a single-layer configuration, and they may form a plurality of layers. A study was made into a case wherein M (M≧1) uniaxial optical retardation films of the second type satisfying $n_x \cong n_y > n_z$ were provided at least between the uniaxial optical retardation film 61 of the first type and the liquid crystal panel 30 or between the uniaxial optical retardation film 62 of the first type and the liquid crystal panel 30. As a result, it was revealed that optimum values of a retardation R and a retardation $Rt'_1 + Rt'_2 + \ldots + Rt'_M$ are in a relationship as shown below with a retardation $R_{LC}$ (unit: nm) where retardations $((n_x+n_y)/2-n_z)d$ of the M optical retardation films are represented by $Rt'_1, Rt'_2, \ldots, Rt'_M$, respectively.

Optimum Value of Retardation R: Constant at 95 Regardless of Retardation $R_{LC}$ Optimum Value of $Rt'_1 + Rt'_2 + \ldots Rt'_M$: $0.89 \times R_{LC} - 137$ That is, when a plurality of uniaxial optical retardation films of the second type are provided, they are equivalent to one uniaxial optical retardation film of the second type having a value that is equal to the sum of retardations Rt of those films.

Figure 33:
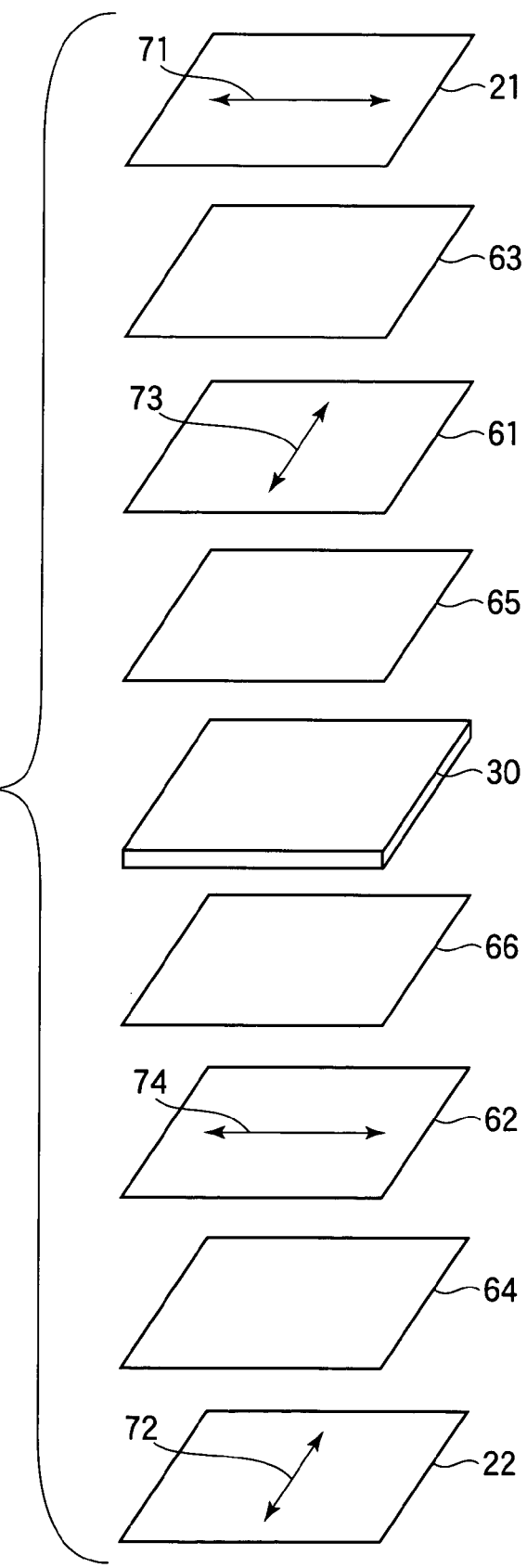
FIG. 33 shows another configuration of the MVA LCD according to fourth, fifth or sixth embodiment.

FIG. 33 shows an example of another configuration of an MVA LCD according to the fourth, fifth or sixth embodiment. In the configuration of this example, uniaxial optical retardation films 63, 64, 65 and 66 of the second type are respectively provided between the uniaxial optical retardation film 61 of the first type and the first polarizing element 21, between the uniaxial optical retardation film 61 of the first type and the liquid crystal panel 30, between the uniaxial optical retardation film 62 of the first type and the liquid crystal panel 30 and between the uniaxial optical retardation film 62 of the first type and the second polarizing element 21. That is, this is a configuration provided by adding the uniaxial optical retardation films 65 and 66 of the second type to the configuration of the fifth embodiment in FIG. 22 or by adding the uniaxial optical retardation films 63 and 64 of the second type to the configuration of the sixth embodiment in FIG. 28.

Preferable viewing angle characteristics were achieved in the configuration of FIG. 33 in which a liquid crystal panel 30 obtained by combining two substrates with spacers having a diameter of 4.0 µm interposed to seal nematic liquid crystals (Δn=0.086) having negative dielectric anisotropy between them was used; stretched films having a retardation R=45 nm or films having polymer liquid crystal layers (e.g., discotic liquid crystal layers or the like) were used as the uniaxial optical retardation films 61 and 62 of the first type; and polycarbonate (PC) films having a retardation Rt=60 nm were used as the uniaxial optical retardation films 63, 64, 65 and 66 of the second type.

As thus described, various changes may be made as to the locations and quantity of the uniaxial optical retardation films of the second type. A simulation was carried out to study an optimum condition for the provision of a plurality of uniaxial optical retardation films of the second type in the example of configuration in FIG. 33. Specifically, a study was made into a configuration in which N uniaxial optical retardation films of the second type satisfying $n_x \cong n_y > n_z$ were provided at least between the first polarizing element 21 and the uniaxial optical retardation film 61 of the first type or between the second polarizing element 22 and the uniaxial optical retardation film 62 of the first type and in which M uniaxial optical retardation films of the second type satisfying $n_x \cong n_y > n_z$ were provided at least between the uniaxial optical retardation film 61 of the first type and the liquid crystal panel 30 or between the uniaxial optical retardation film 62 of the first type and the liquid crystal panel 30 (N+M≧1).

As a result, it was revealed that optimum values of a retardation R and a retardation $Rt_1 + Rt_2 + \ldots + Rt_N + Rt'_1 + Rt'_2 + Rt'_M$ are in a relationship as shown below with a retardation $R_{LC}$ (unit: nm) where retardations $((n_x+n_y)/2-n_z)d$ of the N optical retardation films are represented by $Rt_1, Rt_2, \ldots, Rt_N$, respectively and where retardations $((n_x+n_y)/2-n_z)d$ of the M optical retardation films are represented by $Rt'_1, Rt'_2, \ldots, Rt'_M$ respectively.

Optimum Value of Retardation R: $(-0.08 \times R_{LC} + 58) \times \alpha + 95 \times (1-\alpha)$ Optimum Value of $Rt_1 + Rt_2 + \ldots + Rt_N + Rt'_1 + Rt'_2 + \ldots + Rt'_M$: $(1.13 \times R_{LC} - 105) \times \alpha + (0.89 \times R_{LC} - 137) \times (1-\alpha)$ where $\alpha = (Rt_1 + Rt_2 + \ldots + Rt_N)/(Rt_1 + Rt_2 + \ldots + Rt_N + Rt'_1 + Rt'_2 + \ldots + Rt'_M)$, and the unit is nm.

The panel had contrast of substantially 2 or more as viewed at a diagonal angle of 80 deg. in directions at 45 deg. when the retardation R was within a range of ±60 nm about an optimum value obtained as described serving as a reference and when the retardation $Rt_1 + Rt_2 + \ldots + Rt_N + Rt'_1 + Rt'_2 + \ldots + Rt'_M$ was within a range of ±120 nm about an optimum value obtained as described above serving as a reference. It was revealed that improved viewing angle characteristics was provided through the use of the optical retardation films compared to the case shown in FIG. 4 wherein no optical retardation film is used.

Further, the panel had contrast of substantially 5 or more as viewed at a diagonal angle of 80 deg. in directions at 45 deg. when the retardation R was within a range of ±30 nm about an optimum value obtained as described serving as a reference and when the retardation $Rt_1 + Rt_2 + \ldots + Rt_N + Rt'_1 + Rt'_2 + \ldots + Rt'_M$ was within a range of ±60 nm about an optimum value obtained as described above serving as a reference. It was revealed that further improvement of viewing angle characteristics was achieved.

TAC (triacetyl cellulose) films widely used as support substrates for polarizers were also used as the optical films according to the embodiment described above. In general, a polarizer is manufactured by laminating a TAC film wound in the form of a roll, an iodine-doped PVA (polyvinyl alcohol) film wound in the form of a roll and another TAC film wound in the form of a roll as they are and by rewinding them around a roll.

Among such films pulled out from rolls, at least a TAC film to be provided on a liquid crystal panel was stretched in one direction in the plane thereof. In general, a PVA film is stretched in the direction in which it is fed from a roll, and the film has an optic axis in the same direction. Iodine is aligned in the same direction, and its absorption axis is in parallel with the optic axis of the PVA film. The stretching direction of the TAC film to be provided on a liquid crystal panel is perpendicular to the stretching direction of the PVA film (which is the direction in which the film is fed from the roll) or the direction of alignment of iodine or the direction of the optic axis of the PVA film. Therefore, the extending direction of the TAC film is a direction perpendicular to the direction in which it is fed from the roll, in general. Obviously, the invention is not limited to the above-described relationship between stretching directions of the films as long as the optic axis of the PVA (iodine) film and the stretching direction of the TAC film are perpendicular to each other.

Referring to requirements for such a stretched TAC film, preferable viewing angle characteristics could be achieved when it had an in-plane retardation in the range from 10 nm to 100 nm and, more preferably, in the range of 60 nm±30 nm. As thus described, viewing angle characteristics were advantageously improved by a film obtained by stretching a TAC film only in one direction such that the stretching direction was perpendicular to the absorption axis of a polarizing layer (PVA/iodine layer) adjacent thereto. In practice, the effect of improving viewing angle characteristics was observed even in a configuration in which a pair of polarizers as described above were laminated with a liquid crystal layer (MVA) in a vertical alignment and to which any other element was not added.

As described above, the present embodiment makes it possible to stably manufacture uniaxial optical retardation films of the first type in which an in-plane retardation with a small value of birefringence occurs with a high margin for manufacture. It is therefore possible to improve viewing angle characteristics of a VA liquid crystal display utilizing the same. Further, the present embodiment makes it possible to provide an optimum configuration for optical retardation films of a VA liquid crystal display, which allows further improvement of viewing angle characteristics.

Seventh Embodiment

A liquid crystal display according to a seventh embodiment of the invention will now be described. Prior to the description of the embodiment, a specific description will be made on the problems to be solved by the present embodiment. The present embodiment relates to a liquid crystal display which has at least a discotic liquid crystal film as an optical compensation film for improving viewing angle characteristics and to a liquid crystal display in an OCB (optically compensated birefringence mode) utilizing a liquid crystal layer in a bend alignment.

Recently, there is increasing needs for high response liquid crystal displays capable of displaying dynamic images with high definition satisfactorily. When a dynamic image is displayed using a conventional LCD, display is subjected to a mixture of blur inherent in the hold type driving method and blur attributable to its response which is much poor than that of a CRT, and the dynamic image is very poorly displayed on the screen.

Blur in display attributable to the driving method can be solved by using the CR method in which black lines are periodically written and the scan backlight method in which a backlight periodically blinks in a display frame, for example. Referring to blur in display attributable to response, there is no solution other than improving the response characteristics of LCDs themselves. For this reason, various liquid crystal operating modes have been examined. For example, driving modes utilizing ferroelectric and antiferroelectric liquid crystals have not reached a practical level because of a significant difficulty associated with control of alignment, although they allow high response on the order of microseconds (μs). Further, various driving methods utilizing nematic liquid crystals are being examined, but they have a problem in that display quality is reduced although high response can be achieved.

Among driving modes utilizing nematic liquid crystals, OCB mode LCDs utilizing bend alignment are high response LCDs in which response of 10 milliseconds (ms) will be achieved regardless of gray shades and, recently, the introduction of such LCDs to the market is anticipated. A brief description will now be made with reference to FIG. 34 and FIGS. 35A through 35D on a configuration and operation of such an OCB mode LCD.

Figure 34:
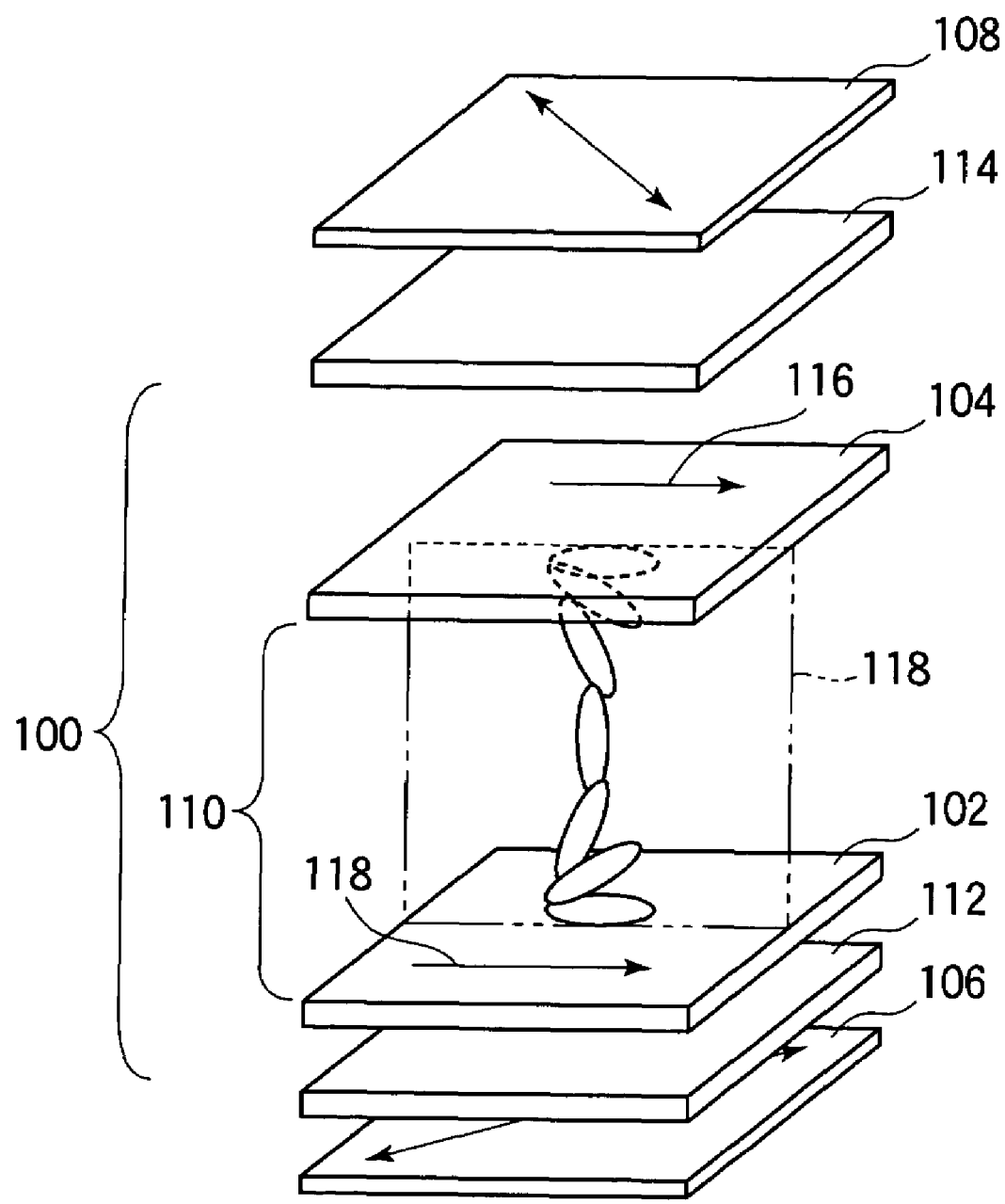
FIG. 34 is a perspective view showing a schematic configuration of an OCB mode LCD.
Figure 35A:
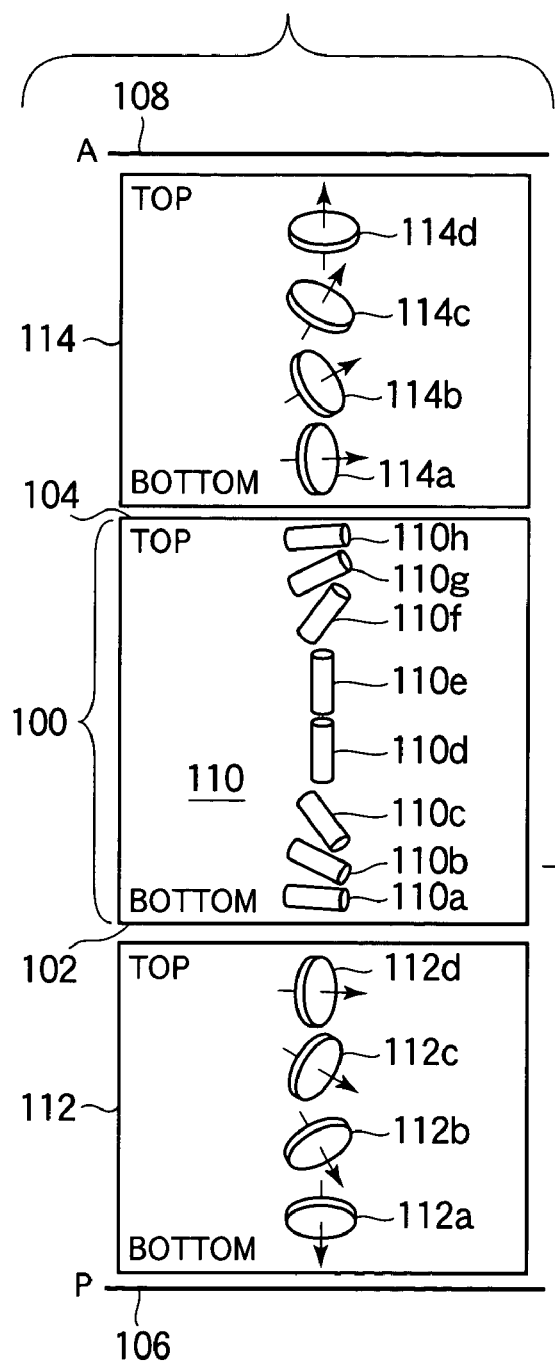
FIGS. 35A through 35D show a schematic configuration of a conventional liquid crystal display.
Figure 35B:
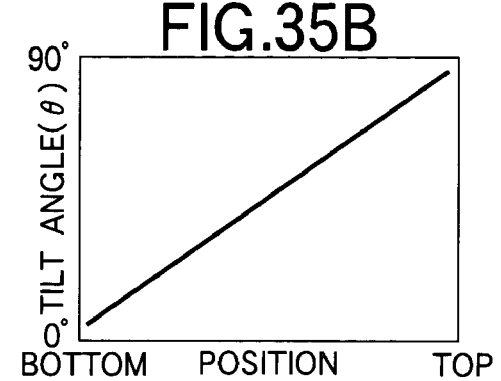
Figure 35C:
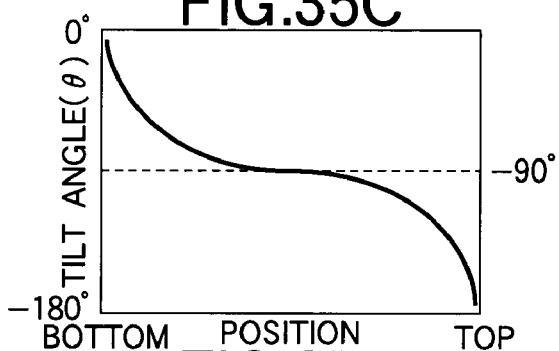
Figure 35D:
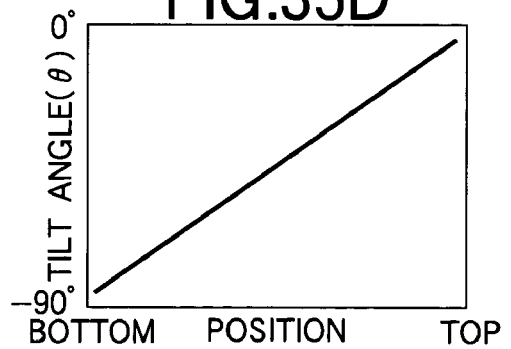

FIG. 34 is a perspective view showing a schematic configuration of the OCB mode LCD. FIG. 35A is a sectional view showing the schematic configuration of the OCB mode LCD. FIGS. 35B through 35D are graphs on which changes in the tilt angle of liquid crystals in each element of the OCB mode LCD are plotted in the direction of the thickness of each liquid crystal layer (the direction in which retardation increases from a value at the entrance side (bottom) to a value at the exit side (top); hereinafter referred to as "positions in the direction of the depth").

In the OCB mode, nematic liquid crystals which are in the spray alignment when no voltage is applied are driven for display by applying a predetermined relatively high voltage to change the alignment to the bend alignment. Images are then displayed within a range of applied voltages at which the bend alignment is maintained. An OCB mode LCD is a birefringence type liquid crystal display in which voltages in accordance with gray shades are applied to the liquid crystal layer to control the tilt of the liquid crystal molecules in the bend alignment and in which retardation of light passing through the liquid crystal layer is thereby controlled to display an image.

Referring to FIG. 34 and FIGS. 35A through 35D, a liquid crystal cell 100 is formed by an array substrate 102 on which a TFT (thin film transistor) and a display electrode are formed in each pixel, a counter substrate 104 provided in a face-to-face relationship with the array substrate 102 and having a common electrode formed thereon and a liquid crystal layer 110 sealed in the gap between the array substrate 102 and the counter substrate 104. A polarizer 106 is provided on the surface of the array substrate 102 opposite to the side of the liquid crystal layer 110. A polarizer 108 having an optical transmission axis perpendicular to (in a crossed Nicols relationship with) the optical transmission axis of the polarizer 106 is provided on the surface of the counter substrate 104 opposite to the side of the liquid crystal layer 110.

A discotic liquid crystal film (optically anisotropic element) 112 is provided between the array substrate 102 and the polarizer 106. A discotic liquid crystal film 114 is provided between the counter substrate 104 and the polarizer 108. The discotic liquid crystal films 112 and 114 are provided to cancel retardations (phase differences) in the liquid crystal layer 110 as much as possible to perform compensation such that an index ellipsoid becomes closer to a sphere as much as possible, thereby providing a panel having a wide viewing angle.

A rubbing process is performed in the same directions 116 and 118 on alignment films (not shown) formed on both of the array substrate 102 and the counter substrate 104 on the sides thereof where the liquid crystal layer 110 is located. As a result, the liquid crystal molecules in the liquid crystal layer 110 sealed between the array substrate 102 and the counter substrate 104 are put in the bend alignment in a plane 118 when a predetermined voltage is applied. The rubbing direction is at an angle of 45 deg. to the optical transmission axes of the polarizers 106 and 108. The OCB mode LCD shown in FIG. 34 and FIGS. 35A through 35D is a normally white LCD that displays white at the minimum voltage within the range of applied voltages at which the bend alignment is maintained because the polarizers 106 and 108 are in a crossed Nicols configuration.

The liquid crystal layer 110 shown in FIG. 34 represents an example of an alignment of molecules in a state wherein the maximum voltage within the range of applied voltages for maintaining the bend alignment is applied to display black. When black is displayed, most of liquid crystal molecules in the middle of the liquid crystal layer 110 are substantially in parallel with the normal direction of the surfaces of the array substrate 102 and counter substrate 104 (longitudinal direction of the figure); the liquid crystal molecules are gradually tilted toward a direction orthogonal to the normal direction near the substrates; and the liquid crystal molecules are tilted substantially perpendicularly to the normal direction in the vicinity of the alignment films on the surfaces of both of the substrates.

As apparent from the liquid crystal layer 110 in FIG. 35A, in the bend alignment in the OCB mode, liquid crystal molecules are tilted such that a substantially symmetric relationship is established between liquid crystal molecules 110e through 110h located in an upper half of the liquid crystal layer 110 above a straight line extending substantially in the middle of the layer in parallel with the substrate surfaces and liquid crystal molecules 110a through 110d located in a lower half thereof. The suffixes of the reference numbers assigned to liquid crystal molecules in the present specification merely discretely represent the positions of the liquid crystal molecules which are continuously distributed and do not indicate the quantity of molecules or the like.

Figure 36:
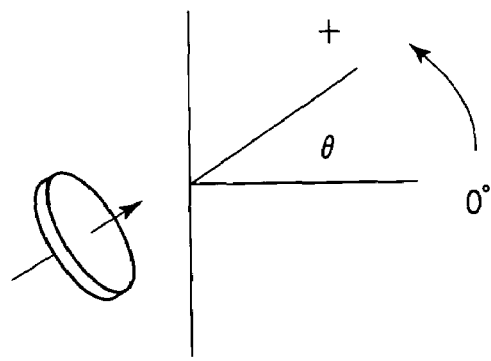
FIG. 36 illustrates a definition of a tilt angle.

A description will now be made with reference to FIG. 35C on a state of tilt of liquid crystal molecules in the liquid crystal layer 110 when black is displayed. FIG. 35C shows positions in the direction of the depth of the layer as viewed from the array substrate 102 (bottom) toward the counter substrate 104 (top) along the abscissa axis. The tilt angle (angle of inclination) of the liquid crystal molecules in the liquid crystal layer 110 is shown along the ordinate axis. In the context of the present specification, the tilt angle is a positive angle increasing counterclockwise from 0 deg. in the direction orthogonal to the normal of the substrates as shown in FIG. 36.

As shown in FIG. 35C, the tile angle of the liquid crystal molecules in the liquid crystal layer 110 abruptly changes from a value near 0 deg. in a location near the array substrate 102 (bottom) to a value near −90 deg. in a location closer to the counter substrate 104 (top). It stays near 90 deg. while monotonously decreasing and thereafter abruptly changes from a value near 90 deg. to a value near −180 deg. in the vicinity of the counter substrate 104.

A description will be made with reference to FIG. 35D on changes in the tilt angle of the discotic liquid crystal molecules in the discotic liquid crystal layer 112. FIG. 35D shows positions in the direction of the depth of the film (positions in the normal direction of the substrate surface) as viewed from the polarizer 106 (bottom) toward the array substrate 102 (top) along the abscissa axis. The tilt angle of the discotic liquid crystal molecules 112a through 112d in the film are shown along the ordinate axis. As shown in FIG. 35D, the tilt angle of the discotic liquid crystal molecules 112a through 112d linearly changes from a value near −90 deg. in a location near the polarizer 106 (bottom) to a value near 0 deg. in a location closer to the array substrate 102 (top) to compensate the optical characteristics of the liquid crystal molecules 110a through 110d in the lower half of the liquid crystal layer 110 when black is displayed.

A description will be made with reference to FIG. 35B on changes in the tilt angle of the discotic liquid crystal molecules in the discotic liquid crystal layer 114. FIG. 35B shows positions in the direction of the depth of the film (positions in the normal direction of the substrate surface) as viewed from the counter substrate 104 (bottom) toward the polarizer 108 (top) along the abscissa axis. The tilt angle of the discotic liquid crystal molecules 114a through 114d in the film are shown along the ordinate axis. As shown in FIG. 35B, the tilt angle of the discotic liquid crystal molecules 114a through 114d linearly changes from a value near 0 deg. in a location near the counter substrate 104 (bottom) to a value near +90 deg. in a location closer to the array substrate 102 (top) to compensate the optical characteristics of the liquid crystal molecules 110e through 110h in the upper half of the liquid crystal layer 110 when black is displayed.

As thus described, in the conventional OCB mode LCD, while the tilt angle of the liquid crystal molecules 110a through 110h continuously changes in a non-linear fashion in the liquid crystal cell 100, the tilt angle of the discotic liquid crystal molecules 112a through 112d and 114a through 114d in the discotic liquid crystal films 112 and 114 changes linearly.

An examination on viewing angle characteristics of an OCB mode LCD that employs the above-described conventional discotic liquid crystal films 112 and 114 as optical compensation films indicates that an actually achieved viewing angle is not still impractical and there is a need for a further expansion of the same.

First, a description will be made with reference to FIG. 37 on viewing angle characteristics achieved by providing a uniaxial optical retardation film (not shown) between the counter substrate 104 and the polarizer 108 without using the discotic liquid crystal films 112 and 114 in the OCB mode LCD shown in FIG. 34.

Figure 37:
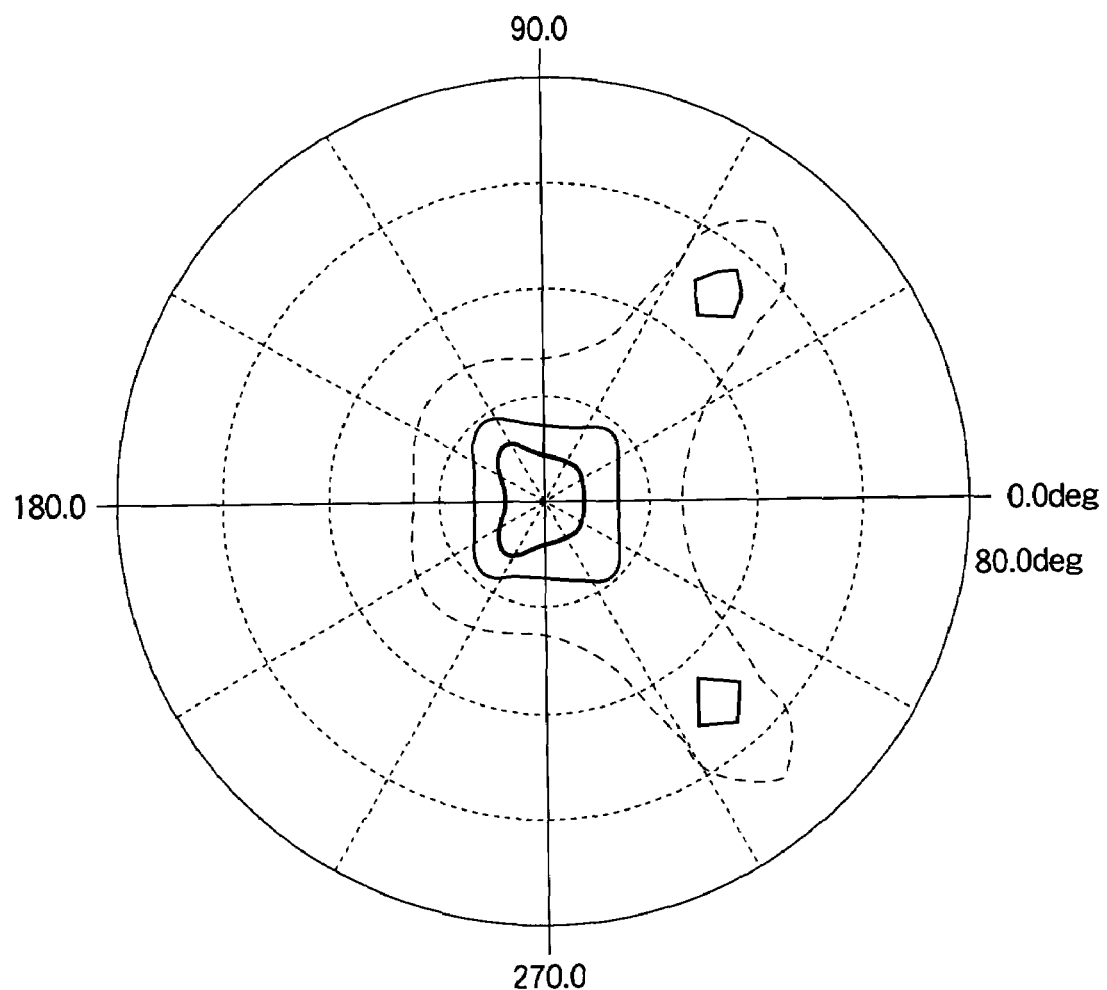
FIG. 37 shows viewing angle characteristics of an OCB mode LCD having no discotic liquid crystal film.

In the viewing angle characteristics diagram shown in FIG. 37, a viewing position for viewing the panel in the direction toward the center of the display surface of the panel is represented by the angle defined between the position and the normal of the panel surface (the angle of sight) and the azimuth angle to the center of the panel surface. The concentric circles that spread from the center of the diagram at equal intervals represent angles of sight of 20 deg., 40 deg., 60 deg. and 80 deg. shown in the order of their closeness to the center. The straight lines that pass through the center and divide the circles into twelve equal parts represent azimuth angles at steps of 30 deg. The azimuth angle of 0 deg. is represented by the line extending to the right side of the drawing from the center, and the azimuth angles are positive angles increasing counterclockwise.

It should be noted that FT-5181 (manufactured by CHISSO CORP.) is used as the liquid crystal material for the liquid crystal layer 110. The liquid crystal cell 100 has a retardation of 1000 nm, and the uniaxial optical retardation film has a retardation of 120 nm.

The optical transmission axes of the polarizers 106 and 108 in a crossed Nicols configuration are directions at +45 deg. and −45 deg. in terms of the azimuth angles in FIG. 37.

The rubbing directions 116 and 118 are the lateral direction of the figure (which is in parallel with a straight line connecting the azimuth angles 0 deg. and 180 deg.).

In FIG. 37, the bold solid line represents a line of equal contrast ratio indicating a contrast ratio of 500, and the thin solid line represents a line of equal contrast ratio indicating a contrast ratio of 100. The broken line represents a line of equal contrast ratio indicating a contrast ratio of 10.

As shown in FIG. 37, in the case of the conventional OCB mode LCD that utilizes only uniaxial optical retardation films, for example, the viewing angle at which a contrast ratio of 10% can be reliably achieved is only about 30 deg.

A description will now be made with reference to FIG. 38 on viewing angle characteristics of a conventional OCB mode LCD utilizing the discotic liquid crystal films 112 and 114 shown in FIG. 34 and FIGS. 35A through 35D. A uniaxial optical retardation film and a positive vertically aligned optical retardation film are provided between the discotic liquid crystal film 114 and the polarizer 108. The representation of viewing angle characteristics in FIG. 38 will not be described because it is similar to that in FIG. 37. Both of the discotic liquid crystal films 112 and 114 have a retardation of 125 nm. The configuration and conditions are otherwise the same as those shown in FIG. 37.

Figure 38:
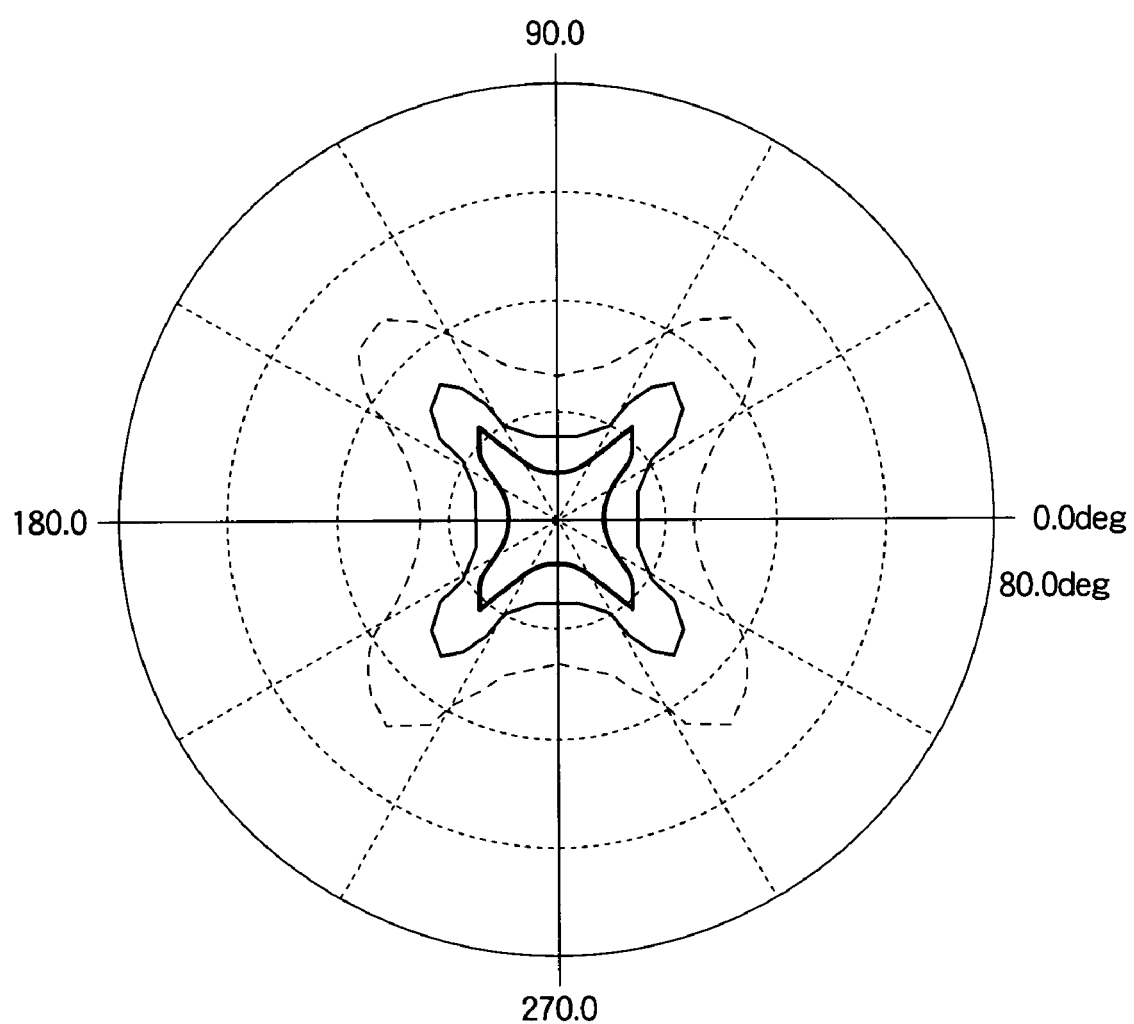
FIG. 38 shows viewing angle characteristics of a conventional OCB mode LCD having discotic liquid crystal films.

As shown in FIG. 38, the OCB mode LCD utilizing the discotic liquid crystal films 112 and 114 has less fluctuation of a contrast ratio depending on the viewing direction compared to the LCD shown in FIG. 37 and therefore maintain a viewing angle that is uniform in all directions to some degree. However, a contrast ratio of 10% or more can be achieved only a viewing angle of about 30 deg., which is still impractical.

Presently, a satisfactorily practical viewing angle can not be achieved using even three-dimensional optical retardation films and conventional optical compensation films utilizing negative retardation films.(VAC) instead of discotic liquid crystal films.

As thus described, viewing angle characteristics of OCB mode LCDs have not been improved sufficiently yet, which is a factor hindering the realization of displays having high speed response characteristics. It is an object of the present embodiment to provide an OCB mode liquid crystal display which can provide a wide viewing angle that is sufficiently practical.

The object of the present embodiment is achieved by a liquid crystal display characterized in that it has first and second substrates provided in a face-to-face relationship with a predetermined gap left therebetween, a liquid crystal layer in the bend alignment sealed in the gap, a first polarizer provided on a surface of the first substrate opposite to the side where the liquid crystal layer is located, a second polarizer provided on a surface of the second substrate opposite to the side where the liquid crystal layer is located, a first optical compensation film provided between the first substrate and the first polarizer and a second optical compensation film provided between the second substrate and the second polarizer, in that the first optical compensation film has discotic liquid crystals whose tilt angle changes in accordance with non-linear changes in the tilt of liquid crystal molecules in a region closer to the first substrate that is one of two substantially equal regions of the liquid crystal layer formed by dividing the layer in the normal direction of the substrate surface to compensate any retardation attributable to the non-linear changes in the tilt; and in that the second optical compensation film has discotic liquid crystals whose tilt angle changes in accordance with non-linear changes in the tilt of liquid crystal molecules in a region closer to the second substrate that is one of the two substantially equal regions of the liquid crystal layer formed by dividing the layer in the normal direction of the substrate surface to compensate any retardation attributable to the non-linear changes in the tilt.

A liquid crystal display according to the present embodiment is characterized in that each of the first and second optical compensation films is formed by laminating a plurality of discotic liquid crystal layers whose tilt angle changes substantially linearly to compensate the retardation by interpolating the curve of the non-linear changes of the tilt angle of the liquid crystal layer.

A liquid crystal display according to the present embodiment is characterized in that each of the first and second optical compensation films is constituted by a lamination of a plurality of films having the discotic liquid crystal layer whose tilt angle changes substantially linearly.

Any of the liquid crystal displays according to the present embodiment as described above is characterized in that each of the first and second optical compensation films has a multi-layer structure formed by first and second sub-films located in this order which is the order of their closeness to the liquid crystal layer and in that the maximum value (absolute value) θ1 of the tilt angle of the discotic liquid crystals in the first sub-film satisfies 50°≦θ1≦80°. A liquid crystal display according to the present embodiment is characterized in that R1+R2 is 450 nm±150 nm and R2/R1 ranges from 1 to 10 where R1 represents a retardation in the first sub-film and R2 represents a retardation in the second sub-film.

Any of the liquid crystal displays according to the present embodiment as described above is characterized in that each of the first and second optical compensation films has a multi-layer structure formed by first through third sub-films located in this order which is the order of their closeness to the liquid crystal layer, in that the maximum value (absolute value) θ1 of the tilt angle of the discotic liquid crystals in the first sub-film satisfies 30°≦θ1≦60° and in that the maximum value (absolute value) θ2 of the tilt angle of the discotic liquid crystals in the second sub-film satisfies θ1≦θ2<85°. It is further characterized in that R1+R2+R3 is 450 nm±150 nm; R2/R1 ranges from 1 to 5; and R3/R1 ranges from 5 to 10 where R1 represents a retardation in the first sub-film; R2 represents a retardation in the second sub-film; and R3 represents a retardation in the third sub-film.

A liquid crystal display according to the present embodiment is characterized in that it has a third optical compensation film provided between the first optical compensation film and the first polarizer. It is further characterized in that the third optical compensation film is a positive vertically aligned optical retardation film which is an index ellipsoid represented by $n_x=n_y<n_z$, $N_z$ substantially coinciding with the normal of the substrate surface. It is alternatively characterized in that a fourth optical compensation film is provided between the second optical compensation film and the second polarizer and in that the third and fourth optical compensation films are negative optical retardation films.

Discotic liquid crystals having a negative retardation provides a perfect effect of compensation when aligned completely similarly to liquid crystals in the bend alignment having a positive retardation. In the case of the normally white (NW) mode, since black is displayed when a voltage is applied, the bend alignment must be compensated when the voltage is applied in order to achieve high contrast. According to the present embodiment, a wide viewing angle can be achieved because discotic liquid crystals are artificially aligned in the same alignment as the bend alignment using a plurality of sub-films having different tilts to always maintain the compensating relationship regardless of the viewing direction.

Figure 39A:
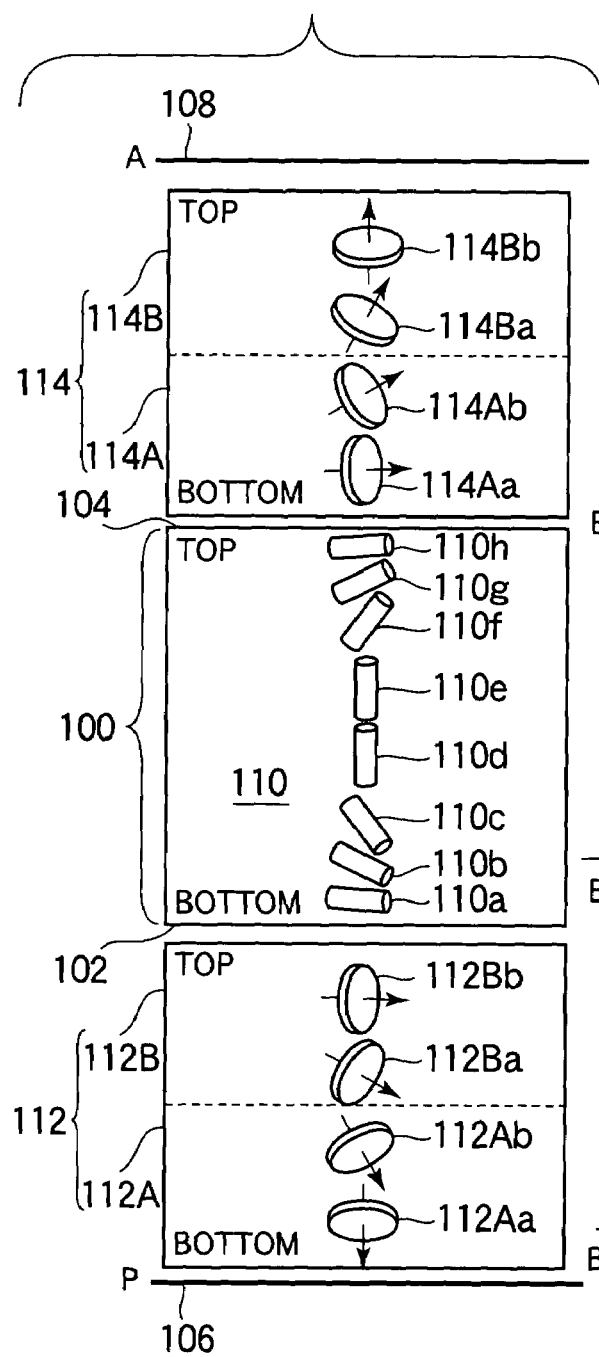
FIGS. 39A through 39D show a schematic configuration of a liquid crystal display according to a seventh embodiment of the invention.
Figure 39B:
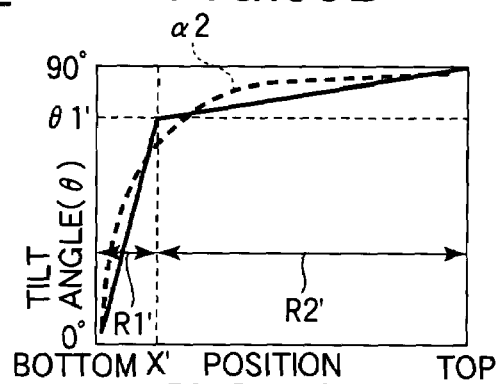
Figure 39C:
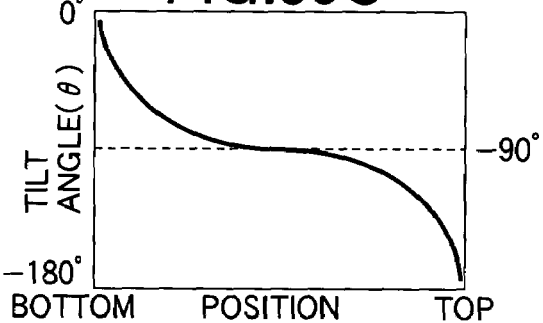
Figure 39D:
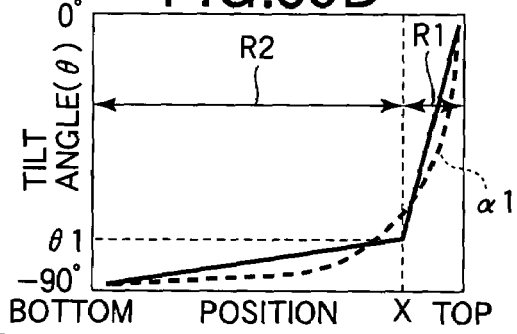

A liquid crystal display according to a seventh embodiment of the invention will now be described with reference to FIGS. 39A through 47. First, a schematic configuration of the liquid crystal display will be described with reference to FIGS. 39A through 39D. FIGS. 39A through 39D show a schematic configuration of an OCB mode LCD according to the present embodiment in association with FIGS. 35A through 35D which have been described in the section of the related art. FIG. 39A is a sectional view showing the schematic configuration of the OCB mode LCD, and FIGS. 39B through 39D are graphs on which the tilt angle of the liquid crystals in each element of the OCB mode LCD is plotted in the direction of the depth thereof. Elements substantially identical to the elements described above with reference to FIGS. 34 through 38 are indicated by like reference numbers.

Referring to FIGS. 39A through 39D with cross-reference to FIG. 34, a liquid crystal cell 100 is formed by an array substrate 102 on which a TFT (thin film transistor) and a display electrode are formed in each pixel, a counter substrate 104 provided in a face-to-face relationship with the array substrate 102 and having a common electrode formed thereon and a liquid crystal layer 110 sealed in the gap between the array substrate 102 and the counter substrate 104. A polarizer 106 is provided on the surface of the array substrate 102 opposite to the side of the liquid crystal layer 110. A polarizer 108 having an optical transmission axis perpendicular to (in a crossed Nicols relationship with) the optical transmission axis of the polarizer 106 is provided on the surface of the counter substrate 104 opposite to the side of the liquid crystal layer 110.

A rubbing process is performed in the same directions 116 and 118 on alignment films (not shown) formed on both of the array substrate 102 and the counter substrate 104 on the sides thereof where the liquid crystal layer 110 is located. As a result, the liquid crystal molecules in the liquid crystal layer 110 sealed between the array substrate 102 and the counter substrate 104 are put in the bend alignment in a plane 118 when a predetermined voltage is applied. The rubbing direction is at an angle of 45 deg. to the optical transmission axes of the polarizers 106 and 108. The OCB mode LCD shown in FIG. 34 and FIGS. 39A through 39D is a normally white LCD that displays white at the minimum voltage within the range of applied voltages at which the bend alignment is maintained because the polarizers 106 and 108 are in a crossed Nicols configuration.

The liquid crystal layer 110 shown in FIGS. 39A through 39D represents an example of an alignment of molecules in a state wherein the maximum voltage within the range of applied voltages for maintaining the bend alignment is applied to display black. When black is displayed, most of liquid crystal molecules in the middle of the liquid crystal layer 110 are substantially in parallel with the normal direction of the surfaces of the array substrate 102 and counter substrate 104 (longitudinal direction of the figure); the liquid crystal molecules are gradually tilted toward a direction orthogonal to the normal direction near the substrates; and the liquid crystal molecules are tilted substantially perpendicularly to the normal direction in the vicinity of the alignment films on the surfaces of both of the substrates.

As apparent from the liquid crystal layer 110 in FIG. 39A, in the bend alignment in the OCB mode, liquid crystal molecules are tilted such that a substantially symmetric relationship is established between liquid crystal molecules 110e through 110h located in an upper half of the liquid crystal layer 110 above a straight line extending substantially in the middle of the layer in parallel with the substrate surfaces and liquid crystal molecules 110a through 110d located in a lower half thereof. The state of tilt of the liquid crystal molecules in the liquid crystal layer 110 when black is displayed shown in FIG. 39C is the same as that shown in FIG. 35C.

A discotic liquid crystal film 112 according to the present embodiment is provided between the array substrate 102 and the polarizer 106.

The discotic liquid crystal film 112 has a plurality of discotic liquid crystal sub-films 112A and 112B (two films in this example) whose tilt angle is changed to compensate any retardation attributable to non-linear changes of the tilt of the liquid crystal molecules 110a through 110d in a region closer to the array substrate 102 that is one of two substantially equal regions defined by dividing the liquid crystal layer 110 in the normal direction of the substrate surface.

A discotic liquid crystal film 114 according to the present embodiment is provided between the counter substrate 104 and the polarizer 108. The discotic liquid crystal film 114 has a plurality of discotic liquid crystal sub-films 114A and 114B (two films in this example) whose tilt angle is changed to compensate any retardation attributable to non-linear changes of the tilt of the liquid crystal molecules 110e through 110h in a region closer to the counter substrate 104 that is one of the two substantially equal regions defined by dividing the liquid crystal layer 110 in the normal direction of the substrate surface.

The use of the pairs of discotic liquid crystal sub-films 112A, 112B and 114A, 114B with different tilt angles makes it possible to cancel any retardation in accordance with non-linear changes in the tilt of the liquid crystal molecules 110a through 110h in the liquid crystal layer 110 and to thereby perform compensation such that an index ellipsoid in the liquid crystal layer 110 becomes as close to a sphere as possible. This makes it possible to improve viewing angle characteristics of image light emitted by a liquid crystal display panel, thereby providing a panel having a wide viewing angle. It is therefore possible to achieve preferable display of black with a high contrast ratio and without any inverted region on the display surface of the liquid crystal panel regardless of the viewing angle.

A description will be made with reference to FIG. 39D on changes in the tilt angle of discotic liquid crystal molecules in the discotic liquid crystal sub-films 112A and 112B. FIG. 39D shows positions in the direction of the depth of the sub-films (positions in the normal direction of the substrate surface) as viewed from the polarizer 106 (bottom) toward the array substrate 102 (top) along the abscissa axis. The tilt angle of discotic liquid crystal molecules 112Aa and 112Ab in the sub-film 112A and discotic liquid crystal molecules 112Ba and 112Bb in the sub-film 112B are shown along the ordinate axis.

The tilt angle $\theta$ of the discotic liquid crystal molecules 112Aa and 112Ab in the sub-film 112A linearly changes from −90 deg. in a location near the polarizer 106 to $\theta 1$ in a predetermined position X in the direction of the depth. The tilt angle $\theta$ of the discotic liquid crystal molecules 112Ba and 112Bb in the sub-film 112B linearly changes from a value substantially equal to $\theta 1$ in the position X to a value substantially equal to 0 deg. in a position near the array substrate 102.

The broken line shown in FIG. 39D represents an idealistic compensation curve α1 for compensating non-linear changes in the tilt angle attributable to the liquid crystal molecules 110a through 110d in the liquid crystal layer 110 when black is displayed shown in FIG. 39C.

As apparent from FIG. 39D, when the discotic liquid crystal sub-films 112A and 112B according to the present embodiment are overlapped, a retardation is compensated by two straight lines that interpolate the idealistic compensation curve α1 for non-linear changes in the tilt angle attributable to the liquid crystal molecules 110a through 110d. This makes it possible to compensate a retardation more accurately compared to approximation using a single straight line as in the prior art.

Next, a description will be made with reference to FIG. 39B on changes in the tilt angle of discotic liquid crystal molecules in the discotic liquid crystal sub-films 114A and 114B. FIG. 39B shows positions in the direction of the depth of the films (positions in the normal direction of the substrate surface) as viewed from the counter substrate 104 (bottom) toward the polarizer 108 (top) along the abscissa axis. The tilt angle of discotic liquid crystal molecules 114Aa and 114Ab in the sub-film 114A and discotic liquid crystal molecules 114Ba and 114Bb in the sub-film 114B are shown along the ordinate axis.

The tilt angle θ of the discotic liquid crystal molecules 114Aa and 114Ab in the sub-film 114A linearly increases from 0 deg. in a location near the counter substrate 104 to θ1' in a predetermined position X' in the direction of the depth. The tilt angle θ of the discotic liquid crystal molecules 114Ba and 114Bb in the sub-film 114B linearly increases from a value substantially equal to θ1' in the position X' to a value substantially equal to 90 deg. in a position near the polarizer 108.

The broken line shown in FIG. 39B represents an idealistic compensation curve α2 for compensating non-linear changes in the tilt angle attributable to the liquid crystal molecules 110e through 110h in the liquid crystal layer 110 when black is displayed shown in FIG. 39C.

As apparent from FIG. 39B, when the discotic liquid crystal sub-films 114A and 114B according to the present embodiment are overlapped, a retardation is compensated by two straight lines that interpolate the idealistic compensation curve α2 for non-linear changes in the tilt angle attributable to the liquid crystal molecules 110e through 110h. This makes it possible to compensate a retardation more accurately compared to approximation using a single straight line as in the prior art.

As thus described, an OCB mode LCD according to the present embodiment has a first substrate (array substrate) 102 and a second substrate (counter substrate) 104 provided in a face-to-face relationship with a predetermined gap left therebetween and a liquid crystal layer 110 in a bend configuration sealed in the gap. It also has a first polarizer 106 provided on the surface of the array substrate 102 opposite to the side thereof where the liquid crystal layer 110 is located and a second polarizer 108 provided on the surface of the counter substrate 104 opposite to the side thereon where the liquid crystal layer 110 is located.

A first optical compensation film (discotic liquid crystal film) 112 provided between the array substrate 102 and the first polarizer 106 has discotic liquid crystals 112Aa, 112Ab, 112Ba and 112Bb whose tilt angle is changed to compensate any retardation attributable to non-linear changes of the tilt of liquid crystal molecules 110a through 110d in a region closer to the array substrate 102 that is one of two substantially equal regions defined by dividing the liquid crystal layer 110 in the normal direction of the substrate surface.

A second optical compensation film (discotic liquid crystal film) 114 provided between the counter substrate 104 and the second polarizer 108 has discotic liquid crystals 114Aa, 114Ab, 114Ba and 114Bb whose tilt angle is changed to compensate any retardation attributable to non-linear changes of the tilt of liquid crystal molecules 110e through 110h in a region closer to the counter substrate 104 that is one of the two substantially equal regions defined by dividing the liquid crystal layer 110 in the normal direction of the substrate surface.

An OCB mode LCD according to the present embodiment has a configuration characterized described above. An OCB mode LCD having a quite wide and preferable viewing angle can be provided because the tilt angle of the discotic liquid crystal molecules 112a through 112d and 114a through 114d in the discotic liquid crystal films 112 and 114 can be changed along an idealistic compensation curve instead of being changed linearly in association with the tilt angle of the liquid crystal molecules 110a through 110h that continuously changes in a non-linear fashion as in a conventional OCB mode LCD.

A description will now be made with reference to FIGS. 40 through 43 on Example 1 which is an example of a specific configuration of a liquid crystal display according to the present embodiment. Elements substantially identical to the elements described in the above embodiments are indicated by like reference numbers and will not be described here. First, the configuration of an OCB mode LCD of the present example will be briefly described with reference to FIGS. 40 and 41.

Figure 40:
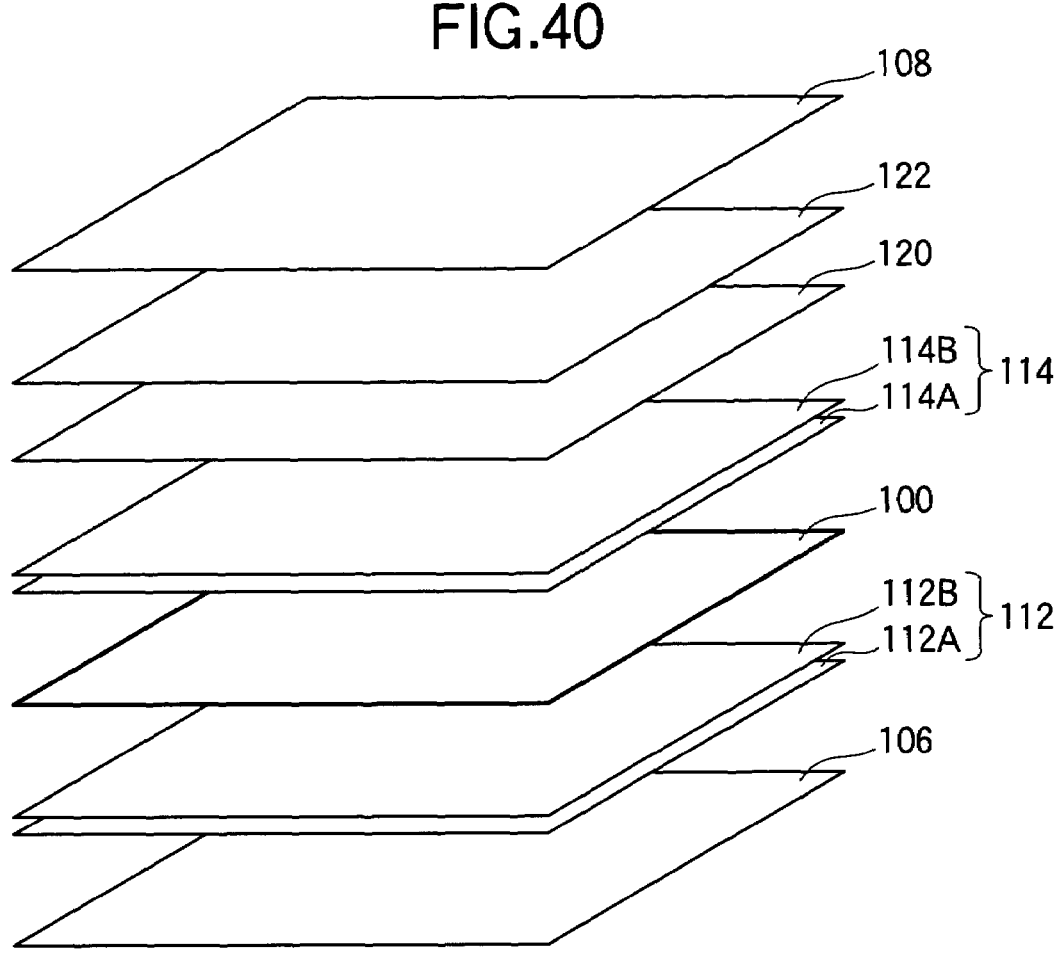
FIG. 40 is an illustration of Example 1 of a specific configuration of a liquid crystal display according to the seventh embodiment of the invention.

As shown in FIG. 40, polarizers 106 and 108 are provided on both sides of a liquid crystal cell 100 in a crossed Nicols configuration. A discotic liquid crystal film 112 is provided between the liquid crystal cell 100 and the polarizer 106. Between the liquid crystal cell 100 and the polarizer 108, there is provided a discotic liquid crystal film 114, a positive vertically aligned optical retardation film 120 and a uniaxial optical retardation film 122 in the order listed which is the order of their closeness to the liquid crystal cell 100.

Figure 41:
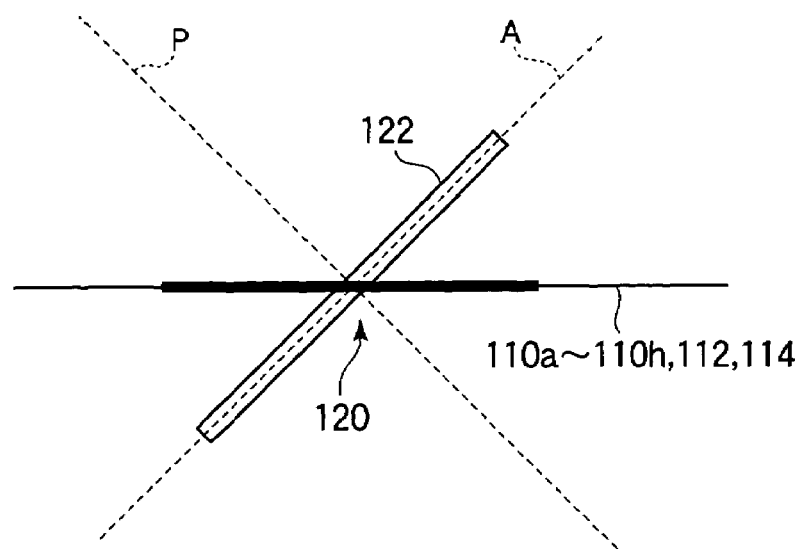
FIG. 41 is an illustration of a state of lamination of optical compensation films in Example 1 as an example of a specific configuration of a liquid crystal display according to the seventh embodiment of the invention.
Figure 42:
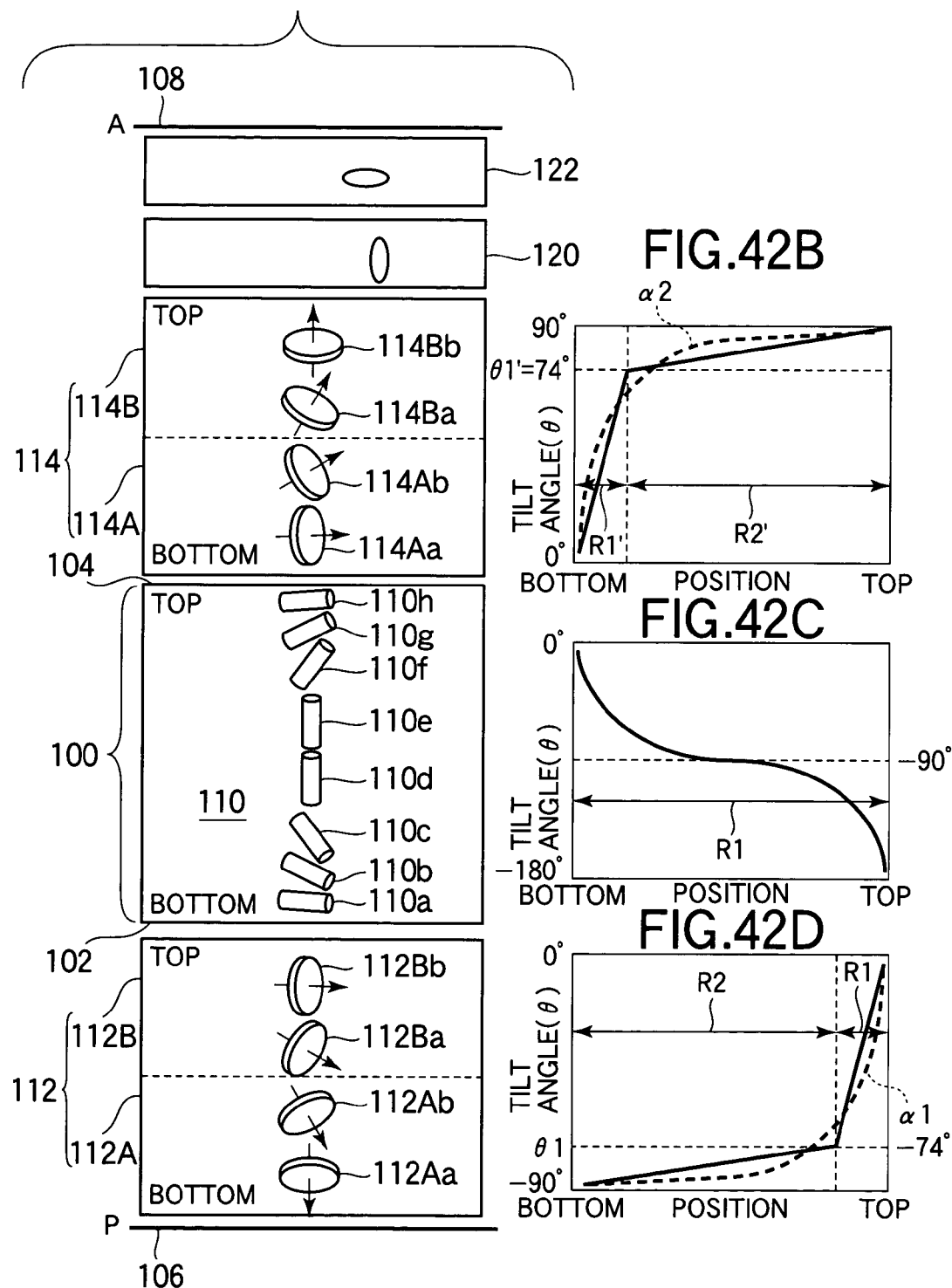
FIGS. 42A through 42D are illustrations of a schematic configuration of Example 1 as an example of a specific configuration of a liquid crystal display according to the seventh embodiment of the invention.

FIG. 41 shows the relationship between the positions of the optical compensation films as viewed from above the polarizer 108. The discotic liquid crystal molecules in the discotic liquid crystal film 112 and 114 are aligned in substantially the same direction as that of liquid crystal molecules 110a through 110h in the bend alignment that are aligned in the lateral direction of the figure. The directions of optical transmission axes P and A of the polarizers 106 and 108 are tilted at 45 deg. to the direction of alignment of the liquid crystal molecules 110a through 110h in the bend alignment. The direction of alignment of the positive vertically aligned optical retardation film 120 is a direction perpendicular to the plane of the drawing, and the optic axis of the uniaxial optical retardation film 122 coincides with the optical transmission axis of the polarizer 108.

FIG. 42A is a sectional view showing a schematic configuration of an OCB mode LCD according to the present example. FIGS. 42B through 42D are graphs on which the tilt angle of the liquid crystals in each element of the OCB mode LCD is plotted in the direction of the thickness of each liquid crystal layer. FIG. 42A shows the same configuration as that in FIG. 39A except that a positive vertically aligned optical retardation film 120 and a uniaxial optical retardation film 122 are added.

FT-5181 (manufactured by CHISSO CORP.) is used as the liquid crystal material for the liquid crystal layer 110.

The liquid crystal cell 100 has a retardation R1 of 1000 nm. The retardation RI is preferably within the range from 800 to 1200 nm.

For example, discotic liquid crystal films or the like manufactured by FUJI PHOTO FILM CO., LTD. may be used as sub-films used for the discotic liquid crystal films 112 and 114. The discotic liquid crystal films 112 and 114 may be originally fabricated because they can be obtained by mixing discotic liquid crystals in a UV-curing resin in an aligned state and by curing the mixture using ultraviolet rays. The positive vertically aligned optical retardation film 120 can be obtained by solidifying an index ellipsoid which satisfies $n_x=n_y \leq n_z$ and which is in an alignment such that the Z-axis of the molecules therein agrees with the normal direction of the film to be obtained, and a vertically aligned liquid crystal layer may be substituted for this part.

As shown in FIG. 42D, the maximum value θ1 (absolute value) of the tilt angle of the discotic liquid crystals in a discotic liquid crystal sub-film 112B as viewed from the side of the liquid crystal layer 110 is 74 deg. The tilt angle of discotic liquid crystals 112Aa and 112Ab in a sub-film 112A changes substantially linearly from θ1=−90 deg. to θ1=−74 deg. as viewed from the side of the polarizer 106, and the tilt angle of discotic liquid crystals 112Ba and 112Bb in the sub-film 112B changes substantially linearly from θ1=−74 deg. to θ1=0 deg. as viewed from the side of the polarizer 106.

The sub-film 112A has a retardation R2 of 375 nm, and the sub-film 112B has a retardation R1 of 75 nm.

As thus described, when the discotic liquid crystal sub-films 112A and 112B of the present example are overlapped, a retardation is compensated by two straight lines that interpolate an idealistic compensation curve αl for non-linear changes in the tilt angle attributable to liquid crystal molecules 110*a* through 110*d*. This makes it possible to compensate a retardation more accurately compared to approximation using a single straight line as in the prior art. In order to interpolate the compensation curve α1 with the two straight lines, the maximum tilt angle θ1 preferably satisfies 50°≦θ1≦80°. Referring to the relationship between the retardations R1 and R2, R1+R2 is preferably 450 nm±150 nm, and R2/R1 preferably ranges from 1 to 10. In this example, R1+R2=450 nm, and R2/R1=5.

As shown in FIG. 42B, the maximum value θ1' (absolute value) of the tilt angle of the discotic liquid crystals in a discotic liquid crystal sub-film 114A is 74 deg. The tilt angle of discotic liquid crystals 114Aa and 114Ab in the sub-film 114A changes substantially linearly from 0 deg. to θ1=+74 deg. as viewed from the side of the counter substrate 104, and the tilt angle of discotic liquid crystals 114Ba and 114Bb in a sub-film 114B changes substantially linearly from θ1=+74 deg. to 90 deg. as viewed from the side of the counter substrate 104.

The sub-film 114A has a retardation R1' of 75 nm, and the sub-film 114B has a retardation R2' of 375 nm.

When such discotic liquid crystal sub-films 114A and 114B are overlapped, a retardation is compensated by two straight lines that interpolate an idealistic compensation curve α2 for non-linear changes in the tilt angle attributable to liquid crystal molecules 110*e* through 110*h*. This makes it possible to compensate a retardation more accurately compared to approximation using a single straight line as in the prior art. In order to interpolate the compensation curve α2 with the two straight lines, the maximum tilt angle θ1 preferably satisfies 50°≦θ1'≦80°. Referring to the relationship between the retardations R1' and R2', R1'+R2' is preferably 450 nm±150 nm, and R2'/R1' preferably ranges from 1 to 10. In this example, R1'+R2'=450 nm, and R2'/R1'=5.

Viewing angle characteristics of the OCB mode LCD of the present example will now be described with reference to FIG. 43. There presentation of viewing angle characteristics in FIG. 43 is similar to that in FIG. 37 and will not be described.

Figure 43:
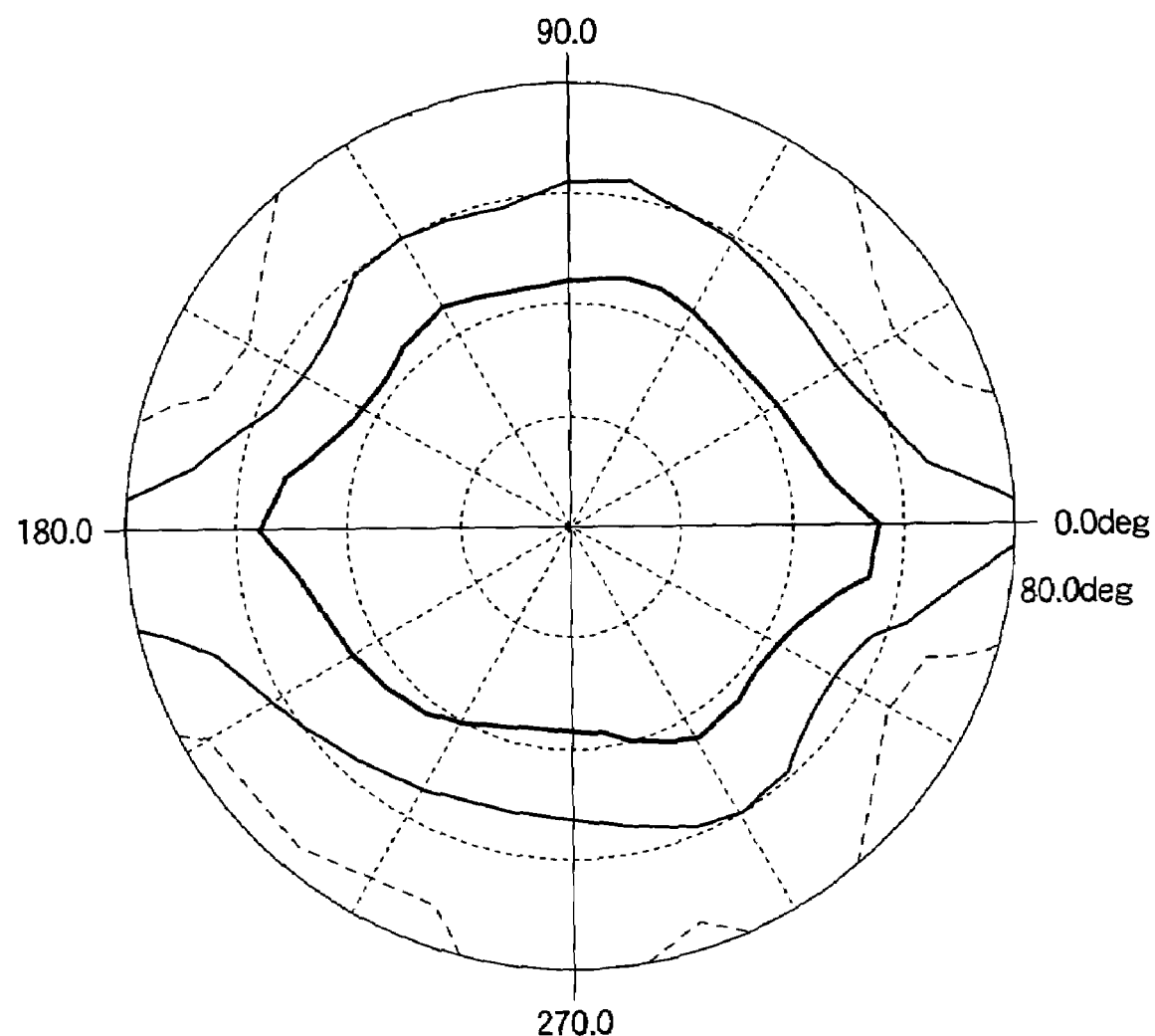
FIG. 43 is an illustration of an effect of Example 1 as an example of a specific configuration of a liquid crystal display according to the seventh embodiment of the invention.

As shown in FIG. 43, the OCB mode LCD utilizing the discotic liquid crystal films 112 and 114 having two-layer structure of this example can provide a wide and uniform viewing angle in all directions with reduced fluctuation of contrast ratios depending on viewing directions compared to the conventional LCD shown in FIGS. 37 and 38. For example, a contrast ratio of 500% can be achieved at a viewing angle of 50 deg.; a contrast ratio of 100% can be achieved at a viewing angle of 60 deg.; and a contrast ratio of 10% can be achieved at a viewing angle of 70 deg. This makes it possible to obtain preferable viewing angle characteristics including more excellent symmetry of a viewing angle, and to display an image with sufficiently practical quality.

As described above, the OCB mode LCD of the present example has a unique configuration as described above in which the tilt angle of the discotic liquid crystal molecules 112*a* through 112*d* and 114*a* through 114*d* in the discotic liquid crystal films 112 and 114 can be changed in compliance with idealistic compensation curves. This makes it possible to provide an OCB mode LCD which provides a quite wide and preferable viewing angle.

A description will now be made with reference to FIGS. 44A through 44D and FIG. 45 on Example 2 which is an example of another specific configuration according to the present embodiment. FIG. 44A is a sectional view showing a schematic configuration of an OCB mode LCD of the present example, and FIGS. 44B through 44D are graphs on which the tilt angle of the liquid crystal molecules in each element of the OCB mode LCD are plotted in the direction of the depth of each liquid crystal layer. The present example has the same configuration as that of Example 1 shown in FIGS. 42A through 42D except that each of discotic liquid crystal films 112 and 114 have three layers.

The discotic liquid crystal film 112 has discotic liquid crystal sub-films 112A, 112B and 112C laminated in the same order that is the order of their closeness to a polarizing plate 106. As shown in FIGS. 44A and 44D, the maximum value (absolute value) θ1 of the tilt angle of discotic liquid crystals 112Ca in the sub-film 112C as viewed from the side of a liquid crystal layer 110 is 52 deg.

Similarly, the maximum value (absolute value) θ2 of the tilt angle of discotic liquid crystals 112Ba and 112Bb in the sub-film 112B is 83 deg.

The tilt angle of discotic liquid crystals 112Aa in the sub-film 112A changes substantially linearly from −90 deg. to θ2=−83 deg. as viewed from the side of the polarizer 106, and the tilt angle of discotic liquid crystals 112Ba and 112Bb in a sub-film 112B changes substantially linearly from θ2=−83 deg. to θ1=−52 deg. The tilt angle of the discotic liquid crystals 112Ca in the sub-film 112C changes substantially linearly from θ1=−52 deg. to 0 deg.

The sub-film 112A has a retardation R3 of 330 nm; the sub-film 112B has a retardation R2 of 125 nm; and the sub-film 112C has a retardation R1 of 43 nm.

When such discotic liquid crystal sub-films 112A, 112B and 112C are overlapped, a retardation is compensated by three straight lines that interpolate an idealistic compensation curve α1 for non-linear changes in the tilt angle attributable to liquid crystal molecules 110a through 110d. This makes it possible to compensate a retardation more accurately compared to approximation using a single straight line as in the prior art. In order to interpolate the compensation curve a1 with the three straight lines, the maximum tilt angles (absolute values) θ1 and θ2 preferably satisfy 30°≦θ1≦60° and θ1≦θ2≦85°, respectively. Referring to the relationship between the retardations R1, R2 and R3, R1+R2+R3 is preferably 450 nm±150 nm; R2/R1 preferably ranges from 1 to 5; and R3/R1 preferably ranges from 5 to 10. In this example, R1+R2+R3=498 nm; R2/R1=2.9; and R3/R1=7.7.

The discotic liquid crystal film 114 has discotic liquid crystal sub-films 114A, 114B and 114C laminated in the same order that is the order of their closeness to a counter substrate 104. As shown in FIGS. 44A and 44B, the maximum value (absolute value) θ1' of the tilt angle of discotic liquid crystals 114Aa in the sub-film 114A as viewed from the side of a liquid crystal layer 110 is 52 deg.

Similarly, the maximum value (absolute value) θ2' of the tilt angle of discotic liquid crystals 114Ba and 114Bb in the sub-film 114B is 83 deg.

The tilt angle of discotic liquid crystals 114Aa in the sub-film 114A changes substantially linearly from 0 deg. to θ1'=52 deg. as viewed from the side of the counter substrate 104, and the tilt angle of discotic liquid crystals 114Ba and 114Bb in the sub-film 114B changes substantially linearly from θ1'=52 deg. to θ2'=83 deg. The tilt angle of discotic liquid crystals 114Ca in the sub-film 114C changes substantially linearly from θ2'=83 deg. to 90 deg.

The sub-film 114A has a retardation R1' of 43 nm; the sub-film 114B has a retardation R2' of 125 nm; and the sub-film 114C has a retardation R3' of 330 nm.

When such discotic liquid crystal sub-films 114A, 114B and 114C are overlapped, a retardation is compensated by three straight lines that interpolate an idealistic compensation curve α2 for non-linear changes in the tilt angle attributable to liquid crystal molecules 110e through 110h. This makes it possible to compensate a retardation more accurately compared to approximation using a single straight line as in the prior art. In order to interpolate the compensation curve α2 with the three straight lines, the maximum tilt angles θ1' and θ2' preferably satisfy 30°≦θ1'≦60° and θ1'≦θ2'≦85°, respectively. Referring to the relationship between the retardations R1', R2 And R3', R1'+R2'+R3' is preferably 450 nm±150 nm; R2'/R1' preferably ranges from 1 to 5; and R3'/R1' preferably ranges from 5 to 10. In this example, R1'+R2'+R3'=498 nm; R2'/R1'=2.9; and R3'/R1'=7.7.

Viewing angle characteristics of the OCB mode LCD of the present example will now be described with reference to FIG. 45. The representation of viewing angle characteristics in FIG. 45 is similar to that in FIG. 37 and will not be described.

Figure 45:
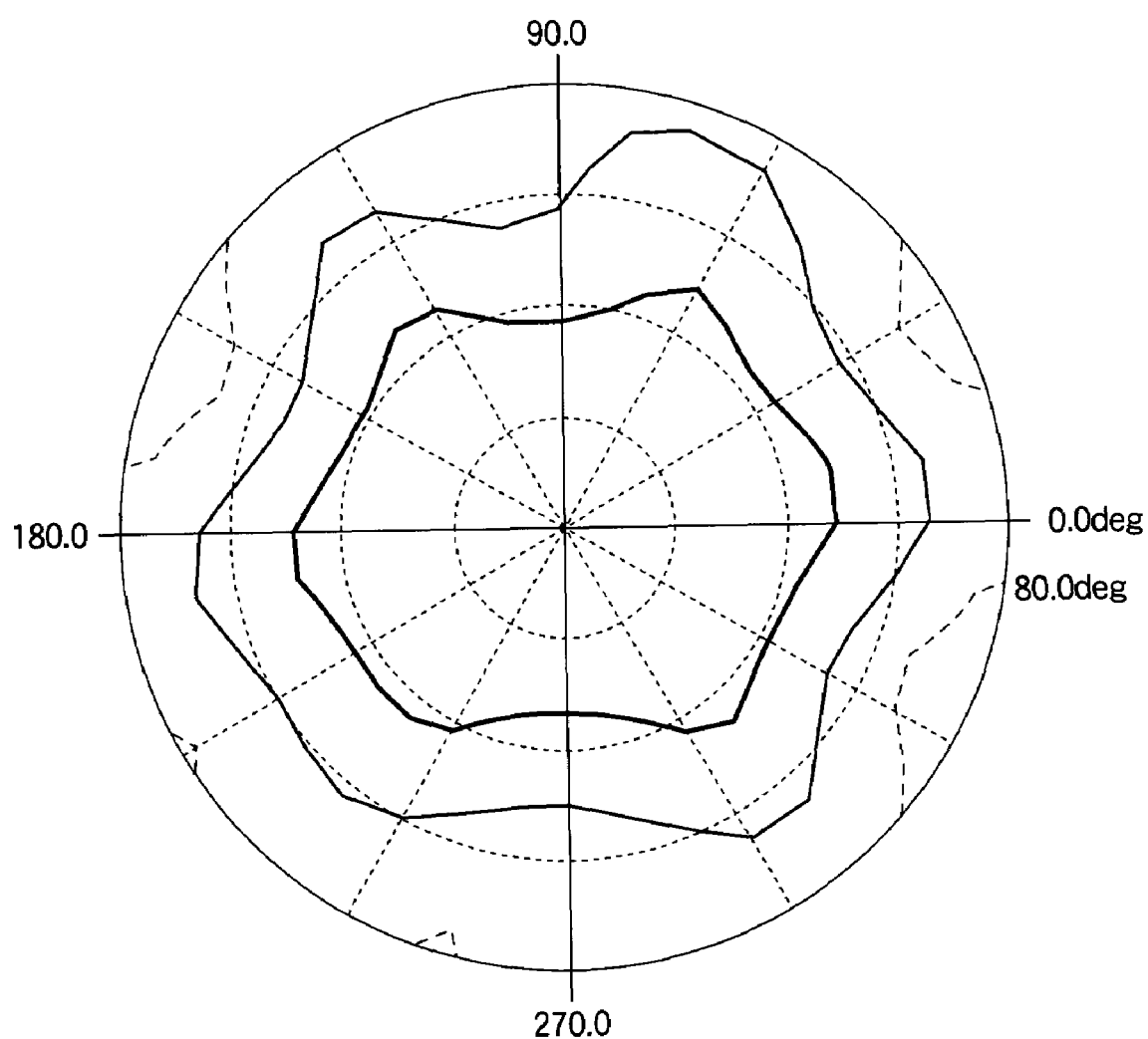
FIG. 45 is an illustration of an effect of Example 2 as an example of a specific configuration of a liquid crystal display according to the seventh embodiment of the invention.

As shown in FIG. 45, the OCB mode LCD utilizing the discotic liquid crystal films 112 and 114 having three-layer structure of this example can provide a wide and uniform viewing angle in all directions with reduced fluctuation of contrast ratios depending on viewing directions compared to the conventional LCD shown in FIGS. 37 and 38. According to the present example, the viewing angle characteristics achieved by Example 1 is further improved to obtain preferable viewing angle characteristics including more excellent symmetry of a viewing angle, which makes it possible to display an image with sufficiently practical quality.

As described above, in the OCB mode LCD of the present example 1, the tilt angle of the discotic liquid crystal molecules 112a through 112d and 114a through 114d in the discotic liquid crystal films 112 and 114 can be changed in compliance with idealistic compensation curves. This makes it possible to provide an OCB mode LCD which provides a quite wide and preferable viewing angle.

Figure 46A:
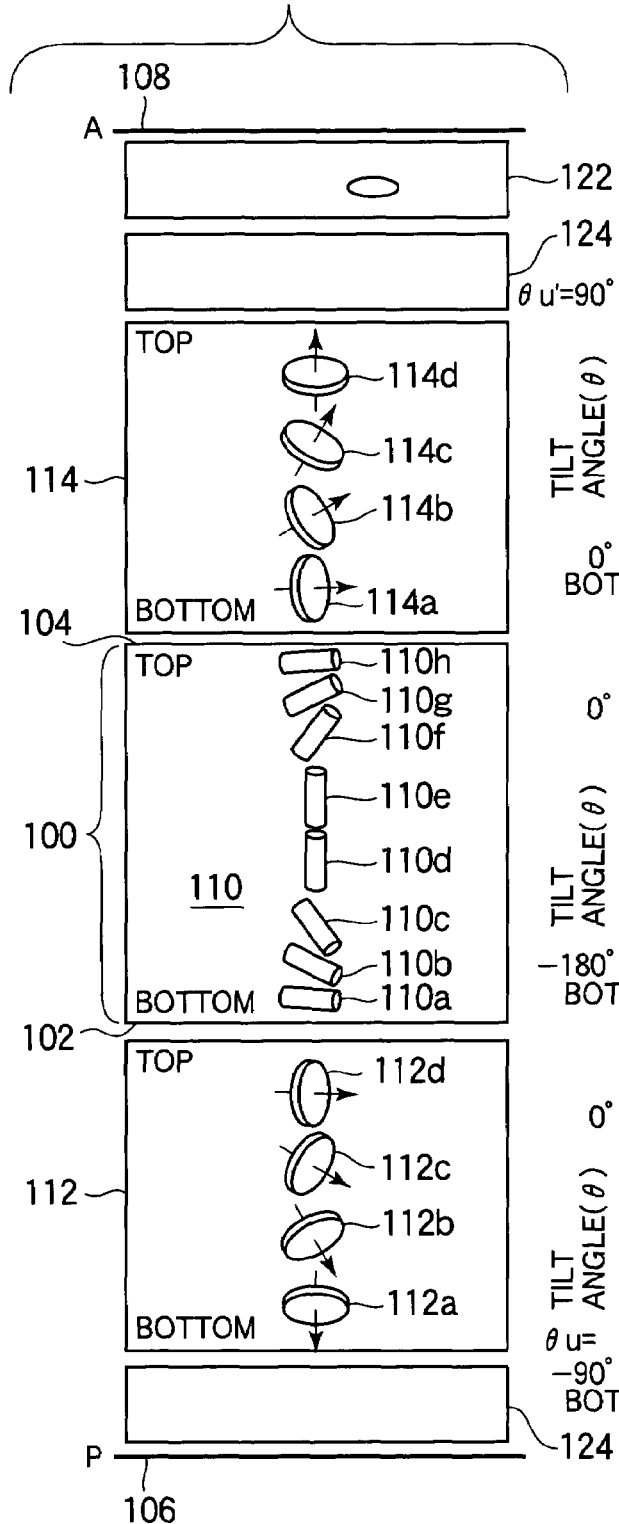
FIGS. 46A through 46D are illustrations of a schematic configuration of Example 3 as an example of a specific configuration of a liquid crystal display according to the seventh embodiment of the invention.
Figure 46B:
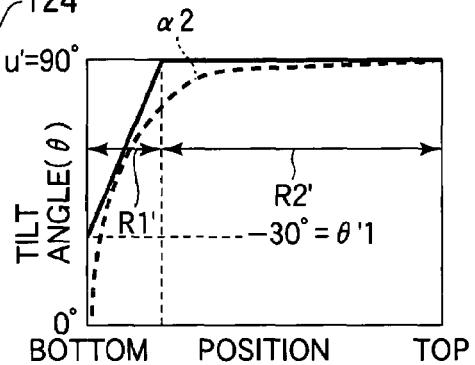
Figure 46C:
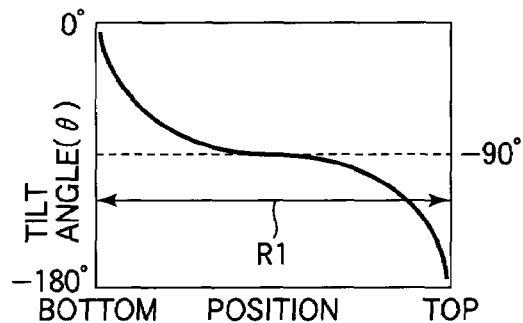
Figure 46D:
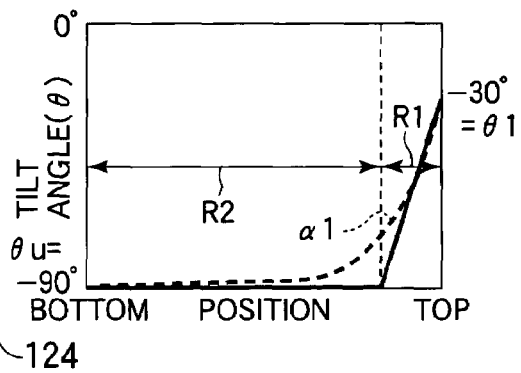

A description will now be made with reference to FIGS. 46A through 46D and FIG. 47 on Example 3 which is an example of still another specific configuration according to the present embodiment. FIG. 46A is a sectional view showing a schematic configuration of an OCB mode LCD of the present example, and FIGS. 46B through 46D are graphs on which the tilt angle of the liquid crystal molecules in each element of the OCB mode LCD are plotted in the direction of the thickness of each liquid crystal layer. The present example is characterized in that each of discotic liquid crystal films 112 and 114 is constituted by a single layer and in that negative optical retardation films 124 are provided on both sides of them. The configuration of this example is otherwise the same as that of Example 1 shown in FIGS. 42A through 42D.

A negative optical retardation film 124 is provided in each of the gaps between the discotic liquid crystal film 112 constituted by one layer and a polarizer 106 and between the discotic liquid crystal film 114 constituted by one layer and a uniaxial optical retardation film 122. As shown in FIGS. 46A and 46D, the maximum value (absolute value) θu of the tilt angle of discotic liquid crystals 112a through 112d in the discotic liquid crystal film 112 as viewed from the side of a liquid crystal layer 110 is 90 deg. On the other hand, the minimum value (absolute value) θ1 of the tilt angle is substantially 30 deg. The tilt angle of the discotic liquid crystals 112a through 112d in the film 112 changes substantially linearly from θu=−90 deg. to θ1=−30 deg. as viewed from the side of the polarizer 106. The film 112 has a retardation R1 of 200 nm, and the negative optical retardation film 124 has a retardation R2 of 280 nm.

When such discotic liquid crystal film 112 and negative optical retardation film 124 are overlapped, a retardation is compensated by two straight lines that interpolate an idealistic compensation curve a1 for non-linear changes in the tilt angle attributable to liquid crystal molecules 110a through 110d. This makes it possible to compensate a retardation more accurately compared to approximation using a single straight line.

The discotic liquid crystal film 114 will now be described. As shown in FIGS. 46A and 46B, the maximum value (absolute value) θu' of the tilt angle of discotic liquid crystals 114a through 114d in the discotic liquid crystal film 114 as viewed from the side of a counter substrate 104 is 90 deg. On the other hand, the minimum value (absolute value) θ1' of the tilt angle is 30 deg. The tilt angle of the discotic liquid crystals 114a through 114d in the film 114 changes substantially linearly from θ1'=30 deg. to 90 deg.=θu' as viewed from the side of the counter substrate 104. The film 114 has a retardation R1' of 200 nm, and the negative optical retardation film 124 has a retardation R2' of 280 nm.

When such discotic liquid crystal film 114 and negative optical retardation film 124 are overlapped, a retardation is compensated by two straight lines that interpolate an idealistic compensation curve α2 for non-linear changes in the tilt angle attributable to liquid crystal molecules 110e through 110h. This makes it possible to compensate a retardation more accurately compared to approximation using a single straight line.

The minimum value θu of the tilt angle was set at 30 deg. because one of the two straight lines for interpolating the idealistic compensation curves α1 and α2 is fixed at θ=90 deg. independently of the position in the direction of the depth as shown in FIGS. 46B and 46D and it is therefore required to offset the straight lines defined by the discotic liquid crystal films 112 and 114 along the longitudinal axis to perform interpolation with less error.

Figure 47:
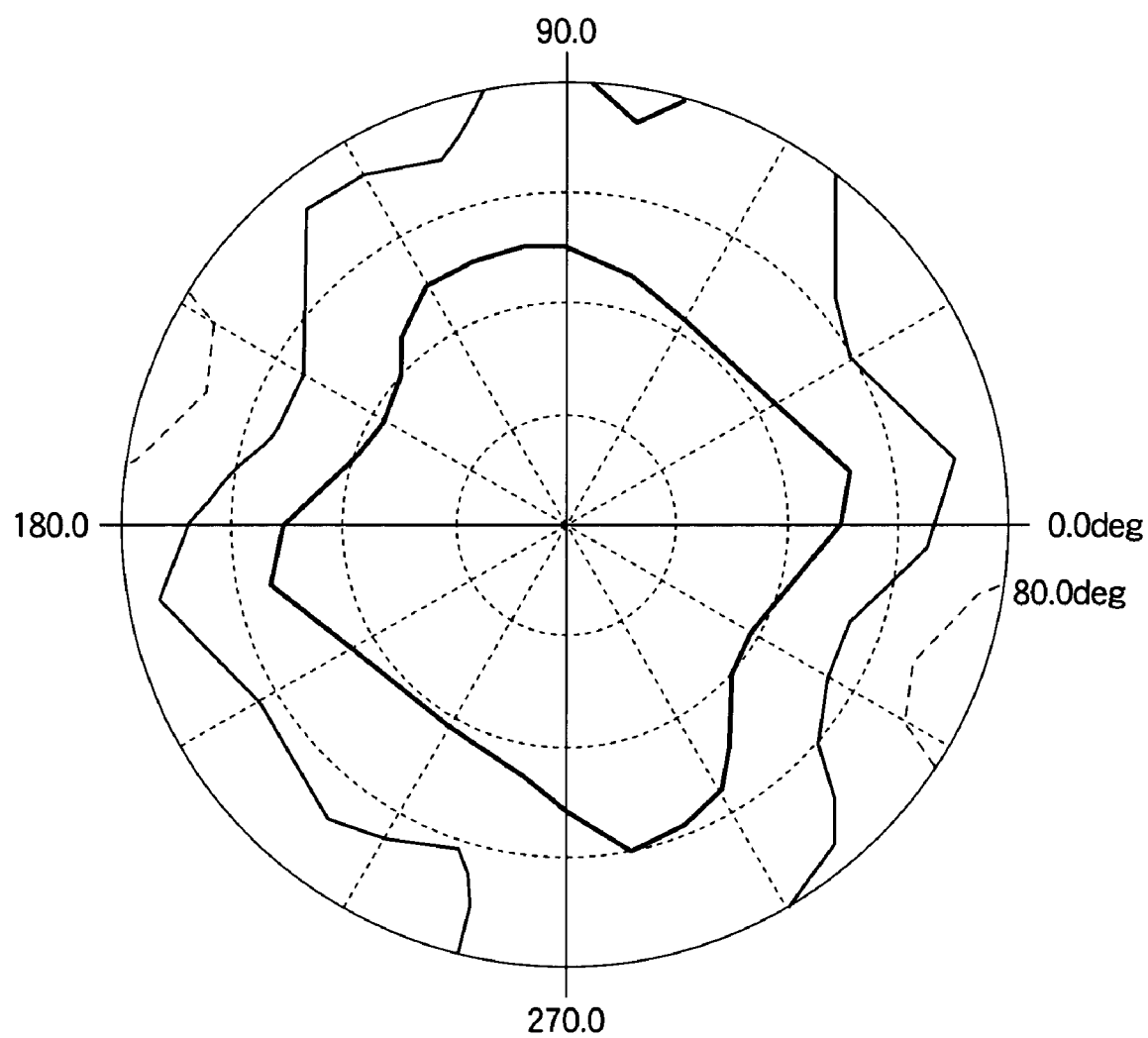
FIG. 47 is an illustration of an effect of Example 3 as an example of a specific configuration of a liquid crystal display according to the seventh embodiment of the invention.

Viewing angle characteristics of the OCB mode LCD of the present example are shown in FIG. 47. Similarly to the above-described Examples 1 and 2, the present example makes it possible provide a wide and uniform viewing angle in all directions with reduced fluctuation of contrast ratios depending on viewing directions. As described above, according to the present example, high speed response and a practical wide viewing angle can be achieved in an OCB mode liquid crystal display.

Eighth Embodiment

A liquid crystal display according to an eighth embodiment of the invention will now be described. Prior to the description of the embodiment, a specific description will be made on the problems to be solved by the present embodiment.

Recently, liquid crystal displays are being widely used in increasing applications to take advantage of their features including low profiles, light weights, drivability at a low voltage and low power consumption. However, liquid crystal panels are presently lower than CRTs in display characteristics or viewing angle characteristics when viewed in diagonal directions. Therefore, there are demands for liquid crystal panels having excellent viewing angle characteristics. Referring to systems for liquid crystal panels having a wide viewing angle, systems such as IPS (in-plane switching) have already been put in practical use in addition to MVA systems as described with reference to FIGS. 1 through 3B.

The viewing angle characteristics of an MVA type liquid crystal panel as shown in FIGS. 1 through 3B are represented as iso-contrast curves obtained by connecting viewing angles at which the liquid crystal panel is viewed with equal contrast in all directions by lines, as shown in FIG. 4. In FIG. 4, the viewing angle at which contrast is 10 in directions at 45 deg., 135 deg., 225 deg. and 315 deg. is about 37 deg. As apparent from FIG. 4, although a wide viewing angle can be achieved when the liquid crystal panel is viewed in upward, downward, leftward and rightward directions, the viewing angle decreases when it is viewed in directions at 45 deg. and the like.

Under such circumstances, according to the present embodiment, at least one optical retardation film is provided between polarizing elements provided in a crossed Nicols configuration on a display surface and a non-display surface and a liquid crystal panel, and conditions for the optical retardation film is optimized. A liquid crystal display according to the present embodiment will be described below with reference to FIGS. 48 through 63.

Figure 48:
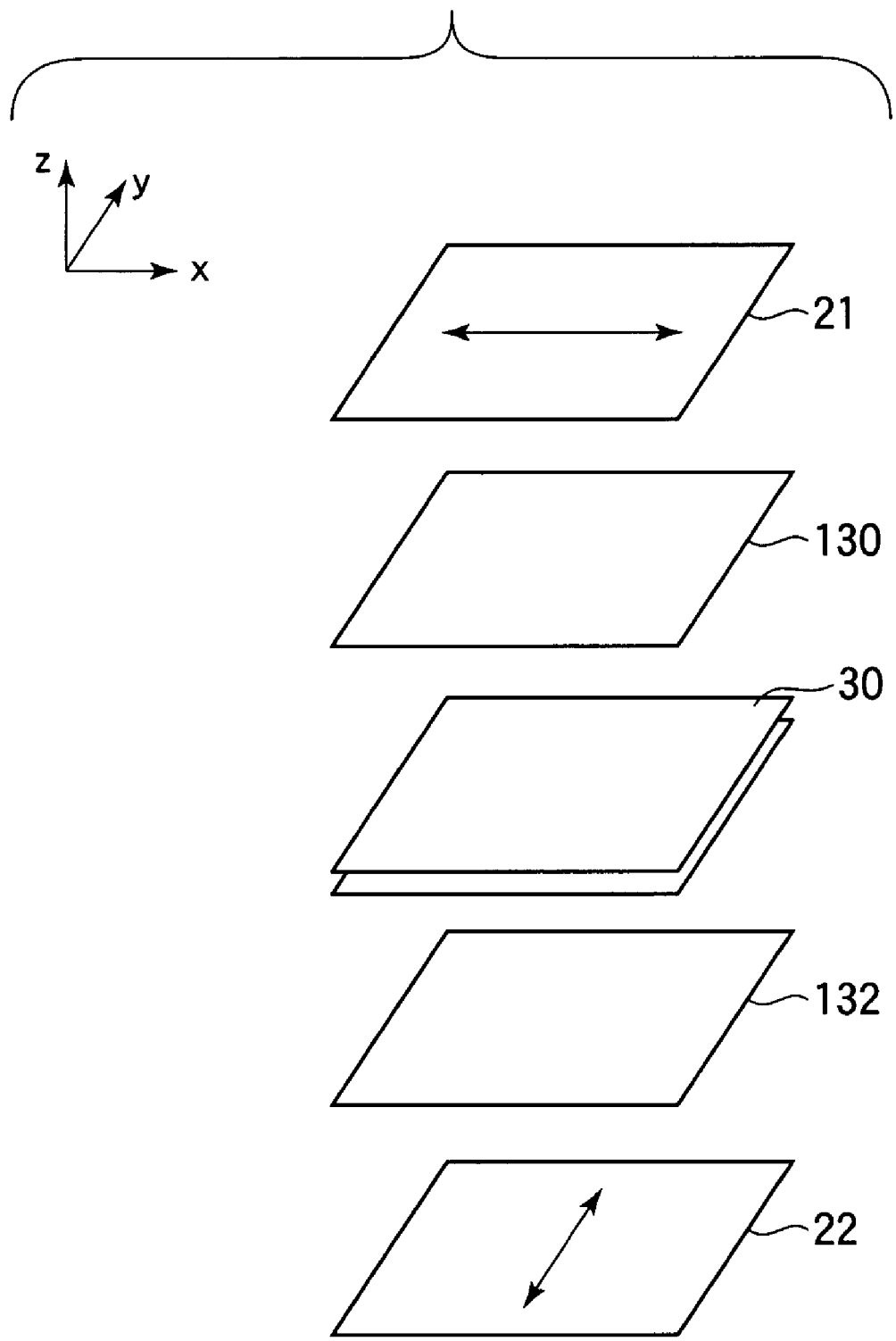
FIG. 48 shows a schematic configuration of a liquid crystal display according to an eighth embodiment of the invention.

FIG. 48 shows an example of a configuration of a liquid crystal panel according to the present embodiment. Referring to FIG. 48, optical retardation films 130 and 132 are provided between both surfaces of a four-division MVA liquid crystal panel 30 and polarizers 21 and 22, respectively. Let us assume that z represents the normal direction of the panel 30 and that x and y represent directions in the plane of the panel.

Let us assume that $n_x$, $n_y$ and $n_z$ represent principal refractive indices of the optical retardation films 130 and 132. Then, as already described, a frontal retardation R of the optical retardation films 130 and 132 and a retardation Rt in the direction of the thickness thereof are as follows.

$$R=(n_x-n_y)d$$

$$R=((n_x+n_y)/2-n_z)d$$

where d represents the thickness of the optical retardation films 130 and 132.

The optical retardation films 130 and 132 used in the present embodiment are formed such that they satisfy $n_x \cong n_y > n_z$ (0 nm $\leq$ R $\leq$ 10 nm).

A discussion will now be made on a case in which only the optical retardation film 130 is used in the panel configuration shown in FIG. 48. FIG. 49 illustrates definitions of Eulerian angles $\phi$ and $\theta$. The angle $\phi$ represents an angle defined by rotating the x-y axis of an x-y-z global coordinate system about the z-axis in the x-y plane. The angle $\theta$ represents an angle defined by rotating the y-z axis of a local coordinate system, for example, about the x-axis in the y-z plane, the local coordinate system being rotated from the global system at an angle $\phi$. The directions of the $n_x$, $n_y$ and $n_z$ can be defined using the Eulerian angles $\phi$ and $\theta$.

Figure 50:
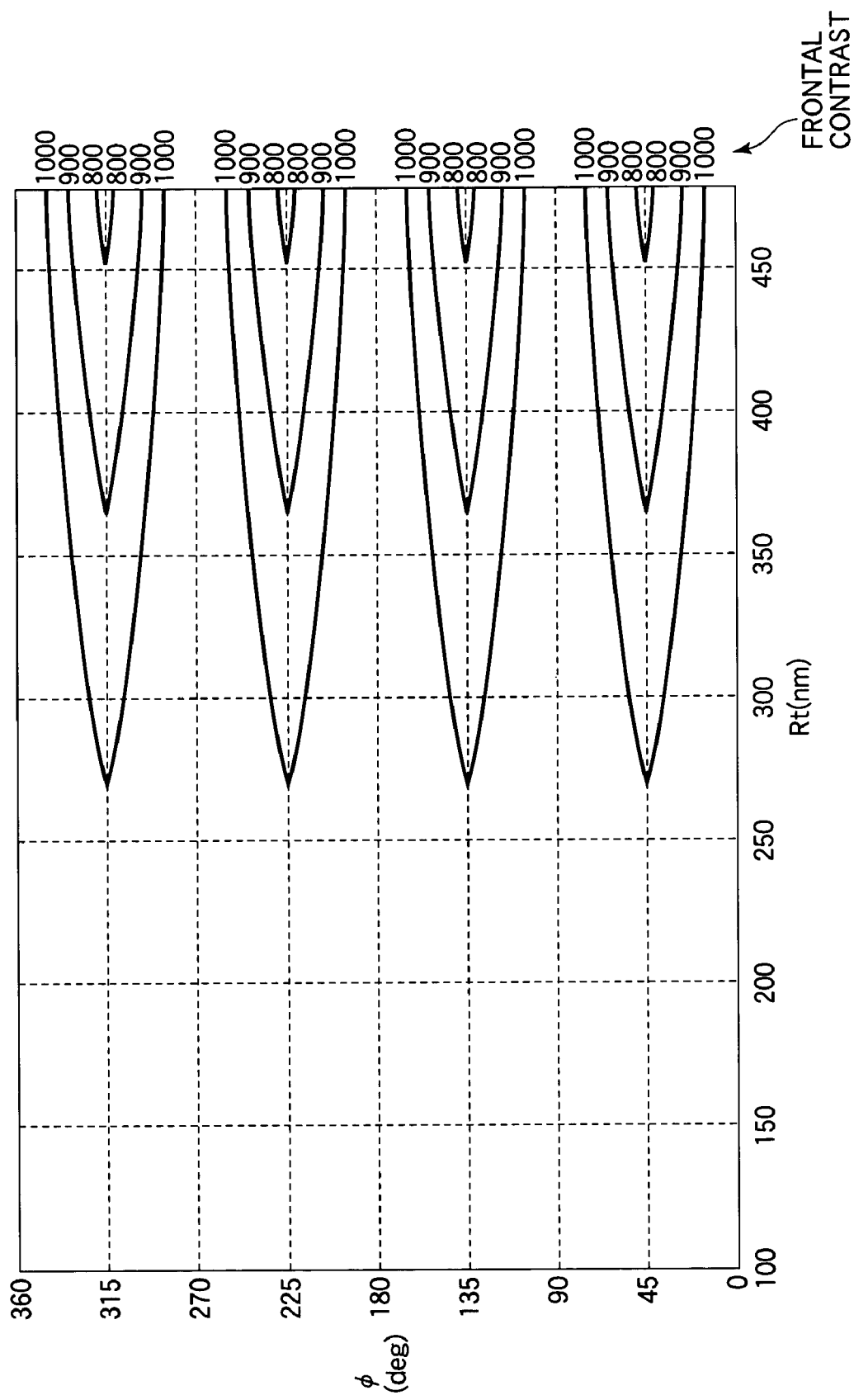
FIG. 50 is a graph showing frontal contrast obtained with the angle $\theta$ of an optical retardation film 130 fixed at 5 deg., the angle $\phi$ of the same varied between 0 deg. to 360 deg. and a retardation $R_t$ of the direction of the thickness of the same varied in the range from 100 nm to 480 nm.
Figure 51:
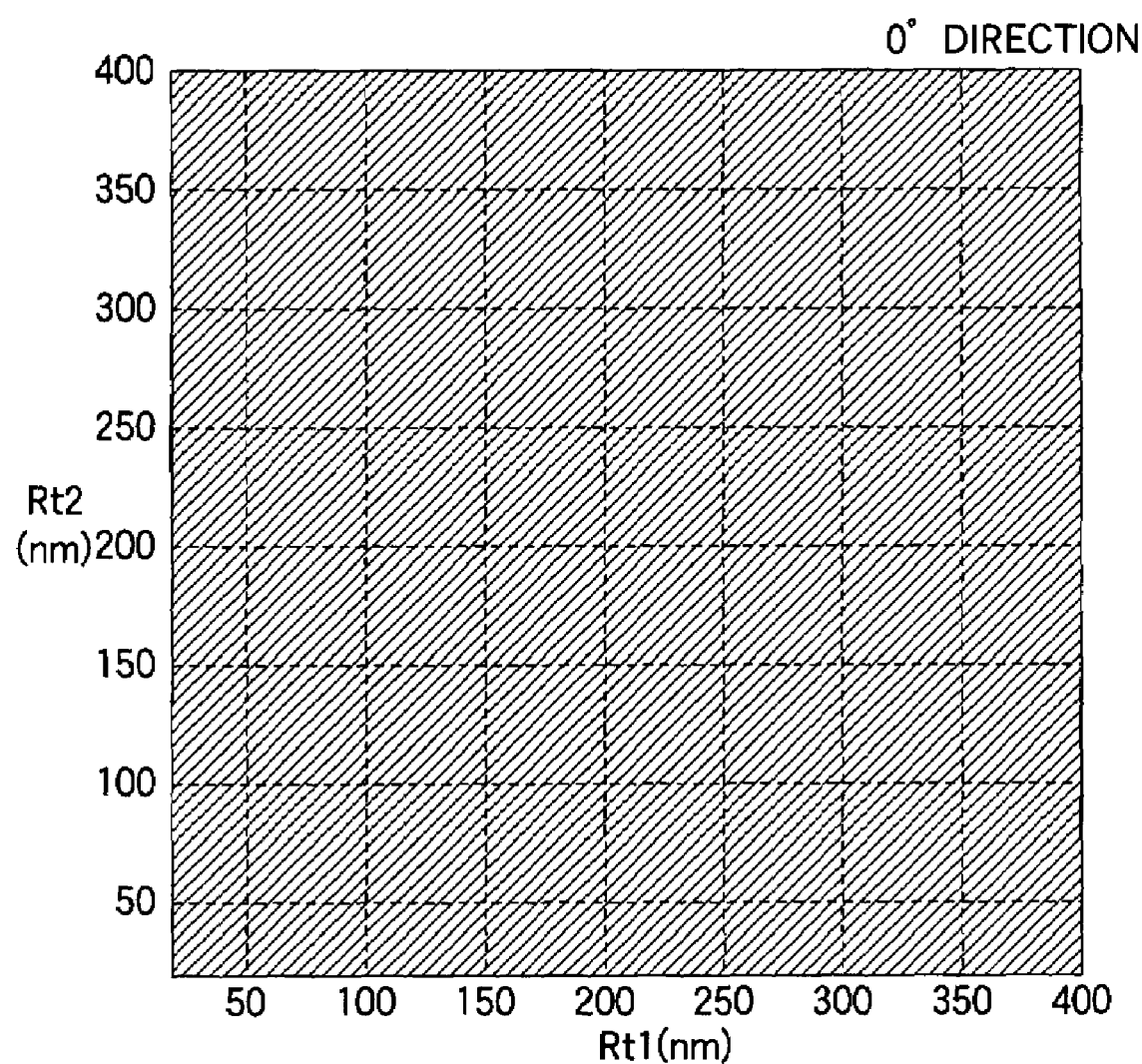
FIG. 51 is a graph showing viewing angle characteristics as viewed in a direction at 0 deg. according to an eight embodiment of the invention at fixed angles $\theta_1=\theta_2=5$ deg., $\phi_1=0$ deg. and $\phi_2=180$ deg. with each of retardations $R_{t1}$ and $R_{t2}$ in the direction of the thickness varied in the range from 20 nm to 400 nm.
Figure 52:
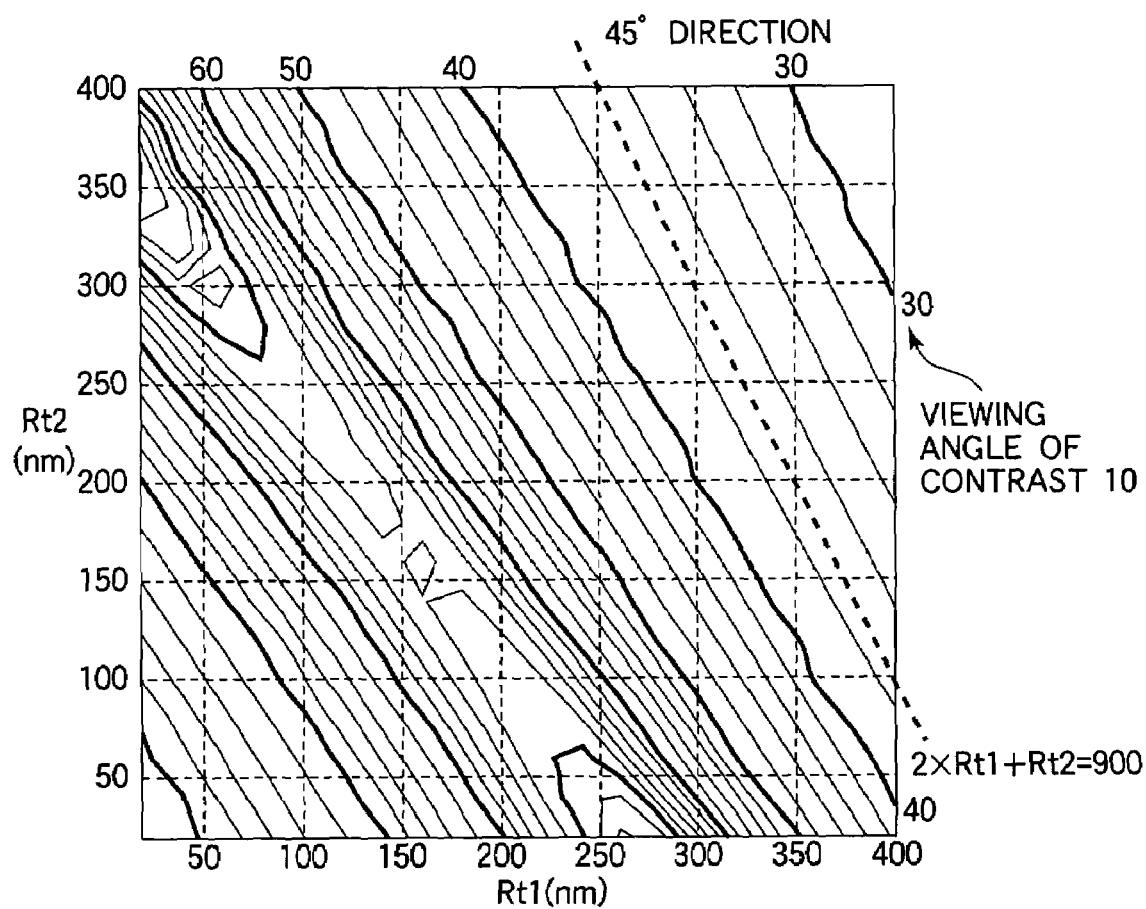
FIG. 52 is a graph showing viewing angle characteristics as viewed in a direction at 45 deg. under the same conditions for the angles $\theta_1$, $\theta_2$, $\phi_1$ and $\phi_2$ and the retardations $R_{t1}$ and $R_{t2}$ in the direction of the thickness as those shown in FIG. 51.
Figure 53:
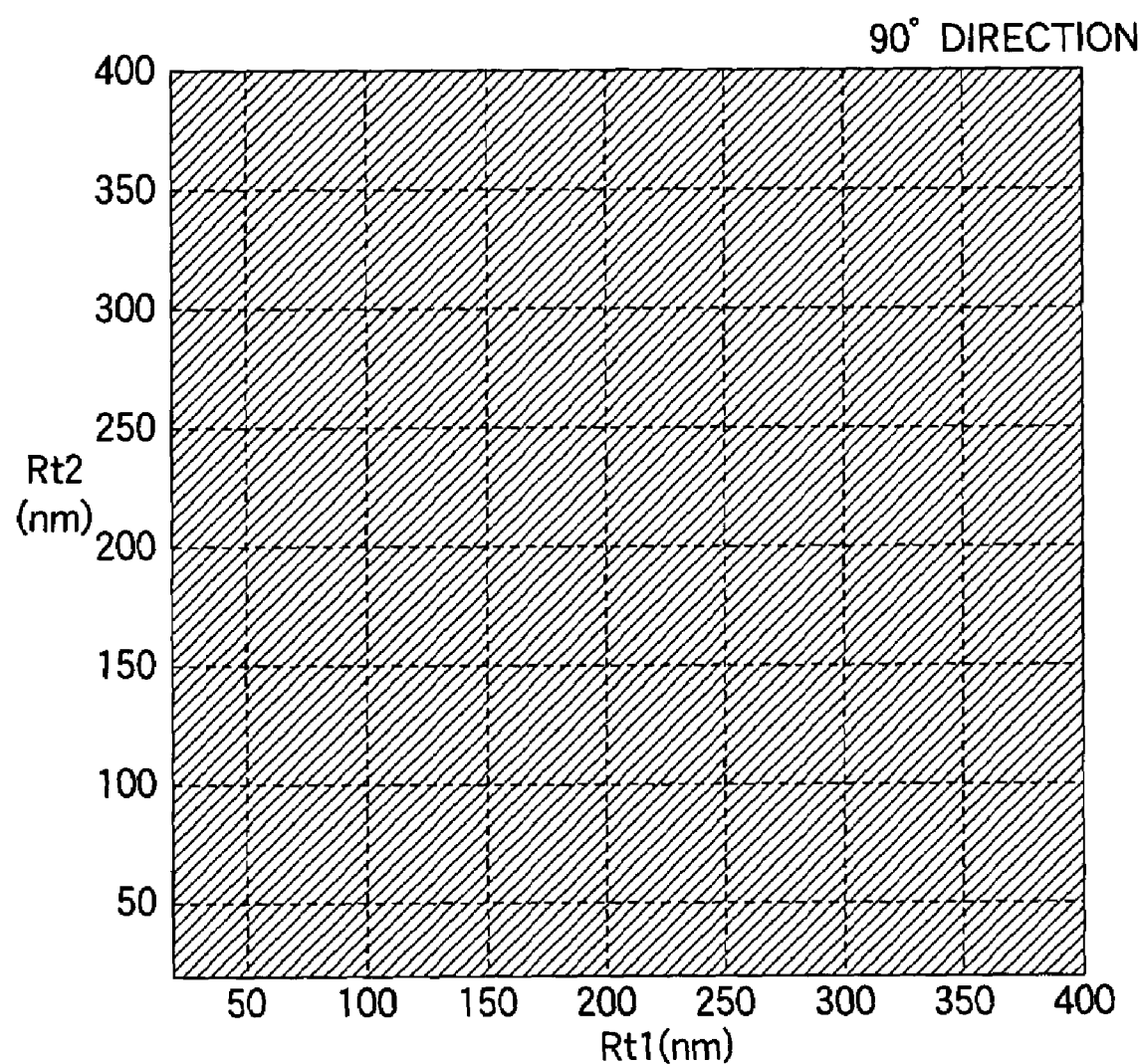
FIG. 53 is a graph showing viewing angle characteristics as viewed in a direction at 90 deg. under the same conditions for the angles $\theta_1$, $\theta_2$, $\phi_1$ and $\phi_2$ and the retardations $R_{t1}$ and $R_{t2}$ as in the direction of the thickness those shown in FIG. 51.
Figure 54:
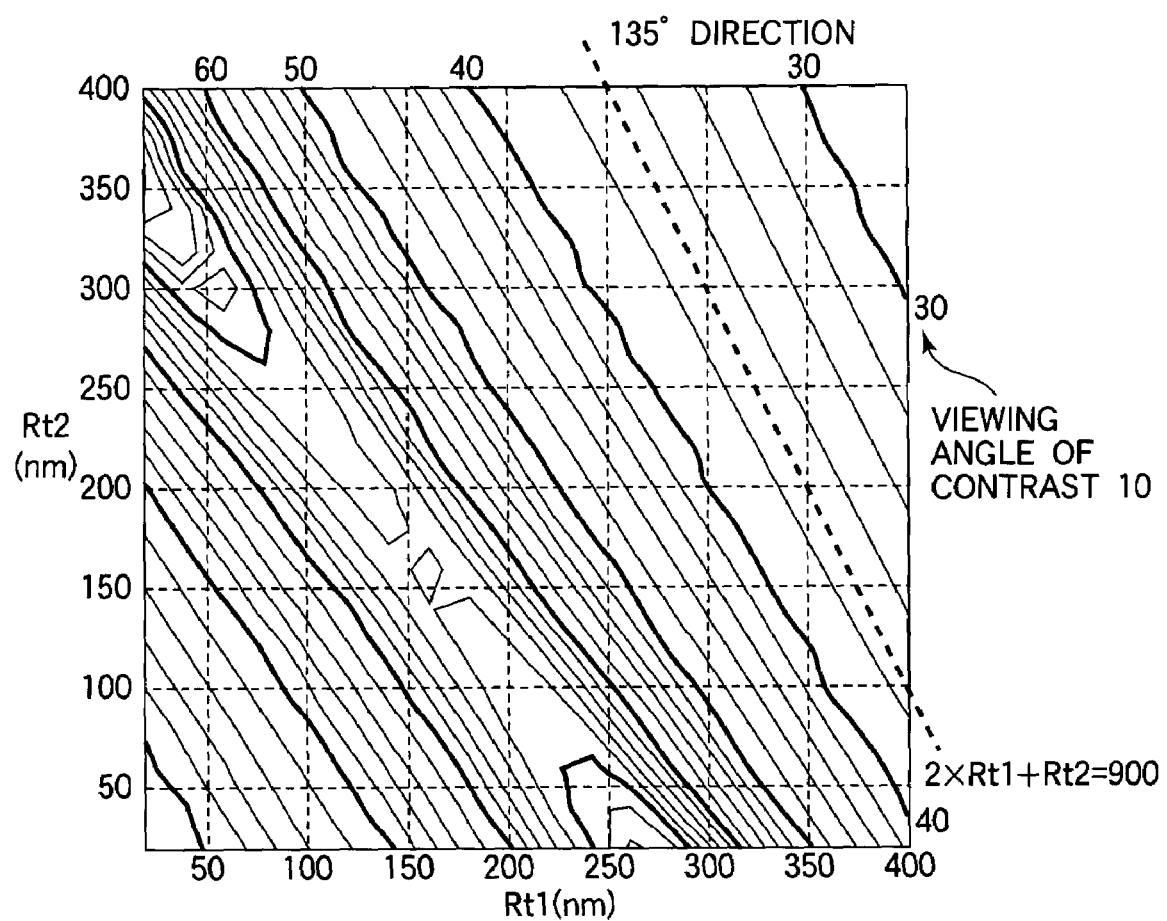
FIG. 54 is a graph showing viewing angle characteristics as viewed in a direction at 135 deg. under the same conditions for the angles $\theta_1$, $\theta_2$, $\phi_1$ and $\phi_2$ and the retardations $R_{t1}$ and $R_{t2}$ in the direction of the thickness as those shown in FIG. 51.
Figure 55:
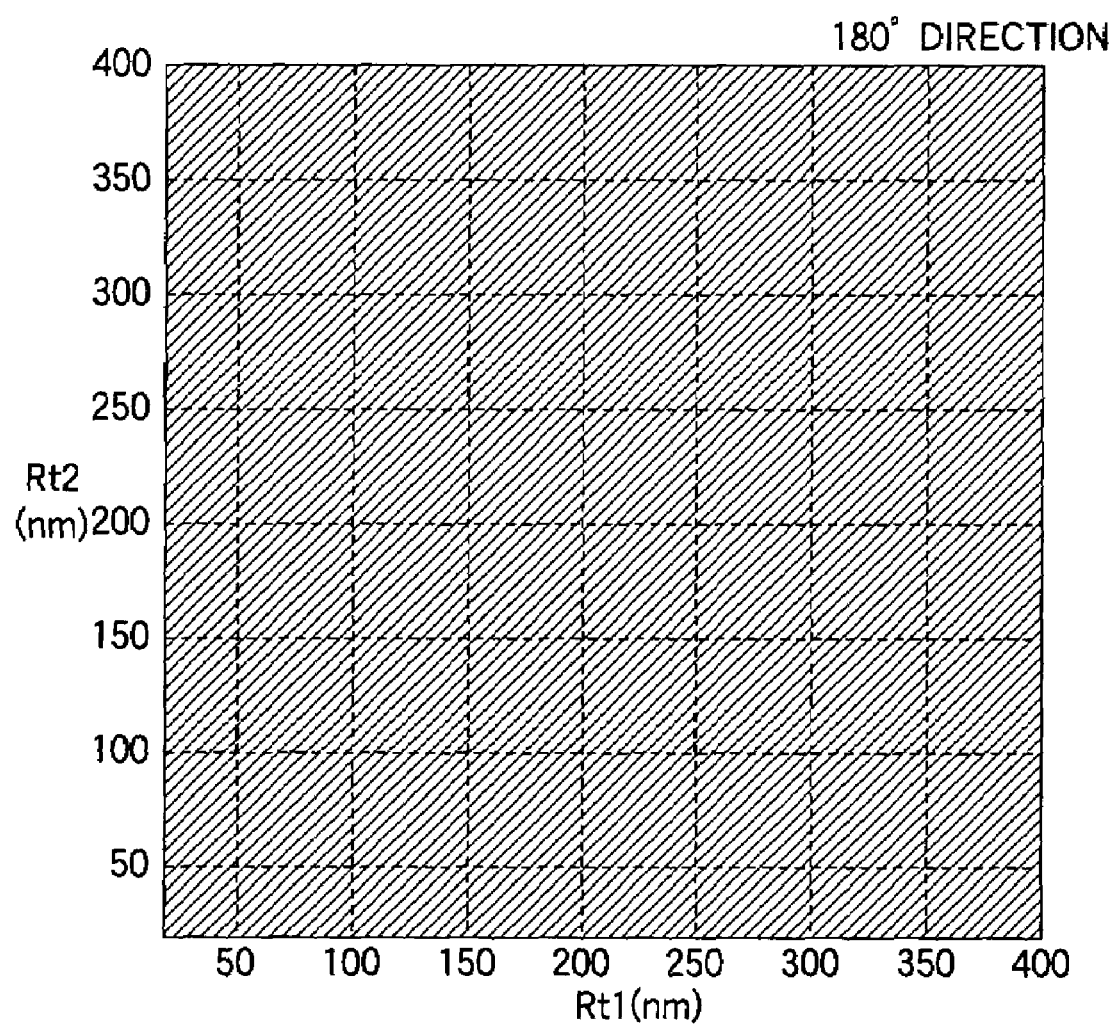
FIG. 55 is a graph showing viewing angle characteristics as viewed in a direction at 180 deg. under the same conditions for the angles $\theta_1$, $\theta_2$, $\phi_1$ and $\phi_2$ and the retardations $R_{t2}$ and $R_{t2}$ in the direction of the thickness as those shown in FIG. 51.
Figure 56:
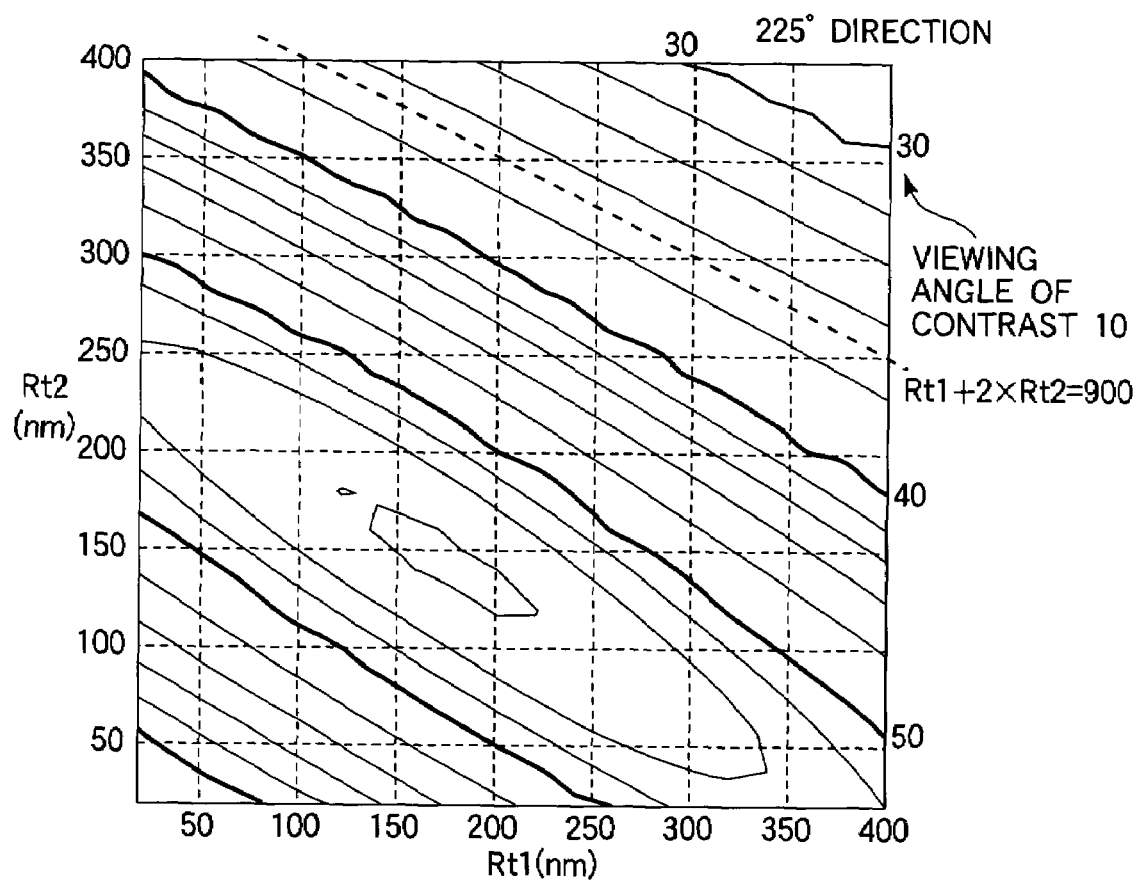
FIG. 56 is a graph showing viewing angle characteristics as viewed in a direction at 225 deg. under the same conditions for the angles $\theta_1$, $\theta_2$, $\phi_1$ and $\phi_2$ and the retardations $R_{t1}$ and $R_{t2}$ in the direction of the thickness as those shown in FIG. 51.
Figure 57:
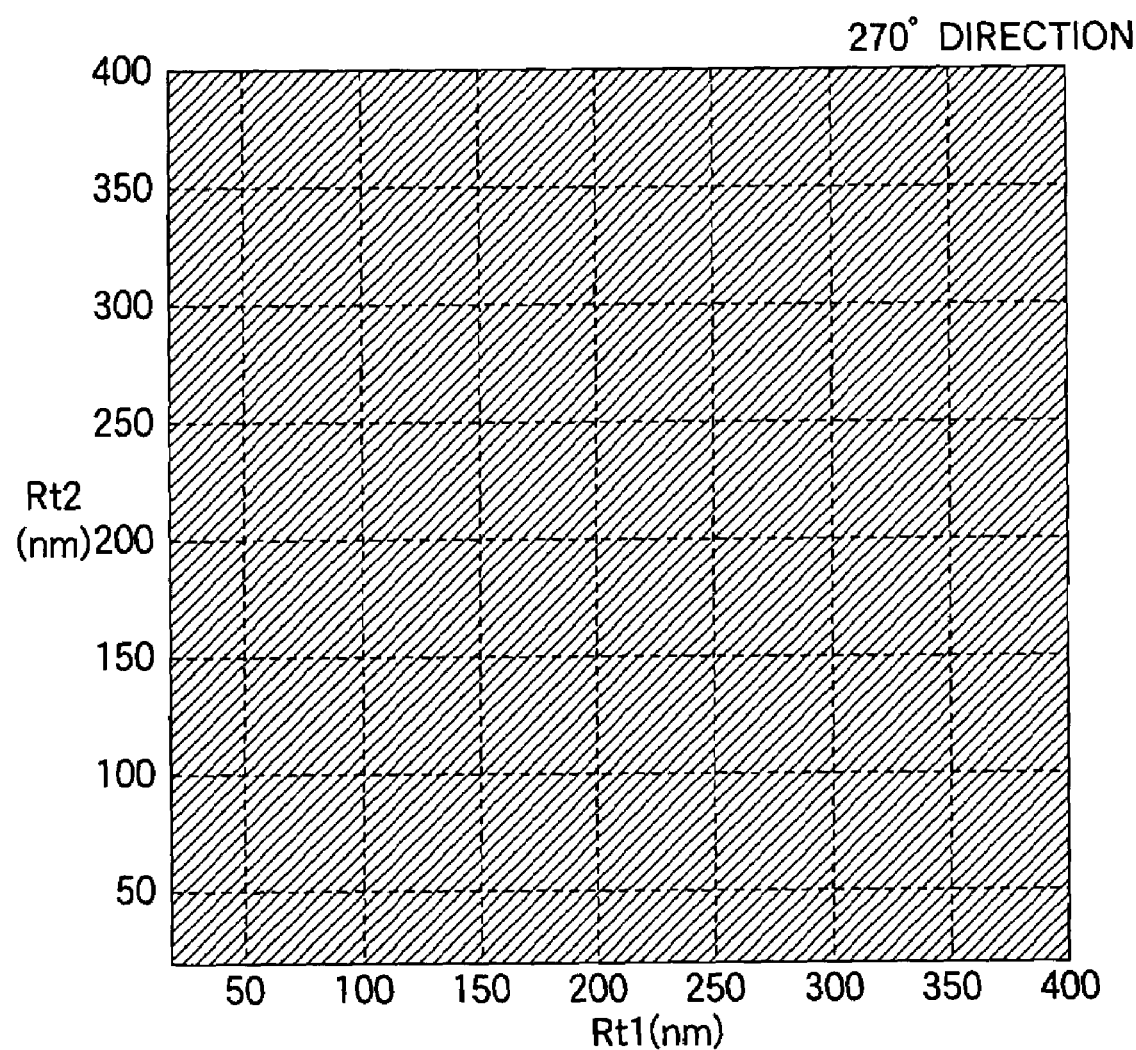
FIG. 57 is a graph showing viewing angle characteristics as viewed in a direction at 270 deg. under the same conditions for the angles $\theta_1$, $\theta_2$, $\phi_1$ and $\phi_2$ and the retardations $R_{t1}$ and $R_{t2}$ in the direction of the thickness as those shown in FIG. 51.

FIG. 50 shows frontal contrast achieved by fixing the angle $\theta$ of the optical retardation film 130 at 5 deg., varying the angle $\phi$ in the range from 0 deg. to 360 deg. and varying the retardation $R_t$ in the direction of the thickness in the range from 100 nm to 480 nm. The abscissa axis represents the retardation $R_t$ in the direction of the thickness, and the ordinate axis represents the angle $\phi$. FIG. 50 is a contour graph on which sets of ($R_t$, $\phi$) at which the same frontal contrast appears are connected by lines.

As apparent from the contour graph showing the same frontal contrast in FIG. 50, frontal contrast at an angle $\phi$=45 deg., 135 deg., 225 deg. and 315 deg. is reduced when the retardation $R_t$ in the direction of the thickness is large. In order to prevent any reduction in frontal contrast regardless of the value of the retardation $R_t$ in the direction of the thickness, the angle $\phi$ must be any of 0 deg., 90 deg., 180 deg. and 270 deg. Even when a plurality of optical retardation films are provided instead of providing the optical retardation film 130 only, no reduction of frontal contrast occurs regardless of the retardation $R_t$ in the direction of the thickness of each optical retardation film as long as the angle $\phi$ of each optical retardation film is any of 0 deg., 90 deg., 180 deg. and 270 deg.

A discussion will now be made on a case wherein the optical retardation films 130 and 132 are provided on both surfaces of the liquid crystal panel 30 as shown in FIG. 48. Let us assume that the angle $\theta$ of the optical retardation film 130 is $\theta_1$; the angle $\phi$ of the same is $\phi_1$; the retardation $R_t$ in the direction of the thickness of the same is $R_{t1}$; the angle $\theta$ of the optical retardation film 132 is $\theta_2$; the angle $\phi$ of the same is $\phi_2$; and the retardation $R_t$ in the direction of the thickness of the same is $R_{t2}$.

Figure 58:
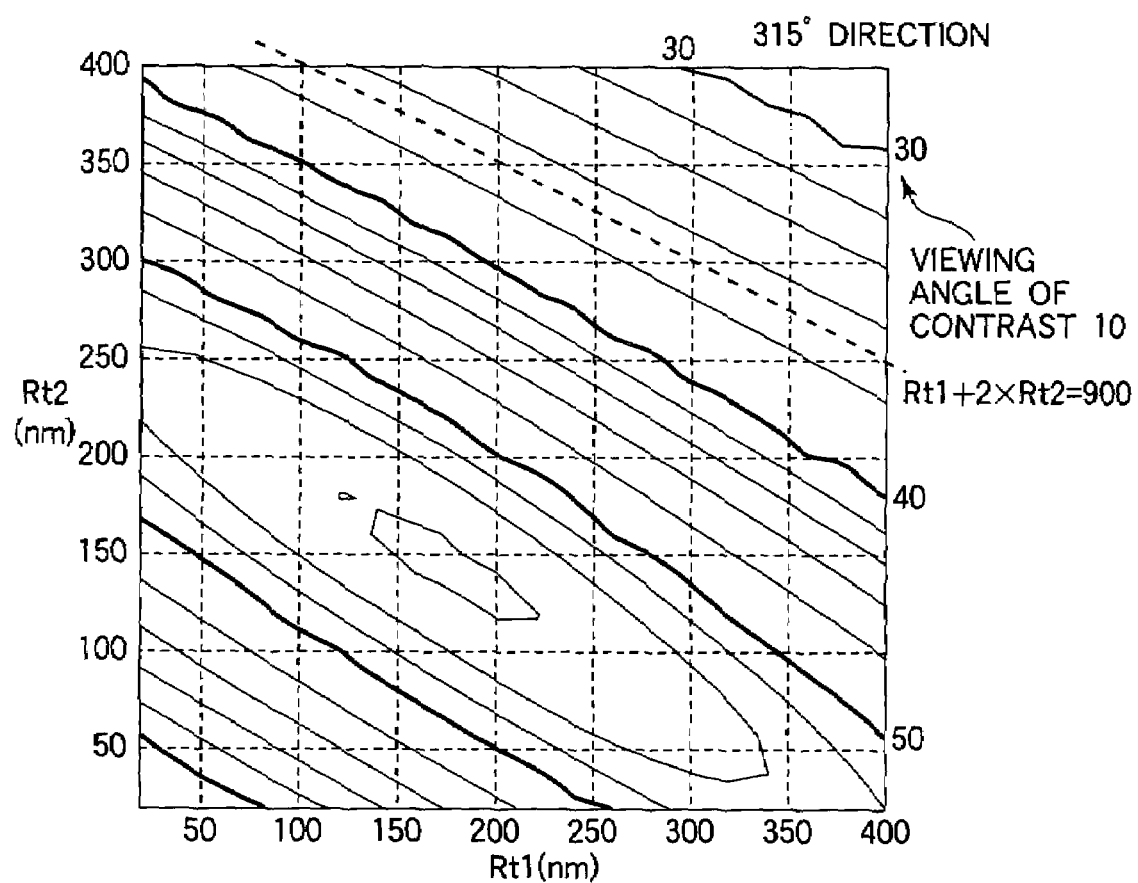
FIG. 58 is a graph showing viewing angle characteristics as viewed in a direction at 315 deg. under the same conditions for the angles $\theta_1$, $\theta_2$, $\phi_1$ and $\phi_2$ and the retardations $R_{t1}$ and $R_{t2}$ in the direction of the thickness as those shown in FIG. 51.

As described above, the angles $\phi_1$ and $\phi_2$ must be any of 0 deg., 90 deg., 180 deg. and 270 deg. Then, viewing angle characteristics were checked with fixed relationships $\theta 1=\theta 2=5$ deg., $\phi_1=0$ deg., and $\phi_2=180$ deg. established and with each of the retardations $R_{t1}$ and $R_{t2}$ in the direction of the thickness varied in the range from 20 nm to 400 nm. The results are shown in FIGS. 51 through 58. In FIGS. 51 through 58, the retardation $R_{t1}$ in the direction of the thickness of the optical retardation film 130 is plotted along the abscissa axis, and the retardation $R_{t2}$ in the direction of the thickness of the optical retardation film 132 is plotted along the ordinate axis. FIGS. 51 through 58 are contour graphs plotted by connecting values ($R_{t1}$, $R_{t2}$) at which contrast is 10 when the liquid crystal panel is viewed sequentially at the same viewing angle in eight directions at 0 deg. (FIG. 51), 45 deg. (FIG. 52), 90 deg. (FIG. 53), 135 deg. (FIG. 54), 180 deg. (FIG. 55), 225 deg. (FIG. 56), 270 deg. (FIG. 57) and 315 deg. (FIG. 58). The diagonal lines shown on the entirety of FIGS. 51, 53, 55 and 57 represent a region where the viewing angle that results in contrast of 10 is 80 deg. or more.

As described with reference to FIG. 4, the viewing angle at which contrast of 10 is achieved in directions 45 deg., 135 deg. and 315 deg. without any optical retardation film is about 37 deg. Therefore, referring to FIGS. 51 through 58, the addition of the optical retardation films 130 and 132 is considered effective when the retardations $R_{t1}$ and $R_{t2}$ in the direction of the thickness satisfy the conditions under which the viewing angle that results in contrast of 10 in the directions at 45 deg., 135 deg., 225 deg. and 315 deg. is 37 deg. or more. Referring to FIGS. 51 through 58, the viewing angle that results in contrast of 10 is 37 deg. or more in all of four directions at 45 deg. (FIG. 52), 135 deg. (FIG. 54), 225 deg. (FIG. 56) and 315 deg. (FIG. 58) when the retardations $R_{t1}$ and $R_{t2}$ in the direction of the thickness satisfy the following conditions simultaneously.

$$0 \text{ nm} < 2 \times R_{t1} + R_{t2} < 900 \text{ nm};$$

$$0 \text{ nm} < R_{t1} + 2 \times R_{t2} < 900 \text{ nm} \quad \text{Equation 3}$$

Equation 3 can be modified as follows.

$$0 \text{ nm} < 2 \times R_{t1}/3 + R_{t2}/3 < 300 \text{ nm};$$

$$0 \text{ nm} < R_{t1}/3 + 2 \times R_{t2}/3 < 300 \text{ nm} \quad \text{Equation 4}$$

The above-described results is available when $\theta_1 = \theta_2 = 5$ deg. Viewing angle characteristics were similarly checked under a condition that $\theta_1 = \theta_2 = \alpha (0 \text{ deg.} < \alpha \leq 15 \text{ deg.})$. As a result, it was found that the effect of improving viewing angle characteristics is achieved when the following conditions are simultaneously satisfied.

$$0 \text{ nm} < (\tfrac{1}{2} + \alpha/30) \times R_{t1} + (\tfrac{1}{2} - \alpha/30) \times R_{t2} < 300 \text{ nm};$$

$$0 \text{ nm} < (\tfrac{1}{2} - \alpha/30) \times R_{t1} + (\tfrac{1}{2} + \alpha/30) \times R_{t2} < 300 \text{ nm} \quad \text{Equation 5}$$

Figure 59:
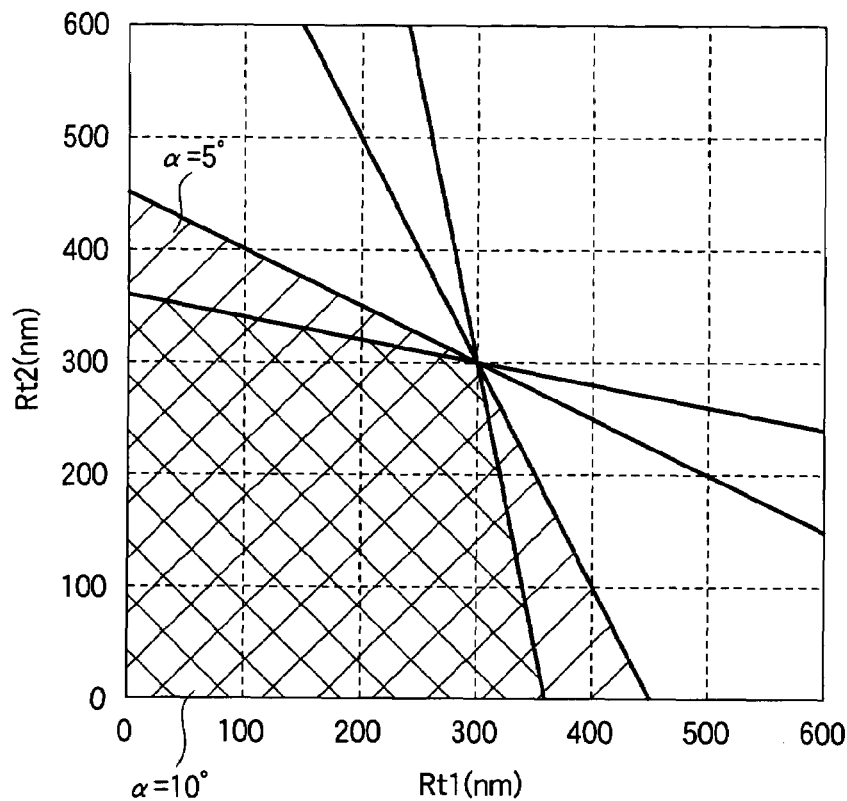
FIG. 59 is a graph illustrating conditions for the retardations $R_{t1}$ and $R_{t2}$ in the direction of the thickness that satisfy Equation 5 at $\alpha=5$ deg. and $\alpha=10$ deg. in the liquid crystal display according to the eighth embodiment of the invention.

FIG. 59 shows the conditions for the retardations $R_{t1}$ and $R_{t2}$ in the direction of the thickness under which Equation 5 is satisfied when $\alpha = 5$ deg. and when $\alpha = 10$ deg. As apparent from FIG. 59, the conditions to be satisfied when $\alpha = 10$ deg. are comprehended in the conditions to be satisfied when $\alpha = 5$ deg. In other words, if the effect of improving viewing angle characteristics is achieved under certain conditions when $\alpha = 10$ deg., the effect of improving viewing angle characteristics is definitely achieved under the same conditions when $\alpha = 5$ deg.

Therefore, if $\theta_1 = \alpha_1$ and $\theta_2 = \alpha_2 (\alpha_1 > \alpha_2)$, the effect of improving viewing angle characteristics is achieved when the following conditions are satisfied simultaneously.

$$0 \text{ nm} < (\tfrac{1}{2} + \alpha_1/30) \times R_{t1} + (\tfrac{1}{2} - \alpha_1/30) \times R_{t2} < 300 \text{ nm};$$

$$0 \text{ nm} < (\tfrac{1}{2} - \alpha_1/30) \times R_{t1} + (\tfrac{1}{2} + \alpha_1/3) \times R_{t2} < 300 \text{ nm} \quad \text{Equation 6}$$

The effect of improving viewing angle characteristics is achieved if Equation 6 is satisfied, for example, even when the angle $\theta_1$ of the optical retardation film 130 continuously or discontinuously changes within the range of $\alpha_2 < \theta_1 < \alpha_1$ in the direction of the thickness of the film.

The above-described result is obtained when $\phi_1 = 0$ deg. and $\phi_2 = 180$ deg. Then, viewing angle characteristics were similarly checked with other combinations of the angles $\phi_1$ and $\phi_2$. As a result, it was found that the effect of improving viewing angle characteristics is achieved if Equation 5 is satisfied with all combinations in which the angles $\phi_1$ and $\phi_2$ are 180 deg. different from each other, e.g., when $\phi_1 = 180$ deg. and $\phi_2 = 0$ deg. and when $\phi_1 = 90$ deg. and $\phi_2 = 270$ deg.

The effect of improving viewing angle characteristics is achieved if Equation 5 is satisfied also when either the retardation $R_{t1}$ or $R_{t2}$ in the direction of the thickness is 0 in Equation 5, i.e., when there is only one optical retardation film.

Figure 60:
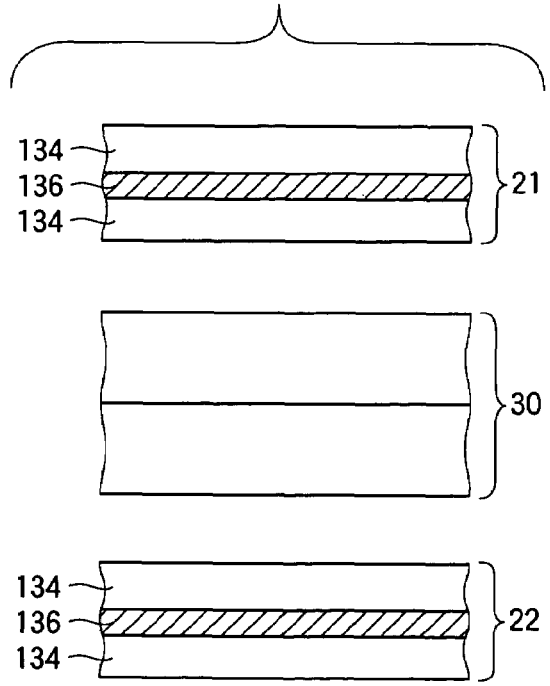
FIG. 60 illustrates a structure of a normal polarizing element.

The above-described results were achieved using a liquid crystal cell having a $\Delta n_{LC} d_{LC}$ value of 341 nm ($\Delta n_{LC}$ represents anisotropy of refractivity of liquid crystals and $d_{LC}$ represents the cell thickness) and polarizing elements having no optical anisotropy. As shown in FIG. 60, a normal polarizing element has a structure in which a PVA (polyvinyl alcohol) film 136 or the like having a polarizing function is sandwiched by TAC (triacetyl cellulose) films 134 or the like which are support films. Since the TAC film 134 has optical anisotropy ($R_t = 50$ nm to 60 nm), the TAC film 134 located between the PVA films 136 provided on both sides of the liquid crystal panel 30 serves as an optical retardation film.

Viewing angle characteristics were similarly checked while varying the retardation Rt in the direction of the thickness of the support films serving as optical retardation films (in the case shown in FIG. 60, the sum of the retardations Rt in the direction of the thickness of the two TAC films 134 located between the PVA films 136) and $\Delta n_{LC} d_{LC}$ ($d_{LC}$ represents the cell gap) of the liquid crystal panel 30. As a result, it was found that the effect of improving viewing angle characteristics is achieved when the following conditions are simultaneously satisfied.

$$0 < (\tfrac{1}{2} + \alpha/30) \times R_{t1} + (\tfrac{1}{2} - \alpha/30) \times R_{t2} < 0.88 \times (\Delta n_{LC} d_{LC} + R_{tPL});$$

$$0 < (\tfrac{1}{2} - \alpha/30) \times R_{t1} + (\tfrac{1}{2} + \alpha/30) \times R_{t2} < 0.88 \times (\Delta n_{LC} d_{LC} + R_{tPL}); \quad \text{Equation 7}$$

$R_{tPL}$ represents the sum of the retardations $R_t$ in the direction of the thickness of films to serve as optical retardation films among support films used for polarizing elements. Equation 7 is modified into Equation 5 when (the retardation $\Delta n_{LC} d_{LC}$ of the liquid crystal panel 30 is 341 nm, and the retardation $R_{tPL}$ in the direction of the thickness of the support films is 0 nm.

The above-described result was achieved when one each retardation film whose angle $\theta \leq \alpha (0 \text{ deg.} < \alpha \leq 15 \text{ deg.})$ was provided on both sides of the liquid crystal panel 30. Although not shown in FIG. 60, viewing angle characteristics were similarly checked on a case wherein N optical retardation films that satisfied $\theta \leq \alpha$ and $\phi = \beta$ were provided one either or both sides of the liquid crystal panel 30 and wherein N' optical retardation films that satisfied $\theta \leq \alpha$ and $\phi = \beta + 180$ were provided one either or both sides of the liquid crystal panel 30. As a result, it was found that the effect of improving viewing angle characteristics is achieved when the following conditions are simultaneously satisfied.

$$0 < (\tfrac{1}{2} + \alpha/30) \times (R_{t1} + R_{t2} + \ldots + R_{tN}) + (\tfrac{1}{2} - \alpha/30) \times (R'_{t1} + R'_{t2} + \ldots + R'_{tN'}) < 0.88 \times (\Delta n_{LC} d_{LC} + R_{tPL});$$

$$0 < (\tfrac{1}{2} - \alpha/30) \times (R_{t1} + R_{t2} + \ldots + R_{tN}) + (\tfrac{1}{2} + \alpha/30) \times (R'_{t1} + R'_{t2} + \ldots + R'_{tN'}) < 0.88 \times (\Delta n_{LC} d_{LC} + R_{tPL}) \quad \text{Equation 8}$$

The retardations $R_{t1}, R_{t2}, \ldots R_{tN}$ are retardations $R_t$ in the first through N-th optical retardation films that satisfy $\phi = \beta$, and the retardations $R'_{t1}, R'_{t2}, \ldots R'_{tN'}$ are retardations $R_t$ in the first through N'-th optical retardation films that satisfy $\phi = \beta + 180$. The angle $\beta$ is any of 0 deg., 90 deg., 180 deg. and 270 deg., and N=N'=0 is excluded.

An example of the present embodiment will now be described with reference to FIGS. 61 and 62. First, two substrates to form a four-division MVA liquid crystal panel 30 are prepared. A full transparent electrode, color filters, protrusions in a zigzag configuration for defining domains and the like are formed on one of the substrates. Pixel electrodes, gate bus lines, data bus lines, TFT devices, protrusions in a zigzag configuration for defining domains and the like are formed on the other substrate.

Vertically aligned films made of polyimide are formed on both of the substrates. The two substrates are combined with spacers having a diameter of 4 μm interposed to seal nematic liquid crystals (Δn=0.0852) having negative dielectric anisotropy, and this completes a liquid crystal panel 30.

Polarizing elements 21 and 22 are provided on both sides of the liquid crystal panel 30 such that their absorption axes are at 45 deg. to the direction in which liquid crystal molecules are tilted when a voltage is applied and such that their absorption axes or orthogonal to each other. Optical retardation films 130 and 132 whose retardation $R_t$ in the direction of the thickness thereof is 160 nm and whose $n_z$ is tilted from the normal direction at an angle of 5 deg. are provided between the liquid crystal panel 30 and the polarizing elements 21 and 22 on both sides thereof such that the direction in which the tilting direction of $n_z$ is at 45 deg. to the direction in which the liquid crystal molecules are tilted when a voltage is applied and such that they are 180 deg. different from each other.

The optical retardation films 130 and 132 whose $n_z$ is tilted from the normal direction at an angle of 5 deg. can be fabricated by aligning discotic liquid crystals expressed by the chemical formula shown in FIG. 63 on a TAC film at a tilt.

Figure 61:
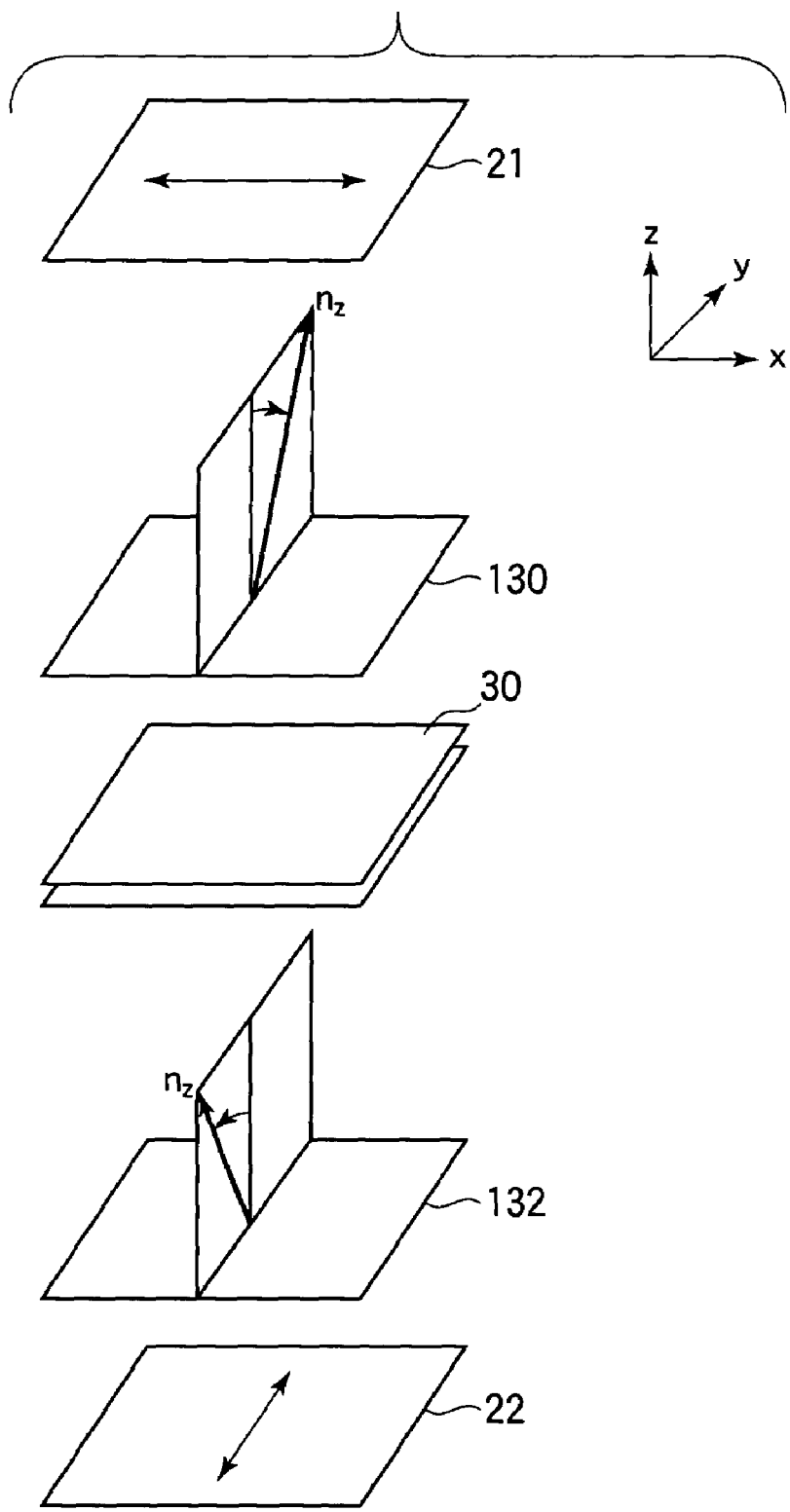
FIG. 61 shows a liquid crystal display according to an example of the eighth embodiment of the invention.
Figure 62:
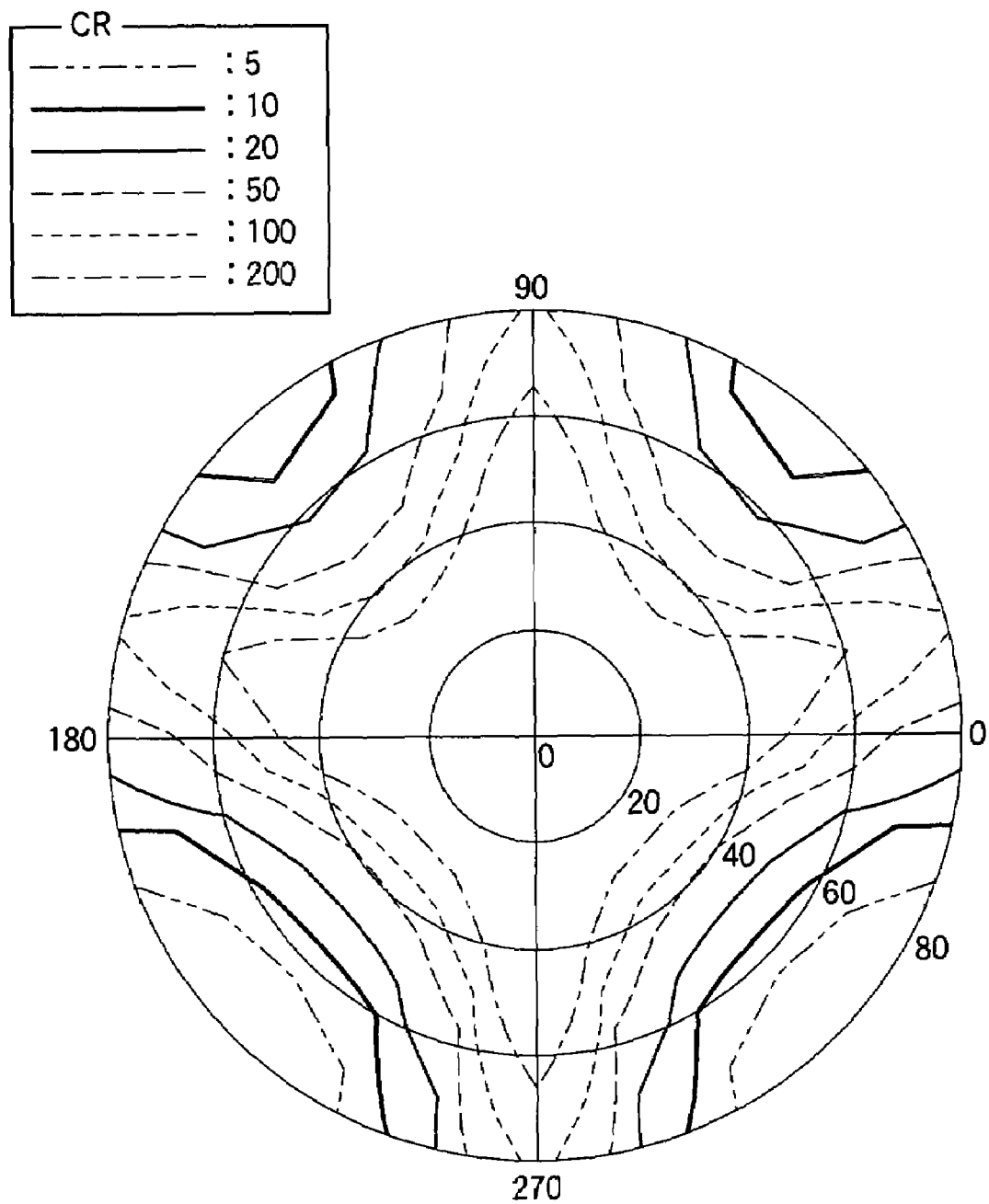
FIG. 62 is a graph illustrating effects of the example of the eighth embodiment of the invention.

The above-described process completes a configuration in which the optical retardation films 130 and 132 whose retardation $R_t$ in the direction of the thickness is 160 nm are provided on both sides of a four-division MVA panel 30 such that $n_z$ is tilted from the normal direction at 5 deg. and such that the tilting directions of $n_z$ are 180 deg. different from each other, as shown in FIG. 61. FIG. 62 shows iso-contrast curves of the liquid crystal display shown in FIG. 61. As shown in FIG. 62, the configuration of the present embodiment makes it possible to provide a liquid crystal display having viewing angle characteristics much better than those shown in FIG. 4.

Ninth Embodiment

A liquid crystal display according to a ninth embodiment of the invention will now be described. The present embodiment will refer to spray VA mode LCDs which are to replace OCB mode LCDs as described in the seventh embodiment.

OCB mode LCDs are attracting attention as high speed LCDs that exhibit response of 10 ms or less regardless of gray shades. However, OCB mode LCDs have problems in control for establishing the bend alignment, viewing angle characteristics. To improve the viewing angle characteristics of an OCB mode LCD, optical compensation materials that are discotic liquid crystals having a negative retardation in the form of films are frequently used as described in the seventh embodiment in addition to conventional methods for compensation wherein three-dimensional optical retardation films or negative optical retardation films (VAC) are applied. In order to perfectly compensate the viewing angle characteristics of an OCB mode LCD, discotic liquid crystal films in a complicated tilt alignment are required. However, such films are quite difficult to manufacture. Therefore, in practice, a plurality of discotic liquid crystal films whose tilt angle linearly changes are used in combination as described in the seventh embodiment. In this case, there is a certain limit on the effect of compensation.

On the other hand, LCDs utilizing vertically aligned (VA) liquid crystals such as MVA mode LCDs have the problem of low response speed.

The present embodiment will refer to a spray VA mode LCD that solves such problems encountered in OCB mode LCDs and VA mode LCDs. The present embodiment will also refer to an example of the use of an optical retardation film having discotic liquid crystal molecules whose alignment changes similarly to changes in the tilt of liquid crystal molecules in a spray VA mode LCD in the direction of the cell thickness thereof.

Figure 64A:
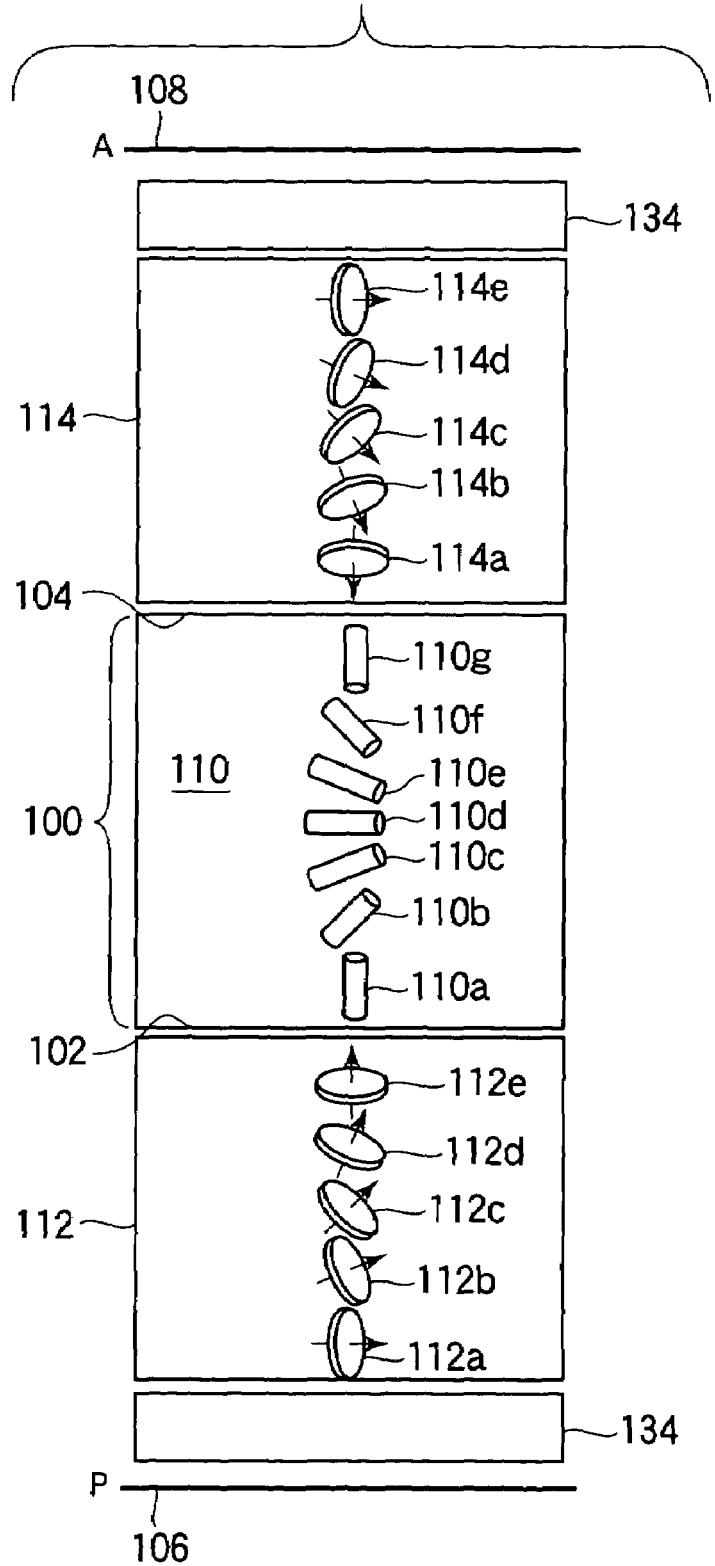
FIGS. 64A through 64D show a schematic configuration of a liquid crystal display according to a ninth embodiment of the invention.
Figure 64B:
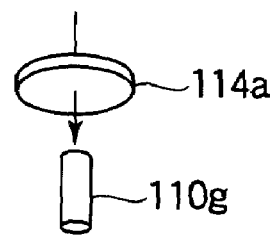
Figure 64C:
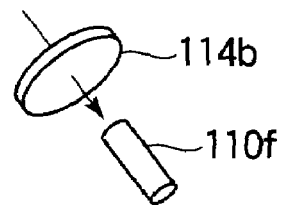
Figure 64D:
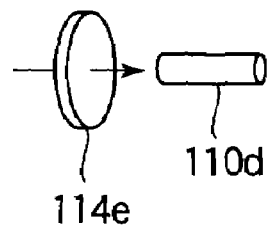

First, a brief description will be made with reference to FIGS. 64A through 64D on a configuration and operation of a spray VA mode LCD. FIG. 64A is a sectional view showing a schematic configuration of a spray VA mode LCD. FIGS. 64B through 64D show an optical compensation operation performed by discotic liquid crystal molecules in response to a change in the tilt of the liquid crystal molecules in the spray VA mode LCD.

In the spray VA mode, nematic liquid crystals having negative dielectric anisotropy which are in the bend alignment when no voltage is applied are driven for display by applying a predetermined relatively high voltage to change the alignment to the spray alignment. Images are then displayed within a range of applied voltages at which the spray alignment is maintained. A spray VA mode is a birefringence type liquid crystal display in which voltages in accordance with gray shades are applied to the liquid crystal layer to control the tilt of the liquid crystal molecules in the spray alignment and in which a retardation of light passing through the liquid crystal layer is thereby controlled to display an image.

In the spray alignment, liquid crystal molecules at the interface to both substrates are tilted in the same direction B into a V-shaped configuration. Liquid crystal molecules in the middle of the cell gap are substantially horizontally aligned. The tilt angle continuously changed from a value in the vicinity of both substrates to a value in the middle of the cell, and the changes in the tilt of the liquid crystals between the center of the cell to the vicinity of the upper substrate are mirror images of the changes in the tilt of the liquid crystals between the center of the cell to the vicinity of the lower substrate. Such a spray VA mode makes it possible to obtain response characteristics at a very high speed compared to those in the normal VA alignment mode.

Referring to FIG. 64A, a liquid crystal cell 100 is formed by an array substrate 102 on which a TFT (thin film transistor) and a display electrode are formed in each pixel, a counter substrate 104 provided in a face-to-face relationship with the array substrate 102 and having a common electrode formed thereon and a liquid crystal layer 110 sealed in the gap between the array substrate 102 and the counter substrate 104. A polarizer 106 is provided on the surface of the array substrate 102 opposite to the side of the liquid crystal layer 110. A polarizer 108 having an optical transmission axis perpendicular to (in a crossed Nicols relationship with) the optical transmission axis of the polarizer 106 is provided on the surface of the counter substrate 104 opposite to the side of the liquid crystal layer 110.

A discotic liquid crystal film (optically anisotropic element) 112 and an optical retardation film 134 are provided between the array substrate 102 and the polarizer 106. A discotic liquid crystal film 114 and an optical retardation film 134 are provided between the counter substrate 104 and the polarizer 108. The discotic liquid crystal films 112 and 114 and the optical retardation films 134 are provided to cancel retardations (phase differences) in the liquid crystal layer 110 as much as possible to perform compensation such that an index ellipsoid becomes closer to a sphere as much as possible, thereby providing a panel having a wide viewing angle.

The negative dielectrically anisotropic liquid crystal molecules in the liquid crystal layer 110 sealed between the array substrate 102 and the counter substrate 104 are put in the spray alignment by vertical alignment films (not shown) formed on the surfaces of both of the array substrate 102 and counter substrate 104 on the side of the liquid crystal layer 110 when a predetermined voltage is applied. The spray VA mode LCD of the present embodiment is a normally black LCD that displays white at the minimum voltage within the range of applied voltages at which the spray alignment is maintained because the polarizers 106 and 108 are in a crossed Nicols configuration.

The liquid crystal layer 110 shown in FIGS. 64A through 64D represents an example of an alignment of molecules in a state wherein the minimum voltage within the range of applied voltages for maintaining the spray alignment is applied to display black. When black is displayed, most of liquid crystal molecules in the middle of the liquid crystal layer 110 are tilted in a direction perpendicular to the normal direction of the surfaces of the array substrate 102 and counter substrate 104 (longitudinal direction of the figure), which is accompanied by changes in the tilt angle; and the liquid crystal molecules in the vicinity of the alignment films on the surfaces of both substrates stand up substantially perpendicularly to the substrate surfaces.

As apparent from the liquid crystal layer 110 in FIG. 64A, in the spray alignment in the spray VA mode, liquid crystal molecules are tilted such that a substantially symmetric relationship is established between liquid crystal molecules 110e through 110g located in an upper half of the liquid crystal layer 110 above a straight line extending substantially in the middle of the layer in parallel with the substrate surfaces and liquid crystal molecules 110a through 110c located in a lower half thereof. The suffixes of the reference numbers assigned to liquid crystal molecules in the present specification merely discretely represent the positions of the liquid crystal molecules which are continuously distributed and do not indicate the quantity of molecules or the like.

A description will now be made with reference to FIGS. 64B, 65C and 65D on changes in the tilt angle of the discotic liquid crystal molecules in the discotic liquid crystal film 114 in association with the spray alignment. The tilt angle of discotic liquid crystal molecules 114a through 114e linearly changes from 90 deg. (vertical direction) to 0 deg. (horizontal direction) as viewed from the counter substrate 104 (bottom) toward the polarizer 108 (top) to compensate the optical characteristics of the liquid crystal molecules 110e through 110g in the upper half of the liquid crystal layer 110 when black is displayed as shown in FIG. 64B through 64D.

Similarly, the tilt angle of discotic liquid crystal molecules 112a through 112e linearly changes from 90 deg. (vertical direction) to 0 deg. (horizontal direction) as viewed from the array substrate 102 (top) toward the polarizer 106 (bottom) to compensate the optical characteristics of the liquid crystal molecules 110a through 110c in the lower half of the liquid crystal layer 110 when black is displayed.

As thus described, when the spray VA mode LCD according to the present embodiment displays black, the spray alignment of the liquid crystal molecules 110a through 110g linearly and continuously changes in each of the upper and lower regions defined by dividing the liquid crystal layer 110 in the direction of the cell thickness. It is therefore possible to cause the tilt angle of the discotic liquid crystal molecules 112a through 112e and 114a through 114e in the discotic liquid crystal films 112 and 114 to change linearly.

A description will now be made with reference to FIGS. 65 and 66 on Example 1 which is an example of a specific configuration of a liquid crystal display according to the present embodiment. Elements substantially identical to the elements described in the above embodiments are indicated by like reference numbers and will not be described here. First, the configuration of a spray VA mode LCD will be briefly described with reference to FIG. 65.

Polarizers 106 and 108 are provided on both sides of a liquid crystal cell 100 in a crossed Nicols configuration. A discotic liquid crystal film 112, a psotive vertically aligned optical retardation film 120 and a uniaxial optical retardation film 122 are provided between the liquid crystal cell 100 and the polarizer 106 in the order listed that is the order of their closeness to the liquid crystal cell 100. Between the liquid crystal cell 100 and the polarizer 108, there is provided a discotic liquid crystal film 114, a positive vertically aligned optical retardation film 120 and a uniaxial optical retardation film 122 in the order listed which is the order of their closeness to the liquid crystal cell 100.

Figure 65:
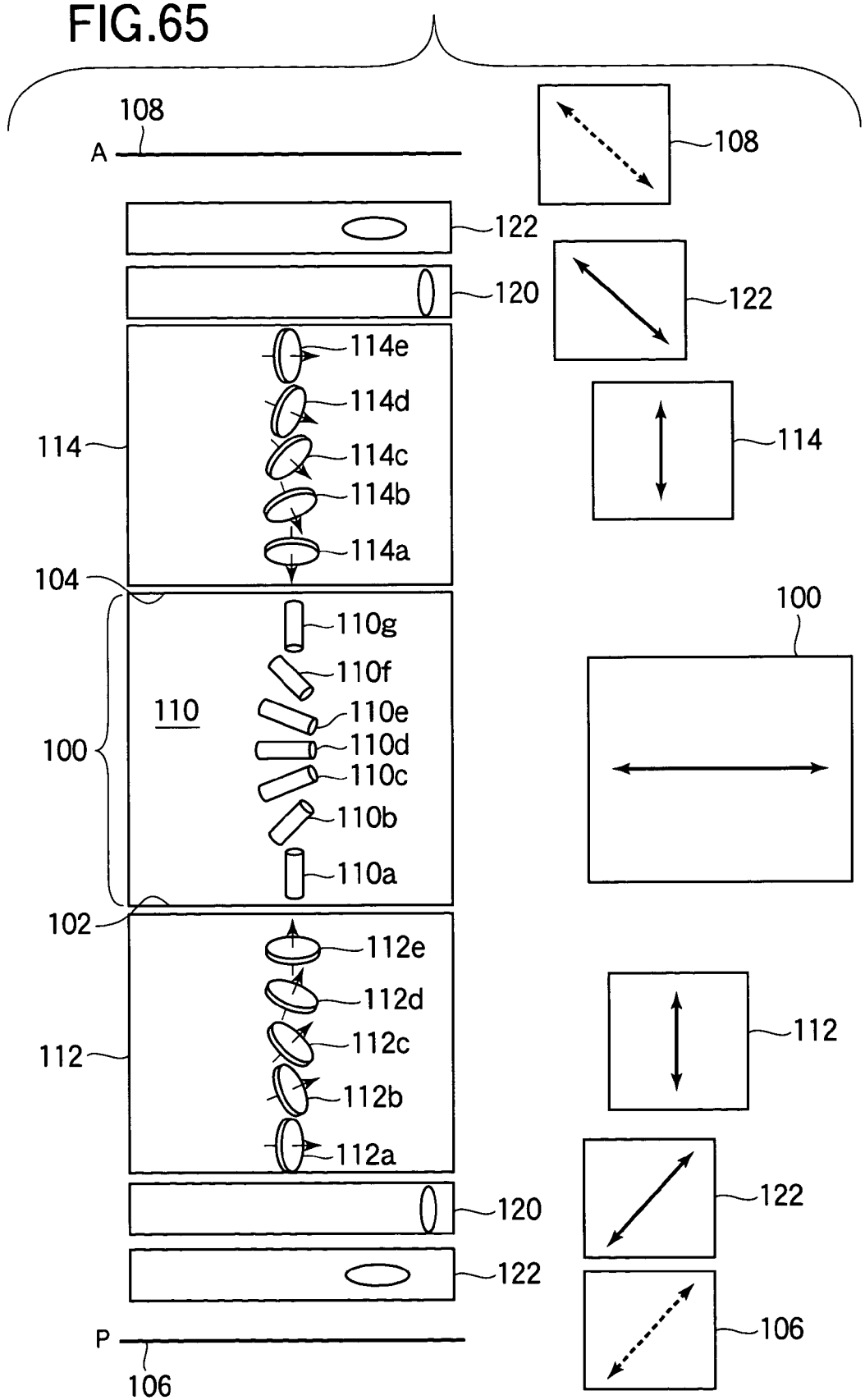
FIG. 65 illustrates Example 1 that is an example of a specific configuration of a liquid crystal display according to the ninth embodiment of the invention.

FIG. 65 shows a sectional view of the spray VA mode LCD on the left side thereof. On the right side of FIG. 65, plan views of major elements are shown, and the directions of optical transmission axes or phase delay axes (optical axes) thereof are indicated by double arrows.

In the present embodiment, the liquid crystal cell 100 has a retardation R1 of 600 nm. Each of the discotic liquid crystal films 112 and 114 has a retardation Rd of 300 nm. The positive vertically aligned optical retardation film 120 has a retardation R1 of 110 mm. The uniaxial optical retardation film 122 has a retardation R2 of 55 nm.

The phase-delay axis of the uniaxial optical retardation film 122 is set in parallel with the transmission axis of the polarizer 106, the direction of the transmission axis of the polarizer 106 serving as a reference. The phase-delay axis of the positive vertically aligned retardation film 120 is not shown because it is vertical to the plane of the drawing. The phase-delay axis of the discotic liquid crystal film 112 is in a direction at a rotation of 45 deg. relative to the transmission axis of the polarizer 106. The phase-delay axis of the liquid crystal cell 100 is in a direction at a rotation of 90 deg. relative to the transmission axis of the polarizer 106. The direction of the phase-delay axis of the discotic liquid crystal film 114 agrees with the direction of the phase-delay axis of the discotic liquid crystal film 112. The phase-delay axis of the uniaxial retardation film 122 is orthogonal to the transmission axis of the polarizer 106. The transmission axis of the polarizer 108 is also orthogonal to the transmission axis of the polarizer 106.

Viewing angle characteristics of the spray VA mode LCD of the present example will be described with reference to FIG. 66. As shown in FIG. 66, the spray VA mode LCD utilizing optical compensation films of the present example can provide a wide and uniform viewing angle in all directions with reduced fluctuation of a contrast ratio depending on the viewing direction.

In summary, the present embodiment has a configuration including:

first and second substrates (102, 104) provided in a face-to-face relationship with a predetermined gap therebetween, a nematic liquid crystal layer (110) having negative dielectric anisotropy which is sealed in the gap and whose liquid crystal molecules (110a, 110g) in the vicinity of the surfaces of the first and second substrates (102, 104) maintains a substantially vertical alignment to form the spray alignment as a whole when a voltage is applied;

a first polarizer (106) provided on a surface of the first substrate (102) opposite to the side thereof where the liquid crystal layer (110) is located;

a second polarizer (108) provided on a surface of the second substrate (104) opposite to the side thereof where the liquid crystal layer (110) is located;

a first optical compensation film (112) provided between the first substrate (102) and the first polarizer (106) and having discotic liquid crystals (112a through 112e) whose tilt angle is changed in accordance with linear changes in the tilt of liquid crystal molecules (110a through 110c) in a region of the liquid crystal layer (110) closer to the first substrate (102) that is one of two regions of the liquid crystal layer (110) substantially equally divided in the normal direction of the substrate surface to compensate retardations attributable to the linear changes of the tilt; and a second optical compensation film (114) provided between the second substrate (104) and the second polarizer (108) and having discotic liquid crystals (114a through 114e) whose tilt angle is changed in accordance with linear changes in the tilt of liquid crystal molecules (110e through 110g) in a region of the liquid crystal layer (110) closer to the second substrate (104) that is one of the two regions of the liquid crystal layer (110) substantially equally divided in the normal direction of the substrate surface to compensate retardations attributable to the linear changes of the tilt. The optical compensation film may be provided on one of the substrates only instead of providing it on both substrates.

In a spray VA alignment, the discotic liquid crystal molecules of the plurality of discotic liquid crystal films are aligned such that they artificially reproduce changes in the tilt of the liquid crystal molecules 110a through 110g when a minimum voltage is applied to optically compensate the state of black in the normally black mode. Discotic liquid crystals having negative retardations demonstrate a perfect effect of compensation when they are in an alignment that is completely similar to that of spray VA alignment liquid crystals having positive retardations. In the normally black mode, since black is displayed when a minimum voltage is applied, high contrast can be achieved by compensating retardations in the spray VA alignment when a low voltage is applied. For this reason, the changes in the tilt of discotic liquid crystal molecules may be substantially linear in the direction of the cell gap (direction of the substrate surface). This is advantageous in that quite high manufacturability can be achieved when compared to compensation films for OCB (whose compensating effect is insufficient when they have linear changes) according to the seventh embodiment for compensating retardations in a liquid crystal layer when a high voltage is applied.

Figure 66:
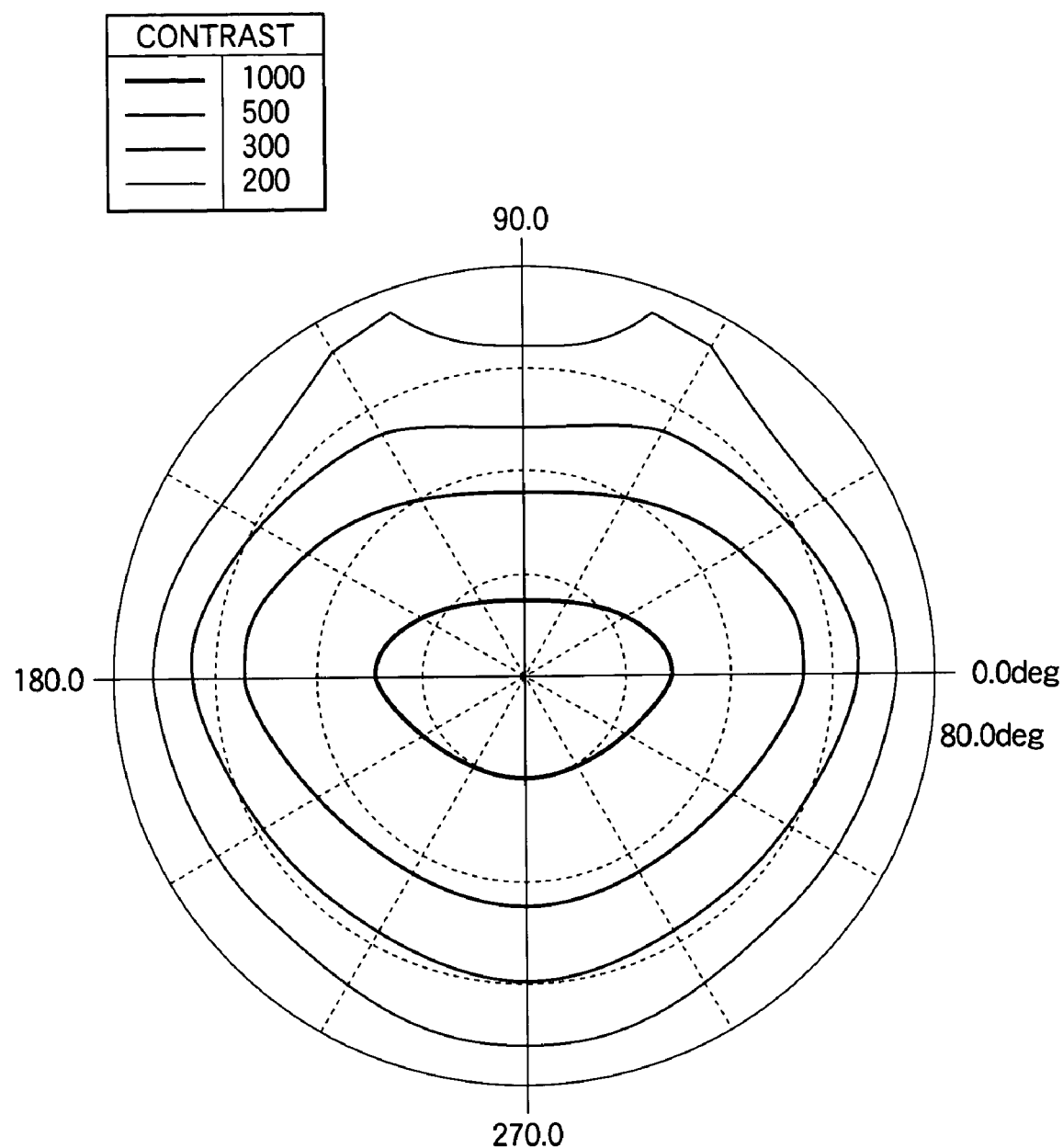
FIG. 66 illustrates effects of Example 1 that is an example of a specific configuration of a liquid crystal display according to the ninth embodiment of the invention.

Further, since the maximum effect of compensation can be achieved when changes in the tilt of discotic liquid crystals are linear, a very wide viewing angle can be achieved as shown in FIG. 66, which makes it possible to achieve viewing angle characteristics much higher than those of normal OCB mode LCDs. While the above-described embodiment has referred to a case wherein the liquid crystal layer 110 has a retardation Δnd of 600 nm, the retardation Δnd may be increased to display white at a low driving voltage. In such a case, retardations in the discotic liquid crystal film must be increased equivalently.

In a spray VA alignment, changes in the direction of the principal refractive index $n_z$ among the principal refractive indices $n_x$, $n_y$, and $n_z$ of the discotic liquid crystal molecules 114a through 114e in the discotic liquid crystal film 114 are associated with the direction of changes in the principal refractive index $n_z$ of the liquid crystal molecules 110e through 110g which are in the region closer to the counter substrate 104 that is one of the two substantially equal regions defined by dividing the liquid crystal layer 110 in the normal direction of the substrate surface. Specifically, the direction of the principal refractive index $n_z$ of the lowermost discotic liquid crystal molecule 114a closest to the counter substrate 104 is the same direction as that of the principal refractive index $n_z$ of the discotic liquid crystal molecule 110g at the interface of the liquid crystal layer 110 with the counter substrate 104. The direction of the principal refractive index $n_z$ of the discotic liquid crystal molecule 114b located slightly higher is the same direction as that of the principal refractive index $n_z$ of the discotic liquid crystal molecule 110f located slightly lower than the interface with the counter substrate 104. Changes in the principal refractive indices $n_z$ of the discotic liquid crystal molecules 114c and 114d in the discotic liquid crystal film 114 in the direction of the cell gap are defined as similar changes. The direction of the principal refractive index $n_z$ of the uppermost discotic liquid crystal molecule 114e in the discotic liquid crystal film 114 is the same direction as that of the principal refractive index $n_z$ of a liquid crystal molecule in the middle of the liquid crystal cell 100 of the liquid crystal layer 110 in the spray alignment, e.g., the liquid crystal molecule 110d.

In a spray VA alignment, changes in the direction of the principal refractive index $n_z$ among the principal refractive indices $n_x$, $n_y$, and $n_z$ of the discotic liquid crystal molecules 112a through 112e in the discotic liquid crystal film 112 are associated with the direction of changes in the principal refractive index $n_z$ of the liquid crystal molecules 110a through 110c in the region of the liquid crystal layer 110 closer to the array substrate 102 which is one of the two substantially equal regions defined by dividing the liquid crystal layer 110 in the normal direction of the substrate surface. Specifically, the direction of the principal refractive index $n_z$ of the uppermost discotic liquid crystal molecule 112e closest to the array substrate 102 is the same direction as that of the principal refractive index $n_z$ of the discotic liquid crystal molecule 110a at the interface of the liquid crystal layer 110 with the array substrate 102. The direction of the principal refractive index $n_z$ of the discotic liquid crystal molecule 112d located slightly lower is the same direction as that of the principal refractive index $n_z$ of the discotic liquid crystal molecule 110b located slightly higher than the interface with the array substrate 102. Changes in the principal refractive indices $n_z$ of the discotic liquid crystal molecules 112c and 112b in the discotic liquid crystal film 112 in the direction of the cell gap are defined as similar changes. The direction of the principal refractive index $n_z$ of the lowermost discotic liquid crystal molecule 112a in the discotic liquid crystal film 112 is the same direction as that of the principal refractive index $n_z$ of a liquid crystal molecule in the middle of the liquid crystal cell 100 of the liquid crystal layer 110 in the spray alignment, e.g., the liquid crystal molecule 110d.

The directions of the principal refractive indices $n_z$ of the discotic liquid crystal molecules 112a through 112e and 114a through 114e of the discotic liquid crystal films 112 and 114 linearly change in accordance with changes in the positions of the discotic liquid crystal molecules 112*a* through 112*e* and 114*a* through 114*e* in the normal direction of the substrate surface.

The retardation $\Delta nd$ ($\Delta n$ represents anisotropy of refractivity, and d represents the call gap) in the liquid crystal layer 110 ranges from 500 to 2000 nm, and the retardation $R=((n_x+n_y)/2-n_z)D$ (D represents the thickness of each of the discotic liquid crystal films 112 and 114) of each of the discotic liquid crystal films 112 and 114 ranges from 300 to 1200 nm.

As described in the above example, the positive vertically aligned optical retardation film 120 which is an index ellipsoid satisfying $n_x=n_y<n_z$ and whose principal refractive index $n_z$ coincides with the normal of the substrate surface and the uniaxial optical retardation film 122 with an optic axis whose direction coincides with the transmission axis of the polarizer 106 are provided at least between the discotic liquid crystal film 112 and the polarizer 106 or between the discotic liquid crystal film 114 and the polarizer 108, the film 112 being located closer to the liquid crystal layer 110.

Example 2 of the present embodiment will now be described with reference to FIGS. 67A through 67C. Driving in the spray VA mode is accompanied by an operation of applying an initial voltage to change the bend alignment to the spray alignment. The purpose of this example is to delete or simplify such an operation. For this purpose, a polymer agent that is scured by UV (ultraviolet) or the like is mixed in the liquid crystals of the liquid crystals 110 to form a network of the polymer agent which will stabilize the sprayed state.

Figure 67:
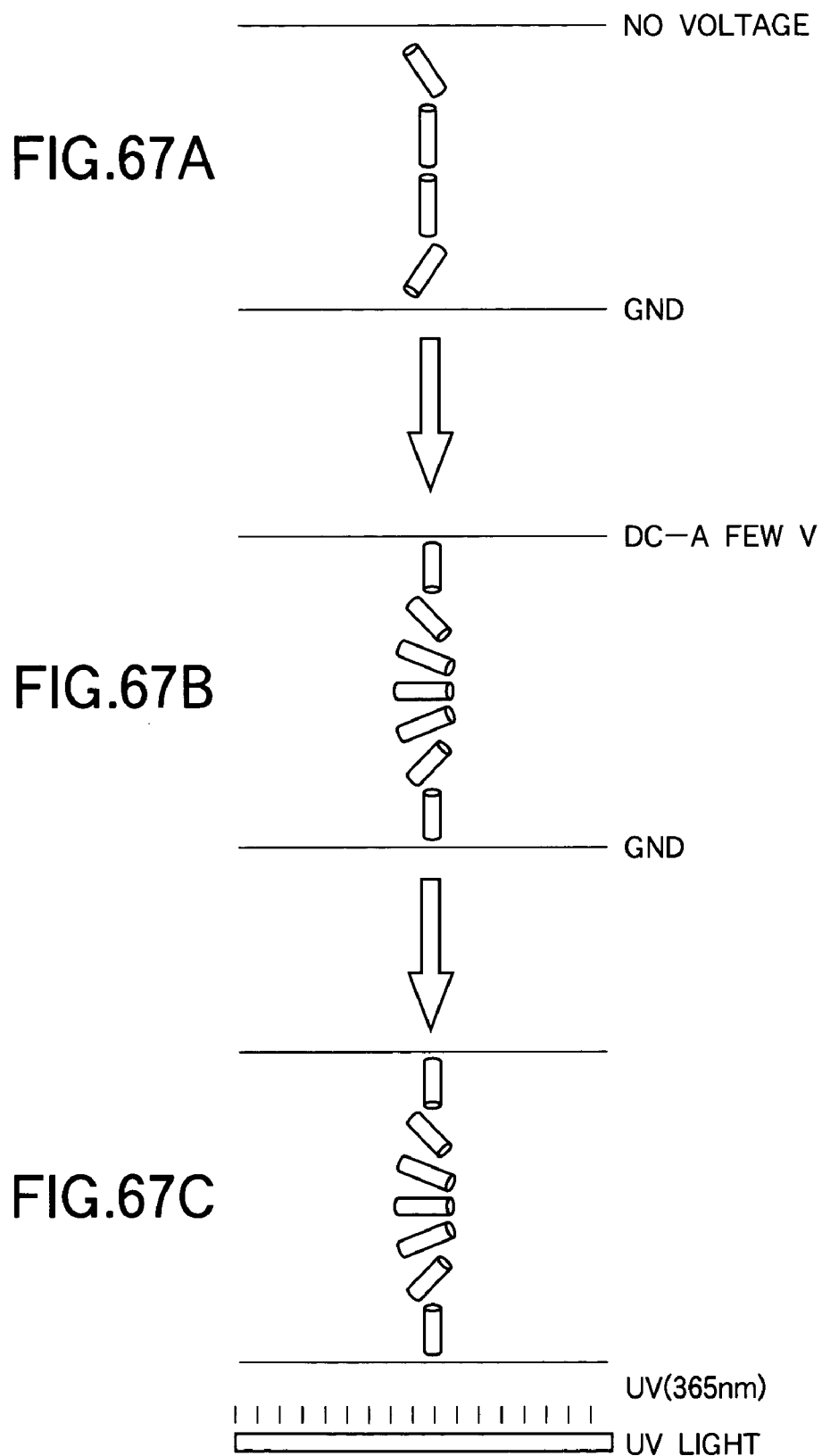
FIGS. 67A through 67C illustrate Example 2 of a liquid crystal display according to the ninth embodiment of the invention.

First, as shown in FIG. 67A, a panel is fabricated by adding UV-curable liquid crystals UCL-001 (Dainippon Ink & Chemicals, Inc.) as the polymer agent to liquid crystals (mj-961214) that are in the bend alignment when no voltage is applied. Then, a voltage of a few volts is applied between the substrates facing each other to align the liquid crystal molecules in the liquid crystal layer in the spray VA alignment, as shown in FIG. 67B. Then, for example, the liquid crystal layer in the spray VA alignment is irradiated with UV light having a wavelength $\lambda=365$ nm to cure the polymer agent, as shown in FIG. 67C. A network of the cured polymer agent is formed in the liquid crystal layer, which makes it possible to maintain the spray VA alignment using a regulating force of the network even when no voltage is applied between the substrates.

Tenth Embodiment

A liquid crystal display according to a tenth embodiment of the invention will now be described with reference to FIGS. 68 through 83. A liquid crystal display according to the present embodiment is characterized in that a wide viewing angle is achieved simply by combining a TN (twisted nematic) liquid crystal panel with an optical compensation film. Specifically, a liquid crystal display according to the present embodiment has a liquid crystal layer in a twisted structure in which the direction of alignment is about 90 deg. different between regions in the vicinity of the upper and lower substrates thereof. Further, the polarizing axes of the polarizing films of the same (the direction in which light is polarized when it is transmitted by the films) are at an angle of about 45 deg. to the direction of alignment of liquid crystals in the vicinity of the lower substrate (the light source side). The polarizing axes of the polarizing films on the upper and lower substrates are substantially in parallel with each other. The three principal refractive indices $n_x$, $n_y$ and $n_z$ of the optical retardation films satisfy $n_x \cong n_y > n_z$; the direction of the principal refractive index $n_x$ is substantially in parallel with the polarizing axes of the polarizers; the direction of the principal refractive index $n_z$ is tilted at a tilt angle $\theta$ from the normal direction of the film surface about the direction of the principal refractive index $n_x$ and, at the same time, the direction of the principal refractive index $n_y$ is tilted at the tilt angle $\theta$ from a direction in parallel with the film surface.

Figure 68:
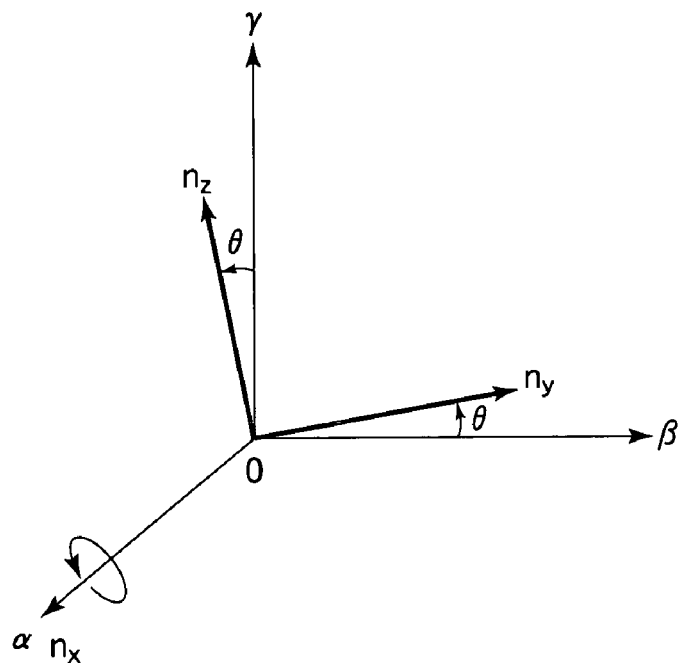
FIG. 68 illustrates disposal of an optical retardation film used in a liquid crystal display according to a tenth embodiment of the invention.

A description will now be made on how a wide viewing angle is achieved in the liquid crystal display having such a configuration. A study was made into conditions for the polarizing films and compensation films to improve the viewing angle characteristics of the TN liquid crystal display through calculations and simulations, and the following conditions were found. First, let us assume that the three principal refractive indices $n_x$, $n_y$ and $n_z$ of the optical retardation films satisfy $n_x \cong n_y > n_z$ in the so-called normally black mode in which the polarizing axes of the upper and lower polarizing films are in parallel with each other. Then, the optical retardation films are provided such that the direction of the principal refractive index $n_z$ is tilted at the tilt angle $\theta$ from the normal direction ($\gamma$-axis) of the film surface and, at the same time, the direction of the principal refractive index $n_y$ of tilted at the angle $\theta$ from the direction ($\beta$-axis) in parallel with the film surface in an $\alpha$-$\beta$-$\gamma$ Cartesian coordinate system, as shown in FIG. 68. It was found that preferable viewing angle characteristics are achieved under conditions as described below.

Figure 69:
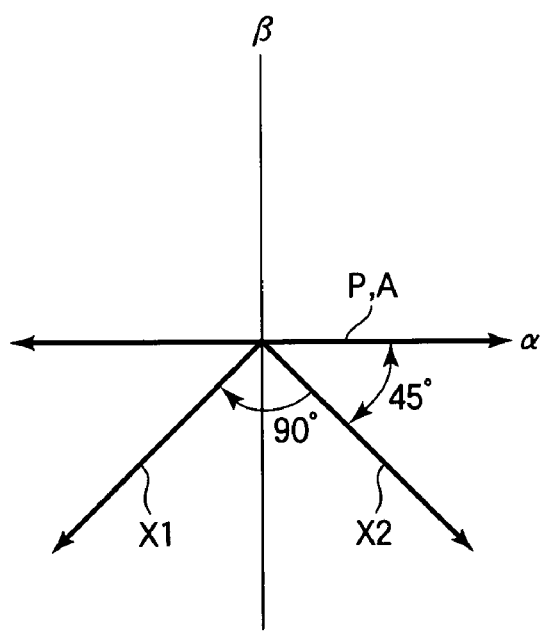
FIG. 69 illustrates the relationship between directions of alignment of liquid crystals and the polarizing axes of polarizing films in the liquid crystal display according to the tenth embodiment of the invention.

Condition (a): The polarizing axes of the polarizing films are tilted at about 45 deg. relative to the direction of alignment of liquid crystals in the vicinity of the substrates adjacent thereto. FIG. 69 shows the $\alpha$-$\beta$ plane as viewed in the direction of the $\gamma$-axis. As shown in FIG. 69, the direction X1 of alignment of liquid crystals in the vicinity of the lower substrate is about 90 deg. different from the direction X2 of alignment of liquid crystals in the vicinity of the upper substrate. The polarizing axes P and A of the two polarizing films which face each other with the upper and lower substrate interposed therebetween are in parallel with each other at an angle of about 45 deg. to the direction X1 of alignment of liquid crystals in the vicinity of the lower substrate and the direction X2 of alignment of liquid crystals in the vicinity of the upper substrate.

Condition (b): The best resolution of the tilt angle $\theta$ shown in FIG. 68 is in a range expressed by 30 deg.$\leq \theta \leq$70 deg.

Condition (c): the retardation $R=(n_x-n_z) \times D$ satisfies 70 nm$\leq R \leq$160 nm where D represents the thickness of the optical layers of the optical retardation films.

Condition (d): The retardation $R_{LC}$ in the liquid crystal panel satisfies 400 nm$\leq R_{LC} \leq$550 nm.

Figure 70:
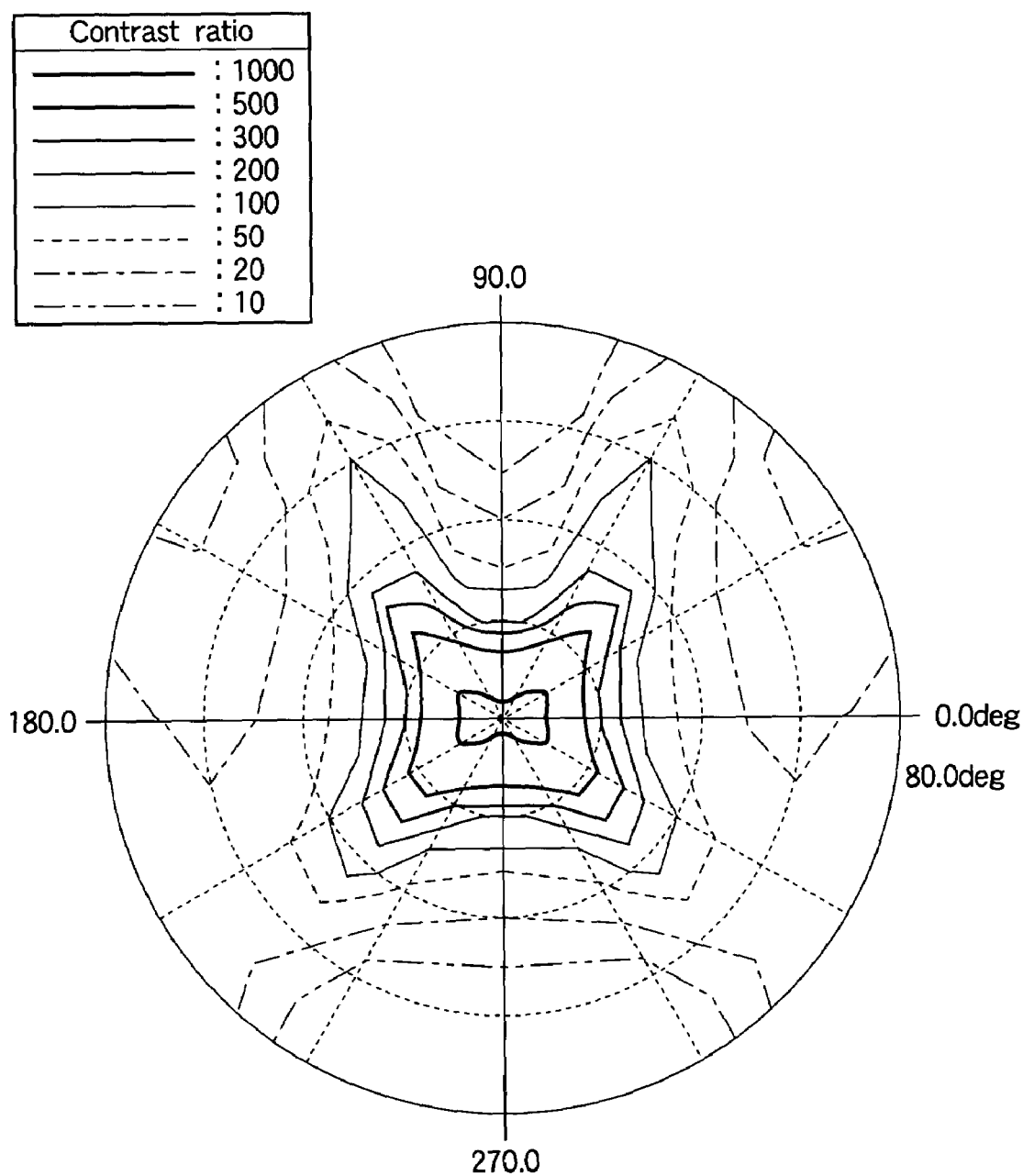
FIG. 70 is a diagram showing viewing angle characteristics of the liquid crystal display according to the tenth embodiment of the invention.

By way of example, FIG. 70 shows the viewing angle characteristics of a liquid crystal display that satisfies the above-described conditions (a) through (d). In the liquid crystal display having the viewing angle characteristics shown in FIG. 70 as an example, tilt angle $\theta$ of the optical retardation films is 45 deg.; the retardation R=120 nm; and the retardation $R_{LC}$ in the liquid crystal panel is 0.47 µm. Each pixel of the liquid crystal panel is subjected to an alignment separating process for aligning the liquid crystals in two different directions. FIG. 70 indicates that a liquid crystal display that satisfies the above-described conditions (a) through (d) has improved viewing angle characteristics.

A description will now be made on effects that occur under the above-described conditions (a) through (d).

Figure 71:
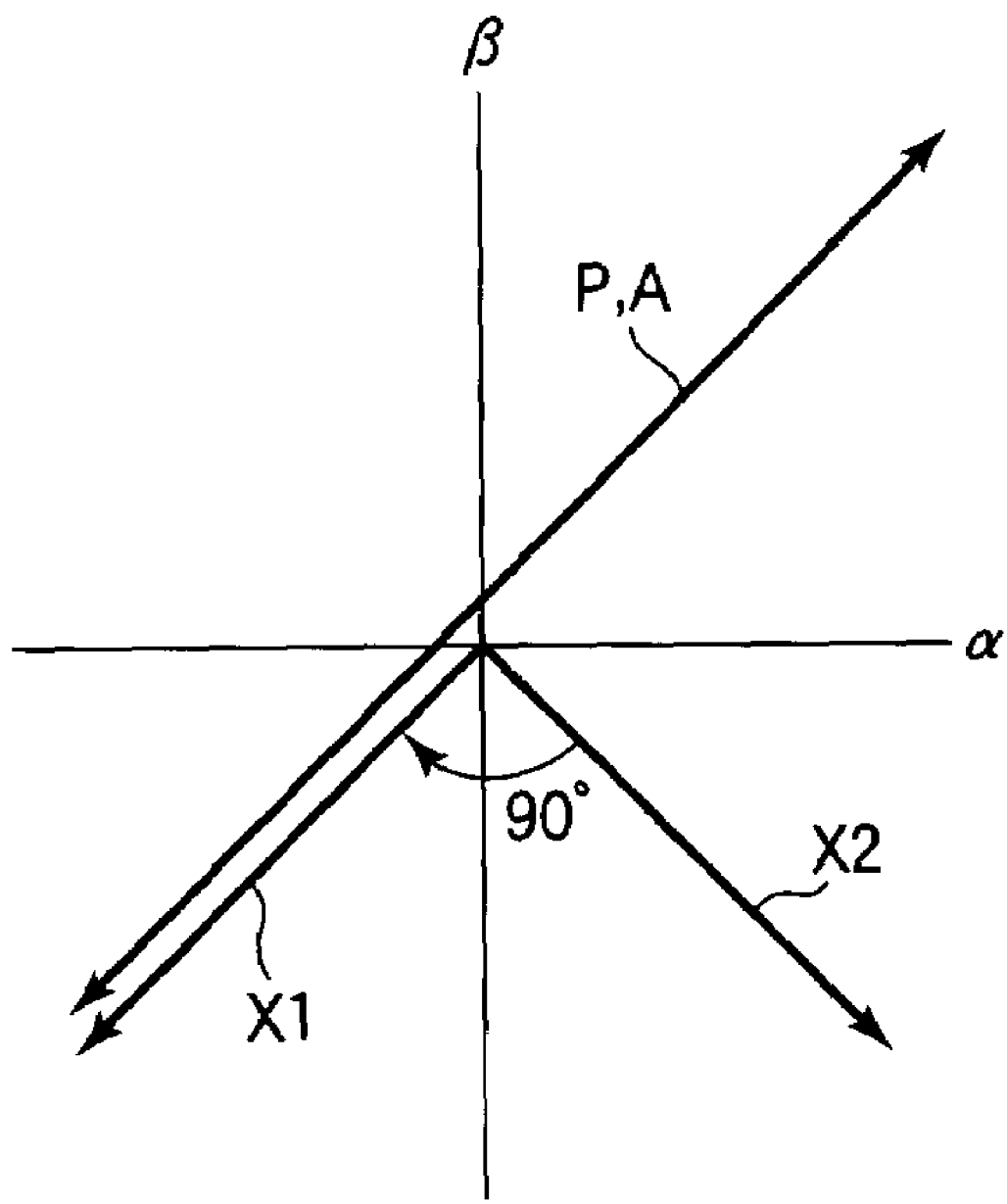
FIG. 71 illustrates the relationship between directions of alignment of liquid crystals and the polarizing axes of polarizing films in a conventional liquid crystal display.

A discussion will be made on a case in which a configuration as shown in FIG. 71 as a comparative example is used instead of the condition (a). FIG. 71 shows the α-β plane as viewed in the direction of the γ-axis. As shown in FIG. 71, the direction X1 of alignment of liquid crystals in the vicinity of the lower substrate is 90 deg. different from the direction X2 of alignment of liquid crystals in the vicinity of the upper substrate; the polarizing axes P and A of the two substrates that face each other with the upper and lower substrates interposed therebetween are in parallel with each other and with the direction X1 of alignment of liquid crystals in the vicinity of the lower substrate and is at an angle of about 90 deg. to the direction X2 of alignment of liquid crystals in the vicinity of the upper substrate. This is a configuration similar to that of a normal TN liquid crystal panel. Such a normal TN liquid crystal panel has low viewing angle characteristics when the screen is viewed from the right and left and in an upward direction as shown in FIG. 72.

Figure 72:
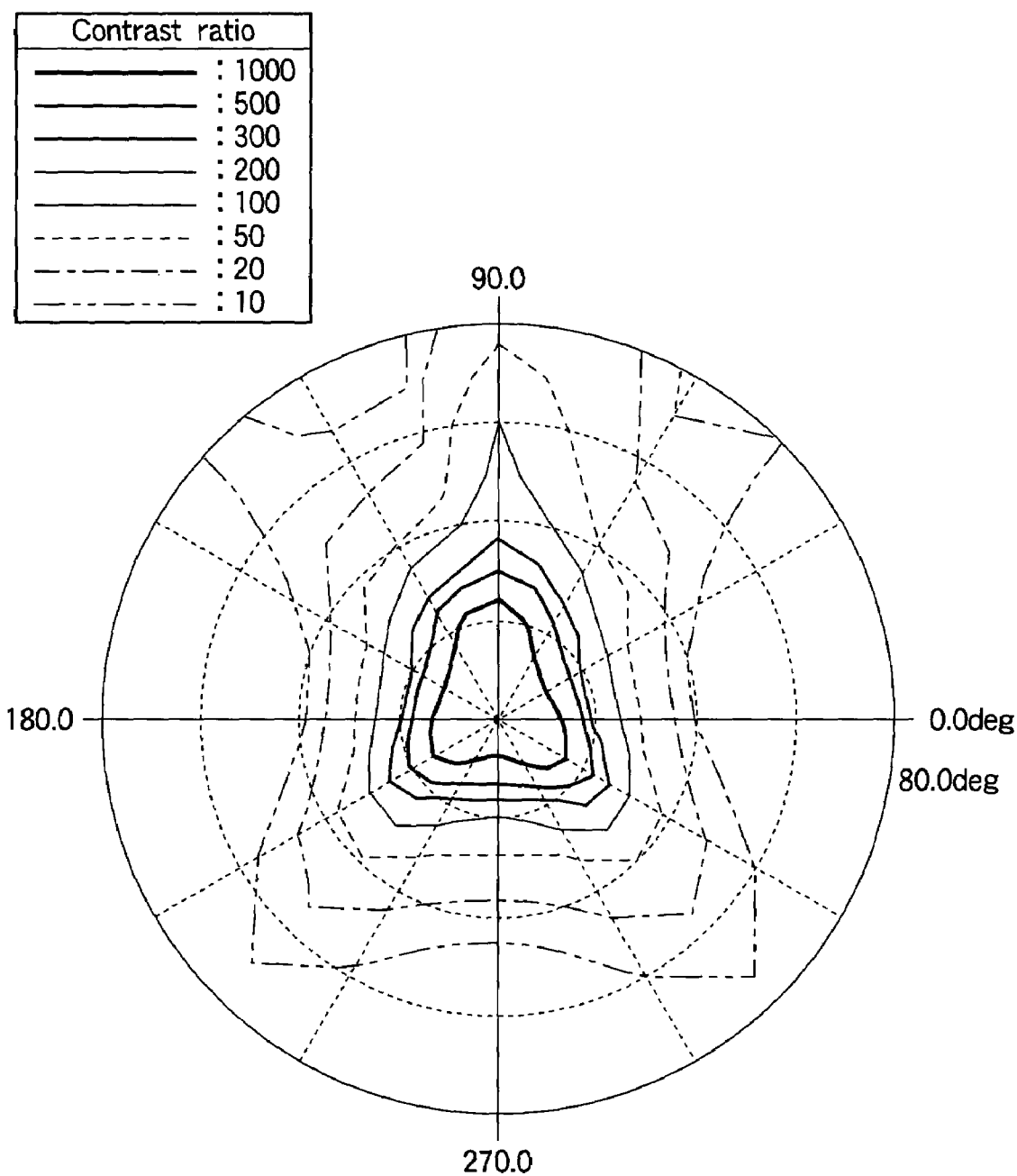
FIG. 72 is another diagram showing viewing angle characteristics of the liquid crystal display according to the tenth embodiment of the invention.
Figure 73:
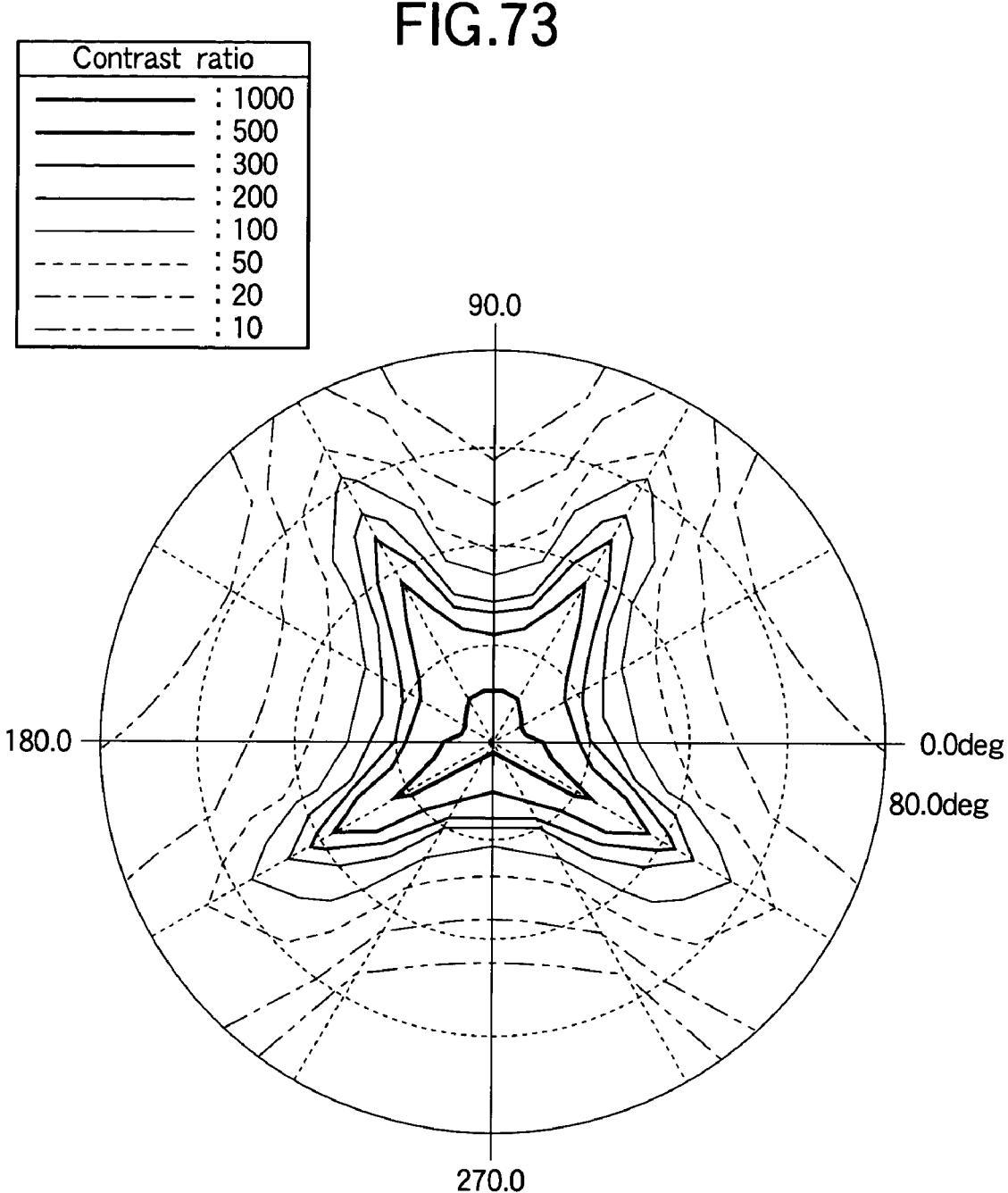
FIG. 73 is a diagram showing viewing angle characteristics of a conventional liquid crystal display.

FIG. 73 shows viewing angle characteristics achieved by a liquid crystal display whose TN liquid crystal panel according to the prior art as shown in FIG. 72 satisfies the condition (a). The liquid crystal panel having viewing angle characteristics shown in FIG. 73 has the same configuration as that of the liquid crystal display whose viewing angle characteristics are shown in FIG. 70 as an example except that the retardation R in the optical retardation films is changed from 120 nm to 100 nm and in that alignment separation is not provided. It is apparent from a comparison between the viewing angle characteristics in FIG. 73 and the viewing angle characteristics of the conventional TN liquid crystal panel shown in FIG. 72 that a wider viewing angle similar to that shown in FIG. 70 is achieved. No preferable viewing angle characteristics are not achieved when the directions of the polarizing axes are set at arbitrary angles other than those shown in FIG. 69.

Figure 74:
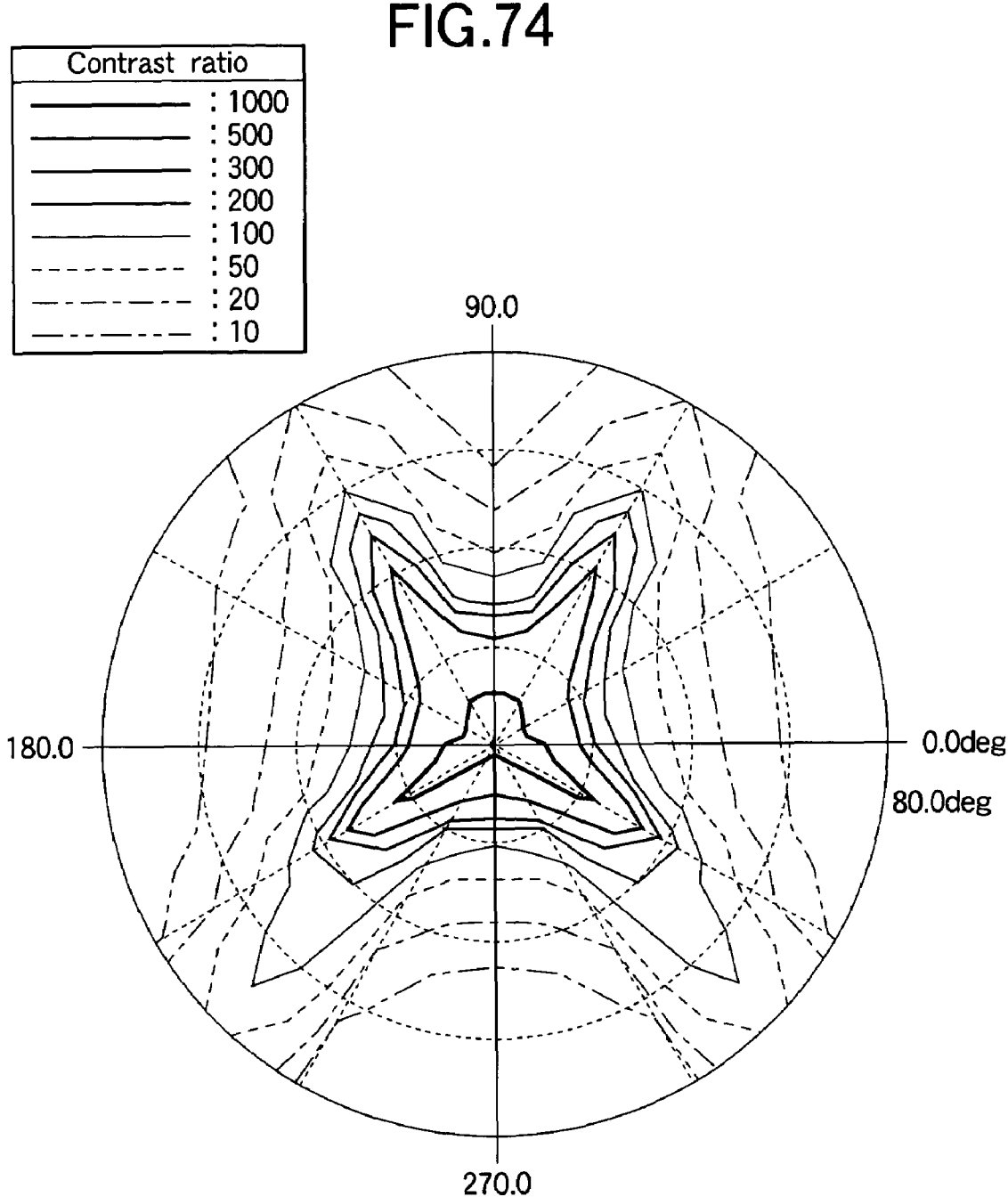
FIG. 74 is a diagram showing viewing angle characteristics achieved on the liquid crystal display according to the tenth embodiment of the invention under a condition (b) at a tilt angle $\theta=30$ deg.
Figure 75:
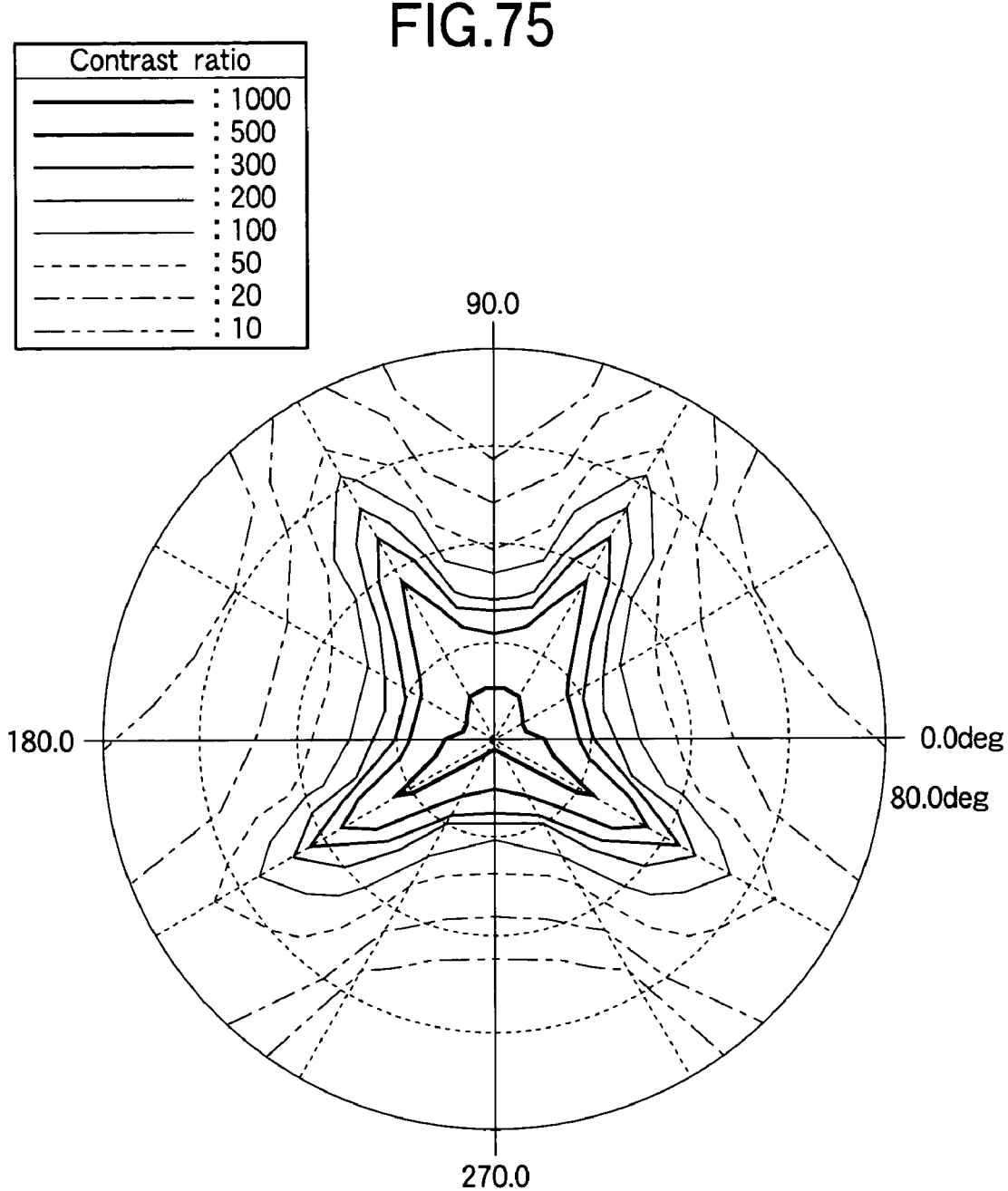
FIG. 75 is a diagram showing viewing angle characteristics achieved on the liquid crystal display according to the tenth embodiment of the invention under the condition (b) at a tilt angle $\theta=45$ deg.
Figure 76:
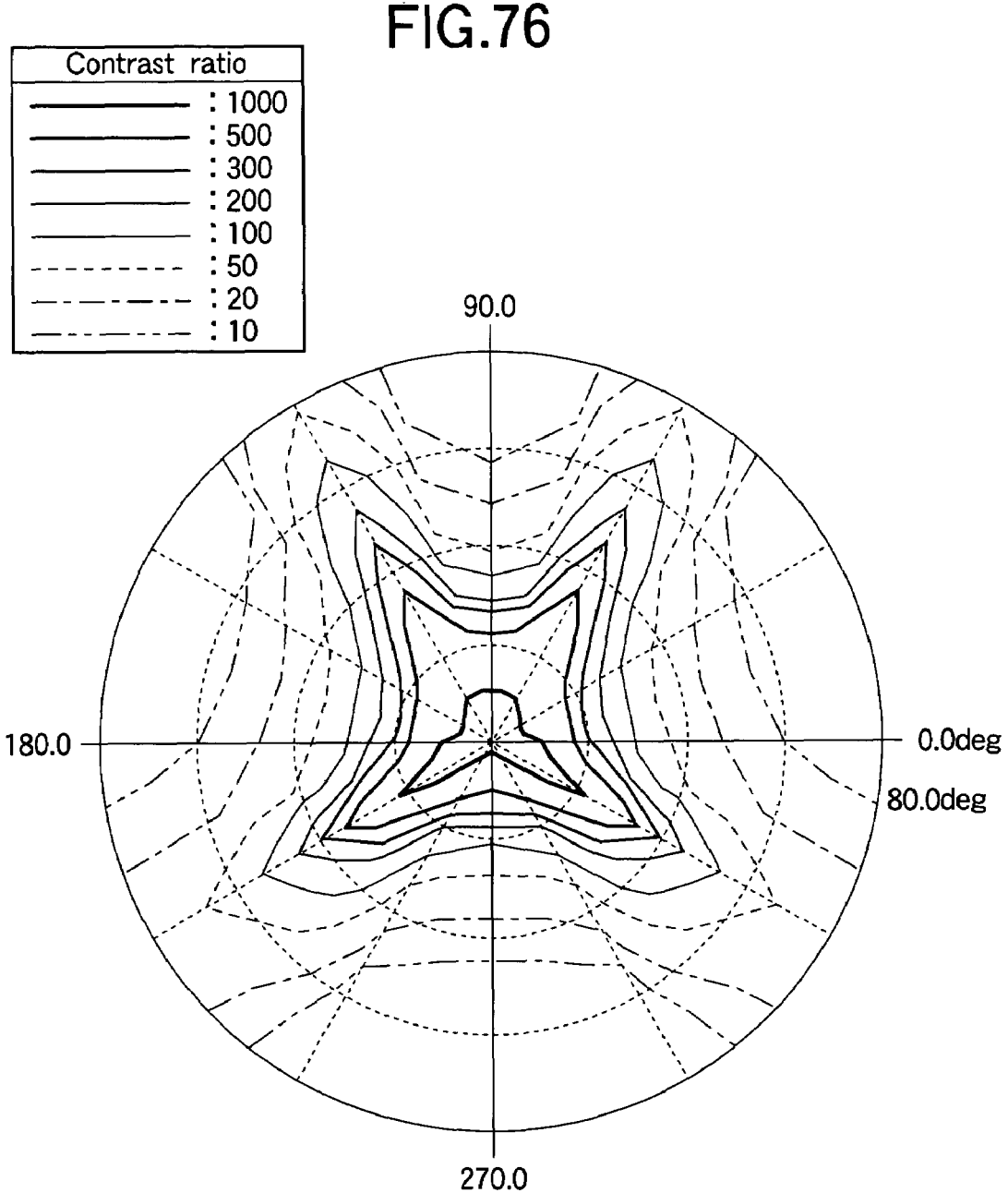
FIG. 76 is a diagram showing viewing angle characteristics achieved on the liquid crystal display according to the tenth embodiment of the invention under the condition (b) at a tilt angle $\theta=60$ deg.
Figure 77:
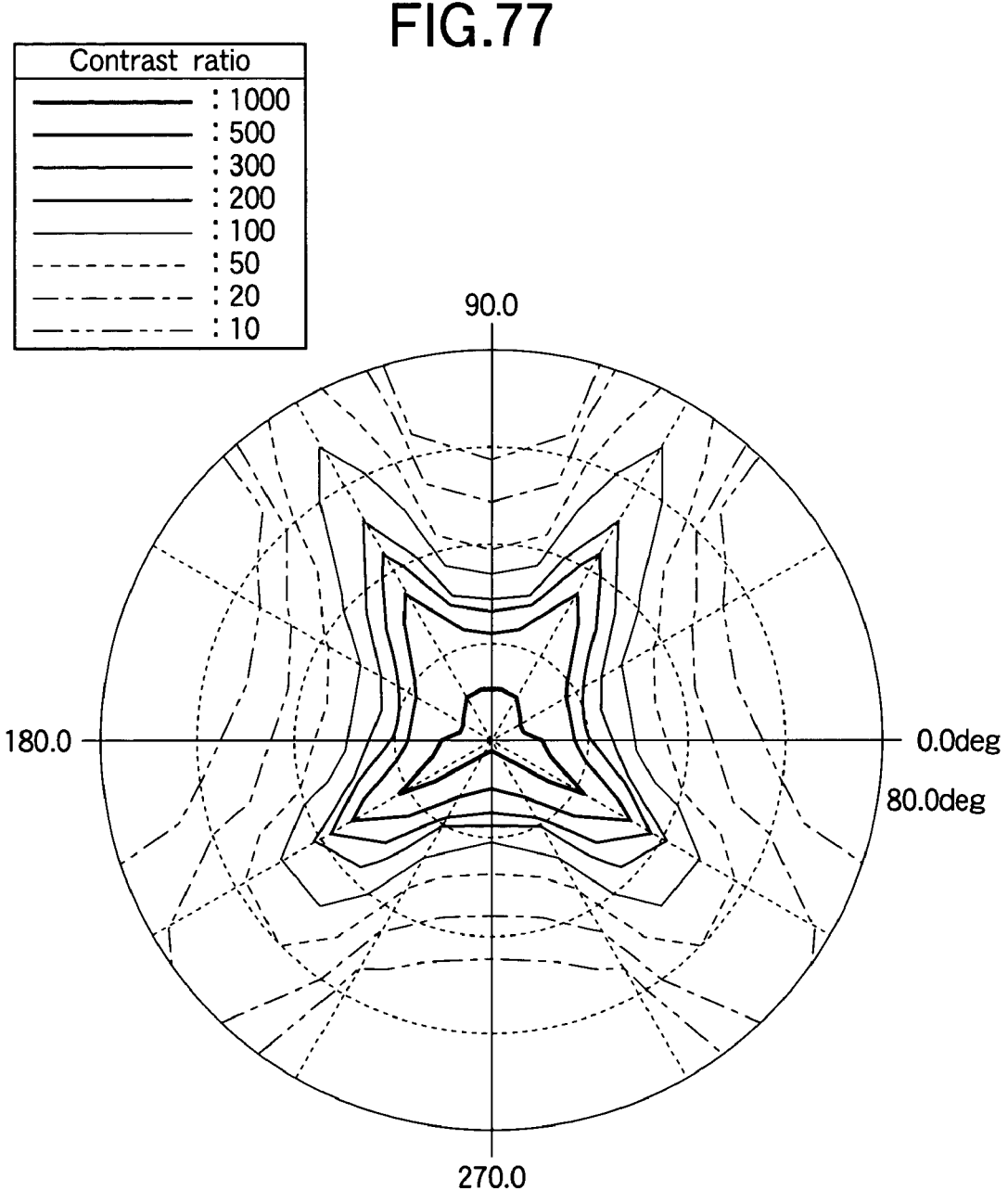
FIG. 77 is a diagram showing viewing angle characteristics achieved on the liquid crystal display according to the tenth embodiment of the invention under the condition (b) at a tilt angle $\theta=70$ deg.

Referring to the condition (b), FIGS. 74 through 77 show changes in viewing angle characteristics that occur when the tilt angle θ is varied. The viewing angle characteristics shown in FIGS. 74 through 77 are achieved with common specifications of the retardation R of the optical retardation films and the retardation $R_{LC}$ in the liquid crystal panel which are 100 nm and 0.47 µm, respectively. FIG. 74 shows a case wherein the tilt angle θ of the optical retardation films is 30 deg. FIG. 75 shows a case wherein the tilt angle θ of the optical retardation films is 45 deg. FIG. 76 shows a case wherein the tilt angle θ of the optical retardation films is 60 deg. FIG. 77 shows a case wherein the tilt angle θ of the optical retardation films is 70 deg.

As apparent from FIGS. 74 through 77, a maximum viewing angle is achieved around the tilt angle θ=45 deg. The characteristics at leftward or rightward viewing angles tend to deteriorate when the tilt angle θ becomes smaller or greater than 45 deg. The deterioration at the leftward and rightward viewing angle characteristics becomes significant at a tilt angle of 30 deg. or less or 70 deg. or more.

Figure 78:
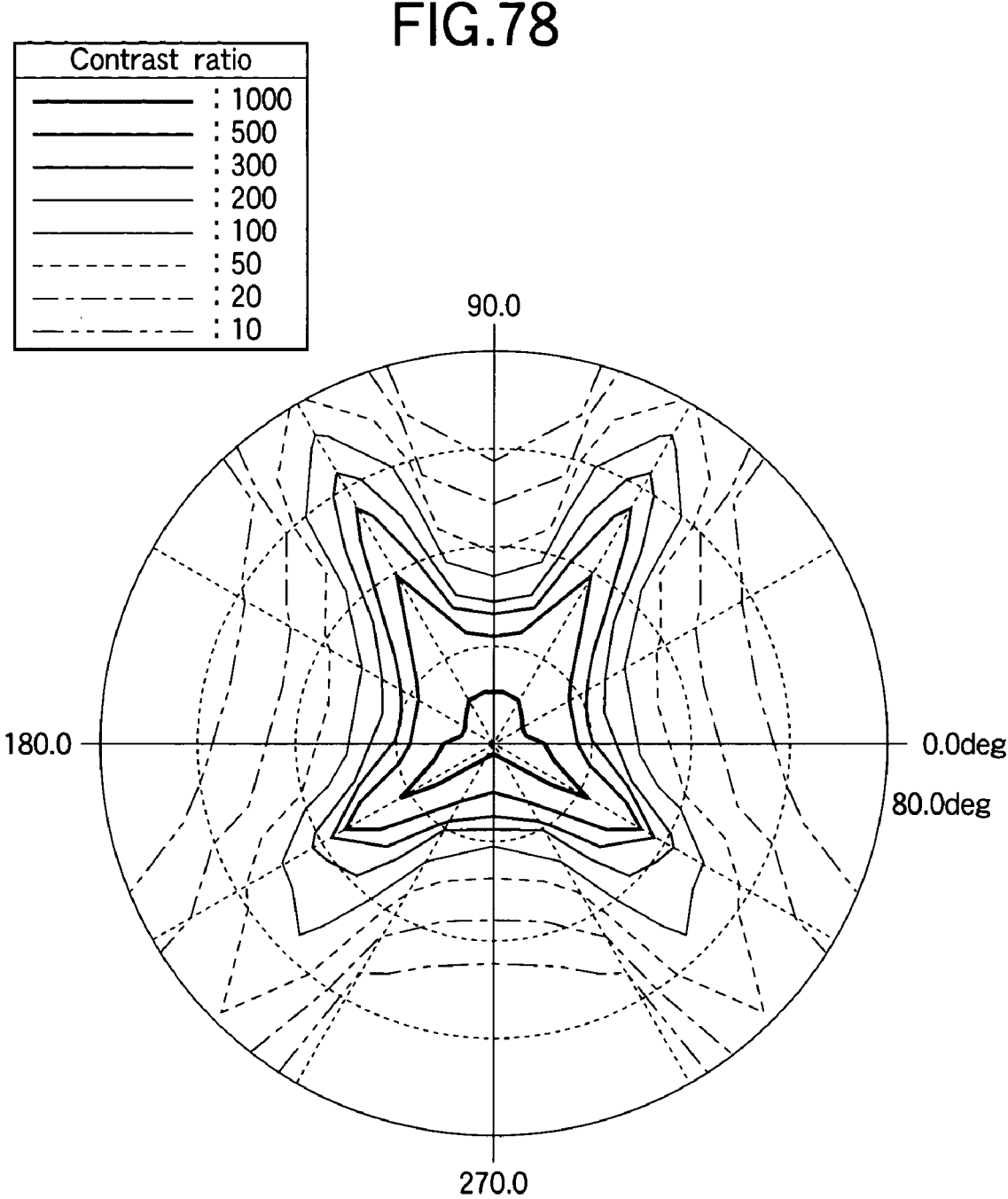
FIG. 78 is a diagram showing viewing angle characteristics achieved on the liquid crystal display according to the tenth embodiment of the invention under a condition (c) with a retardation R in an optical retardation film set at 70 nm.
Figure 79:
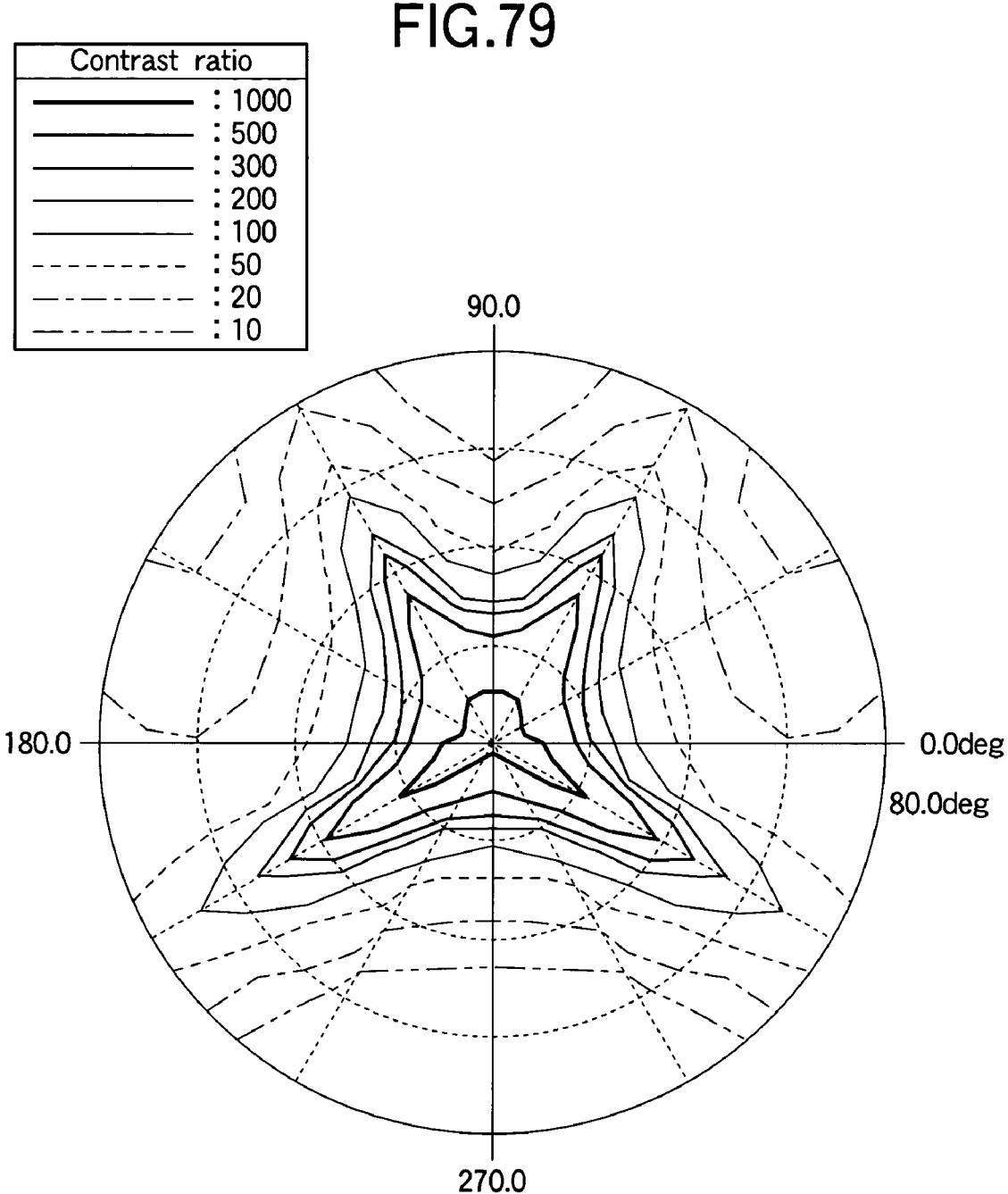
FIG. 79 is a diagram showing viewing angle characteristics achieved on the liquid crystal display according to the tenth embodiment of the invention under the condition (c) with the retardation R in an optical retardation film set at 12 nm.
Figure 80:
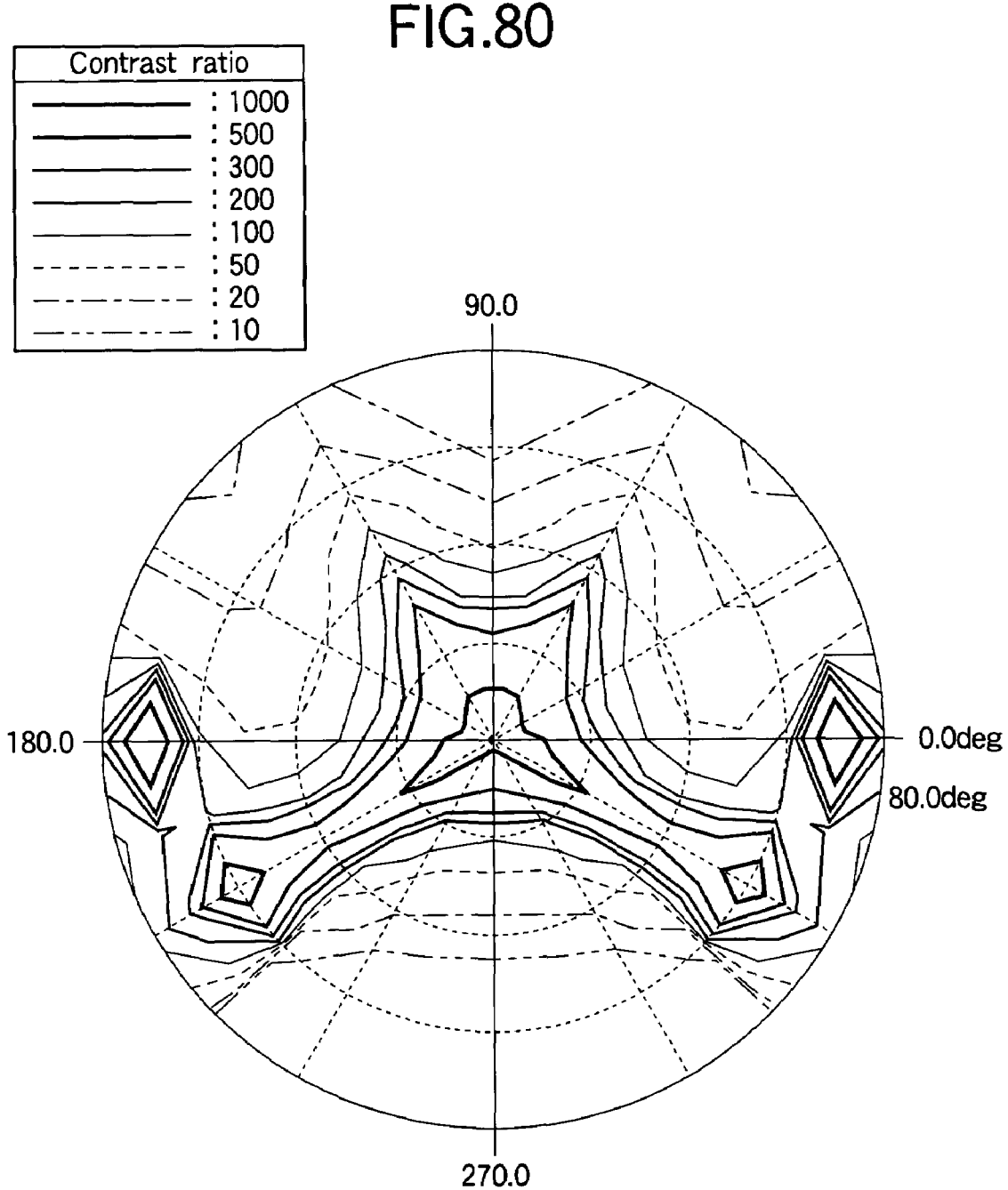
FIG. 80 is a diagram showing viewing angle characteristics achieved on the liquid crystal display according to the tenth embodiment of the invention under the condition (c) with the retardation R in an optical retardation film set at 160 nm.

Referring to the condition (c), FIGS. 78 through 80 show changes in viewing angle characteristics that occur when the retardation R in the optical retardation films is varied. The viewing angle characteristics shown in FIGS. 78 through 80 are achieved with common specifications of the tilt angle θ of the optical retardation films and the retardation $R_{LC}$ in the liquid crystal panel which are 45 deg. and 0.47 m, respectively. FIG. 78 shows a case wherein the retardation R in the optical retardation films is 70 nm. FIG. 79 shows a case wherein the retardation R in the optical retardation films is 120 nm. FIG. 80 shows a case wherein the retardation R in the optical retardation films is 160 nm.

As apparent from FIGS. 78 through 80, the viewing angle characteristics are preferable when R is about 120 nm. The characteristics at upward and downward viewing angles deteriorate when R becomes larger to leave the region around 120 nm, and the characteristics at leftward and rightward viewing angles deteriorate when R becomes smaller to leave the region around 120 nm. That is, an optimum value resides in a range roughly expressed by 70 nm≦R≦160 nm.

Figure 81:
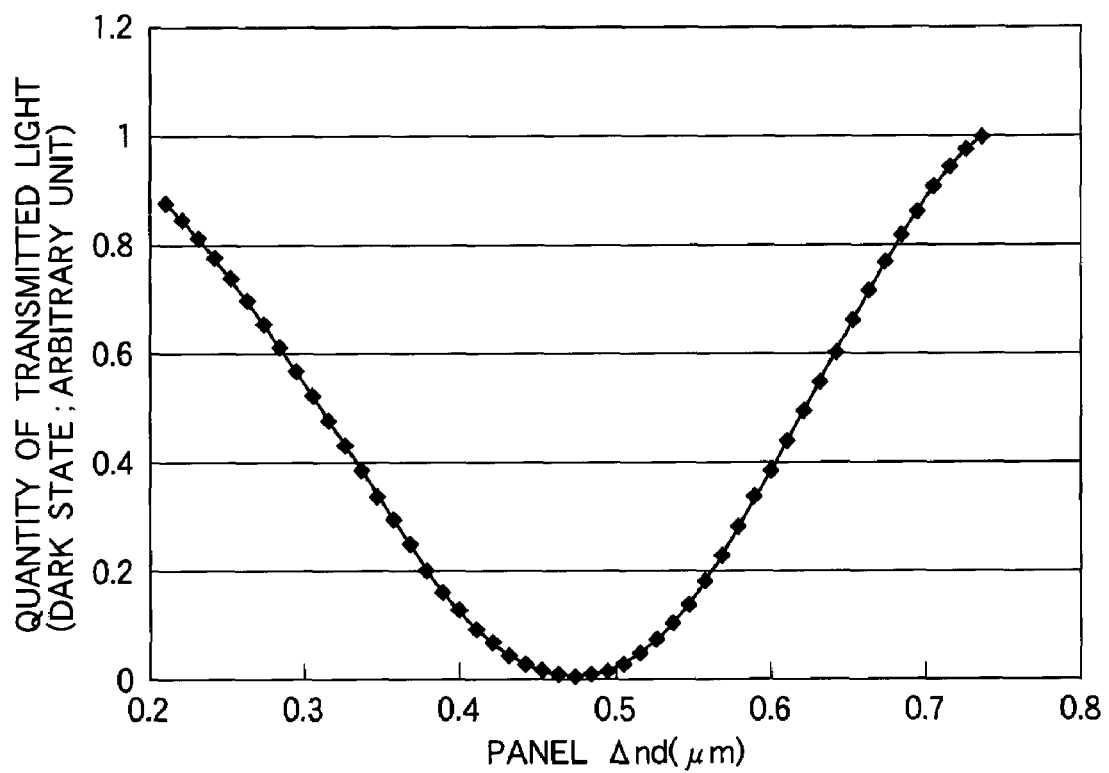
FIG. 81 is a graph on which a retardation $R_{LC}=\Delta nd$ in the liquid crystal panel of the liquid crystal display according to the tenth embodiment of the invention is plotted along the abscissa axis and optical transmittance in a dark state plotted along the ordinate axis to show the relationship between them under a condition (d)

The condition (d) will now be described with reference to FIG. 81. FIG. 81 is a graph on which the retardation of the liquid crystal panel $R_{LC}$=Δnd (Δn represents the anisotropy of refractivity of the liquid crystal material, and d represents the cell gap) is plotted along the abscissa axis and optical transmittance in a dark state is plotted along the ordinate axis to show a relationship between them. The data shown on the graph of FIG. 81 were taken using optical retardation films having a tilt angle θ of 45 deg. and a retardation R of 100 nm. Frontal contrast changes in response to changes in the retardation $R_{LC}$ in the liquid crystal panel, and this is because the optical transmittance in a dark state changes as a result of changes in the retardation $R_{LC}$. FIG. 81 indicates that an optimum value of the retardation $R_{LC}$ in the liquid crystal panel resides around 480 nm. At least, it must be set within a range expressed by 400 nm≦$R_{LC}$≦550 nm.

Figure 82:
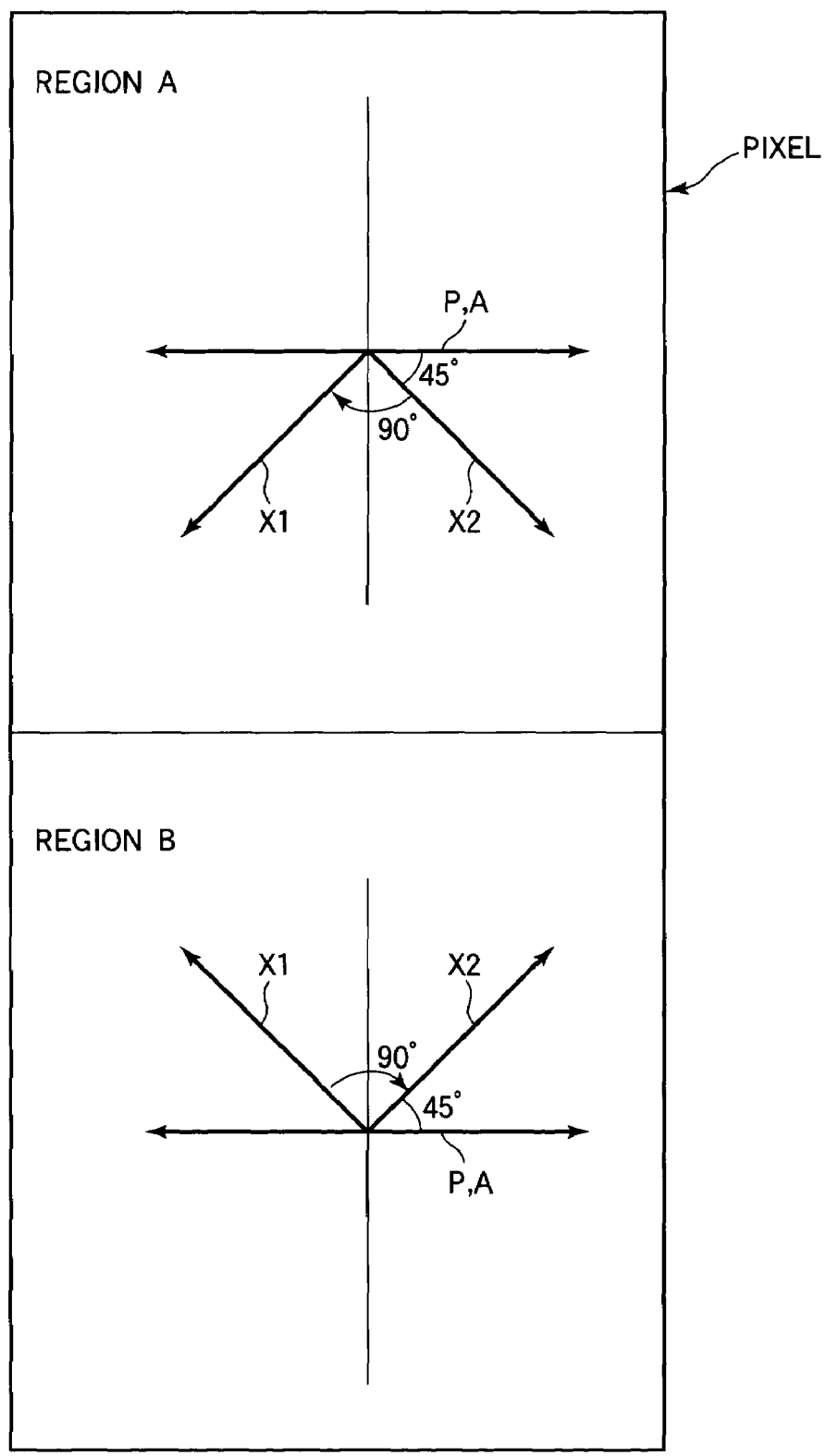
FIG. 82 illustrates alignment separation in the liquid crystal display according to the tenth embodiment of the invention.

As shown in FIG. 82, when the liquid crystal layer in each pixel is divided into two regions A and B having substantially equal areas and alignment separation is performed such that liquid crystals in those regions are aligned indirections 180 deg. different from each other, it is possible to significantly improve viewing angle characteristics of contrast and halftone display characteristics.

Figure 83:
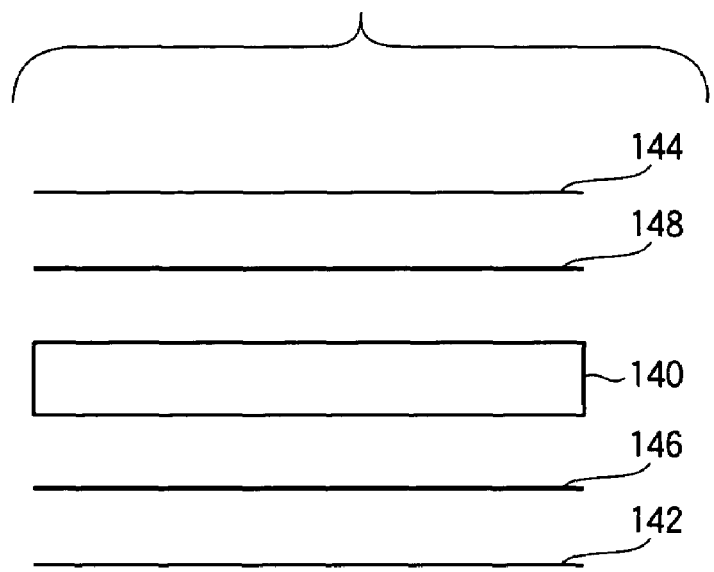
FIG. 83 shows an example of a liquid crystal display according to the tenth embodiment of the invention.

An example of a liquid crystal display according to the present embodiment will now be described with reference to FIG. 83. FIG. 83 shows a sectional configuration of the liquid crystal display. In the liquid crystal display shown in FIG. 83, polarizing films 142 and 144 are respectively provided on both of two substrates in a face-to-face relationship for sealing liquid crystals to form a liquid crystal panel 140, and optical retardation films 146 and 148 are respectively provided between the liquid crystal panel 140 and the polarizers 142 and 144. The optical retardation films 146 and 148 have a tilt angle θ of 45 deg. and a retardation R of 120 nm. The liquid crystal panel 140 is an active matrix LCD utilizing 640×480 pixels of TFTs (thin film transistors) as switching elements in which nematic liquid crystals at a twist of 90 deg. are sealed in a cell gap of 4.5 µm. The liquid crystal material used is a fluorine type liquid crystal having anisotropy of refractivity Δn of 0.105 and a relative dielectric constant Δ∈ of 8.2, and SE7792 (Nissan Chemical Industries, Ltd.) is used as the material for alignment films on the surfaces of the two substrates of the liquid crystal panel 140 on the sides thereof toward the liquid crystals.

Measurement on the viewing angle characteristics of the liquid crystal display of the present example indicated that a wide viewing angle could be achieved at which contrast of 10 was achieved in the range from +55 deg. to −50 deg. in upward and downward directions and at ±80 deg. or more in leftward and rightward directions. Further, when the liquid crystal display was configured using a liquid crystal panel 140 which had been subjected to an alignment separating process by rubbing one half of each pixel while masking the other half of the pixel with a resist, there was an advantage not only in that a wide viewing angle could be achieved at which contrast of 10 was achieved in the range from +55 deg. to −50 deg. in upward and downward directions and at ±80 deg. or more in leftward and rightward directions but also in that excellent performance was achieved in displaying halftones during gray scale display.

In a comparative example in which liquid crystal molecules were at a normal twist of 90 deg. and in which no compensation film was provided, contrast of 10 was achieved only in the range from +24 deg. to −50 deg. in upward and downward directions and in the range from +38 deg. to −38 deg. in leftward and rightward directions.

Eleventh Embodiment

A liquid crystal display according to an eleventh embodiment will now be described with reference to FIGS. 84 through 93. The liquid crystal display of the present embodiment is characterized in that a wide viewing angle can be achieved only by combining a TN liquid crystal panel with optical retardation films. Specifically, a liquid crystal display of the present embodiment has a liquid crystal layer in a twisted structure in which the directions of alignment in the vicinity of the lower and lower substrates are twisted at an angle less than 90 deg. At least one optical retardation film having three principal refractive indices $n_x$, $n_y$ and $n_z$ that satisfy $n_x \cong n_y > n_z$ is provided between polarizing films and glass substrates where the z-axis extends in the direction of the thickness of the film.

Further, at least two uniaxial films are provided between the polarizing films and glass substrates, and the optic axis of at least one of the uniaxial films coincides with the absorption axis or transmission axis of the polarizing film at the exit side.

Obviously, an alignment separating process may be performed to divide the liquid crystal layer in each pixel into two regions having substantially equal areas.

It was found that wide viewing angle characteristics can be achieved in the liquid crystal display having such a configuration as a result of a study made into conditions for the polarizing films and compensation films to improve the viewing angle characteristics of the TN liquid crystal display through calculations and simulations.

Figure 84:
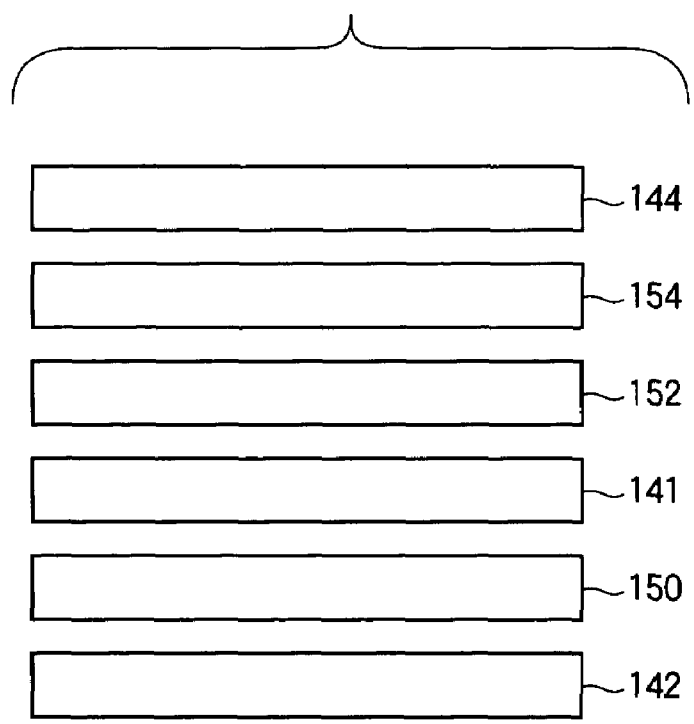
FIG. 84 shows a sectional configuration of a liquid crystal display according to an eleventh embodiment of the invention.

A sectional configuration of the liquid crystal display of the present embodiment will be described with reference to FIG. 84. In the liquid crystal display shown in FIG. 84, polarizing films 142 and 144 are respectively provided on both of two glass substrates in a face-to-face relationship for sealing liquid crystals to form a liquid crystal panel 141. An optical retardation film 150 is provided between the liquid crystal panel 141 and polarizing film 142. Two uniaxial films 152 and 154 are provided between the liquid crystal panel 141 and polarizing film 144.

In this configuration:

(a) The absorption axes of the polarizing films 142 and 144 are orthogonal to each other.

(b) The three principal refractive indices $n_x$, $n_y$ and $n_z$ of the optical retardation film 150 satisfy $n_x \cong n_y > n_z$. A contrast ratio of 10 or more cab be achieve at a viewing angle of 60 deg. or more in the vertical direction when the retardation $R=(n_x-n_z) \times d$ satisfies 70 nm $\leq R \leq$ 200 nm where d represents the thickness of the optical layer.

(c) The twist angle of the TN liquid crystals sealed in the liquid crystal panel 141 is 90 deg. or less and set in the range from 0 deg. to 80 deg., for example.

(d) The luminance of white depends on the retardation $R_{LC}$ in the liquid crystal panel 141, and an optimum value of the retardation depends on the twist angle of the liquid crystals. Preferably, 250 nm $\leq R_{LC} \leq$ 300 nm is satisfied at a twist angle of 0 deg., and 300 nm $\leq R_{LC} \leq$ 350 nm is satisfied at a twist angle of 45 deg.

(e) The uniaxial film 152 has a retardation value as small as 100 nm or less. The uniaxial film 152 is inserted such that its phase-delay axis extends in a direction different from those of the absorption and transmission axes of the polarizing film 144. The uniaxial film 152 is inserted to adjust the liquid crystal driving voltage which can be changed at a direction in a predetermined direction of the phase-delay axis of the uniaxial film 152.

The untiaxial film 152 must have a retardation in the range from 20 to 100 nm to achieve frontal contrast on the level of 1000.

(f) The uniaxial film 154 is inserted such that its phase-delay axis is in parallel with the absorption axis of transmission axis of the polarizing film 144. Viewing angle characteristics can be improved by providing the uniaxial film 154.

(g) In the liquid crystal panel 141, the liquid crystal layer in each pixel is divided into two regions having substantially equal areas to improve halftone characteristics.

A description will now be made with reference to FIGS. 84 through 93 on Examples 1 through 4 of a liquid crystal display according to the present embodiment. The following Examples 1 through 4 are under the same conditions that the liquid crystal layer is made of a fluorine type liquid crystal having anisotropy of refractivity $\Delta n$ of 0.105 and a relative dielectric constant $\Delta \in$ of 8.2; SE7792 (Nissan Chemical Industries, Ltd.) is used for alignment films; and the liquid crystal panel is an active matrix LCD utilizing 640×480 pixels of TFTs as switching elements.

Figure 85:
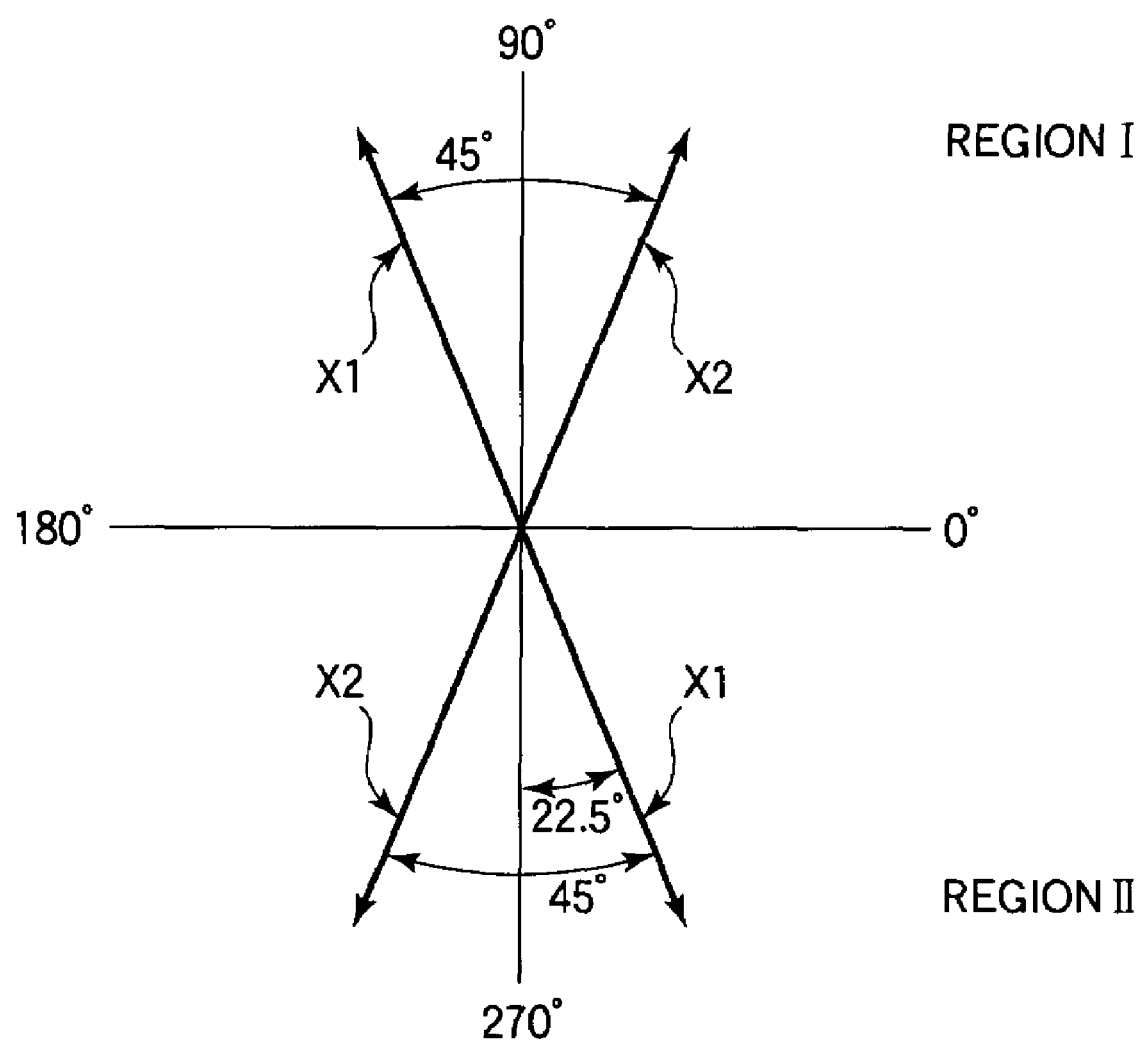
FIG. 85 shows separation of alignment and the direction of alignment of liquid crystal molecules in a pixel of the liquid crystal display according to the eleventh embodiment of the invention.

Example 1 will now be described with reference to FIGS. 84 through 86. In the liquid crystal display shown in FIG. 84 and 85, TN liquid crystal layer sealed in a liquid crystal panel 141 has a twist angle of 45 deg. and a cell gap of 3 µm. As shown in FIG. 85, the liquid crystal layer in each pixel is in separate alignments in regions I and II. In the region I above the horizontal line in the figure, liquid crystal molecules in the vicinity of the lower substrate are aligned in a direction X1 that is rotated at 22.5 deg. counter clockwise about the vertical line, and liquid crystal molecules in the vicinity of the upper substrate are aligned in a direction X2 that is rotated at 22.5 deg. clockwise. Therefore, the twist angle is 45 deg. In the region II in the lower part of the figure, there are alignments in the directions X1 and X2, similarly.

Although not illustrated, the absorption axis of the polarizing film 142 is in a direction at 45 deg., and the absorption axis of the polarizing film 144 is set in a direction at 135 deg. that is orthogonal thereto.

The optical retardation film 150 has a retardation R of 140 nm. The uniaxial film 152 has a retardation of 25 nm, and the phase-delay axis of the same is in a direction at 150 deg. The uniaxial film 154 has a retardation of 160 nm, and the phase-delay axis of the same is in a direction at 45 deg. that is in parallel with the direction of the transmission axis of the polarizing film 144.

Figure 86:
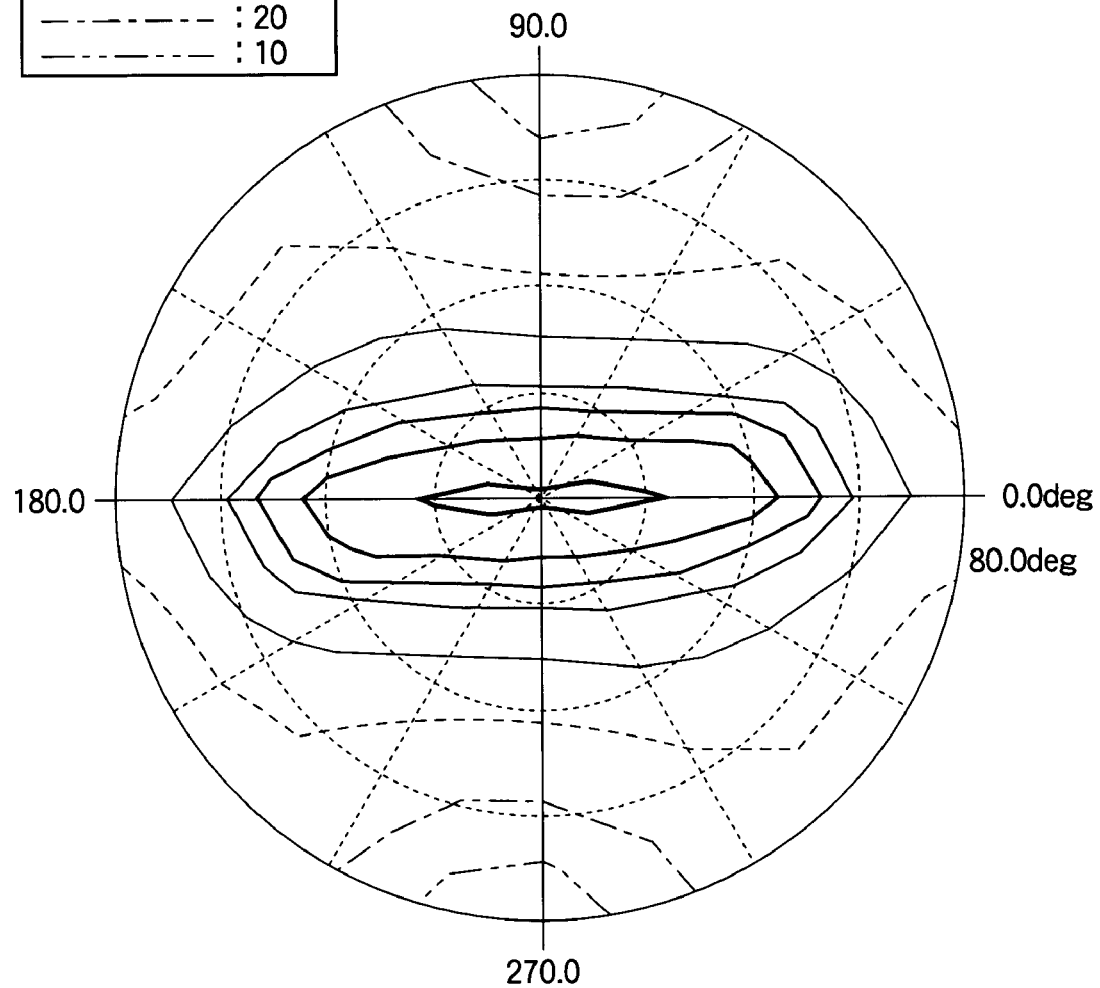
FIG. 86 shows viewing angle characteristics of Example 1 of a liquid crystal display according to the eleventh embodiment of the invention.

FIG. 86 shows viewing angle characteristics measured on the liquid crystal display having the above-described configuration with a liquid crystal driving voltage of 7.5 V applied thereto. Contrast ratios of 10 or less are observed in regions at ±70 deg. in the vertical direction, and preferable viewing angles of 80 deg. or more are achieved in other regions.

Example 2 will now be described with reference to FIG. 84 and FIGS. 87 through 89. In the present example, in a liquid crystal display as shown in FIG. 84, a TN liquid crystal layer sealed in a liquid crystal panel 141 has a twist angle of 45 deg. and a cell gap of 3 µm. The directions of alignment of liquid crystals are the same as those in FIG. 85 described in association with Example 1.

The absorption axis of a polarizing film 142 is in a direction at 45 deg., and the absorption axis of a polarizing film 144 is set in a direction at 135 deg. that is orthogonal to the same.

An optical retardation film 150 has a retardation R of 150 nm, and a uniaxial film 152 has a retardation of 25 nm, and its phase-delay axis is in a direction at 20 deg. A uniaxial film 154 has a retardation of 160 nm, and its phase-delay axis is in a direction at 45 deg. that is in parallel with the direction of the transmission axis of the polarizing film 144.

Figure 87:
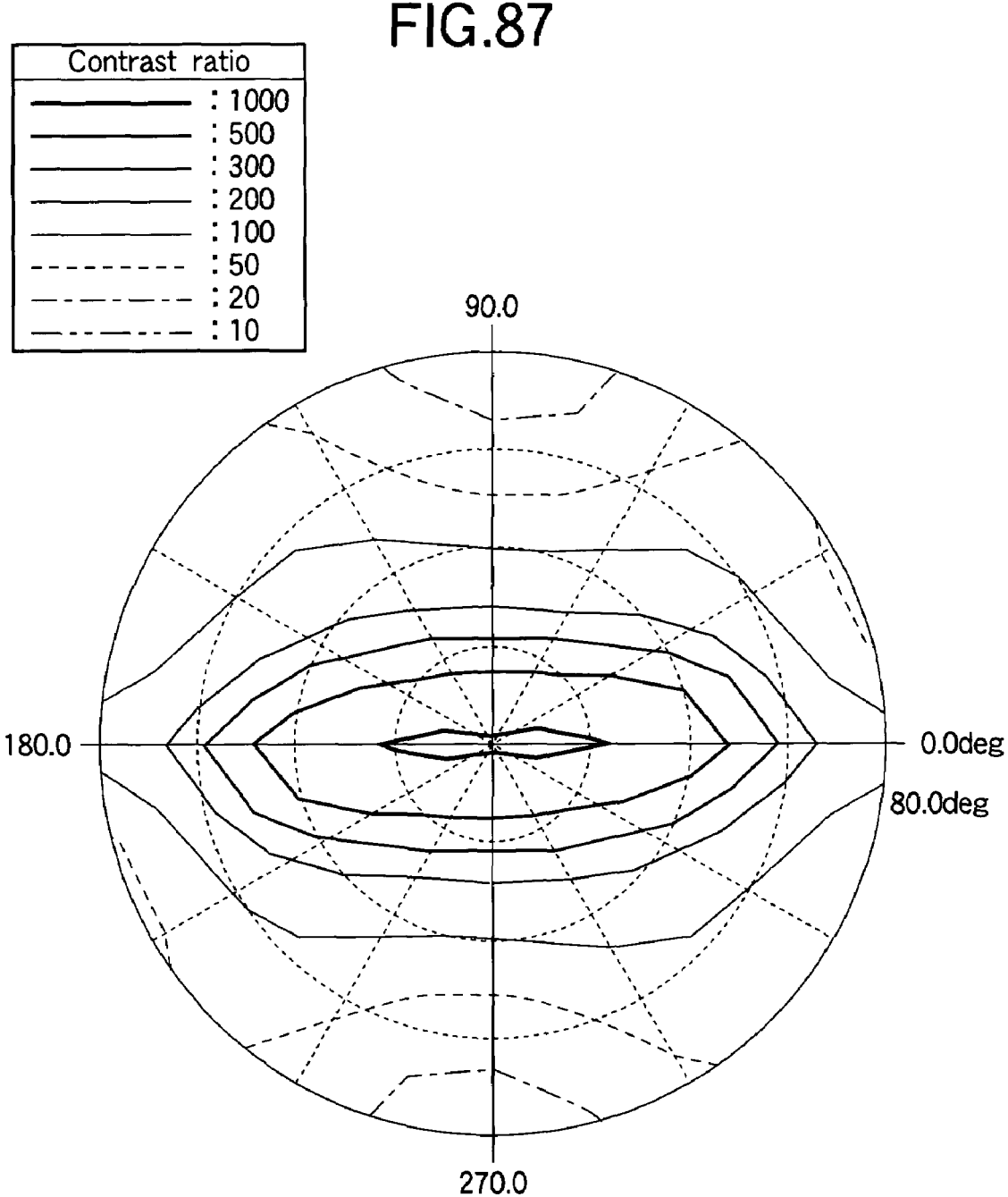
FIG. 87 shows viewing angle characteristics of Example 2 of a liquid crystal display according to the eleventh embodiment of the invention.

FIG. 87 shows viewing angle characteristics measured on the liquid crystal display having the above-described configuration when a liquid crystal driving voltage of 10 V is applied thereto. Preferable viewing angle characteristics are achieved in that regions having contrast ratios of 10 or less are at viewing angles of 80 deg. or more in all directions.

Figure 88:
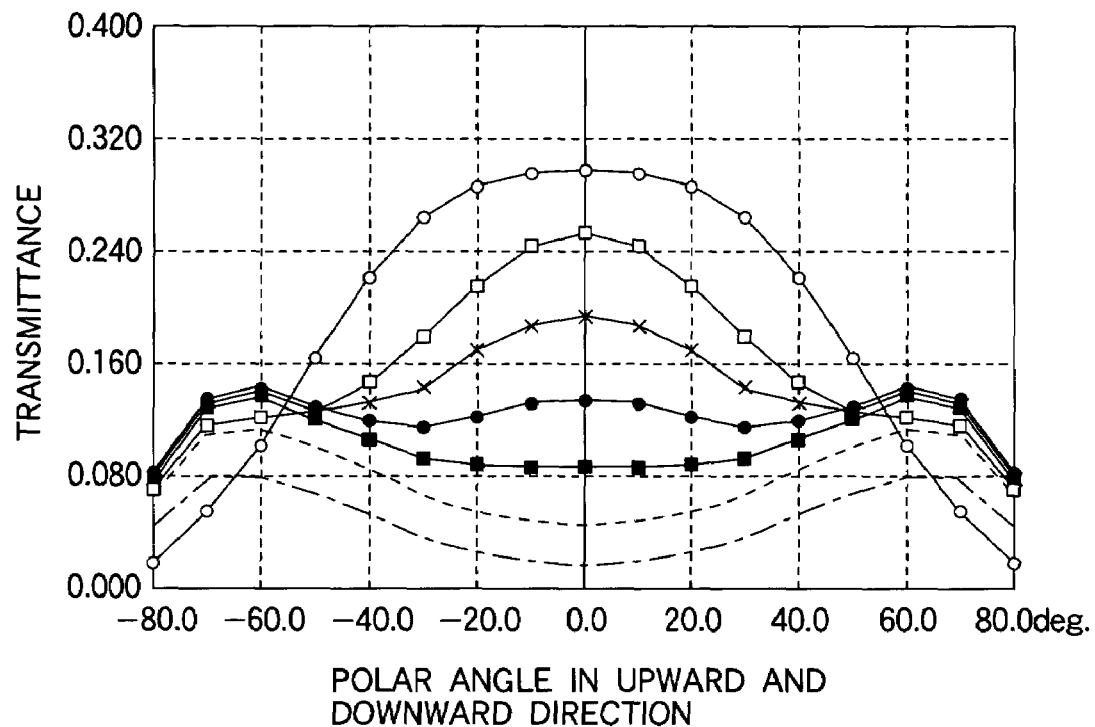
FIG. 88 shows halftone display characteristics (in upward and downward directions) of Example 2 of a liquid crystal display according to the eleventh embodiment of the invention.
Figure 89:
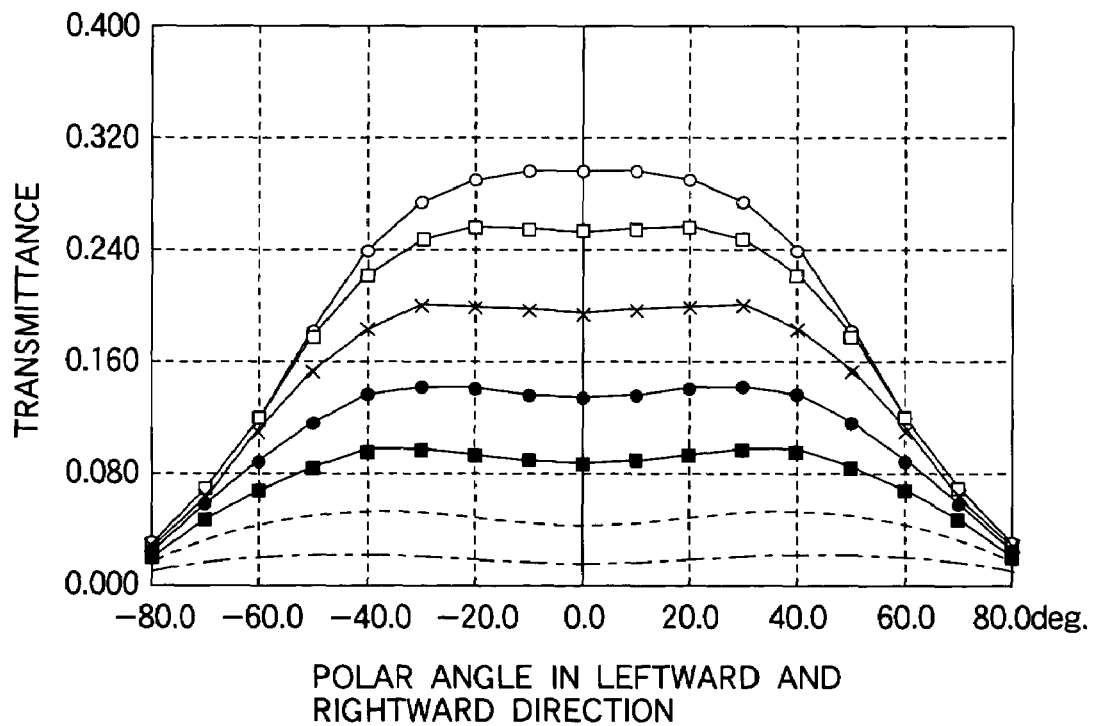
FIG. 89 shows halftone display characteristics (in leftward and rightward directions) of Example 2 of a liquid crystal display according to the eleventh embodiment of the invention.
Figure 90:
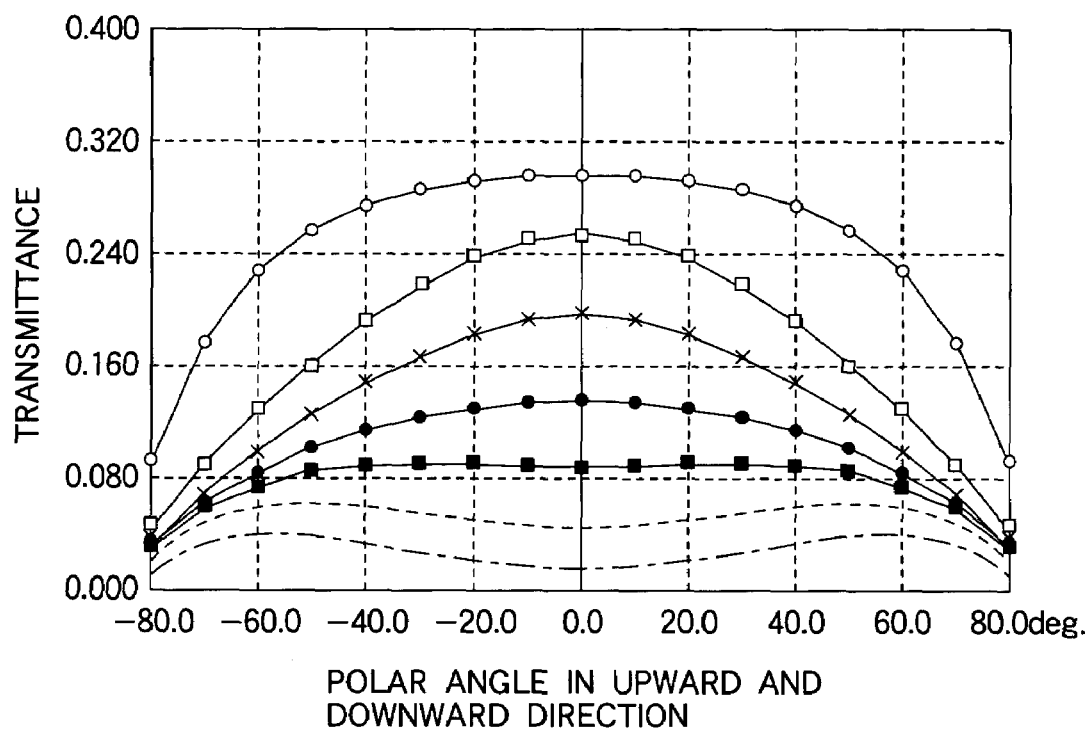
FIG. 90 shows improved halftone display characteristics (in upward and downward directions) of Example 2 of a liquid crystal display according to the eleventh embodiment of the invention.
Figure 91:
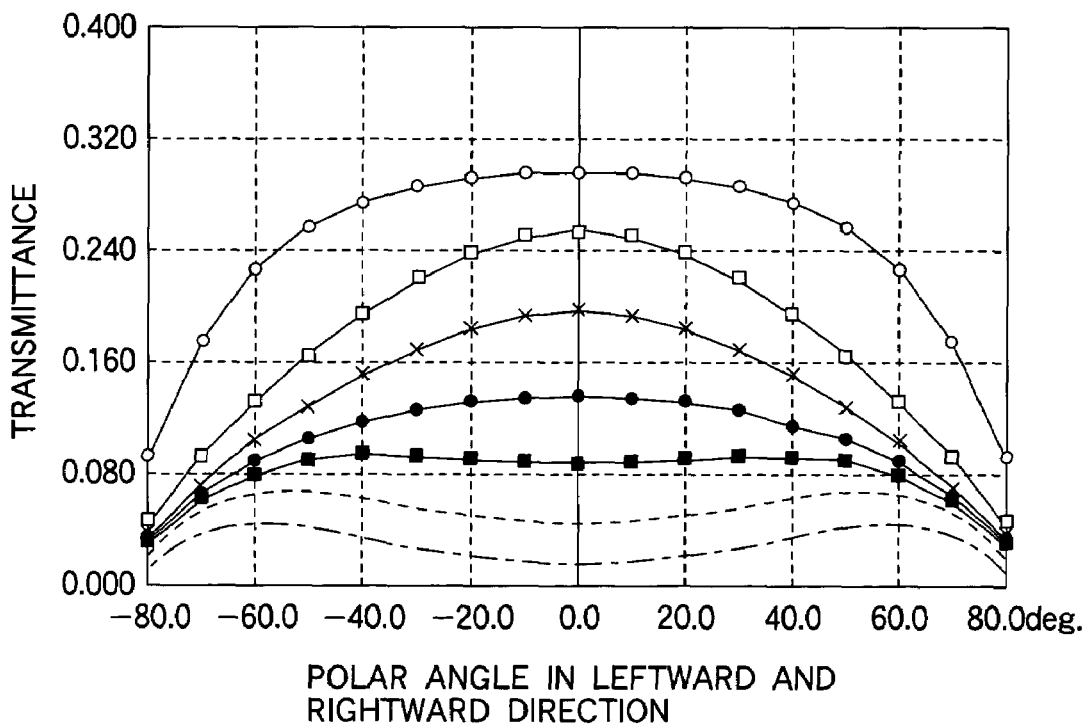
FIG. 91 shows improved halftone display characteristics (in leftward and rightward directions) of Example 2 of a liquid crystal display according to the eleventh embodiment of the invention.

FIG. 88 shows halftone characteristics when viewed in upward and downward directions, and FIG. 89 shows halftone characteristics when viewed in rightward and leftward directions. In FIGS. 88 and 89, polar angles (tilt angles) are plotted along the abscissa axis, and transmittance is plotted along the ordinate axis. The liquid crystal display of this example also displays halftones preferably because an alignment separation process is provided. However, the tone display characteristics in upward and downward directions in FIG. 88 indicates that deterioration of halftone characteristics occurs due to tone inversion at polar angles in the excess of ±50 deg. FIGS. 90 and 91 show halftone characteristics measured with the panel as a whole rotated at 45 deg. about the normal of the substrate surface to change a direction at 45 deg. in the initial state to a vertical direction and to change a direction at 135 deg. to a horizontal direction. In FIGS. 90 and 91, polar angles (tilt angles) are plotted along the abscissa axis, and transmittance is plotted along the ordinate axis. As apparent from FIGS. 90 and 91, tone inversion does not occur in any region at a viewing angle of ±80 deg., which indicates improvement of halftone characteristics in the directions of vertical and horizontal axes that are most important factors in evaluation of halftone characteristics.

Figure 92:
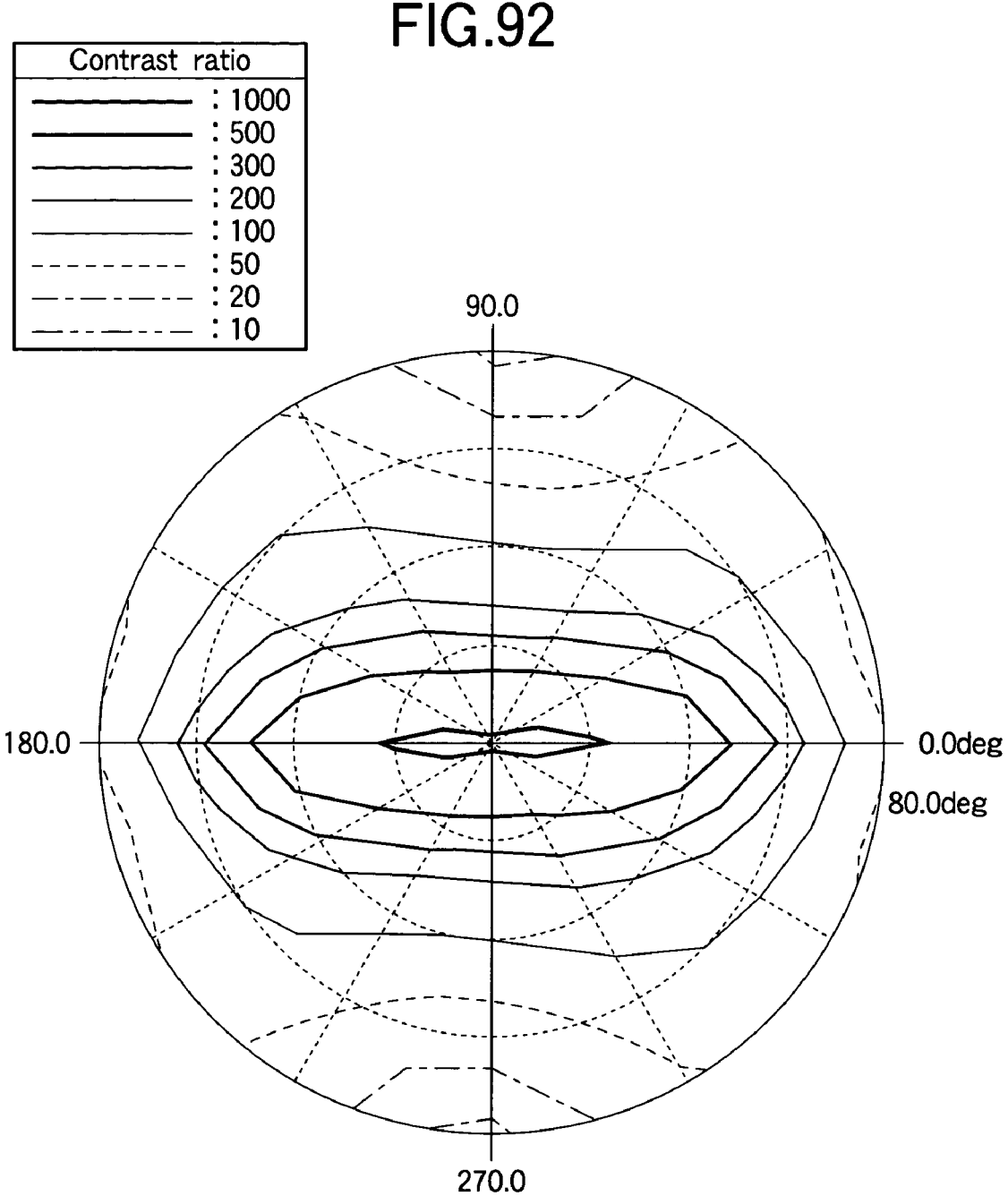
FIG. 92 shows viewing angle characteristics of Example 3 of a liquid crystal display according to the eleventh embodiment of the invention.

Example 3 will now be described with reference to FIGS. 84 and 92. In a liquid crystal display as shown in FIG. 84, a liquid crystal layer sealed in a liquid crystal panel 141 has a twist angle of 0 deg. and a cell gap of 2.6 µm. The direction of alignment of liquid crystals is the direction of connecting 90 deg. and 270 deg. in FIG. 85 associated with Example 1.

The absorption axis of a polarizing film 142 is in a direction at 45 deg., and the absorption axis of a polarizing film 144 is set in a direction at 135 deg. that is orthogonal to the same. A VAC film is used as an optical retardation film 150. The VAC film has a retardation R of 140 nm. A uniaxial film 152 has a retardation of 25 nm, and its phase-delay axis is in a direction at 30 deg. A uniaxial film 154 has a retardation of 120 nm, and its phase-delay axis is in a direction at 45 deg. that is in parallel with the direction of the transmission axis of the polarizing film 144.

FIG. 87 shows viewing angle characteristics measured on the liquid crystal display having the above-described configuration when a liquid crystal driving voltage of 10 V is applied thereto. Preferable viewing angle characteristics are achieved in that regions having contrast ratios of 10 or less are at viewing angles of 80 deg. or more in all directions.

Example 4 will now be described with reference to FIGS. 84 and 93. In a liquid crystal display as shown in FIG. 84, a liquid crystal layer sealed in a liquid crystal panel 141 has a twist angle of 60 deg. and a cell gap of 3.3 µm. The direction of alignment of liquid crystals is directions X1 and X2 each of which is at an angle of 30 deg. to the vertical line in FIG. 85 associated with Example 1.

The absorption axis of a polarizing film 142 is in a direction at 45 deg., and the absorption axis of a polarizing film 144 is set in a direction at 135 deg. that is orthogonal to the same. An optical retardation film 150 has a retardation R of 180 nm. A uniaxial film 152 has a retardation of 25 nm, and its phase-delay axis is in a direction at 145 deg. A uniaxial film 154 has a retardation of 160 nm, and its phase-delay axis is in a direction at 45 deg. that is in parallel with the direction of the transmission axis of the polarizing film 144.

Figure 93:
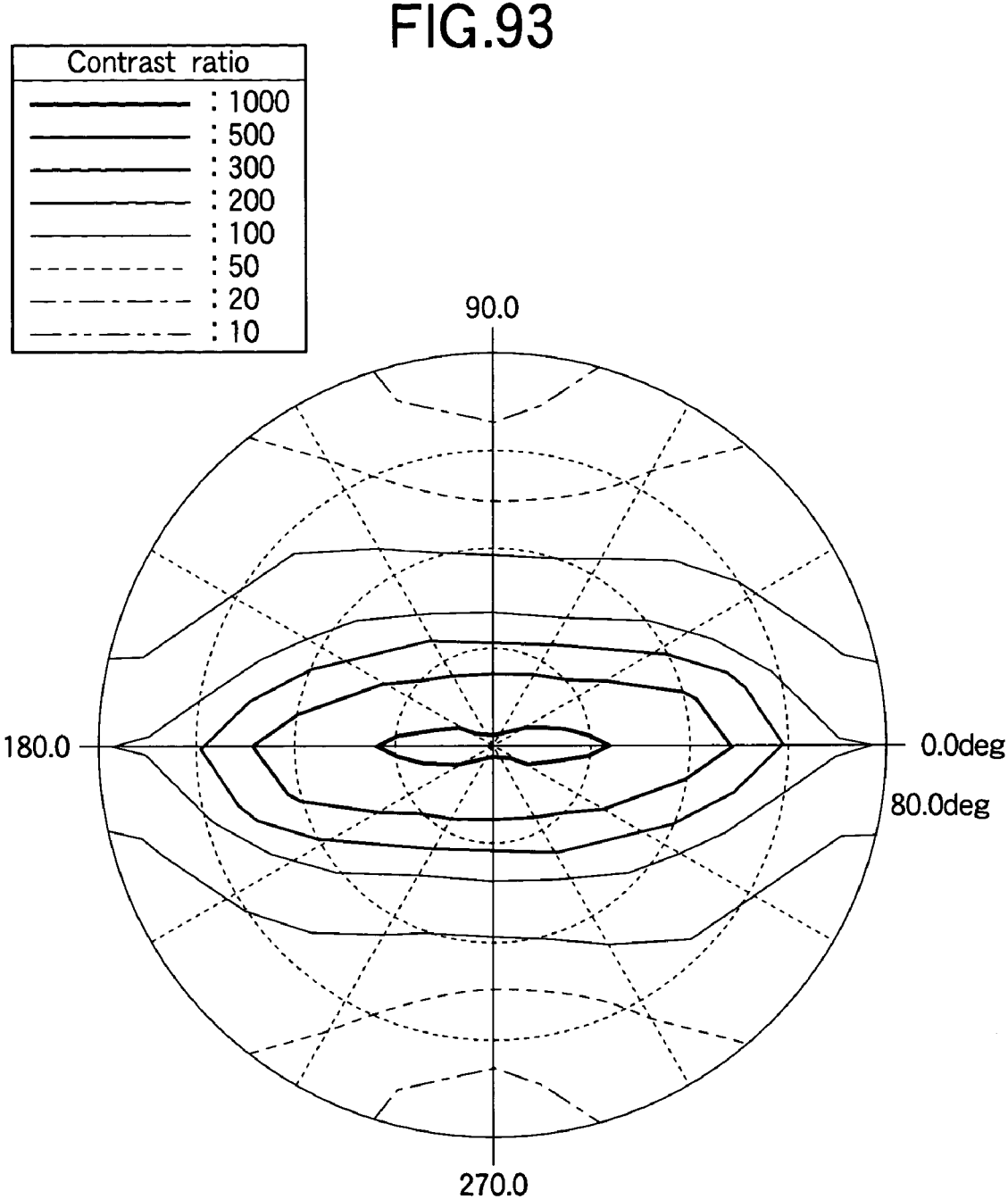
FIG. 93 shows viewing angle characteristics of Example 4 of a liquid crystal display according to the eleventh embodiment of the invention.

FIG. 93 shows viewing angle characteristics measured on the liquid crystal display having the above-described configuration when a liquid crystal driving voltage of 10 V is applied thereto. Preferable viewing angle characteristics are achieved in that regions having contrast ratios of 10 or less are at viewing angles of 80 deg. or more in all directions.

Twelfth Embodiment

A liquid crystal display according to a twelfth embodiment with reference to FIGS. 94 through 104. Prior to the description of the present embodiment, a specific description will be made on the problems to be solved by the present embodiment. TFT liquid crystal displays have recently become larger and adapted to gray shades display and higher contrast, which has made it possible to use such displays as monitors for personal computers and displays for television images. To accommodate such applications, there are demands for liquid crystal displays on which images can be seen with sufficient quality in all directions.

As a technique for achieving a wide viewing angle, the applicant has provided MVA liquid crystal displays. Liquid crystal molecules in an MVA liquid crystal display are in a vertical alignment when no voltage is applied and, when a voltage is applied, they are divided into four regions in which they are tilted in four respective directions. As a result, viewing angle characteristics of those regions are mixed to provide a wide viewing angle consequently.

Referring to the viewing angle of such an MVA liquid crystal display during black-and-white display, contrast of 10 or more is achieved at a tilt angle of 80 deg. at upward, downward, leftward and rightward viewing angles. However, problem arises in that a reduction of contrast occurs in a diagonal viewing direction at an angle of 45 deg.

As a technique for solving this problem, configurations have been proposed in which optical retardation films having phase-delay axes orthogonal to each other are provided on one or both sides of a liquid crystal layer separately or in an overlapping relationship. For example, such proposals have been disclosed in Japanese unexamined patent publication No. H4-101119, Japanese unexamined patent publication No. H4-162018 and so on.

Figure 94:
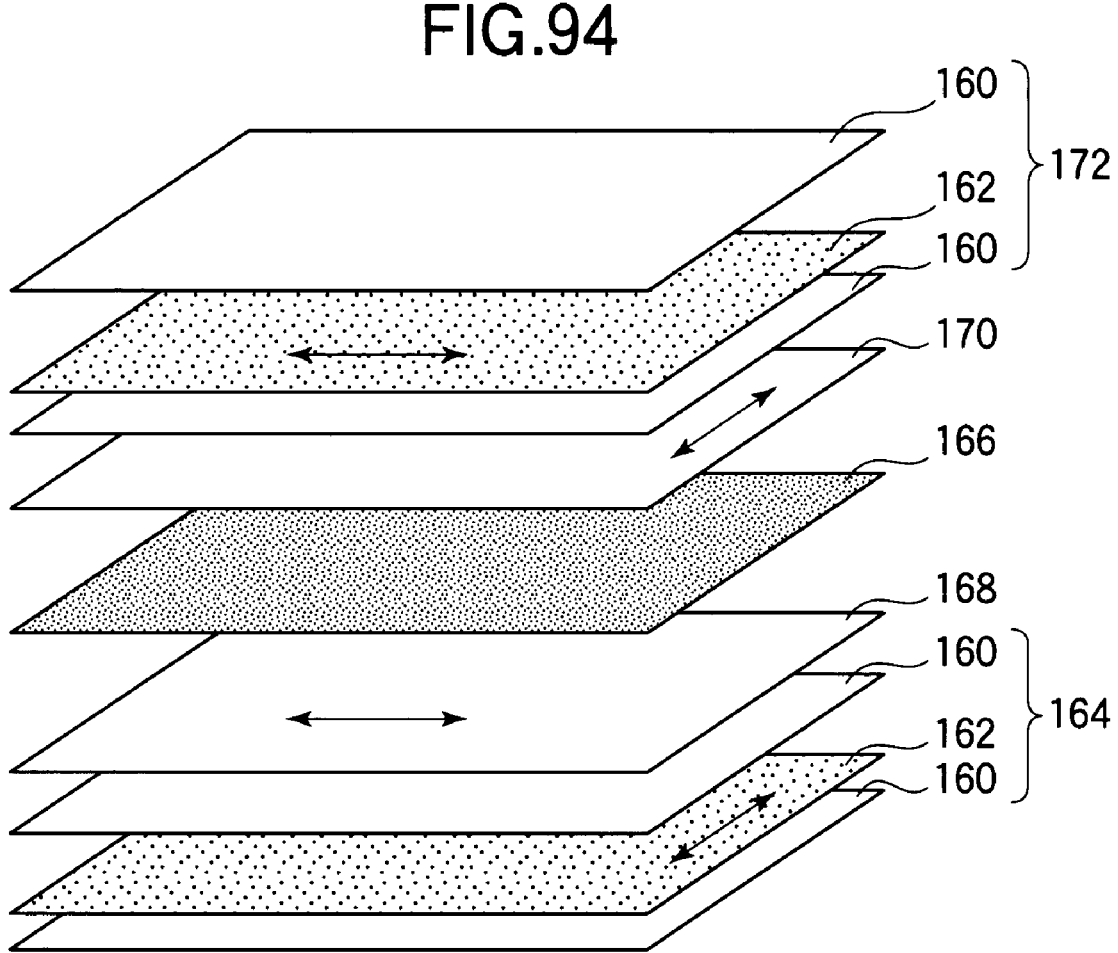
FIG. 94 shows a schematic configuration of a liquid crystal display according to a twelfth embodiment of the invention.

FIG. 94 schematically shows a configuration according to such disclosed techniques. In the liquid crystal display shown in FIG. 94, polarizing films 164 and 172 are respectively provided on the surfaces of both of two glass substrates in a face-to-face relationship for sealing liquid crystals to form a liquid crystal panel 166, and uniaxial stretched films 168 and 170 are respectively provided between the liquid crystal panel 166 and polarizing films 164 and 172.

The polarizer 164 is configured by sandwiching a PVA film 162 with two TAC films 160. Similarly, the polarizer 172 is configured by sandwiching a PVA film 162 with two TAC films 160. The PVA film 162 is doped with iodine to form an absorption axis. As shown in FIG. 94, the stretching axis or phase-delay axis of the uniaxial stretched film 168 is orthogonal to the absorption axis of the PVA film 162 of the polarizer 164. The stretching axis or phase-delay axis of the uniaxial stretched film 170 is orthogonal to the absorption axis of the PVA film 162 of the polarizer 172. The absorption axes of the polarizers 164 and 172 are orthogonal to each other. Vertically aligned liquid crystals are sealed in the liquid crystal panel 166.

Figure 95:
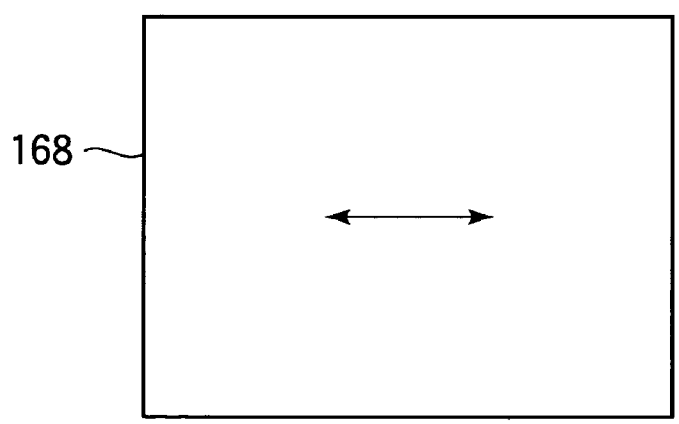
FIG. 95 shows a state of a uniaxial stretched film 168 as viewed in the normal direction of the film surface.
Figure 96:
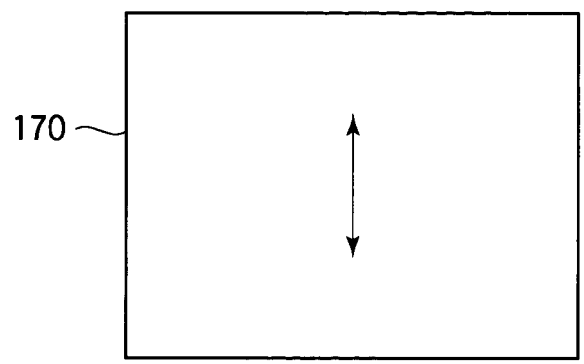
FIG. 96 shows a state of a uniaxial stretched film 170 as viewed in the normal direction of the film surface.

FIG. 95 shows a state of the uniaxial stretched film 168 as viewed in the normal direction of the film, and the arrow in the figure indicates the direction of the phase-delay axis. FIG. 96 shows a state of the uniaxial stretched film 170 as viewed in the normal direction of the film, and the arrow in the figure indicates the direction of the phase-delay axis. Either of the uniaxial stretched films 168 and 170 is cut in a rectangular configuration in compliance with the rectangular panel surface, and their phase-delay axes are formed in a direction in parallel with or perpendicular to the sides of the rectangle. When the uniaxial stretched films 168 and 170 shown in FIGS. 95 and 96 are accurately applied to the surfaces of both substrates of the liquid crystal panel 166 shown in FIG. 94, any optical effect is completely cancelled at a frontal viewing angle because their phase-delay axes are precisely orthogonal to each other.

Figure 97:
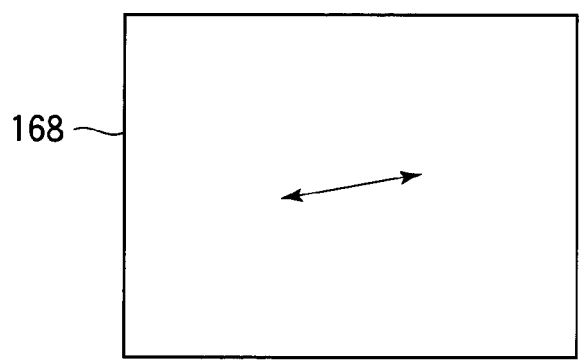
FIG. 97 shows a state of the uniaxial stretched film 168 as viewed in the normal direction of the film surface.
Figure 98:
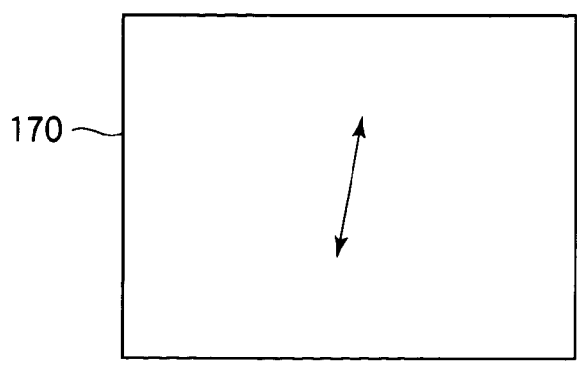
FIG. 98 shows a state of the uniaxial stretched film 170 as viewed in the normal direction of the film surface.

However, the directions of the phase-delay axes of actually fabricated uniaxial stretched films 168 and 170 are frequently not in parallel with or perpendicular to the sides of rectangles that are the outlines of the films as shown in FIGS. 97 and 98. As a result, the phase-delay axes of the uniaxial stretched films 168 and 170 shown in FIGS. 97 and 98 are not necessarily orthogonal to each other even when they are precisely applied to the surfaces of both substrates of the liquid crystal panel 166 shown in FIG. 94. Since the phase-delay axes are not in parallel with or perpendicular to the absorption axes of the polarizers 164 and 172 too, the uniaxial stretched films 168 and 170 exhibits their optical effect to cause leakage light in frontal directions when black is displayed, which has resulted in the problem of reduction of contrast.

Figure 99:
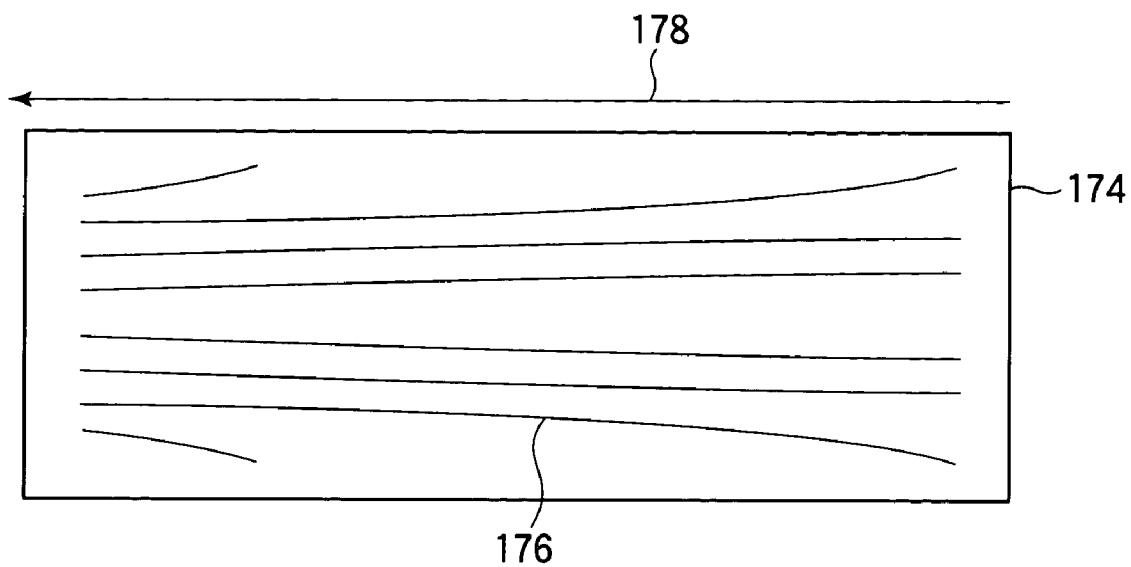
FIG. 99 illustrates distribution of axis of retardations 176 when a film 174 is stretched in the direction indicated by the arrow 178 at a step for manufacturing the uniaxial stretched films 168 and 170.
Figure 100:
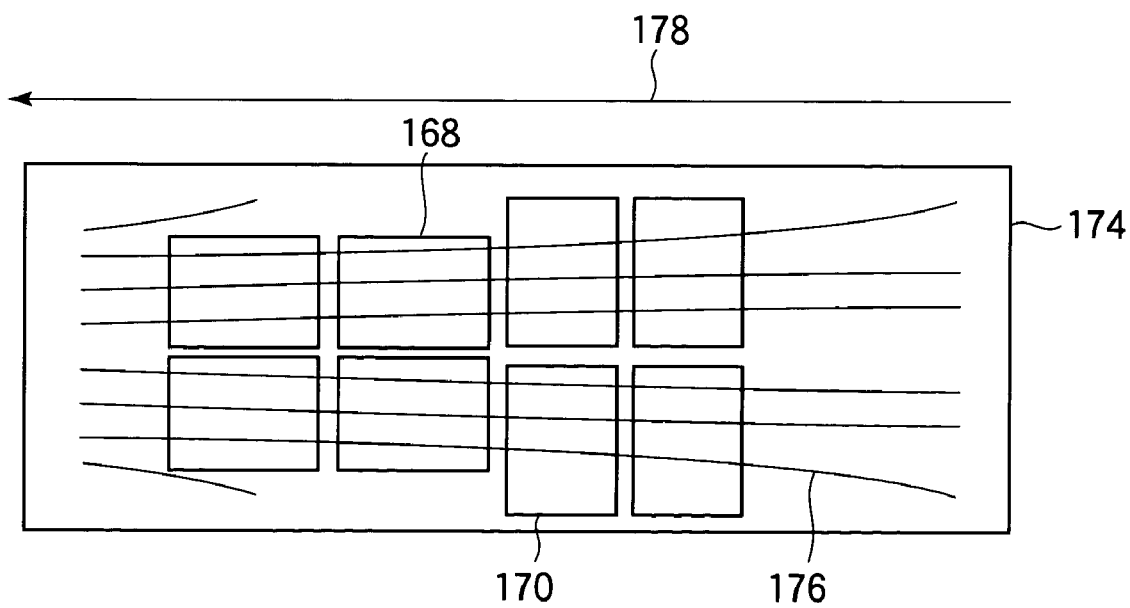
FIG. 100 illustrates a state in which the film 174 is stretched in the direction indicated by the arrow 178 and the uniaxial stretched films 168 and 170 are cut off at a step for manufacturing the uniaxial stretched films 168 and 170.

Such an offset between the phase-delay axes of the uniaxial stretched films 168 and 170 is largely attributable to steps for manufacturing the uniaxial stretched films 168 and 170. FIG. 99 shows distribution of axes of retardation 176 that is observed when a film 174 is stretched in the direction indicated by the arrow 178 at a step of manufacturing the uniaxial stretched films 168 and 170. When the film 174 is stretched, the film receives a stress also in a direction perpendicular to the stretching direction, which results in distribution of directions of retardation in the plane of the film 174. Therefore, as shown in FIG. 100, when the uniaxial stretched films 168 and 170 are cut out using the stretching direction of the film 174 (the direction indicated by the arrow 178) as a reference, the direction of the phase-delay axes of the uniaxial stretched films 168 and 170 is offset from the cutting direction instead of being in parallel with or perpendicular to the same. When films cut in a rectangular configuration are combined at random, the two phase-delay axes are not orthogonal to each other as shown in FIGS. 97 and 98, which results in a reduction of contrast as described above.

Figure 101:
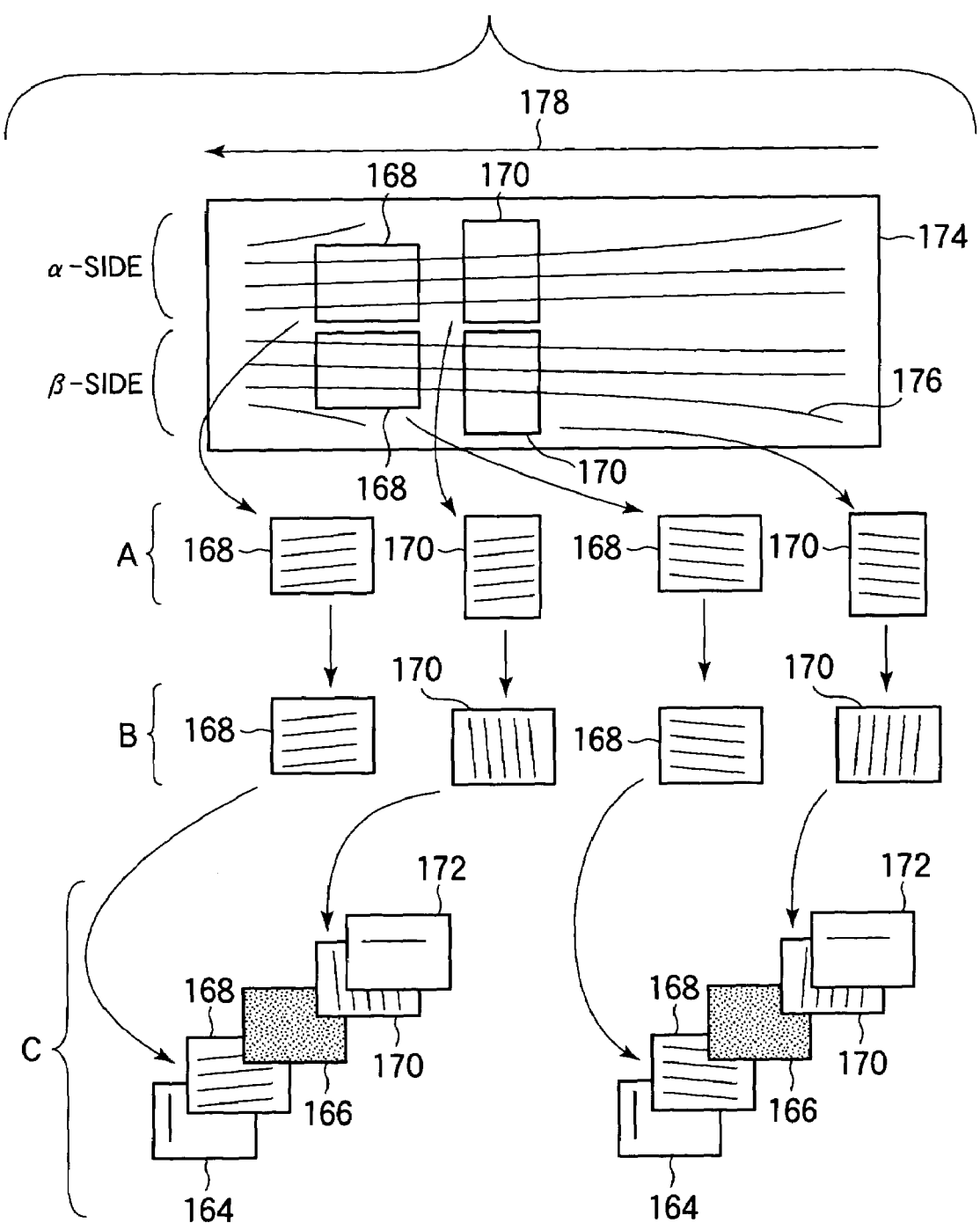
FIG. 101 schematically shows steps from a step of fabricating the uniaxial stretched films 168 and 170 up to a step of applying them to a liquid crystal panel.

A description will now be made with reference to FIG. 101 on a liquid crystal display according to the present embodiment and a method for manufacturing the same. FIG. 101 schematically shows manufacturing steps from the fabrication of uniaxial stretched films 168 and 170 up to a step of applying the films to a liquid crystal panel, the arrows extending downward in the figure indicate a flow of the steps.

First, the positions and directions in which the uniaxial stretched films 168 and 170 are cut from the stretched film 174 are managed as shown in an upper part of FIG. 101, and the directions of the optical axes in each film 174 are recognized. Combinations of the uniaxial stretched films 168 and 170 are determined based on the same. For example, norbornene type film is used as the film 174. When the distribution of retardations in the plane of the stretched film 174 that is under a tensile stress applied by the stretching machine is substantially line symmetric about an axis (central axis) in parallel with the stretching direction (the direction indicated by the arrow 178) in the middle of the film 174 as shown in FIG. 101, the film 174 is divided into regions in an upper half (α-side) and a lower half (β-side) as shown in the figure. What is important at this time is to divide the film such that retardations are substantially uniformly distributed in the plane of the region on the α-side (or region on the β-side) and such that the divided regions have different distributions of retardations.

At a film cutting step A and a subsequent step B, the directions of offsets of the optical axes in the films are managed. Obviously, management is simultaneously carried out to allow the top and bottom surfaces of films and the leading and supply sides of films to be identified during a stretching process. At the step A, a uniaxial stretched film 168 cut off from the α-side of a film 174 is combined with a uniaxial stretched film 170 cut off similarly from the α-side. On the other hand, a uniaxial stretched film 168 cut off from the β-side of the film 174 is combined with a uniaxial stretched film 170 cut off similarly from the β-side. Then, the uniaxial stretched films 168 and 170 are aligned with each other.

Figure 102:
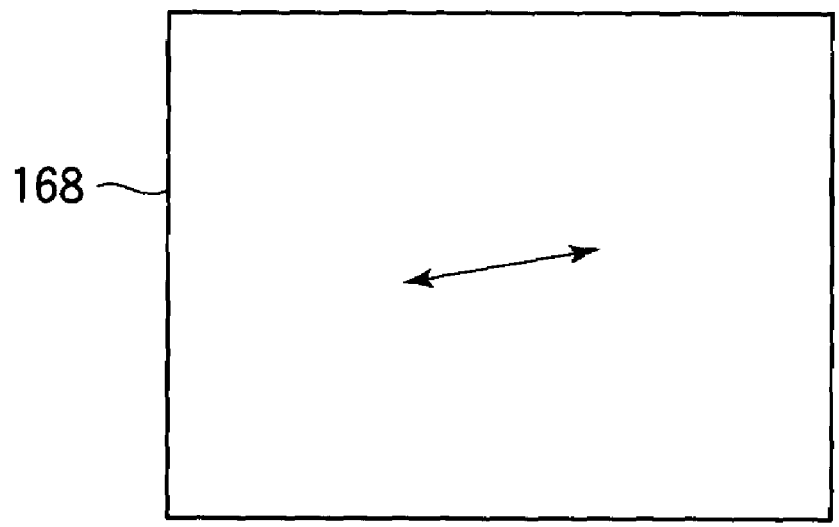
FIG. 102 illustrates a state of the phase-delay axis of the uniaxial stretched film 168 according to a method for manufacturing a liquid crystal display according to a twelfth embodiment of the invention.
Figure 103:
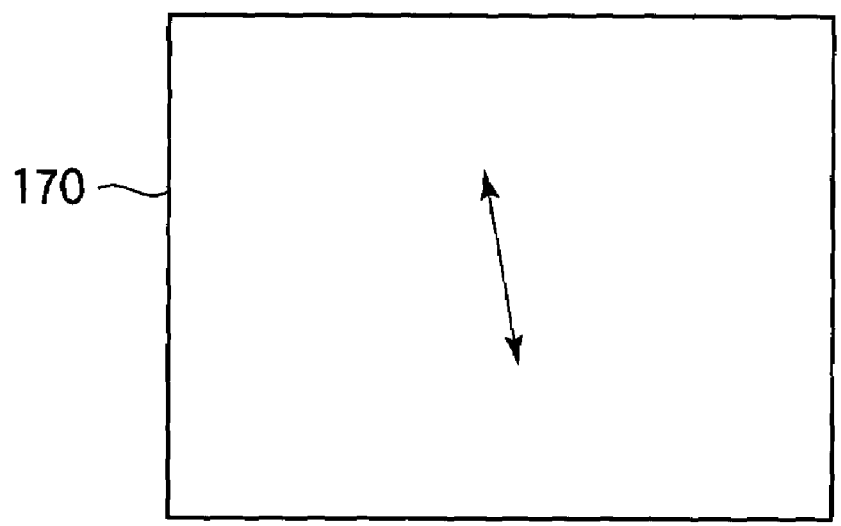
FIG. 103 illustrates a state of the phase-delay axis of the uniaxial stretched film 170 according to the method for manufacturing a liquid crystal display according to the twelfth embodiment of the invention.

In this state, the phase-delay axis (indicated by the arrow) of the uniaxial stretched film 168 is neither parallel nor perpendicular to each side of the rectangle that forms the outline of a film, as illustrated in FIG. 102. On the other hand, the phase-delay axis of the uniaxial stretched film 170 is also neither parallel nor perpendicular to each side of the rectangle that forms the outline of a film, as illustrated in FIG. 103. However, it will be noted from FIGS. 102 and 103 overlapped with each other that those phase-delay axes are orthogonal to each other. That is, two films whose phase-delay axes are orthogonal to each other can be easily fabricated by combining films from a region (e.g., the α-side) where phase-delay axes extend in substantially equal directions.

A liquid crystal display is fabricated using such a combination of uniaxial stretched films 168 and 170 by providing the uniaxial stretched film 168 between a liquid crystal panel 166 and a polarizer 164 (which has an absorption axis that extends in the vertical direction of the figure) and by providing the uniaxial stretched film 170 between the liquid crystal panel 166 and a polarizer 172 (which has an absorption axis that extends in the lateral direction of the figure). No optical effect occurs on the liquid crystal display thus completed when viewed at a frontal viewing angle because the phase-delay axes of the uniaxial stretched films 168 and 170 are orthogonal to each other. As a result, excellent frontal contrast can be achieved with a high yield. Referring to the locations of the uniaxial stretched films 168 and 170, they may be provided on one of the panel surfaces of the liquid crystal panel 166 in an overlapping relationship. However, it is desirable to provide them on both sides of the panel to sandwich the liquid crystal panel 166 from the viewpoint of the optical effect in that two uniaxial stretched films will not exhibit the effect of rotating a polarizing direction when they are provided on one side in an overlapping relationship.

Figure 104:
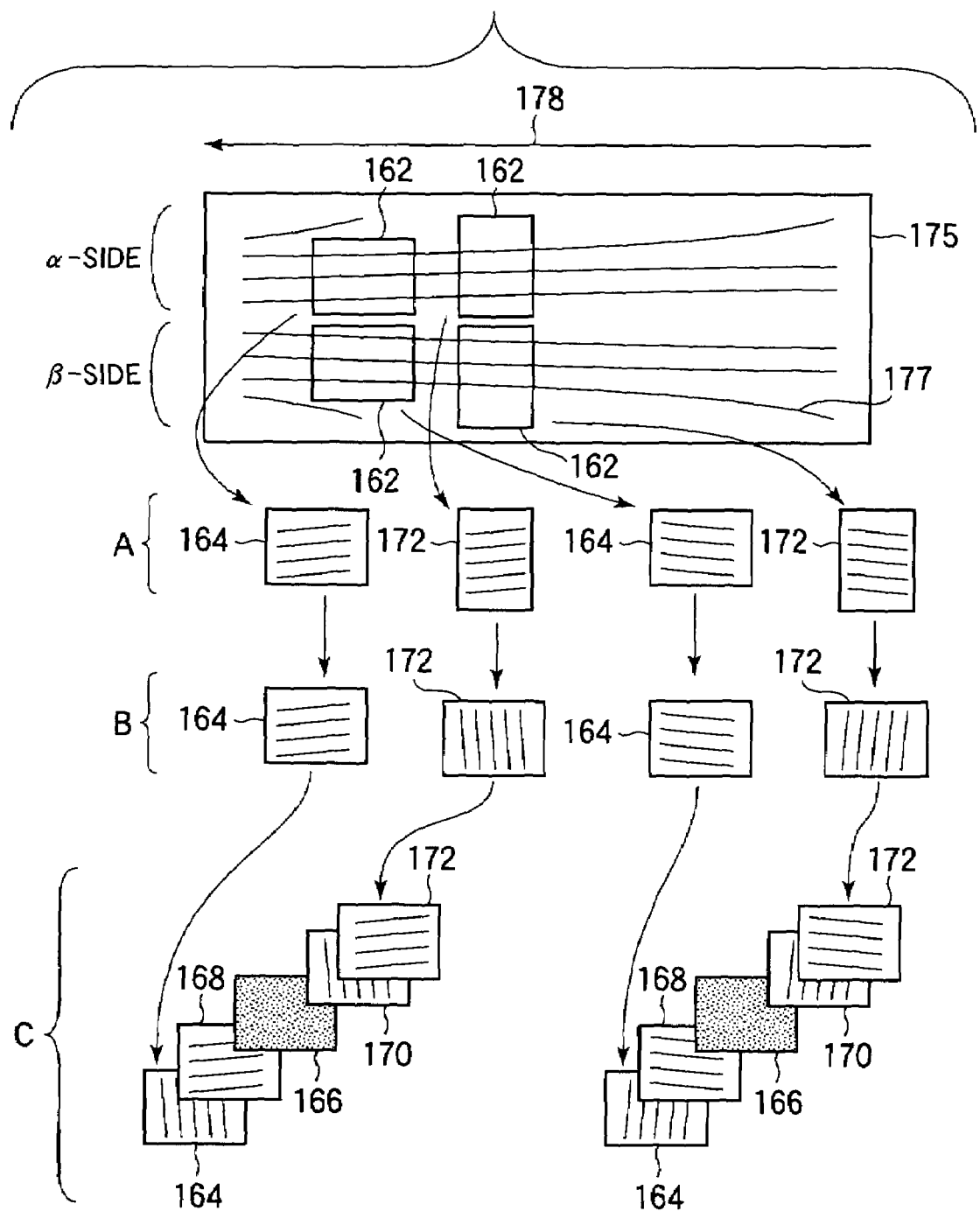
FIG. 104 schematically shows steps from a step of fabricating polarizers 164 and 172 up to a step of applying the films to a liquid crystal panel.

A description will now be made with reference to FIG. 104 on an example of an application of the liquid crystal display and the manufacturing method according to the present embodiment to manufacture of a polarizer. FIG. 104 schematically shows steps from a step of manufacturing a PVA film 162 to be used for the polarizers 164 and 172 up to a step of applying the film to a liquid crystal panel, and the arrows extending downward in the figure indicate a flow of those steps.

First, the position and direction in which a PVA film 162 is to be cut from a PVA stretched film 175 doped with iodine are managed as shown in an upper part of FIG. 104, and the directions of optical axes in the film 175 are recognized. Combinations of uniaxial stretched films 162 are determined based on the same. As illustrated, the PVA stretched film 175 is divided into an upper half (α-side) and a lower half (β-side) using a method similar to the method described with reference to FIG. 101.

A method similar to the method described with reference to FIG. 101 is also used at a film cutting step A and a subsequent step B to manage the combinations of films. At the step A, a TAC film is applied to each of two PVA films 162 cut from the α-side of the PVA stretched film 175 to fabricate a set of polarizers 164 and 172. A TAC film is applied to each of two PVA films 162 cut from the β-side of the PVA stretched film 175 to fabricate another set of polarizers 164 and 172. Then, the polarizers 164 and 172 are aligned with each other at the step B.

In this state, the absorption axes of then polarizers 164 and 172 (represented by a plurality of parallel lines in FIG. 104) are neither parallel nor perpendicular to each side of the rectangle that forms the outline of a film. However, as apparent from FIG. 104, the absorption axes of the polarizers 164 and 172 are orthogonal to each other when they are viewed in an overlapping relationship. That is, two polarizers whose absorption axes are orthogonal to each other can be fabricated by combining films from a region (e.g., the α-side) where absorption axes extend in substantially equal directions.

The polarizers 164 and 172 thus combined are respectively provided on both panel surfaces of a liquid crystal panel 166. A uniaxial stretched film 168 is provided between the polarizer 164 and the liquid crystal panel 166, and a uniaxial stretched film 170 is provided between the liquid crystal panel 166 and the polarizer 172, which completes a liquid crystal display. A combination of the uniaxial stretched films 168 and 170 and the polarizers 164 and 172 fabricated according to the present embodiment makes it possible to reliably achieve not only perpendicularity between the phase-delay axes of the uniaxial stretched films 168 and 170 but also perpendicularity between the absorption axes of the polarizers 164 and 172 and still more perpendicularity between the uniaxial stretched films 168 and 170 and the polarizers 164 and 172, and this makes it possible to reliably prevent the occurrence of any optical effect at a frontal viewing angle. As a result, excellent frontal contrast can be achieved with a high yield.

As thus described, the present embodiment makes it possible to easily and reliably match deviations of the directions of the optical axes of optical retardation films or polarizers, which allows perpendicularity between the axes of such films to be improved when they are combined.

As described above, the present embodiment makes it possible to improve the display and viewing angle characteristics of an MVA LCD. In particular, displays having high frontal contrast can be provided with a high yield.

The present invention is not limited to the above-described embodiments, and various modifications may be made. As described above in detail, the present invention makes it possible to provide an optical retardation film in an optimum location and to set an optimum retardation, thereby providing an advantage in that viewing angle characteristics can be significantly improved.

What is claimed is:

1. A liquid crystal display comprising:
   a liquid crystal panel having a pair of substrates and liquid crystals which are sealed between the pair of substrates and whose molecules are aligned substantially perpendicularly to the surfaces of the substrates when no voltage is applied;
   first and second polarizing elements provided on both sides of the liquid crystal panel such that their absorption axes are orthogonal to each other;
   a first optical retardation film which is provided between the liquid crystal panel and the first polarizing element, which satisfies $n_x > n_y \cong n_z$ and which is provided such that its phase-delay axis (the direction of $n_x$) is orthogonal to the absorption axis of the first polarizing element, $n_x$ and $n_y$ representing refractive indices in directions in the plane of the film among principal refractive indices $n_x$, $n_y$ and $n_z$, $n_z$ representing a refractive index in the normal direction of the film;
   a second optical retardation film which is provided between the liquid crystal panel and the second polarizing element, which satisfies $n_x > n_y \cong n_z$ and which is provided such that its phase-delay axis (the direction of $n_x$) is orthogonal to the absorption axis of the second polarizing element, $n_x$ and $n_y$ representing refractive indices in directions in the plane of the film among principal refractive indices $n_x$, $n_y$ and $n_z$, $n_z$ representing a refractive index in the normal direction of the film; and
   at least one additional optical retardation film which is provided in a location at least between the first polarizing element and the first optical retardation film, between the first optical retardation film and the liquid crystal panel, between the second polarizing element and the second optical retardation film or between the second optical retardation film and the liquid crystal panel and which satisfies $n_x \cong n_y > n_z$, $n_x$ and $n_y$ representing refractive indices in directions in the plane of the film among principal refractive indices $n_x$, $n_y$ and $n_z$, $n_z$ representing a refractive index in the normal direction of the film.

2. A liquid crystal display according to claim 1, further comprising a domain defining structure constituted by a protrusion, a recess, a slit provided on an electrode or a combination of them being provided at least either of surfaces of the pair of substrates that form the liquid crystal panel in a face-to-face relationship; and
   wherein the domain defining structure defines the tilting direction of the liquid crystals such that the tilting direction becomes a plurality of directions in each pixel when a voltage is applied between the substrates.

3. A liquid crystal display according to claim 1, satisfying:

$0 \leq R_1$;

$0 \leq R_2$;

$$0 \leq Rt_1 + Rt_2 + \ldots + Rt_N + Rt'_1 + Rt'_2 + \ldots + Rt'_M;$$

$$(-0.08 \times R_{LC} + 58) \times \alpha + 95 \times (1-\alpha) - 60 \leq R_1 \leq (-0.08 \times R_{LC} + 58) \times \alpha + 95 \times (1-\alpha) + 60;$$

$$(-0.08 \times R_{LC} + 58) \times \alpha + 95 \times (1-\alpha) - 60 \leq R_2 \leq (-0.08 \times R_{LC} + 58) \times \alpha + 95 \times (1-\alpha) + 60; \text{ and}$$

$$(1.13 \times R_{LC} - 105) \times \alpha + (0.89 \times R_{LC} - 137)(1-\alpha) - 25 \leq Rt_1 + Rt_2 + \ldots + Rt_N + Rt'_1 + Rt'_2 + \ldots + Rt'_M \leq (1.13 \times R_{LC} - 105) \times \alpha + (0.89 \times R_{LC} - 137)(1-\alpha) + 25$$

wherein $\alpha = (Rt_1 + Rt_2 + \ldots + Rt_N)/(Rt_1 + Rt_2 + \ldots + Rt_N + Rt'_1 + Rt'_2 + \ldots + Rt'_M)$ and wherein the numerical values are in nm, $R_1$ and $R_2$ representing retardations $(n_x - n_y)d$ of the first and second optical retardation films respectively (d representing the thickness of the optical retardation films), $Rt_1$, $Rt_2$, ..., $Rt_N$ representing retardations of N optical retardation films $(n_x + n_y)/2 - n_z)d$ among the additional optical retardation films which are provided at least between the first polarizing element and the first optical retardation film or between the second polarizing element and the second optical retardation film (d representing the thickness of the additional optical retardation films), $Rt'_1$, $Rt'_2$, ..., $Rt'_M$ (N+M≧1) representing retardations of M optical retardation films $(n_x + n_y)/2 - n_z)d$ among the additional optical retardation films which are provided at least between the first optical retardation film and the liquid crystal panel or between the second optical retardation film and the liquid crystal panel (d representing the thickness of the additional optical retardation films), $R_{LC}$ representing a retardation in the liquid crystal panel.

4. A liquid crystal display according to claim 1, satisfying:

$$0 \leq R_1;$$

$$0 \leq R_2;$$

$$0 \leq Rt_1 + Rt_2 + \ldots + Rt_N + Rt'_1 + Rt'_2 + \ldots + Rt'_M;$$

$$(-0.08 \times R_{LC} + 58) \times \alpha + 95 \times (1-\alpha) - 30 \leq R_1 \leq (-0.08 \times R_{LC} + 58) \times \alpha + 95 \times (1-\alpha) + 30;$$

$$(-0.08 \times R_{LC} + 58) \times \alpha + 95 \times (1-\alpha) - 30 \leq R_2 \leq (-0.08 \times R_{LC} + 58) \times \alpha + 95 \times (1-\alpha) + 30; \text{ and}$$

$$(1.13 \times R_{LC} - 105) \times \alpha + (0.89 \times R_{LC} - 137)(1-\alpha) - 60 \leq Rt_1 + Rt_2 + \ldots + Rt_N + Rt'_1 + Rt'_2 + \ldots + Rt'_M \leq (1.13 \times R_{LC} - 105) \times \alpha + (0.89 \times R_{LC} - 137)(1-\alpha) + 60$$

wherein $\alpha = (Rt_1 + Rt_2 + \ldots + Rt_N)/(Rt_1 + Rt_2 + \ldots + Rt_N + Rt'_1 + Rt'_2 + \ldots + Rt'_M)$ and wherein the numerical values are in nm, $R_1$ and $R_2$ representing retardations $(n_x - n_y)d$ of the first and second optical retardation films respectively (d representing the thickness of the optical retardation films), $Rt_1$, $Rt_2$, ..., $Rt_N$ representing retardations of N optical retardation films $(n_x + n_y)/2 - n_z)d$ among the additional optical retardation films which are provided at least between the first polarizing element and the first optical retardation film or between the second polarizing element and the second optical retardation film (d representing the thickness of the additional optical retardation films), $Rt'_1$, $Rt'_2$, ..., $Rt'_M$ (N+M≧1) representing retardations of M optical retardation films $(n_x + n_y)/2 - n_z)d$ among the additional optical retardation films which are provided at least between the first optical retardation film and the liquid crystal panel or between the second optical retardation film and the liquid crystal panel (d representing the thickness of the additional optical retardation films), $R_{LC}$ representing a retardation in the liquid crystal panel.

5. A liquid crystal display according to claim 1, wherein at least either of the first and second optical retardation films is a stretched film.

6. A liquid crystal display according to claim 1, wherein at least either of the first and second optical retardation films comprises a polymer liquid crystal layer.

7. A liquid crystal display comprising:

a liquid crystal panel in which a liquid crystal layer made of liquid crystals is sandwiched between a pair of substrates, the liquid crystals including liquid crystal molecules whose longitudinal directions are aligned substantially perpendicularly to surfaces of the substrates when no voltage is applied;

first and second polarizing elements provided outside the liquid crystal panel on both sides thereof and disposed such that respective absorption axes are orthogonal to each other and such that the absorption axes are substantially at an angle of 45 deg. to the direction of alignment of the liquid crystal molecules when a voltage is applied to the liquid crystals;

a first optical retardation film of a first type provided between the first polarizing element and the liquid crystal panel such that a phase-delay axis thereof is orthogonal to the absorption axis of the first polarizing element, the first type of optical retardation film being an optical retardation film whose in-plane refractive index $n_x$ is greater than both of an in-plane refractive index $n_y$ thereof and a refractive index $n_z$ thereof in the direction of the thickness thereof;

a second optical retardation film of the first type provided between the second polarizing element and the liquid crystal panel such that a phase-delay axis thereof is orthogonal to the absorption axis of the second polarizing element, the second optical retardation film of the first type being an optical retardation film in which $n_x$ and $n_y$ are substantially equal to each other and in which $n_x$ and $n_y$ are greater than $n_z$; and at least one optical retardation film of a second type provided in at least one location between the first polarizing element and the first optical retardation film of the first type, between the second polarizing element and the second optical retardation film of the first type, between the first optical retardation film of the first type and the liquid crystal panel or between the second optical retardation film of the first type and the liquid crystal panel, the liquid crystal display satisfying:

$$Rp-t = 2 \times (-0.08 \times R_{LC} + 58 \text{ nm} + \alpha)$$

where $\alpha = \pm 30$ nm; and $$Rt-t = (1.05 \pm 0.05) \times R_{LC} - 47 \text{ nm} + \beta$$

where $-100$ nm $\leq \beta \leq 47$ nm, a retardation $R_{LC}$ in the liquid crystal layer being represented by $\Delta$nd that is the product of birefringence $\Delta n$ of the liquid crystals and the thickness d of the liquid crystal layer, a retardation Rp in an optical retardation film in a direction in the plane thereof being represented by $(n_x - n_y)d$, a retardation Rt in the direction of the thickness being represented by $((n_x + n_y)/2 - n_z)d$, the sum of retardations Rp in in-plane directions of the plurality of optical retardation films excluding optical retardation films whose phase-delay axes are located in parallel with the absorption axes of polarizing elements adjacent thereto being represented by Rp–t, the sum of retardations Rt in the direction of thickness of the plurality of optical retardation films being represented by Rt–t.

8. A liquid crystal display according to claim 7, wherein the retardation $R_{LC}$ in the liquid crystal layer is in the range between 250 nm and 310 nm inclusive; the sum Rt−t of the retardations in the direction of the thickness is in the range between 180 nm and 260 nm inclusive; and the sum of the retardations in in-plane directions of the optical retardation films of the first type is in the range between 25 nm and 50 nm inclusive.

9. A liquid crystal display according to claim 7, wherein the retardation $R_{LC}$ in the liquid crystal layer is in the range between 310 nm and 390 nm inclusive; the sum Rt−t of the retardations in the direction of the thickness is in the range between 230 nm and 350 nm inclusive; and the sum of the retardations in in-plane directions of the optical retardation films of the first type is in the range between 25 nm and 50 nm inclusive.

10. A liquid crystal display according to claim 7, wherein the optical retardation film of the first type is a film stretched in the direction of one or two axes.

11. A liquid crystal display according to claim 7, wherein the optical retardation film of the second type is a protective member that constitutes a polarizer in combination with the polarizing element.

12. A liquid crystal display comprising:
first and second substrates provided in a face-to-face relationship with a predetermined gap left therebetween;
a liquid crystal layer in a bend alignment sealed in the gap;
a first polarizer provided on a surface of the first substrate opposite to the side where the liquid crystal layer is located;
a second polarizer provided on a surface of the second substrate opposite to the side where the liquid crystal layer is located;
a first optical compensation film which is provided between the first substrate and the first polarizer and which has discotic liquid crystals whose tilt angle changes in accordance with non-linear changes in the tilt of liquid crystal molecules in a region of the liquid crystal layer closer to the first substrate that is one of two substantially equal regions of the liquid crystal layer formed by dividing the layer in the normal direction of the substrate surface to compensate any retardation attributable to the non-linear changes in the tilt; and
a second optical compensation film which is provided between the second substrate and the second polarizer and which has discotic liquid crystals whose tilt angle changes in accordance with non-linear changes in the tilt of liquid crystal molecules in a region of the liquid crystal layer closer to the second substrate that is one of the two substantially equal regions of the liquid crystal layer formed by dividing the layer in the normal direction of the substrate surface to compensate any retardation attributable to the non-linear changes in the tilt.

13. A liquid crystal display according to claim 12, wherein each of the first and second optical compensation films is formed by laminating a plurality of discotic liquid crystal layers whose tilt angle changes substantially linearly to compensate the retardation by interpolating the curve of the non-linear changes of the tilt angle of the liquid crystal layer.

14. A liquid crystal display according to claim 13, wherein each of the first and second optical compensation films is constituted by a lamination of a plurality of films having the discotic liquid crystal layer whose tilt angle changes substantially linearly.

15. A liquid crystal display according to claim 14, wherein the discotic liquid crystals in each of the plurality of films are aligned in substantially the same direction as the direction of alignment of the liquid crystal molecules in the liquid crystal layer and wherein the tilt angle (absolute value) increases with the distance from the liquid crystal layer, a direction perpendicular to the normal of the substrate surface serving as a reference.

16. A liquid crystal display according to claim 12, wherein the first and second optical compensation films perform optimum compensation of the retardation when black is displayed in a normally black mode.

17. A liquid crystal display according to claim 12, wherein the retardation in the liquid crystal layer is in the range from 800 to 1200 nm.

18. A liquid crystal display according to claim 17, wherein each of the first and second optical compensation films has a multi-layer structure formed by first and second sub-films located in this order which is the order of their closeness to the liquid crystal layer and wherein the maximum value (absolute value) $\theta 1$ of the tilt angle of the discotic liquid crystals in the first sub-film satisfies $50° \leq \theta 1 \leq 80°$.

19. A liquid crystal display according to claim 18, wherein R1+R2 is 450 nm±150 nm and R2/R1 ranges from 1 to 10 where R1 represents a retardation in the first sub-film and R2 represents a retardation in the second sub-film.

20. A liquid crystal display according to claim 17, wherein each of the first and second optical compensation films has a multi-layer structure formed by first through third sub-films located in this order which is the order of their closeness to the liquid crystal layer; the maximum value (absolute value) $\theta 1$ of the tilt angle of the discotic liquid crystals in the first sub-film satisfies $30° \leq \theta 1 60°$; and the maximum value (absolute value) $\theta 2$ of the tilt angle of the discotic liquid crystals in the second sub-film satisfies $\theta 1 \leq \theta 2 \leq 85°$.

21. A liquid crystal display according to claim 20, wherein R1+R2+R3 is 450 nm±150 nm; R2/R1 ranges from 1 to 5; and R3/R1 ranges from 5 to 10 where R1 represents a retardation in the first sub-film; R2 represents a retardation in the second sub-film; and R3 represents a retardation in the third sub-film.

22. A liquid crystal display according to claim 12, further comprising a third optical compensation film provided between the first optical compensation film and the first polarizer, the third optical compensation film being a positive vertically aligned optical retardation film which is an index ellipsoid represented by $n_x=n_y<n_z$, $n_z$ substantially coinciding with the normal of the substrate surface.

23. A liquid crystal display according to claim 12, further comprising;
a third optical compensation film provided between the first optical compensation film and the first polarizer; and
a fourth optical compensation film provided between the second optical compensation film and the second polarizer;
wherein the third and fourth optical compensation films are negative optical retardation films.

24. A liquid crystal display according to claim 23, wherein the maximum value (absolute value) $\theta u$ of the tilt angle of the discotic liquid crystals in the first and second optical compensation films is substantially 90 deg.

25. A liquid crystal display according to claim 23, wherein the minimum value (absolute value) $\theta 1$ of the tilt angle of the discotic liquid crystals in the first and second optical compensation films is substantially 30 deg.

26. A liquid crystal display according to claim 12, further comprising a uniaxial optical retardation film provided between the third optical compensation film and the first polarizer.

27. A liquid crystal display comprising:
a liquid crystal panel in which a liquid crystal layer made of liquid crystals is sandwiched between a pair of substrates, the liquid crystals including liquid crystal molecules whose longitudinal directions are aligned substantially perpendicularly to surfaces of the substrates when no voltage is applied;
two polarizing elements provided outside the liquid crystal panel on both sides thereof and disposed such that respective absorption axes are orthogonal to each other and such that the absorption axes are substantially at an angle of 45 deg. to the direction of alignment of the liquid crystal molecules when a voltage is applied to the liquid crystals; and
at least one optical retardation film provided between at least one of the polarizing elements and the liquid crystal panel, the direction of the smallest principal refractive index $n_z$ among principal refractive indices $n_x$, $n_y$ and $n_z$ thereof being tilted from the normal direction of the substrates.

28. A liquid crystal display according to claim 27, further comprising a domain defining structure constituted by a protrusion, a recess, a slit provided on an electrode or a combination of them being provided at least either of surfaces of the pair of substrates that form the liquid crystal panel in a face-to-face relationship; and wherein the domain defining structure defines the tilting direction of the liquid crystals such that the tilting direction becomes a plurality of directions in each pixel when a voltage is applied between the substrates.

29. A liquid crystal display according to claim 28, wherein the optical retardation film satisfies:

$n_x \cong n_y > n_z$ and $0 \text{ nm} \leq (n_x - n_y)d \leq 10 \text{ nm}$ where d represents the thickness of an optical layer thereof.

30. A liquid crystal display according to claim 29, satisfying:

$0 \text{ deg.} < \theta \leq 15 \text{ deg.}$ where $\theta$ represents the angle defined by the direction of $n_z$ and the normal of the substrate.

31. A liquid crystal display according to claim 30, wherein an angle $\phi$ is any of 0 deg., 90 deg., 180 deg. and 270 deg., $\phi$ representing the angle defined by the azimuth angle at which $n_z$ is tilted and the absorption axis of the first and second polarizing elements.

32. A liquid crystal display according to claim 31 comprising:
N optical retardation films which satisfy $\theta \leq \alpha$ and $\phi = \beta$; and
N' optical retardation films which satisfy $\theta \leq \alpha$ and $\phi = \beta + 180°$, the liquid crystal display satisfying:

$0 < (\frac{1}{2} + \alpha/30) \times (R_{t1} + R_{t2} + \ldots + R_{tN}) + (\frac{1}{2} - \alpha/30) \times (R'_{t1} + R'_{t2} + \ldots + R'_{tN'}) < 0.88 \times (\Delta n_{LC} d_{LC} + R_{tPL})$; and $0 < (\frac{1}{2} - \alpha/30) \times (R_{t1} + R_{t2} + \ldots + R_{tN}) + (\frac{1}{2} + \alpha/30) \times (R'_{t1} + R'_{t2} + \ldots + R'_{tN'}) < 0.88 \times (\Delta n_{LC} d_{LC} + R_{tPL})$ where $0 \text{ deg.} < \alpha \leq 15 \text{ deg.}$; $\beta$ is any of 0 deg., 90 deg., 180 deg. and 270 deg.; $N \geq 0$ and $N' \geq 0$ ($N = N' = 0$ is excluded); $Rt_1$, $Rt_2$, ..., $R_{tN}$ represent retardations $R_t$ in the first through N-th optical retardation films whose angle $\phi = \beta$ where retardation $R_t = ((n_x + n_y)/2 - n_z)$; $R'_{t1}$, $R'_{t2}$, ..., $R'_{tN'}$, represent retardations $R_t$ in the first through N'-th optical retardation films whose angle $\phi = \beta + 180$; $\Delta n_{LC}$ represents anisotropy of refractivity of liquid crystals; $d_{LC}$ represents a cell thickness; and $R_{tPL}$ represents the sum of the retardations $R_t$ of films serving as an optical retardation film among support films used for the polarizing elements.

33. A liquid crystal display according to claim 32, further comprising an optical retardation film whose angle $\theta$ continuously or discontinuously changes in the direction of the thickness thereof.

34. A liquid crystal display comprising:
first and second substrates provided in a face-to-face relationship with a predetermined gap interposed therebetween;
a nematic liquid crystal layer having negative dielectric anisotropy which is sealed in the gap and whose liquid crystal molecules in the vicinity of the surfaces of the first and second substrates maintains a substantially vertical alignment to form a spray alignment as a whole when a voltage is applied;
a first polarizer provided on a surface of the first substrate opposite to the side thereof where the liquid crystal layer is located;
a second polarizer provided on a surface of the second substrate opposite to the side thereof where the liquid crystal layer is located; and
an optical compensation film provided at least between the first substrate and the first polarizer or between the second substrate and the second polarizer, for compensating any retardation in the liquid crystal layer.

35. A liquid crystal display according to claim 34, further comprising:
a first optical compensation film provided between the first substrate and the first polarizer and having discotic liquid crystals whose tilt angle is changed in accordance with linear changes in the tilt of liquid crystal molecules in a region of the liquid crystal layer closer to the first substrate that is one of two regions of the liquid crystal layer substantially equally divided in the normal direction of the substrate surface to compensate retardations attributable to the linear changes of the tilt; and
a second optical compensation film provided between the second substrate and the second polarizer and having discotic liquid crystals whose tilt angle is changed in accordance with linear changes in the tilt of liquid crystal molecules in a region of the liquid crystal layer closer to the second substrate that is one of the two regions of the liquid crystal layer substantially equally divided in the normal direction of the substrate surface to compensate retardations attributable to the linear changes of the tilt.

36. A liquid crystal display according to claim 35, wherein the first and second optical compensation films optically compensate the state of black in the normally black mode.

37. A liquid crystal display according to claim 36, wherein changes in the direction of a principal refractive index $n_z$ among principal refractive indices $n_x$, $n_y$ and $n_z$ of the discotic liquid crystals in the first optical compensation film are associated with the direction of changes in the principal refractive index $n_z$ of the liquid crystal molecules which are in the region closer to the first substrate that is one of the two substantially equal regions defined by dividing the liquid crystal layer in the normal direction of the substrate surface and wherein changes in the direction of a principal refractive index $n_z$ among principal refractive indices $n_x$, $n_y$ and $n_z$ of the discotic liquid crystals in the second optical compensation film are associated with the direction of changes in the principal refractive index $n_z$ of the liquid crystal molecules which are in the region closer to the second substrate that is one of the two substantially equal regions defined by dividing the liquid crystal layer in the normal direction of the substrate surface.

38. A liquid crystal display according to claim 37, wherein changes in the direction of the principal refractive index $n_z$ of the discotic liquid crystals in the first and second optical compensation films is linear relative to changes in the positions of the discotic liquid crystals in the normal direction of the substrate surface.

39. A liquid crystal display according to claim 35, wherein the retardation $\Delta n d$ ($\Delta n$ represents anisotropy of refractivity, and "d" represents the call gap) in the liquid crystal layer ranges from 500 to 2000 nm, and the retardation $R=((n_x+n_y)/2-n_z)D$ (D represents the thickness of each of the first and second optical compensation films) of each of the first and second optical compensation films ranges from 300 to 1200 nm.

40. A liquid crystal display according to claim 35, further comprising a third optical compensation film which is an index ellipsoid satisfying $n_x=n_y<n_z$ and whose principal refractive index $n_z$ coincides with the normal of the substrate surface and a fourth optical compensation film which is a uniaxial optical retardation film with an optic axis that coincides with the direction of the transmission axis of the first polarizer are provided at least between the first optical compensation film and the first polarizer or between the second optical compensation film and the second polarizer, the third optical compensation film being located closer to the liquid crystal layer.

41. A liquid crystal display comprising:
a liquid crystal layer in a twisted structure sealed between two substrates in a face-to-face relationship in which the direction of alignment is about 90 deg. different between a region in the vicinity of one of the substrates and a region in the vicinity of the other substrate;
two polarizing films respectively provided outside the two substrates, the polarizing axes of the polarizing films being in parallel with each other and being at an angle of about 45 deg. to the direction of alignment of liquid crystals in the vicinity of the substrates; and
an optical retardation film whose principal refractive indices $n_x$, $n_y$, and $n_z$ satisfy $n_x \cong n_y > n_z$, the direction of the principal refractive index $n_x$ being substantially in parallel with the polarizing axes of the polarizing films; the direction of the principal refractive index $n_z$ being tilted at a tilt angle $\theta$ from the normal direction of the film surface about the direction of the principal refractive index $n_x$, the direction of the principal refractive index $n_y$ being tilted at the tilt angle $\theta$ from a direction in parallel with the film surface at the same time;
wherein the tilt angle $\theta$ is in a range expressed by 30 deg.$\leq \theta \leq$70 deg.

42. A liquid crystal display comprising:
a liquid crystal layer in a twisted structure sealed between two substrates in a face-to-face relationship in which the direction of alignment is about 90 deg. Different between a region in the vicinity of one of the substrates and a region in the vicinity of the other substrate;
two polarizing films respectively provided outside the two substrates, the polarizing axes of the polarizing films being in parallel with each other and being at an angle of about 45 deg. to the direction of alignment of liquid crystals in the vicinity of the substrates; and
an optical retardation film whose principal refractive indices $n_x$, $n_y$, and $n_z$ satisfy $n_x \cong n_y > n_z$, the direction of the principal refractive index $n_x$ being substantially in parallel with the polarizing axes of the polarizing films; the direction of the principal refractive index $n_z$ being tilted at a tilt angle $\theta$ from the normal direction of the film surface about the direction of the principal refractive index $n_x$, the direction of the principal refractive index $n_y$ being tilted at the tilt angle $\theta$ from a direction in parallel with the film surface at the same time;
wherein the principal refractive indices $n_x$ and $n_y$ satisfy 70 nm$<(n_x-n_y) \times D<$160 nm where D represents the thickness of the optical retardation film.

43. A liquid crystal display comprising:
a liquid crystal layer in a twisted structure sealed between two substrates in a face-to-face relationship in which the direction of alignment is about 90 deg. different between a region in the vicinity of one of the substrates and a region in the vicinity of the other substrate;
two polarizing films respectively provided outside the two substrates, the polarizing axes of the polarizing films being in parallel with each other and being at an angle of about 45 deg. to the direction of alignment of liquid crystals in the vicinity of the substrates; and
an optical retardation film whose principal refractive indices $n_x$, $n_y$, and $n_z$ satisfy $n_x \cong n_y > n_z$, the direction of the principal refractive index $n_x$ being substantially in parallel with the polarizing axes of the polarizing films; the direction of the principal refractive index $n_z$ being tilted at a tilt angle $\theta$ from the normal direction of the film surface about the direction of the principal refractive index $n_x$, the direction of the principal refractive index $n_y$ being tilted at the tilt angle $\theta$ from a direction in parallel with the film surface at the same time;
wherein a retardation R in the optical retardation film satisfies 400 nm$\leq$R$\leq$550 nm.

44. A liquid crystal display comprising:
a liquid crystal layer in a twisted structure sealed between two substrates in a face-to-face relationship in which the direction of alignment in the vicinity of one of the substrates and in the vicinity of the other substrate are twisted at an angle less than 90 deg;
two polarizing films respectively provided outside the two substrates and whose polarizing axes are orthogonal to each other;
an optical retardation film which is provided between one of the substrates and one of the polarizing films provided outside the same and whose principal refractive indices $n_x$, $n_y$, and $n_z$ satisfy $n_x \cong n_y > n_z$ where the z-axis extends in the direction of the thickness of the film; and
at least two uniaxial films provided between the other substrate and the other polarizing film provided outside the same, the direction of the optic axis of at least one of the uniaxial films coinciding with the absorption axis or transmission axis of the other polarizing film;
wherein a retardation R in the optical retardation film satisfies 70 nm$\leq$R$\leq$200 nm.

45. A liquid crystal display comprising:
a liquid crystal layer in a twisted structure sealed between two substrates in a face-to-face relationship in which the direction of alignment in the vicinity of one of the substrates and in the vicinity of the other substrate are twisted at an angle less than 90 deg;
two polarizing films respectively provided outside the two substrates and whose polarizing axes are orthogonal to each other;
an optical retardation film which is provided between one of the substrates and one of the polarizing films provided outside the same and whose principal refractive indices $n_x$, $n_y$ and $n_z$ satisfy $n_x \cong n_y > n_z$ where the z-axis extends in the direction of the thickness of the film; and at least two uniaxial films provided between the other substrate and the other polarizing film provided outside the same, the direction of the optic axis of at least one of the uniaxial films coinciding with the absorption axis or transmission axis of the other polarizing film;

wherein the uniaxial film having the other optic axis has a retardation at a value ranging from 20 nm to 100 nm and wherein the other optic axis is set in a direction in which the axis does not coincide with the absorption axis and transmission axis of the other polarizing film.

46. A liquid crystal display comprising:

a liquid crystal layer in a twisted structure sealed between two substrates in a face-to-face relationship in which the direction of alignment in the vicinity of one of the substrates and in the vicinity of the other substrate are twisted at an angle less than 90 deg;

two polarizing films respectively provided outside the two substrates and whose polarizing axes are orthogonal to each other;

an optical retardation film which is provided between one of the substrates and one of the polarizing films provided outside the same and whose principal refractive indices $n_x$, $n_y$ and $n_z$ satisfy $n_x \cong n_y > n_z$ where the z-axis extends in the direction of the thickness of the film; and at least two uniaxial films provided between the other substrate and the other polarizing film provided outside the same, the direction of the optic axis of at least one of the uniaxial films coinciding with the absorption axis or transmission axis of the other polarizing film;

wherein the direction of alignment of liquid crystal molecules in the middle of the call gap is tilted at about 45 deg. (or 135 deg.) from the vertical and horizontal direction of the panel when no voltage is applied.

47. A liquid crystal display comprising:

a liquid crystal panel having a pair of substrates and liquid crystals which are sealed between the pair of substrates and whose molecules are aligned substantially perpendicularly to the surfaces of the substrates when no voltage is applied;

first and second polarizing elements provided on both sides of the liquid crystal panel such that their absorption axes are orthogonal to each other;

an optical retardation film which is provided between the liquid crystal panel and the first polarizing element, which satisfies $n_x > n_y \cong n_z$ and which is provided such that its phase-delay axis (the direction of $n_x$) is orthogonal to the absorption axis of the first polarizing element, $n_x$ and $n_y$ representing refractive indices in directions in the plane of the film among principal refractive indices $n_x$, $n_y$ and $n_z$, $n_z$ representing a refractive index in the normal direction of the film; and at least one additional optical retardation film which is provided in a location at least between the first polarizing element and the first optical retardation film, between the first optical retardation film and the liquid crystal panel or between the second polarizing element and the liquid crystal panel and which satisfies $n_x \cong n_y > n_z$, $n_x$ and $n_y$ representing refractive indices in directions in the plane of the film among principal refractive indices $n_x$, $n_y$ and $n_z$, $n_z$ representing a refractive index in the normal direction of the film.

48. A liquid crystal display according to claim 47, satisfying:

$$0 \leq R_1;$$

$$0 \leq Rt_1 + Rt_2 + \ldots + Rt_N + Rt'_1 + Rt'_2 + \ldots + Rt'_M;$$

$$(-0.08 \times R_{LC} + 58) \times \alpha + 95 \times (1-\alpha) - 60 \leq R_1 \leq (-0.08 \times R_{LC} + 58) \times \alpha + 95 \times (1-\alpha) + 60; \text{ and}$$

$$(1.13 \times R_{LC} - 105) \times \alpha + (0.89 \times R_{LC} - 137)(1-\alpha) - 25 \leq Rt_1 + Rt_2 + \ldots + Rt_N + Rt'_1 + Rt'_2 + \ldots + Rt'_M \leq (1.13 \times R_{LC} - 105) \times \alpha + (0.89 \times R_{LC} - 137)(1-\alpha) + 25$$

wherein $\alpha = (Rt_1 + Rt_2 + \ldots + Rt_N)/(Rt_1 + Rt_2 + \ldots + Rt_N + Rt'_1 + Rt'_2 + \ldots + Rt'_M)$ and wherein the numerical values are in nm, $R_1$ representing retardations $(n_x - n_y)d$ of the first optical retardation film (d representing the thickness of the optical retardation films), $Rt_1, Rt_2, \ldots Rt_n$ representing retardations of N optical retardation films $(n_x + n_y)/2 - n_z)d$ among the additional optical retardation films which are provided at least between the first polarizing element and the first optical retardation film, $Rt'_1, Rt'_2, \ldots, Rt'_M$ (N+M≧1) representing retardations of M optical retardation films $(n_x + n_y)/2 - n_z)d$ among the additional optical retardation films which are provided at least between the first optical retardation film and the liquid crystal panel or between the second polarizing element and the liquid crystal panel (d representing the thickness of the additional optical retardation films), $R_{LC}$ representing a retardation in the liquid crystal panel.

49. A liquid crystal display according to claim 47, satisfying:

$$0 \leq R_1;$$

$$0 \leq Rt_1 + Rt_2 + \ldots + Rt_N + Rt'_1 + Rt'_2 + \ldots + Rt'_M;$$

$$(-0.08 \times R_{LC} + 58) \times \alpha + 95 \times (1-\alpha) - 30 \leq R_1 \leq (-0.08 \times R_{LC} + 58) \times \alpha + 95 \times (1-\alpha) + 30; \text{ and}$$

$$(1.13 \times R_{LC} - 105) \times \alpha + (0.89 \times R_{LC} - 137)(1-\alpha) - 60 \leq Rt_1 + Rt_2 + \ldots + Rt_N + Rt'_1 + Rt'_2 + \ldots + Rt'_M \leq (1.13 \times R_{LC} - 105) \times \alpha + (0.89 \times R_{LC} - 137)(1-\alpha) + 60$$

wherein $\alpha = (Rt_1 Rt_2 + \ldots Rt_N)/(Rt_1 + Rt_2 + \ldots + Rt_N + Rt'_1 Rt'_2 + \ldots Rt'_M)$ and wherein the numerical values are in nm, $R_1$ representing retardation $(n_x - n_y)d$ of the first optical retardation films (d representing the thickness of the optical retardation films), $Rt_1, Rt_2, \ldots, Rt_N$ representing retardations of N optical retardation films $(n_x + n_y)/2 - n_z)d$ among the additional optical retardation films which are provided at least between the first polarizing element and the first optical retardation film, $Rt'_1, Rt'_2, \ldots, R'_M$ (N+M≧1) representing retardations of M optical retardation films $(n_x + n_y)/2 - n_z)d$ among the additional optical retardation films which are provided at least between the first optical retardation film and the liquid crystal panel or between the second polarizing element and the liquid crystal panel (d representing the thickness of the additional optical retardation films), $R_{LC}$ representing a retardation in the liquid crystal panel.

50. A liquid crystal display according to claim 47, wherein the optical retardation films is a stretched film.

51. A liquid crystal display according to claim 47, wherein the optical retardation films comprises a polymer liquid crystal layer.

52. A liquid crystal display comprising:

a liquid crystal panel in which a liquid crystal layer made of liquid crystals is sandwiched between a pair of substrates, the liquid crystals including liquid crystal molecules whose longitudinal directions are aligned substantially perpendicularly to surfaces of the substrates when no voltage is applied;

first and second polarizing elements provided outside the liquid crystal panel on both sides thereof and disposed such that respective absorption axes are orthogonal to each other and such that the absorption axes are substantially at an angle of 45 deg. to the direction of alignment of the liquid crystal molecules when a voltage is applied to the liquid crystals;

a first optical retardation film of a first type provided between the first polarizing element and the liquid crystal panel such that a phase-delay axis thereof is orthogonal to the absorption axis of the first polarizing element, the first type of optical retardation film being an optical retardation film whose in-plane refractive index $n_x$ is greater than both of an in-plane refractive index $n_y$ thereof and a refractive index $n_z$ thereof in the direction of the thickness thereof;

a second optical retardation film of the first type provided between the second polarizing element and the liquid crystal panel such that a phase-delay axis thereof is orthogonal to the absorption axis of the second polarizing element, the second optical retardation film of the first type being an optical retardation film in which $n_x$ is greater than both of an in-plane refractive index $n_y$ thereof and a refractive index $n_z$ thereof in the direction of the thickness thereof; and no additional or at least one optical retardation film of a second type in which $n_x$ and $n_y$ are substantially equal to each other and in which $n_x$ and $n_y$ are greater than $n_z$ provided in at least one location between the first polarizing element and the first optical retardation film of the first type, between the second polarizing element and the second optical retardation film of the first type, between the first optical retardation film of the first type and the liquid crystal panel or between the second optical retardation film of the first type and the liquid crystal panel, the liquid crystal display satisfying:

$$Rp-t=2\times(-0.08\times R_{LC}+58 \text{ nm}+\alpha)$$

where $$\alpha=30 \text{ nm; and}$$

$$Rt-t=(1.05\pm0.05)\times R_{LC}-47 \text{ nm}+\beta$$

where $-100$ nm $\leq \beta \leq 47$ nm, a retardation $R_{LC}$ in the liquid crystal layer being represented by $\Delta n d$ that is the product of birefringence $\Delta n$ of the liquid crystals and the thickness d of the liquid crystal layer, a retardation Rp in an optical retardation film in a direction in the plane thereof being represented by $(n_x-n_y)d$, a retardation Rt in the direction of the thickness being represented by $(n_x+n_y)/2-n_z)d$, the sum of retardations Rp in in-plane directions of the plurality of optical retardation films excluding optical retardation films whose phase-delay axes are located in parallel with the absorption axes of polarizing elements adjacent thereto being represented by Rp-t, the sum of retardations Rt in the direction of thickness of the plurality of optical retardation films being represented by Rt-t.

53. A liquid crystal display according to claim 52, wherein the retardation $R_{LC}$ in the liquid crystal layer is in the range between 250 nm and 310 nm inclusive; the sum Rt-t of the retardations in the direction of the thickness is in the range between 180 nm and 260 nm inclusive; and the sum of the retardations in in-plane directions of the optical retardation films of the first type is in the range between 25 nm and 50 nm inclusive.

54. A liquid crystal display according to claim 52, wherein the retardation $R_{LC}$ in the liquid crystal layer is in the range between 310 nm and 390 nm inclusive; the sum Rt-t of the retardations in the direction of the thickness is in the range between 230 nm and 350 nm inclusive; and the sum of the retardations in in-plane directions of the optical retardation films of the first type is in the range between 25 nm and 50 nm inclusive.

55. A liquid crystal display according to claim 52, wherein the optical retardation film of the first type is a film stretched in the direction of one or two axes.

56. A liquid crystal display according to claim 52, wherein the optical retardation film of the second type is a protective member that constitutes a polarizer in combination with the polarizing element.

57. A liquid crystal display comprising:

a liquid crystal panel in which a liquid crystal layer made of liquid crystals is sandwiched between a pair of substrates, the liquid crystals including liquid crystal molecules whose longitudinal directions are aligned substantially perpendicularly to surfaces of the substrates when no voltage is applied;

first and second polarizing elements provided outside the liquid crystal panel on both sides thereof and disposed such that respective absorption axes are orthogonal to each other and such that the absorption axes are substantially at an angle of 45 deg. to the direction of alignment of the liquid crystal molecules when a voltage is applied to the liquid crystals;

a first optical retardation film of a first type provided between the first polarizing element and the liquid crystal panel such that a phase-delay axis thereof is orthogonal to the absorption axis of the first polarizing element, the first type of optical retardation film being an optical retardation film whose in-plane refractive index $n_x$ is greater than both of an in-plane refractive index $n_y$ thereof and a refractive index $n_x$ thereof in the direction of the thickness thereof;

no additional or at least one optical retardation film of a second type provided in which $n_x$ and $n_y$ are substantially equal to each other and in which $n_x$ and $n_y$ are greater than $n_z$ in at least one location between the first polarizing element and the first optical retardation film of the first type, between the second polarizing element and the second optical retardation film of the first type, between the first optical retardation film of the first type and the liquid crystal panel or between the second optical retardation film of the first type and the liquid crystal panel, the liquid crystal display satisfying:

$$Rp-t=2\times(-0.08\times R_{LC}+58 \text{ nm}+\alpha)$$

where $$\alpha=\pm30 \text{ nm;}$$

and $$Rt-t=(1.05\pm0.05)\times R_{LC}47 \text{ nm}+\beta$$

where −100 nm 1347 nm, a retardation $R_{LC}$ in the liquid crystal layer being represented by Δnd that is the product of birefringence Δn of the liquid crystals and the thickness d of the liquid crystal layer, a retardation Rp in an optical retardation film in a direction in the plane thereof being represented by $(n_x-n_y)d$, a retardation Rt in the direction of the thickness being represented by $(n_x+n_y)/2-n_z)d$ the sum of retardations Rp in in-plane directions of the plurality of optical retardation films excluding optical retardation films whose phase-delay axes are located in parallel with the absorption axes of polarizing elements adjacent thereto being represented by Rp–t, the sum of retardations Rt in the direction of thickness of the plurality of optical retardation films being represented by Rt–t.

58. A liquid crystal display according to claim 57, wherein the retardation $R_{LC}$ in the liquid crystal layer is in the range between 250 nm and 310 nm inclusive; the sum Rt–t of the retardations in the direction of the thickness is in the range between 180 nm and 260 nm inclusive; and the sum of the retardations in in-plane directions of the optical retardation films of the first type is in the range between 25 nm and 50 nm inclusive.

59. A liquid crystal display according to claim 57, wherein the retardation $R_{LC}$ in the liquid crystal layer is in the range between 310 nm and 390 nm inclusive; the sum Rt–t of the retardations in the direction of the thickness is in the range between 230 nm and 350 nm inclusive; and the sum of the retardations in in-plane directions of the optical retardation films of the first type is in the range between 25 nm and 50 nm inclusive.

60. A liquid crystal display according to claim 57, wherein the optical retardation film of the first type is a film stretched in the direction of one or two axes.

61. A liquid crystal display according to claim 57, wherein the optical retardation film of the second type is a protective member that constitutes a polarizer in combination with the polarizing element.

* * * * *

UNITED STATES PATENT AND TRADEMARK OFFICE
CERTIFICATE OF CORRECTION

PATENT NO. : 7,319,500 B2
APPLICATION NO. : 09/825116
DATED : January 15, 2008
INVENTOR(S) : Yoshida et al.

It is certified that error appears in the above-identified patent and that said Letters Patent is hereby corrected as shown below:

In the Claims:

Col. 58, line 27, delete "$n_z$" and insert --$n_x$--.

Col. 62, line 33, delete "$30° \leqq \theta 160°$" and insert --$30° \leq \theta 1 \leq 60°$--.

Col. 62, line 36, delete "$\theta 1 \leqq \theta 2 \leqq 85°$" and insert --$\theta 1 \leq \theta 2 < 85°$--.

Col. 63, line 58, delete "$0 < (1/2 + \alpha/30) \times (R_{t1} + R_{t2} + ... + R_{tN}) + (1/2 - \alpha/30) \times (R'_{t1} + R_{t2} + ... + R'_{tN'}) < 0.88 \times (\Delta n_{LC} \cdot d_{LC} + R_{tPL})$" and insert --$0 < (1/2 + \alpha/30) \times (R_{t1} + R_{t2} + ... + R_{tN}) + (1/2 - \alpha/30) \times (R'_{t1} + R'_{t2} + ... + R'_{tN'}) < 0.88 \times (\Delta n_{LC} \cdot d_{LC} + R_{tPL})$--.

Col. 63, line 58, delete "$R_{t2} + ... + R'_{tN'})$" and insert --$R'_{t2} + ... + R'_{tN'})$--.

Col. 69, line 51, delete "$\alpha = 30$ nm" and insert --$\alpha = \pm 30$ nm--.

Col. 70, line 67, delete "Rt-t = $(1.05 \pm 0.05) \times R_{LC} 47$ nm $+\beta$" and insert -- Rt-t = $(1.05 \pm 0.05) \times R_{LC} - 47$ nm $+\beta$--.

Col. 71, line 1, delete "–100nm 1347 nm" and insert ---$100$ nm $\leq \beta \leq 47$ nm--.

Signed and Sealed this

First Day of July, 2008

JON W. DUDAS
*Director of the United States Patent and Trademark Office*